United States Patent [19]

Yianilos et al.

[11] Patent Number: 4,490,811
[45] Date of Patent: Dec. 25, 1984

[54] STRING COMPARATOR DEVICE SYSTEM CIRCUIT AND METHOD

[76] Inventors: Peter N. Yianilos, 2807 NE. 36 St.; Samuel R. Buss, Apt. 205, 2700 NE. 51 St., both of Fort Lauderdale, Fla. 33308

[21] Appl. No.: 331,631

[22] Filed: Dec. 17, 1981

Related U.S. Application Data

[63] Continuation-in-part of Ser. No. 20,518, Mar. 14, 1979, abandoned.

[51] Int. Cl.³ ............................................. G06F 15/40
[52] U.S. Cl. .................................................. 364/900
[58] Field of Search ........................ 364/200, 300, 900

[56] References Cited

U.S. PATENT DOCUMENTS 4,290,115 9/1981 Pitt et al. .............................. 364/900

Primary Examiner—Raulfe B. Zache
Attorney, Agent, or Firm—Malin, Haley & McHale

[57] ABSTRACT

The string comparator device for comparison of strings of indicia at high speeds for use in a system circuit in a computer system. The string comparison device provides a numeric measurement of the degree of similarity between the compared indicia strings as defined by a mathematical algorithm. The algorithm is solved through a new string comparator device or a new program in a computer system. The system circuit in chip form can be connected in a storage loop of a computer system to locate and quickly extract records that are very similar to the supplied query. Inexact queries will rapidly locate records similar with respect to indicia string related measurements of similarity. The method of indicia string comparison in the improved string comparator device can provide rapid response to queries in a computation time proportional to the average length of the indicia string.

21 Claims, 106 Drawing Figures

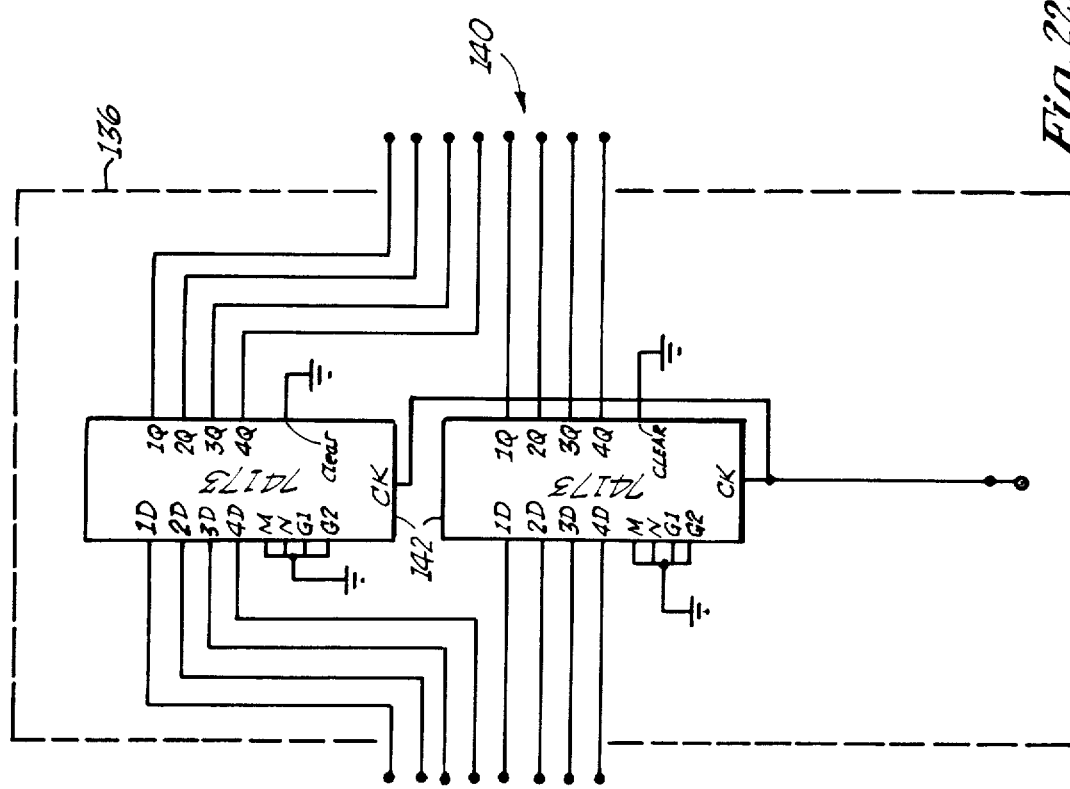
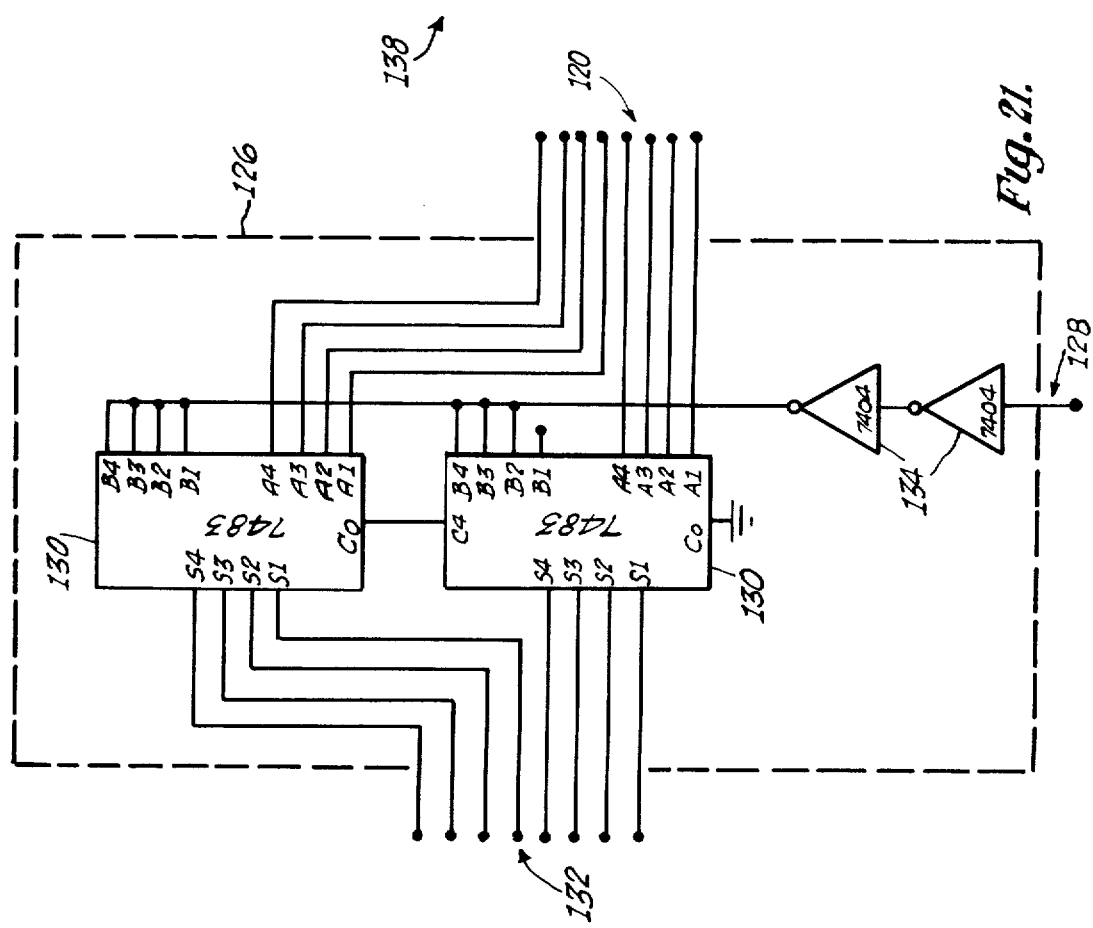

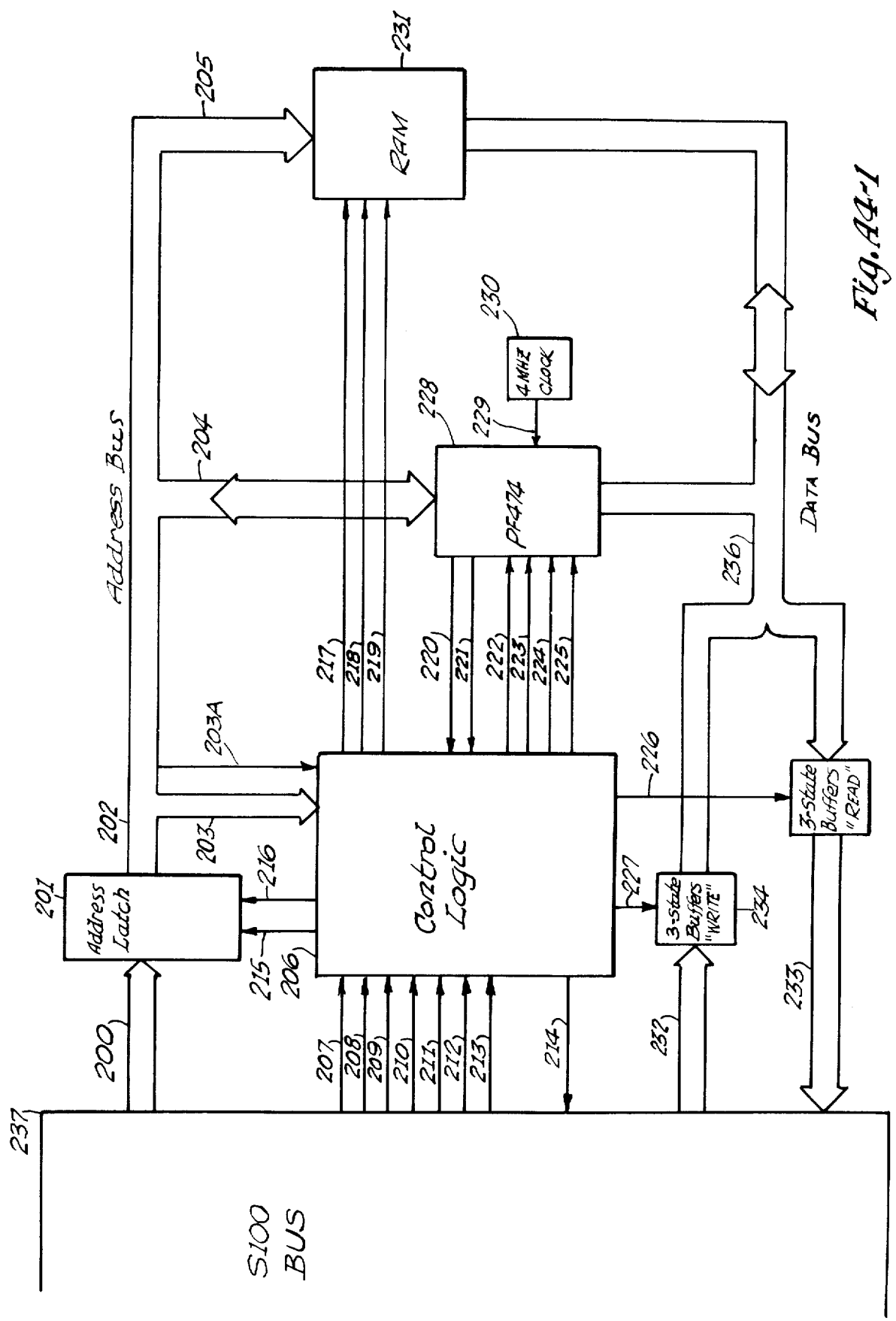
Fig.A4-1

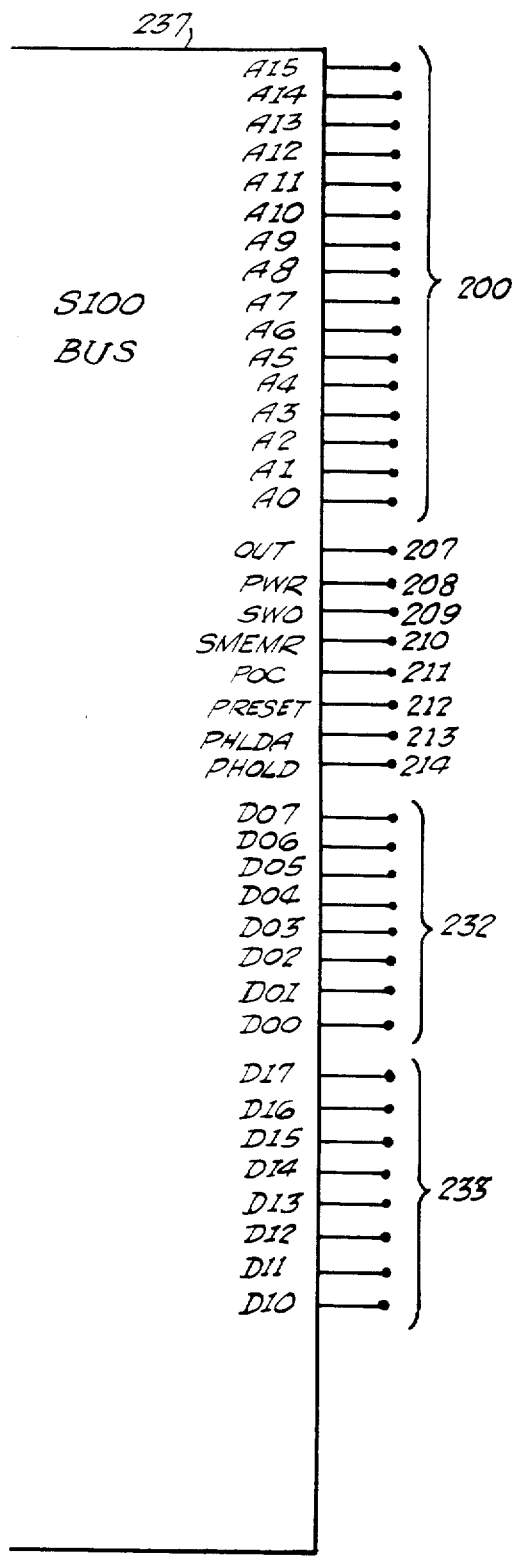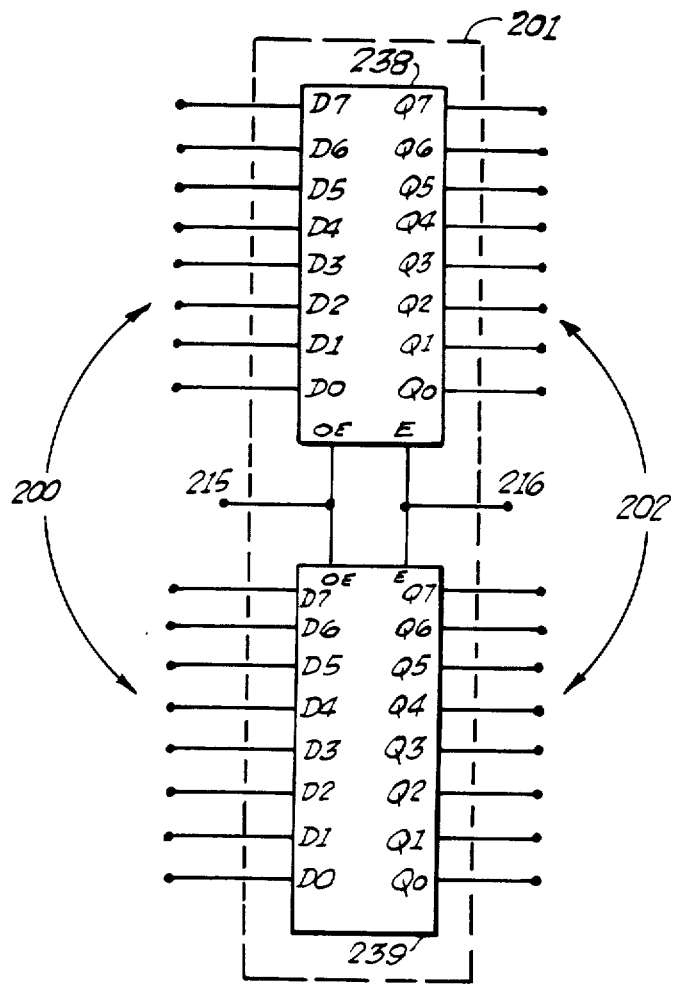
Fig. A4-3.
Fig. A4-2.

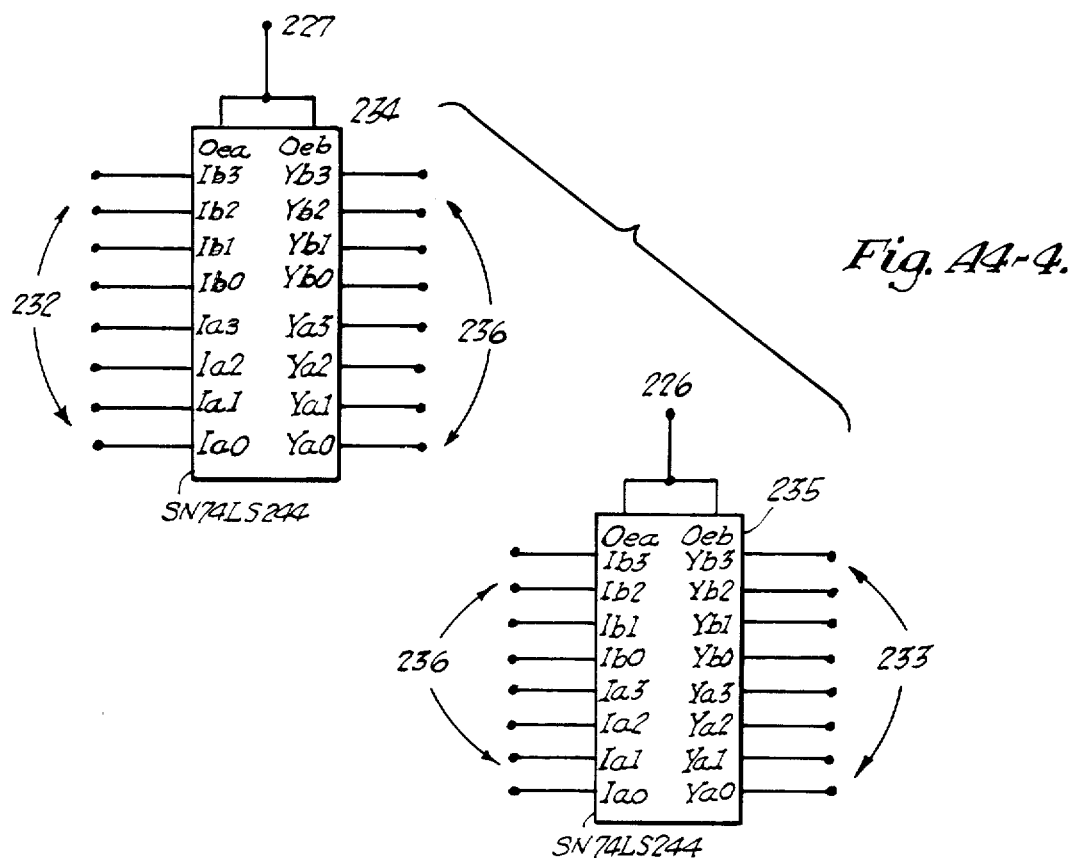
Fig. A4-4.
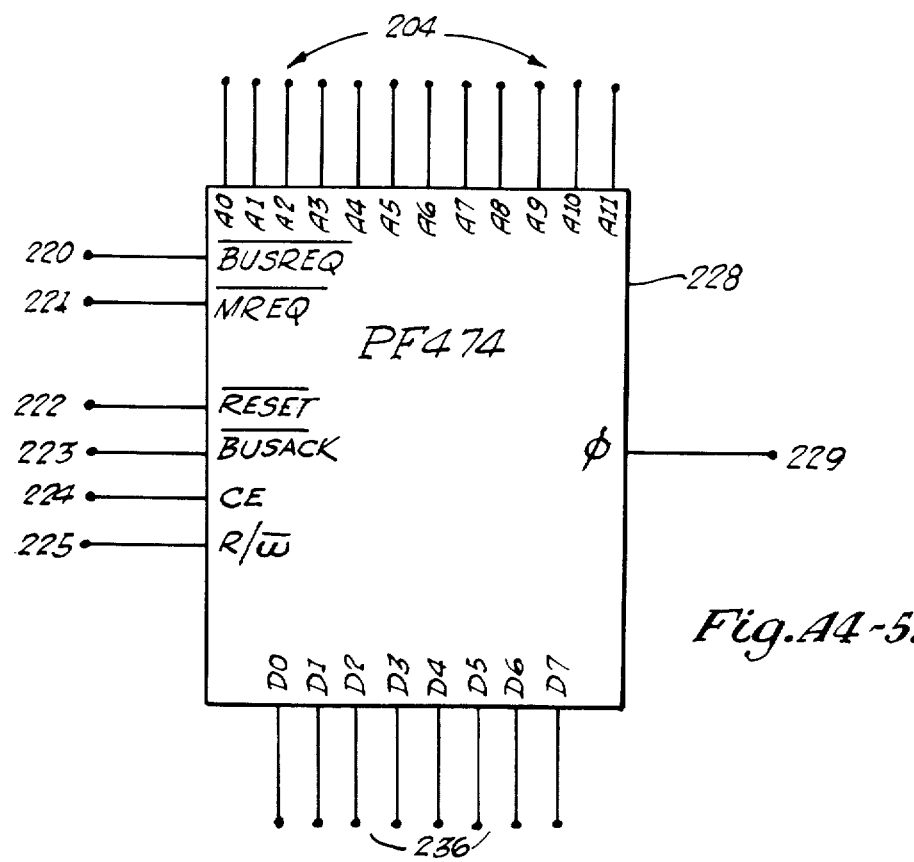
Fig. A4-5.

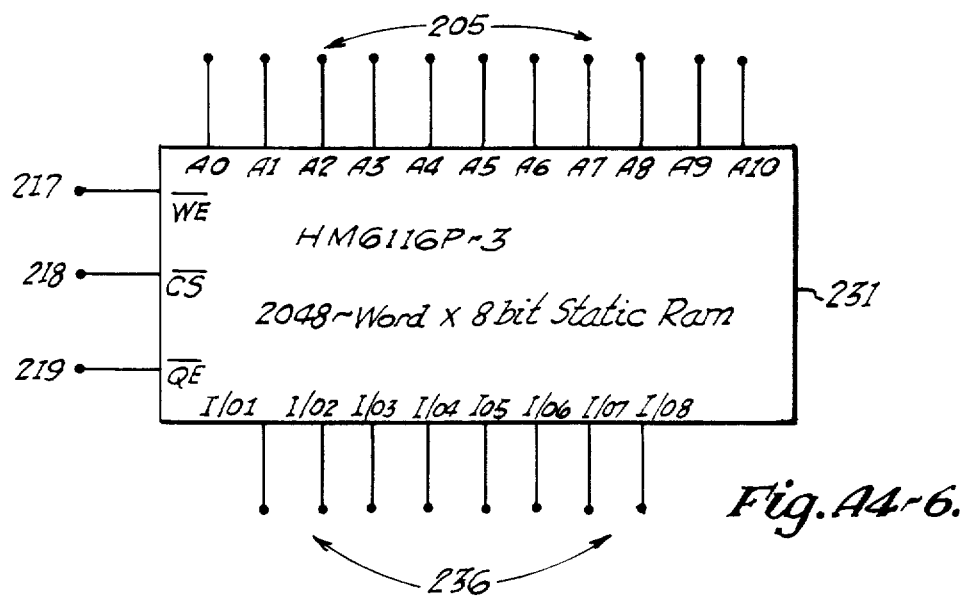
Fig. A4-6.
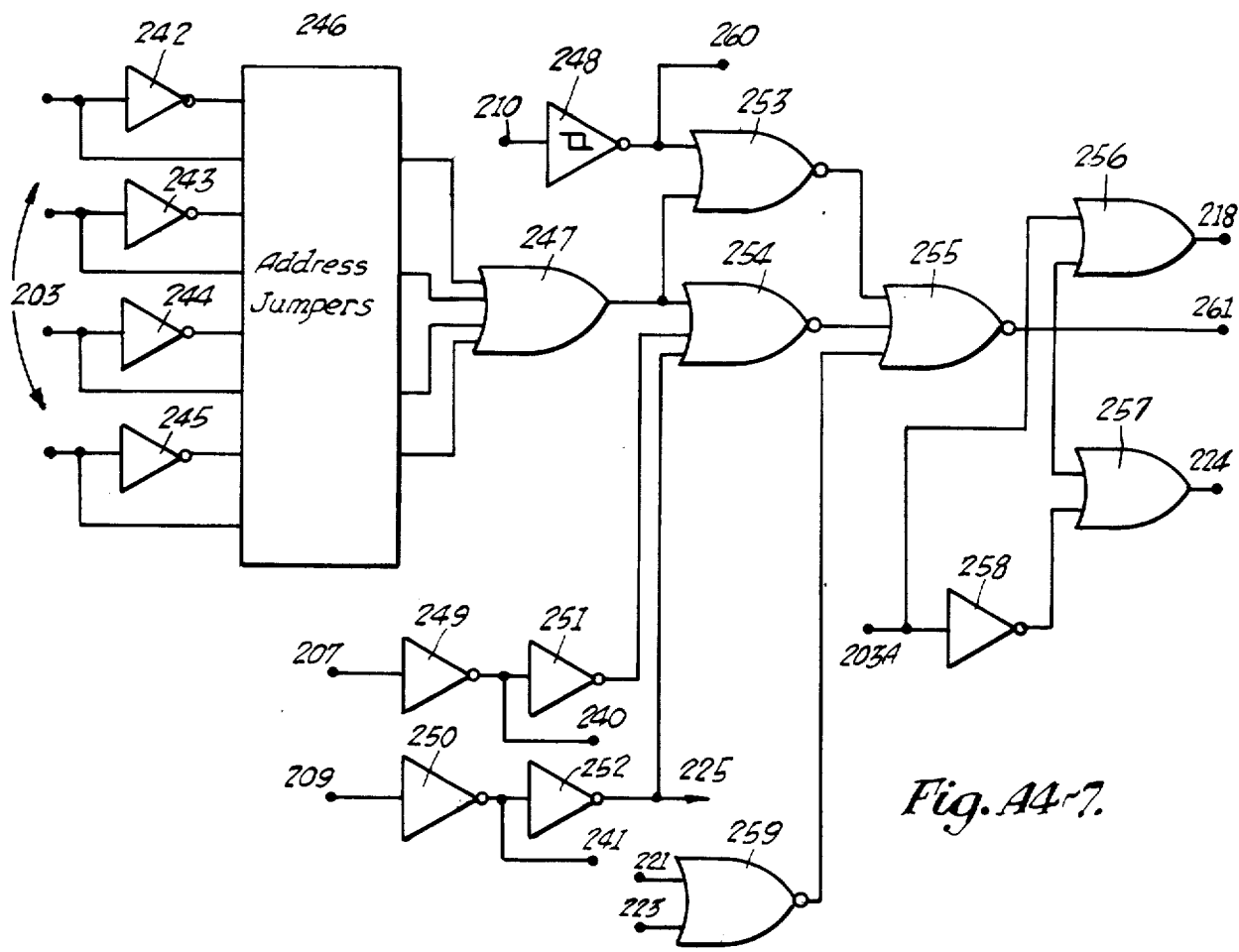
Fig. A4-7.

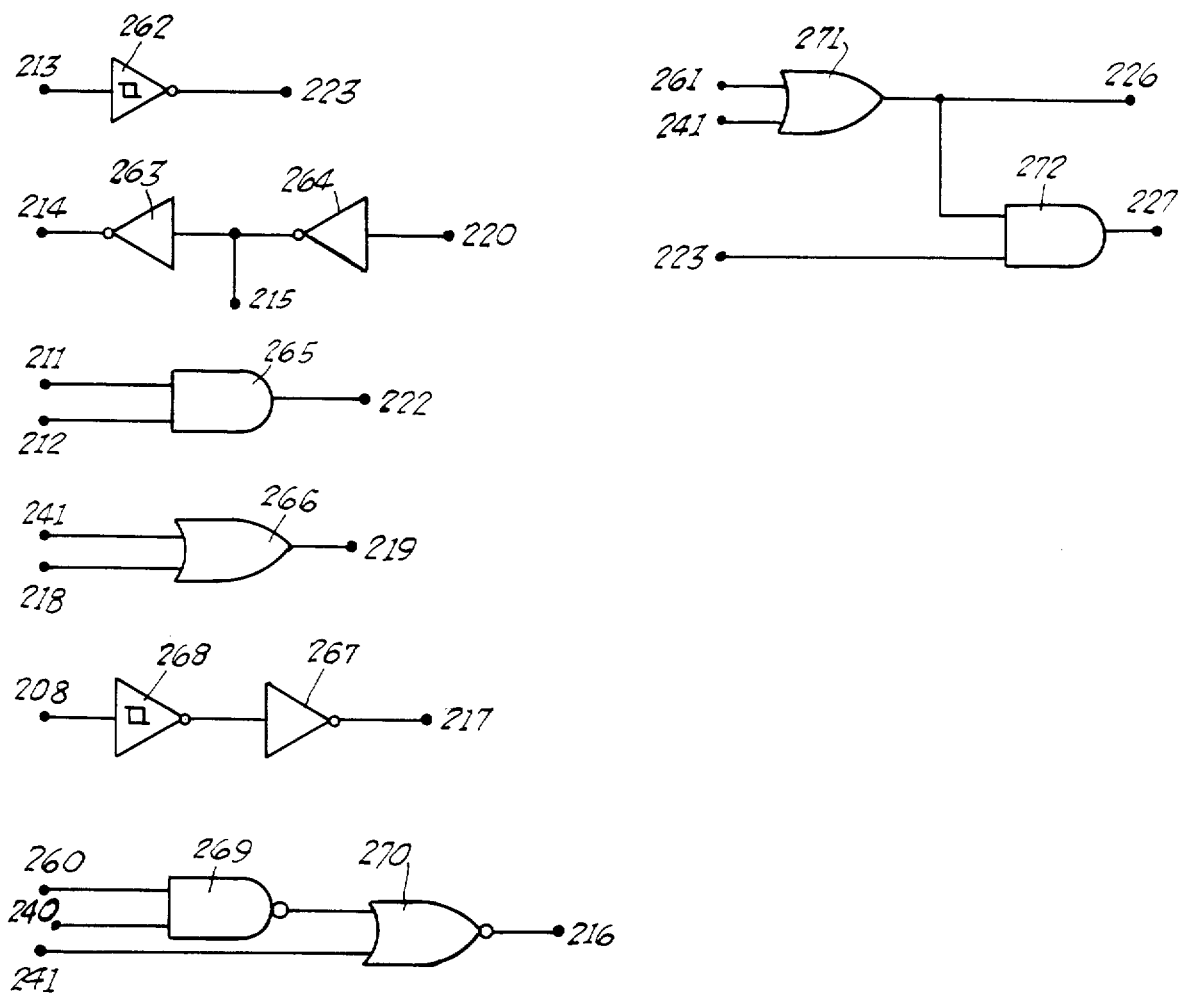
Fig. A4-8

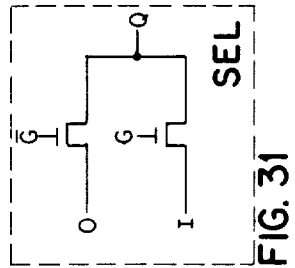
FIG. 31 SEL
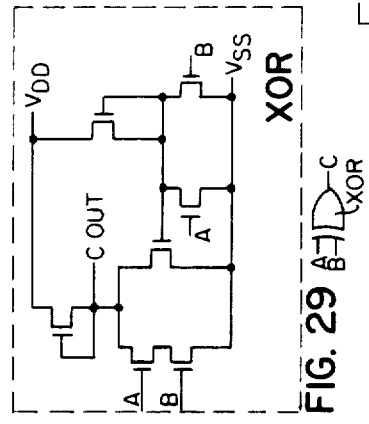
FIG. 29 XOR
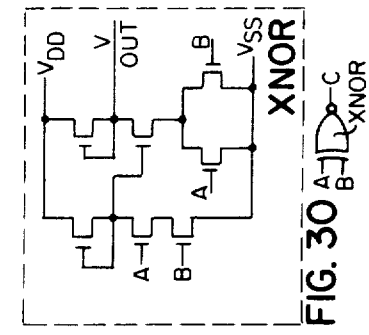
FIG. 30 XNOR
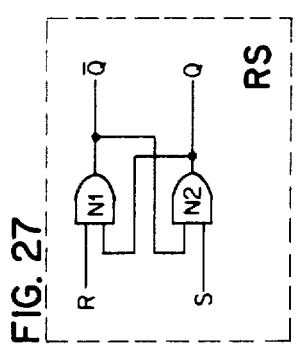
FIG. 27 RS
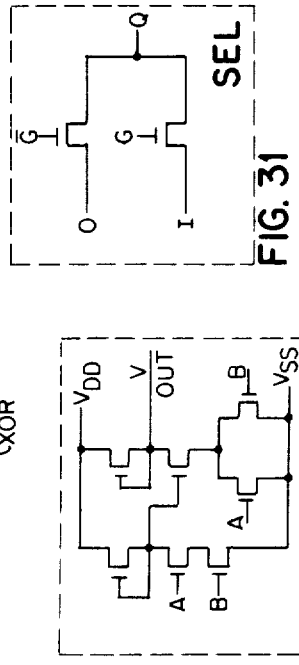
FIG. 28 RSX

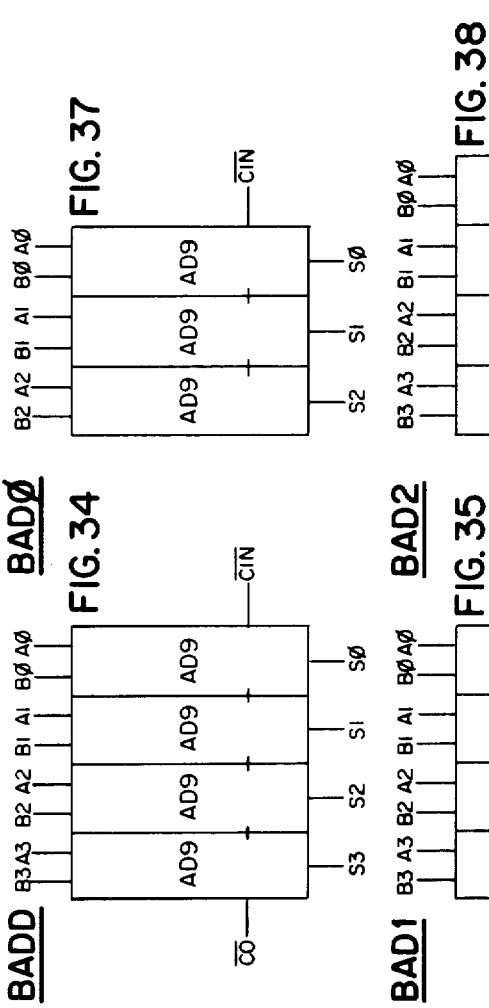
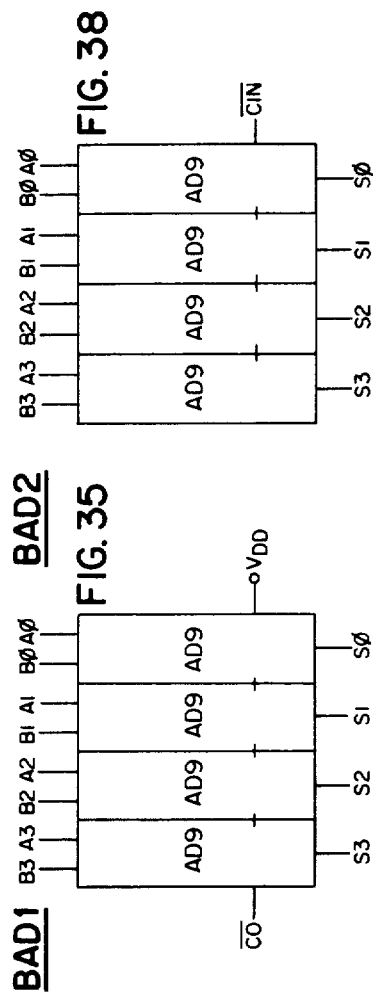
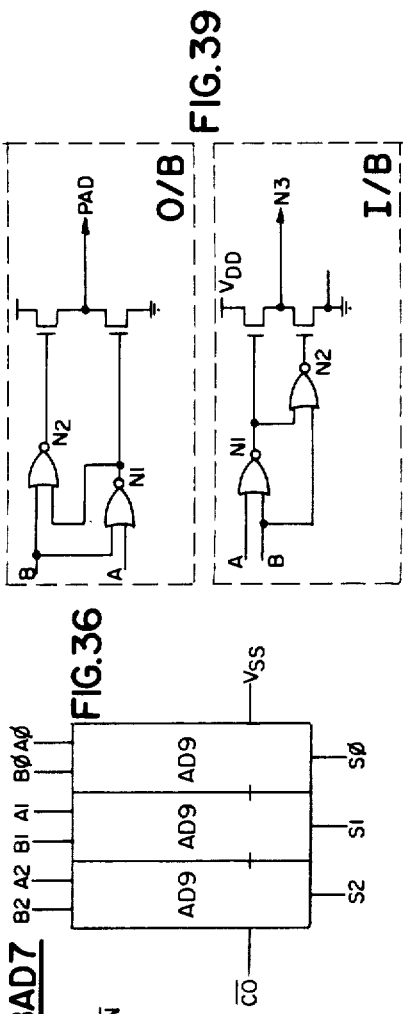
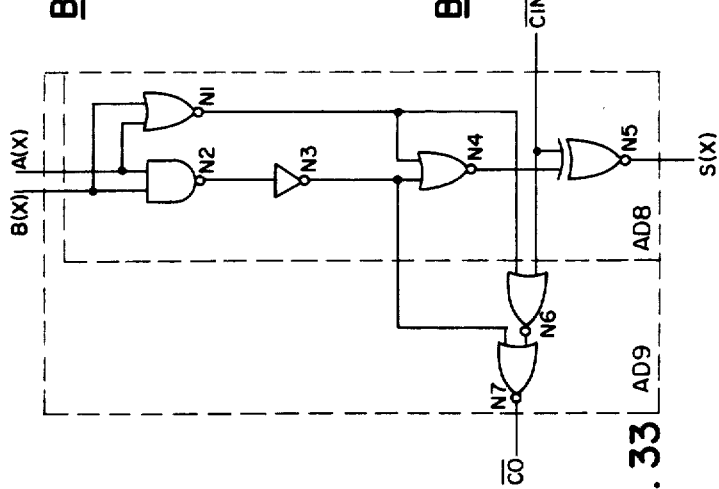

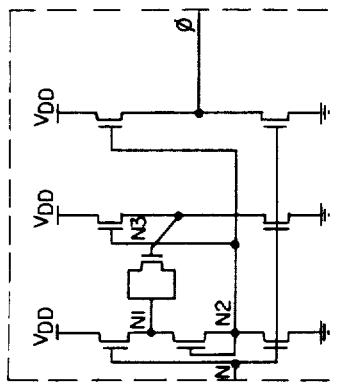
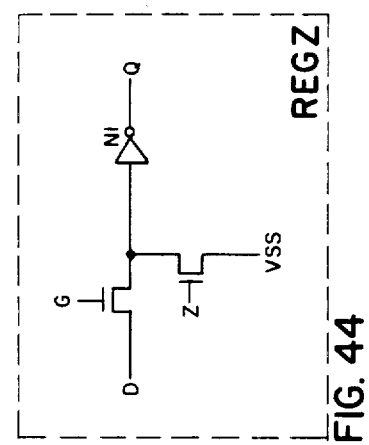
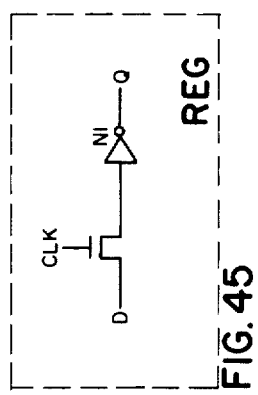
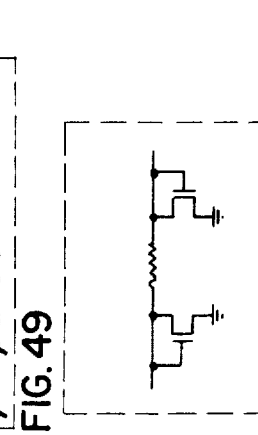
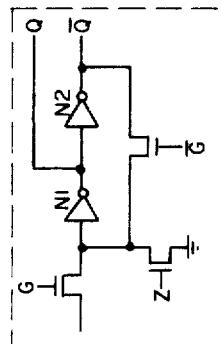
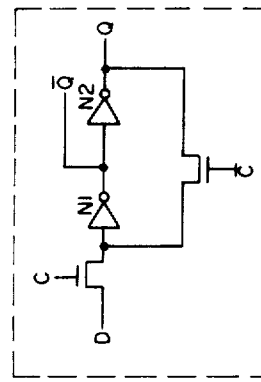

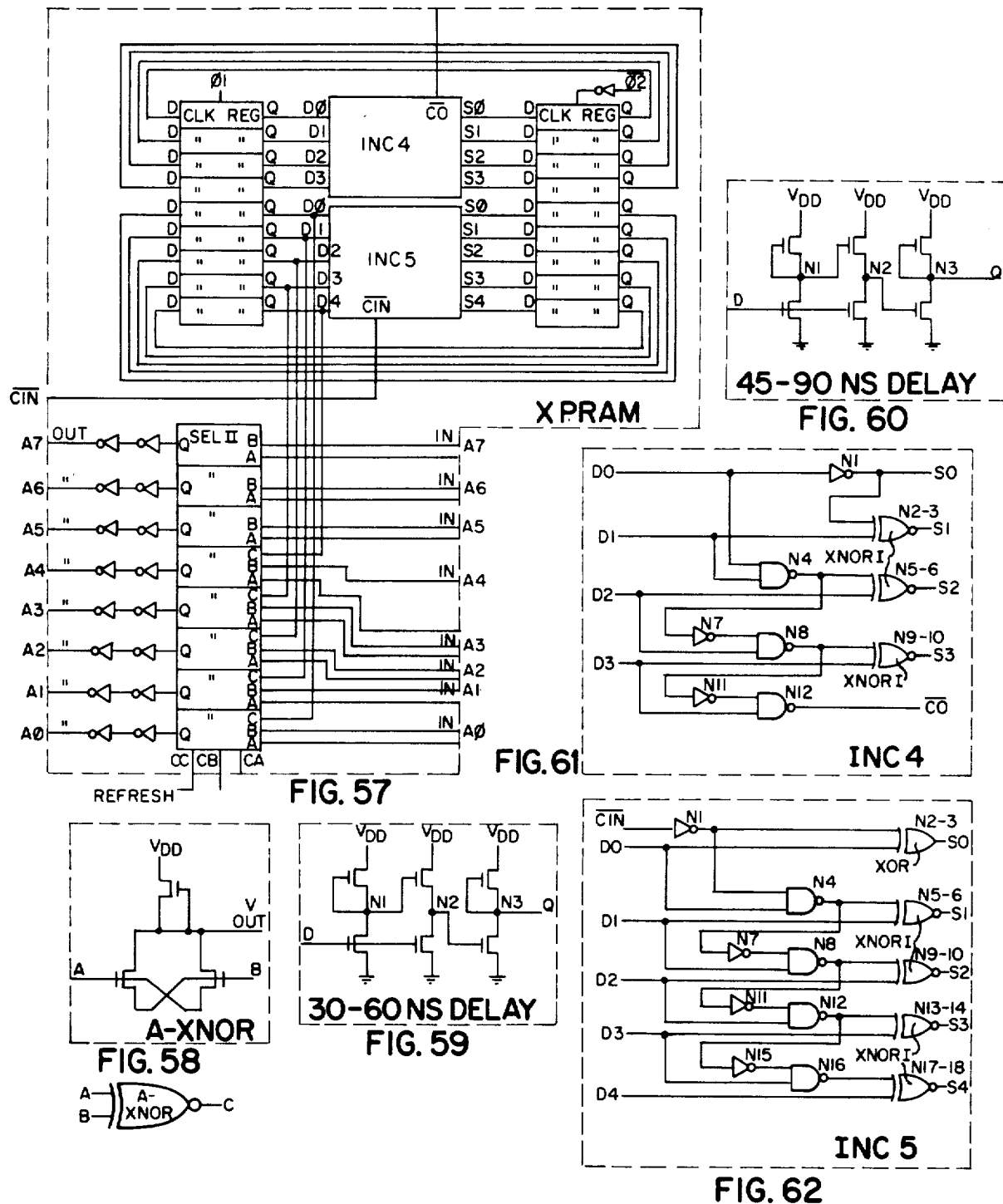

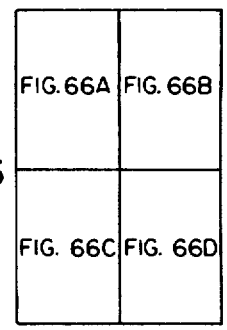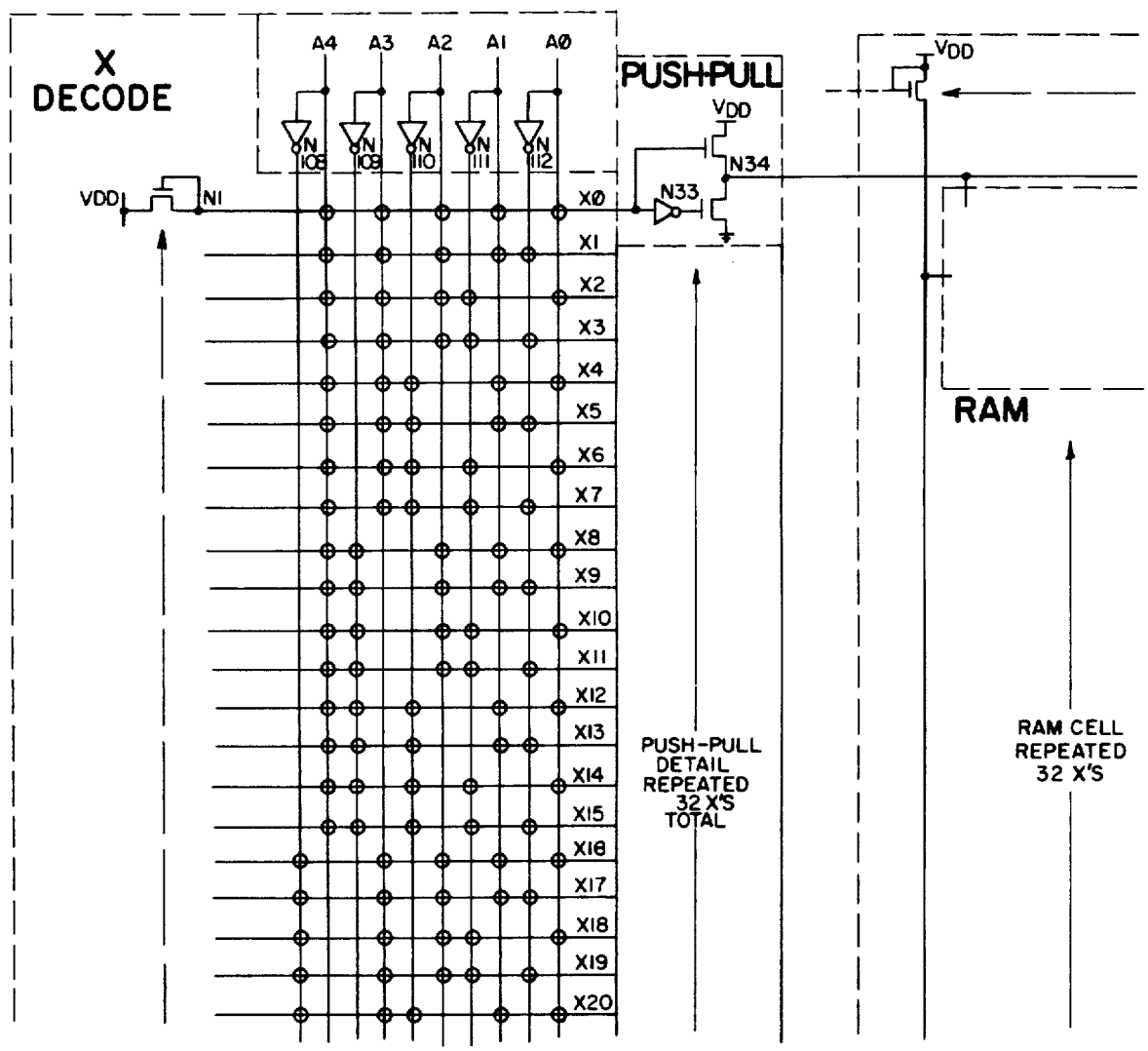
FIG. 66A

| FIG. 67A | FIG. 67B | FIG. 67C | FIG. 67D | FIG. 67E |
|---|---|---|---|---|
| FIG. 67F | FIG. 67G | FIG. 67H | FIG. 67I | FIG. 67J |
| FIG. 67K | FIG. 67L | FIG. 67M | FIG. 67N | FIG. 67O |
|  | FIG. 67P | FIG. 67Q | FIG. 67R | FIG. 67S |
|  | FIG. 67T | FIG. 67U | FIG. 67V | FIG. 67W |
|  | FIG. 67X | FIG. 67Y | FIG. 67Z | FIG. 67AA |

FIG. 67

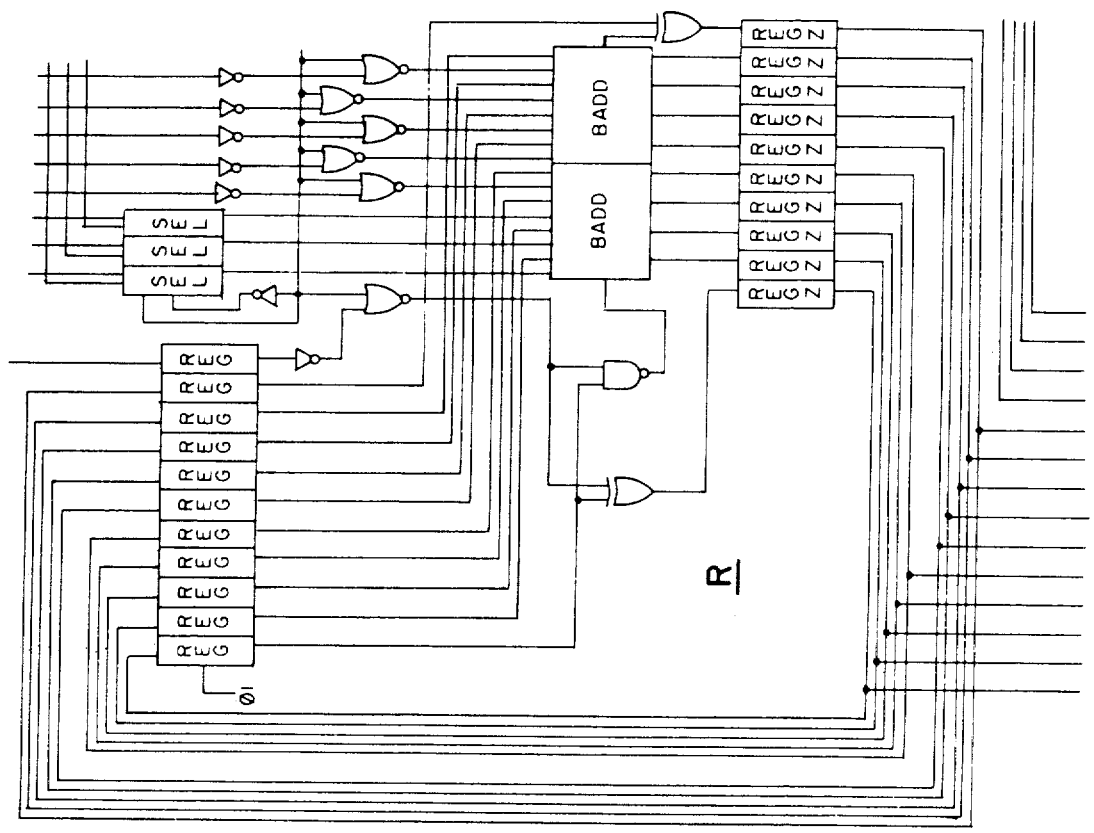
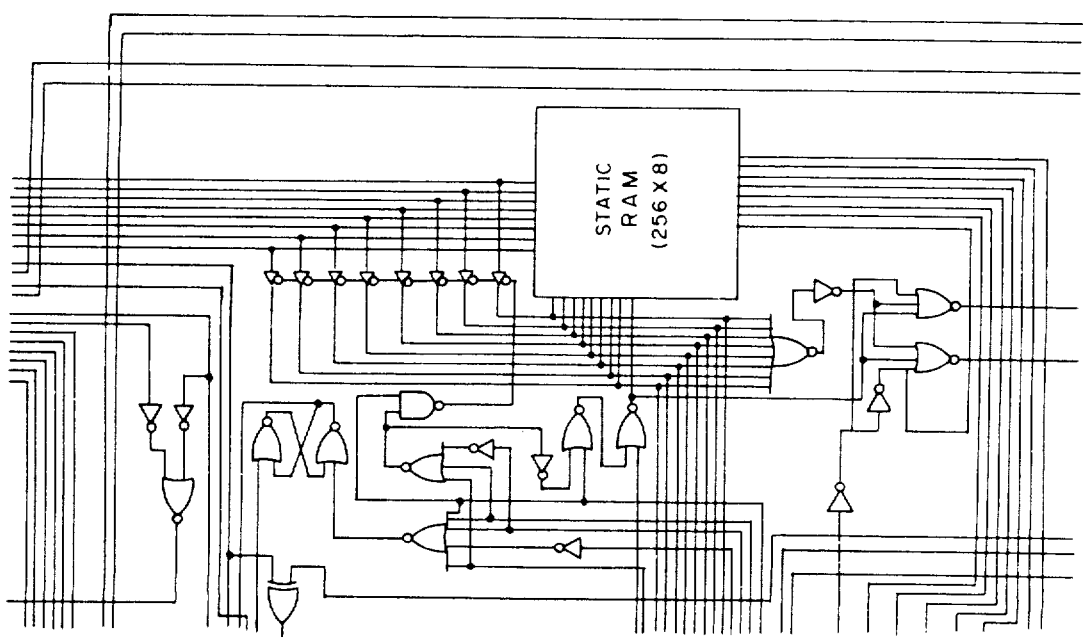
FIG. 67N

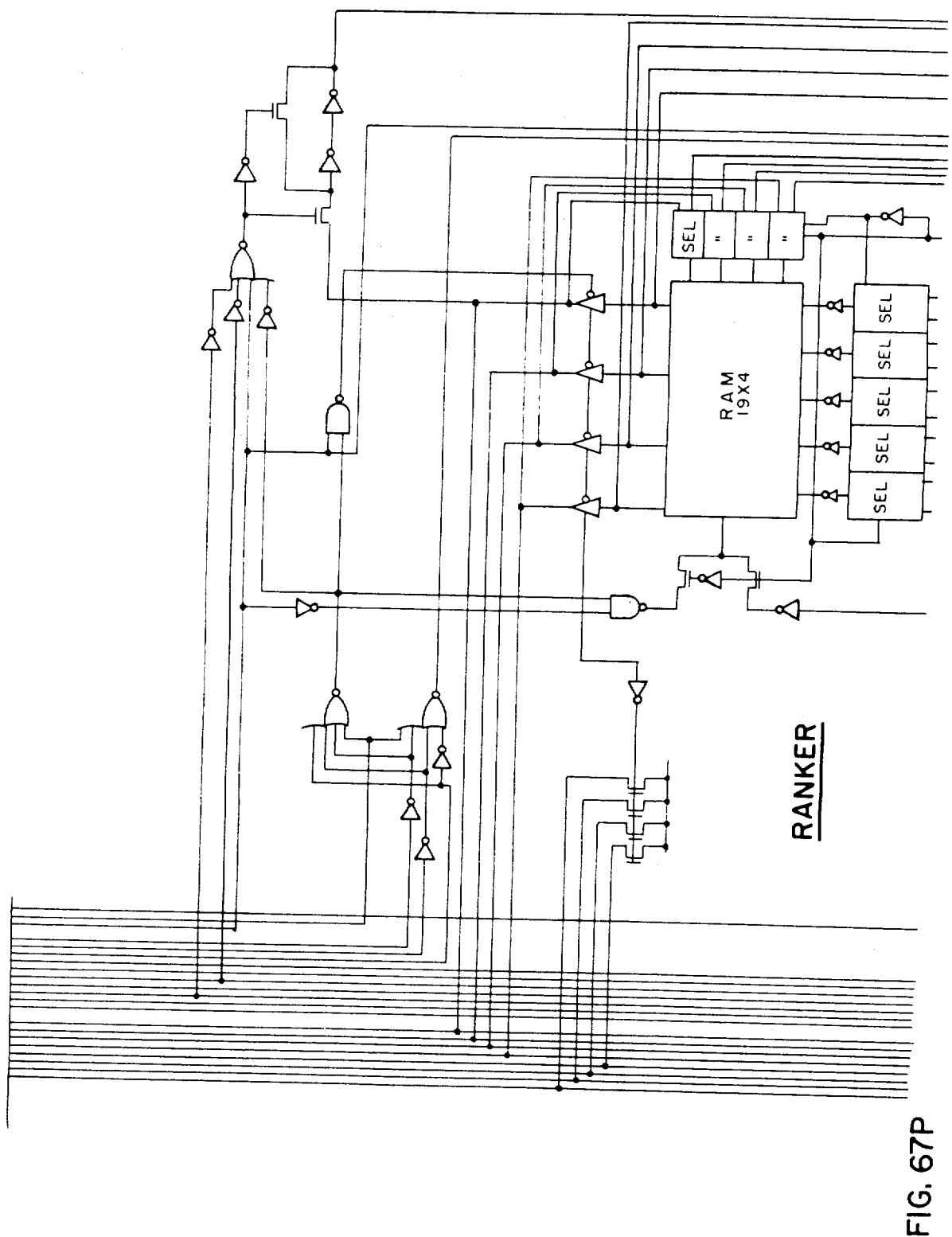
FIG. 67P RANKER

STRING COMPARATOR DEVICE SYSTEM CIRCUIT AND METHOD

CROSS REFERENCE TO RELATED APPLICATIONS

This is a continuation-in-part of Ser. No. 020,518 filed Mar. 14, 1979, now abandoned.

BACKGROUND OF THE INVENTION

An associative memory is a special kind of storage device. Whereas most memories are numerically addressed, associative memories are addressed via their contents. For example, one might ask an associative memory to return all records containing the letters "ZXU" in columns one, two, and three respectively. The address applied to an associative memory is the query. If some record exactly satisfies the query, then the query is said to be exact, otherwise it is said to be inexact. Conventional associative memories provide no information in response to an inexact query. Inexact queries are merely rejected. If a record exists within the associative memory that is only slightly different from the supplied query, then in many cases it would be desirable to know of its existence. Such records are minor corruptions of the query. Alternatively, they are very similar to the query. Some related concepts were discussed in the following articles:

(1) "The application of a pattern matching algorithm to searching medical record text," in the proceedings of the second annual symposium on computer applications in medical care, p. 308-313, IEEE 78CH 1413-3, by the inventor et al, a copy of which is attached hereto and made a part hereof;

(2) The Ramon D. Faulk article in communications of the ACM, Vol. 7/Number II/November 1964, pages 647-653;

(3) The A. J. Szanser article, Mathematical Linguistics Error-Correcting Methods in Natural Language Processing, Information Processing .68-North-Holland Publishing Company-Amsterdam (1969), pages 1412-1416; and (4) The A. J. Szanser article, The Computer Journal, Vol. 16, Number 2, pages 132-134.

(5) U.S. Pat. Nos. 3,333,243; 3,651,459 and 4,084,260 show the state of the prior art.

(6) "Approximate String Matching", Patrick A. V. Hall and Geoff R. Dowling, ACM Computing Surveys, Vol. 12, No. 4, pp 381-402, December, 1980.

A storage loop is formed when a storage device repeatedly and sequentially transmits its entire contents to external devices over a high speed data bus. An associative memory may be formed by attaching to this bus a device whose function it is to scrutinize in a passive manner the data stream originating from the storage device as it passes by on the bus. This attached device senses data appearing on the bus that is related in some predetermined fashion to a supplied query.

Central to associative memories of this type is some sort of word comparator device. In the prior art, a simple digital comparator distinguishes two cases: equal and unequal. Other devices can detect certain special corruptions such as the transposition of two characters, the deletion of a single character. Still other devices compare two words to arrive at an indication of how similar they are. One such device recodes the words as binary strings and then measures the Hamming distance between them. Devices in the prior art do not, however, seem to compare words in a general way that approaches the sort of similarity recognizing ability found in humans. U.S. Pat. Nos. 3,333,243; 3,651,459; and 4,084,260 show the state of the prior art.

Approximate string matching means which provide a fairly general and sophisticated measure of string similarity exist in prior art. However, in prior art, such systems are relatively slow in completing the matching process. Most of such prior art string matching systems utilize dynamic programming methods as discussed in ACM Computing Surveys in "Approximate String Matching". The computation time for such prior art systems is generally proportional to the square of the average length of the strings.

SUMMARY OF THE INVENTION

The system circuit, a computer peripherial device includes an indicia string comparator device that compares strings of indicia or characters at high speeds. This system circuit performs an approximate string comparison operation. The system circuit computes a measure of string similarity. The system circuit is accessed by a computer in the same manner as a Random Access Memory. Query strings and record strings are written into the system's memory and the approximate similarity measures are automatically computed and the best matches are recorded in a memory inside the system circuit. These best matches may then be accessed by the host computer.

Typically the system circuit would be used to search a large lexicon or database of record strings for the entries which are most similar to a query string. The query string is entered into the system circuit and then each lexicon or database record string is entered. At the end, the pointers to the record strings most similar to the query string are automatically available in a list in memory in the system circuit.

The measure of string similarity is an extremely general function which can be tailored or adapted under software control for a specific application by the setting of parameters. The computation time is proportional to the average length of a string of indicia.

The system circuit in chip form also incorporates logic to perform Direct Memory Access (DMA) operations.

The string comparison device is a means described in Appendix 1 which is made a part of this application. First the string comparator means is described in "the simplest string comparison function" in pages 1 through 6 of Appendix 1, second it is described in "string comparison function with variable character weights" in pages 7 through 10 of Appendix 1, third, it is described in "string comparison function with unmatched character compensation and variable character weight", in pages 11 through 14 of Appendix 1, fourth it is described in "string comparison function with directional biasing and variable character weights" in pages 15 through 18 of Appendix 1, and fifth it is described in "the full string comparison function with variable character weights, unmatched character compensation and directional biasing" in pages 19 through 22 of Appendix 1. Each of the first five string comparison means descriptions are described in a mathematical description and in an algorithm description.

One of the preferred means for computation of the string similarity function described in the Appendix 1 is the system circuit. The system circuit is an electronic device which includes a string comparator means. The system circuit performs the calculation of the string similarity function 0. The string comparator which is an electronic circuit, and an I/O controller and ranker means together comprise an electronic device which is referred to as the String Comparator means. The system circuit is connected to a computer system by means of an interface circuit to utilize the string comparator means.

The logic design of the String Comparator means is explained in detail herebelow.

In the preferred embodiment of the String Comparator means as shown in the drawings, the string comparator means includes Bus Control means, Master Control means, Ranker means, Divider means, and a String Similarity Computer. The String Comparator means is used like a random access memory. The Bus Control means uses well-known techniques to control internal bus lines and the external signals. Master Control implements DMA operation and DMA editing in the manner described in detail herein below. The Ranker means maintains a ranked list of the best comparison results. The Divider means computes the ratio of two binary numbers from the String Similarity Computer. The String Similarity Computer computes the full string similarity function $\theta$ defined in appendix 1. The Master Control means, the Bus Control means, the Ranker means, the Divider means and the String Similarity Computer may be logic circuits and may be embodied with well-known electronic components.

The String Similarity Computer is comprised of the String Control means, Parameter Generation means, Core section, CA section, CB section, R section, M section, TOTR section and TOTM section.

The purpose of the String Control means is to control and coordinate the activities of the rest of the string similarity computer. The String Control means is connected as shown in the drawings and has internal storage registers and memory.

The Parameter Generation means is used to obtain the indicia or character weight and compensation values. The indicia or character itself is received from the string control means or circuit. The character weight and compensation value are used by the rest of the string similarity comparator. The Parameter Generation means is connected as shown in drawings. The Core section is the decision-making part of the String Similarity Computer. The Core section identifies common portion of the query string and the record string, and is connected as shown in drawings. The CA section is used to compute the total compensation value for the indicia or characters in the string A. The CA section is connected as shown in the drawings. The CB section is used to compute the total compensation value for the indicia or characters in the string B. The CB section is shown in the drawings. The R section computes an intermediate subtotal value. The values computed by the R section correspond precisely to the R function described in the description of string similarity function. The R function is connected as shown in the drawings. The M section computes the numerator of the ratio defining the string similarity function. The M function is connected as shown in the drawings. The TOTR section computes an intermediate subtotal value. The values computed by the TOTR section correspond precisely to the values of the variable TOTR used in the C programs. The TOTR section is connected as shown in the drawings. The TOTM computes the denominator of the ratio defining the string similarity function. The TOTM section is connected as shown in the drawings.

The original disclosure of the invention related to the new and improved word comparator device, referred to hereinafter as a word associator circuit, that provides a numeric measurement of the degree of a word similarity between the compared words as defined by mathematical formula. The original disclosure also related to an associative retrieval system and method for retrieval of inexact queries in a quick and expeditious manner. The circuit may be an electrical digital circuit or other type of circuitry that will provide an output conforming to a mathematical formula to provide an improved word comparator function. An associative memory is normally thought of as a device which responds only to exact queries. Some may respond in a limited manner to inexact queries, for example see "Backend Processors is REM the Answer" in Datamation, March 1978, pg. 206-207. The system and method of the original disclosure uses the improved word comparator device to form an associative memory which responds to inexact queries in a new and useful way. This word comparator device is used to rapidly locate records most similar to a query. Similarity is defined by certain mathematical formula and is measured using a high speed digital circuit referred to hereafter as a Word Associator Circuit in the preferred embodiment. A word associator circuit will also be referred to as a string similarity computer.

This continuation in part relates to improvements in the word associator circuit described in the original patent. The original word associator circuit computed a numeric measurement of the similarity of two strings of indicia. Said numeric measurement was defined in the original patent; is defined in "The definition, computation, and application of symbol string similarity functions", Emory University, M.S. Thesis, Department of Mathematics, 1978, by the inventor; and is also defined in "The simple string comparison function" in pages 1-6 of Appendix 1.

Appendix 1 also describes four improvements to the original string comparison function. These improvements provide an extremely flexible string comparison function which can be adapted for a given application by the setting of parameters. Any of these improvements to the word associator circuit may be used in an associative memory in the same manner as the original word associator circuit.

This continuation in part also relates to a new preferred embodiment of the improved word associator circuit, a system circuit in chip form.

Similarity has three components; word, numeric, and mask. Most central to this invention is the notion of word similarity. Words are strings of symbols from some alphabet. A symbol can be any character or indicium from a finite or infinite set or alphabet. Words are also referred to as character strings, symbol strings, indicia strings, or merely strings. Word similarity, or indicia string similarity, is a measurement of the similarity between two words or indicia strings. Several variable parameters are involved in the definition of word similarity, making it very flexible. Of significance is the ease with which the degree of word similarity may be determined using digital circuits. Using existing technology word associator circuits may be built to process serial data at rates in excess of 20,000,000 characters per second. Such a circuit is described hereinbelow.

The word similarity of two indicia strings may be expressed in three different forms: absolute, ratio, and fractional. Absolute word similarity provides a single non-negative number M which is a measure of the total weight of the common portions of the indicia strings. The common portions are symbols or indicia occuring in both of the indicia strings, the total weight of which depends on the individual indicia weights and the relative positions of the common portions. Absolute word similarity is most useful when the lengths or total weights of the indicia strings are always equal or nearly equal.

Ratio word similarity provides the absolute word similarity value M and the total word weight TOTM. The total word weight is a measure of the total weights of the indicia comprising the indicia strings and of the length of the indicia strings. Fractional word similarity provides a number between 0 and 1 which is equal to the ratio of the absolute word similarity value M and the total word lengths TOTM.

Absolute word similarity and ratio word similarity are most useful in applications which search for a word similarity value exceeding a certain threshold. A possible application would involve monitoring a heartbeat by continually encoding recorded heartbeats as a string of indicia. This indicia string would then be compared to one or more indicia strings which denote abnormal heartbeats. If the similarity of the two indicia strings were above a certain threshold, an alarm could be sounded.

Fractional word similarity is useful in applications such as the associative memory circuit, where a large number of indicia strings are compared with a word associator circuit and a ranked list of the most similar indicia strings is maintained. The fractional representation of word similarity provides a convenient way to compare word similarity values.

The system includes the use of one or more associator circuits in storage loops to locate and extract records most similar to the supplied query. The system's architecture is preferably totally parallel so that it may be configured to process any number of simultaneous requests. Its memory is partitioned into storage loops so that through suitable configuration, arbitrarily large datasets may be processed. Attached to each storage loop via a dynamically variable network are multiple associator circuits to locate and extract the records most similar to the supplied query. By varying the number of storage loops versus the number of associator circuits, configurations may achieve a wide range of cost/response-time possibilities. In use, the associative retrieval system with associator circuits could off load from a host processor, the task of searching for database records. In doing this, it could provide improved services as well as entirely new services.

The method for retrieval as described in detail herein that conforms to a mathematical formula also provides a new and improved invention over and above the prior art.

When queries of words are made seeking records, exact records as well as slightly different records or similar records, are produced as an output. Such outputs are said to be a minor corruption of the query or are said to be in close similarity with the query. A measurement of the degree of similarity between two strings of symbols from some alphabet is defined in "The definition, computation and application of symbol string similarity functions", Emory University, M.S. Thesis, Department of Mathematics, 1978, by the inventor, a copy of which is attached hereto and made a part hereof. This measurement agrees well with intuition while remaining mathematically simple and easy to compute, see "The application of a pattern matching algorithm to searching medical record text", in the proceedings of the second annual symposium on computer applications in medical care, p. 308-313, IEEE, 78 CH 1413-4, by the inventor et al, a copy of which is attached hereto and made a part hereof. Using this measurement, minor corruptions may be located, thus extending the conventional function of an associative memory into the area of a similarity memory. Of significance is the fact that this measurement may be trivally computed using the new and improved digital circuitry disclosed herein. Circuits to compute it are described herein and may be built to achieve very high processing rates. Therefore, in some applications, minor corruptions may be located without additional overhead.

The basic mathematics of word similarity was developed by the inventor and constituted his Master's thesis at Emory University, Atlanta, Georgia, June, 1978 referred to hereinabove. The inventor is also primary author of a paper presented to and published by the IEEE reference hereinabove. This paper describes the application of word similarity to searching raw narrative medical record text.

It is an object of this invention to provide a string comparison device that is a new, improved fast indicia string associator circuit.

Another object of this invention is to provide a string comparison device that provides a numeric measurement of the similarity of two indicia strings in a time proportional to the average length of the indicia strings.

It is another object of this invention to provide an indicia string comparison device that provides a numeric measurement of the degree of indicia string similarity between the compared indicia strings as defined by an algorithm.

It is another object of this invention to provide an indicia string comparison device in the form of an electrical circuit for providing indicia string or word comparison conforming to the algorithm.

It is another object of this invention to provide a system by connecting at least one indicia string comparison device into a computer system for access in the same manner as a random access memory.

A further object of this invention is to provide a method of processing data for indicia string comparison that conforms to a particular algorithm.

An additional object of this invention is to provide a system method of retrieving similar indicia strings, words, numbers, and/or masks from inexact queries.

In accordance with these and other objects which will be apparent hereinafter, the instant invention will now be described with particular reference to the accompanying drawings.

BRIEF DESCRIPTION OF THE DRAWINGS

In the drawings

FIG. 21 is a schematic diagram of the add circuit shown in FIG. 17.

FIG. 22 is a schematic diagram of the latch circuit shown in FIG. 17.

FIGS. 27-67, 66A-66D, 67A-67Z and 67AA show a detailed circuit diagram of an LSI chip used with a string similarity computer.

FIGS. A4-1 through A4-8 show an interface circuit described in Appendix 4.

DESCRIPTION OF THE PREFERRED EMBODIMENTS

This invention is to a new and improved string comparator device which provides a numeric measurement of the degree of indicia string similarity between the compared strings as defined by an algorithm.

Figure 1:
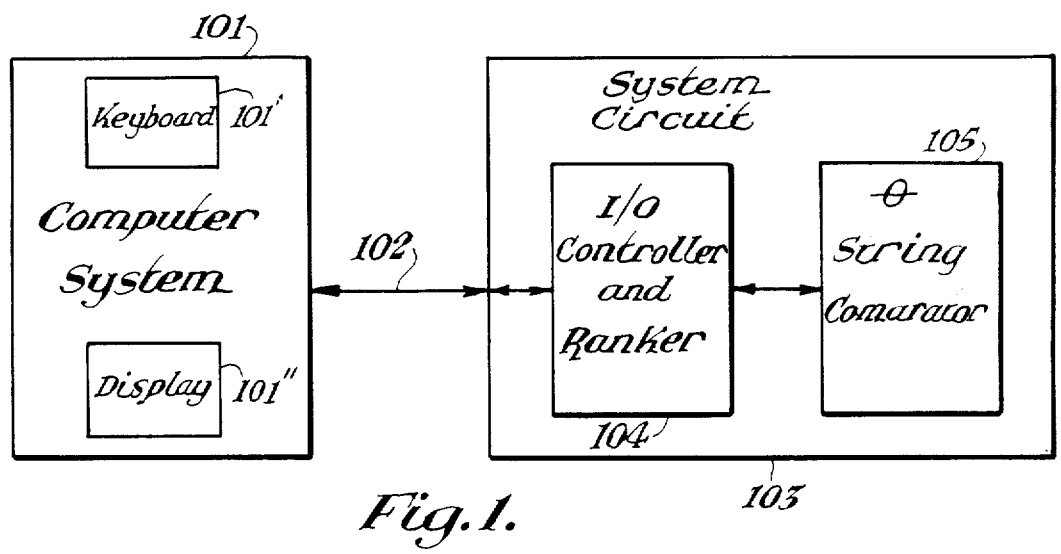
FIG. 1 is the improved block diagram of the system circuit interfaced with a computer system.

The preferred embodiment of the system circuit is an electronic device which is a string comparator means including a comparator device. FIG. 1 shows a system in which this electronic device would be used. In FIG. 1 the string comparator 105 performs the calculation of the string similarity function $\theta$. The string similarity computer 105 and an I/O controller and ranker means 104 together comprise the system circuit 103 referred to as the String Comparator means. The system circuit 103 is connected to a computer system 101 by means of an interface circuit 102. The computer system 101 is shown with a keyboard 101' and a display 101" for human interaction. A variety of well-known devices for storage, communications and computation may also be attached to the computer system 101.

A sample interface circuit 102 is described in Appendix 4, including FIGS. A4-1 through A4-8 which is made a part of this specification. Appendix 3 made a part of this specification is a document describing how to interface and to utilize the String Comparator means.

Figure 1A:
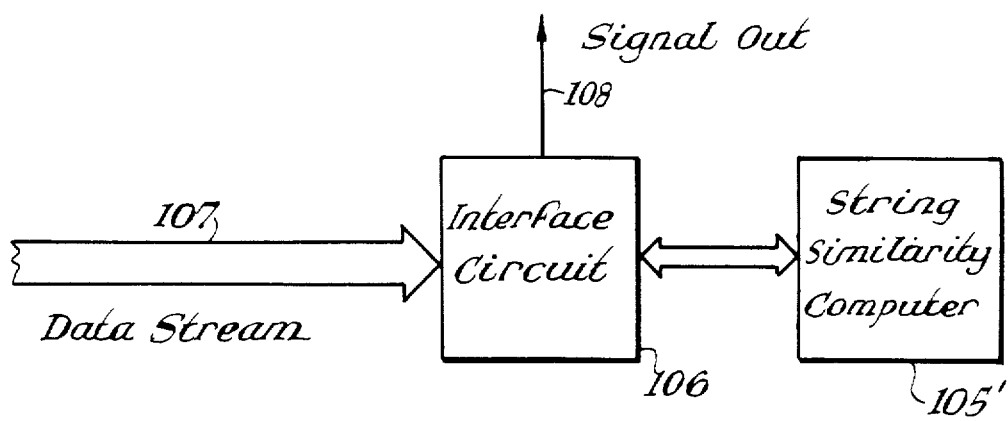
FIG. 1A is a block diagram of a string similarity computer interfaced to and monitoring a data stream.

Another use of the string similarity computer 105' is shown in FIG. 1A. Here an interface means 106 monitors a stream of data 107, formats words denoting the contents of the data stream, and uses a string similarity computer 105' to compare against one or more predefined strings. When a predetermined similarity threshhold value is exceeded, an output signal 108 denotes a match condition.

The logic design of the String Comparator means is explained below. FIGS. 27-67, 66A-66D, 67A-67Z and 67AA give a complete, detailed logic specification for the preferred embodiment of the String Comparator means as a Large Scale Integrated (LSI) electronic circuit. String Comparator means refers to the preferred embodiment as well as alternate circuits for performing particular functions.

Figure 2:
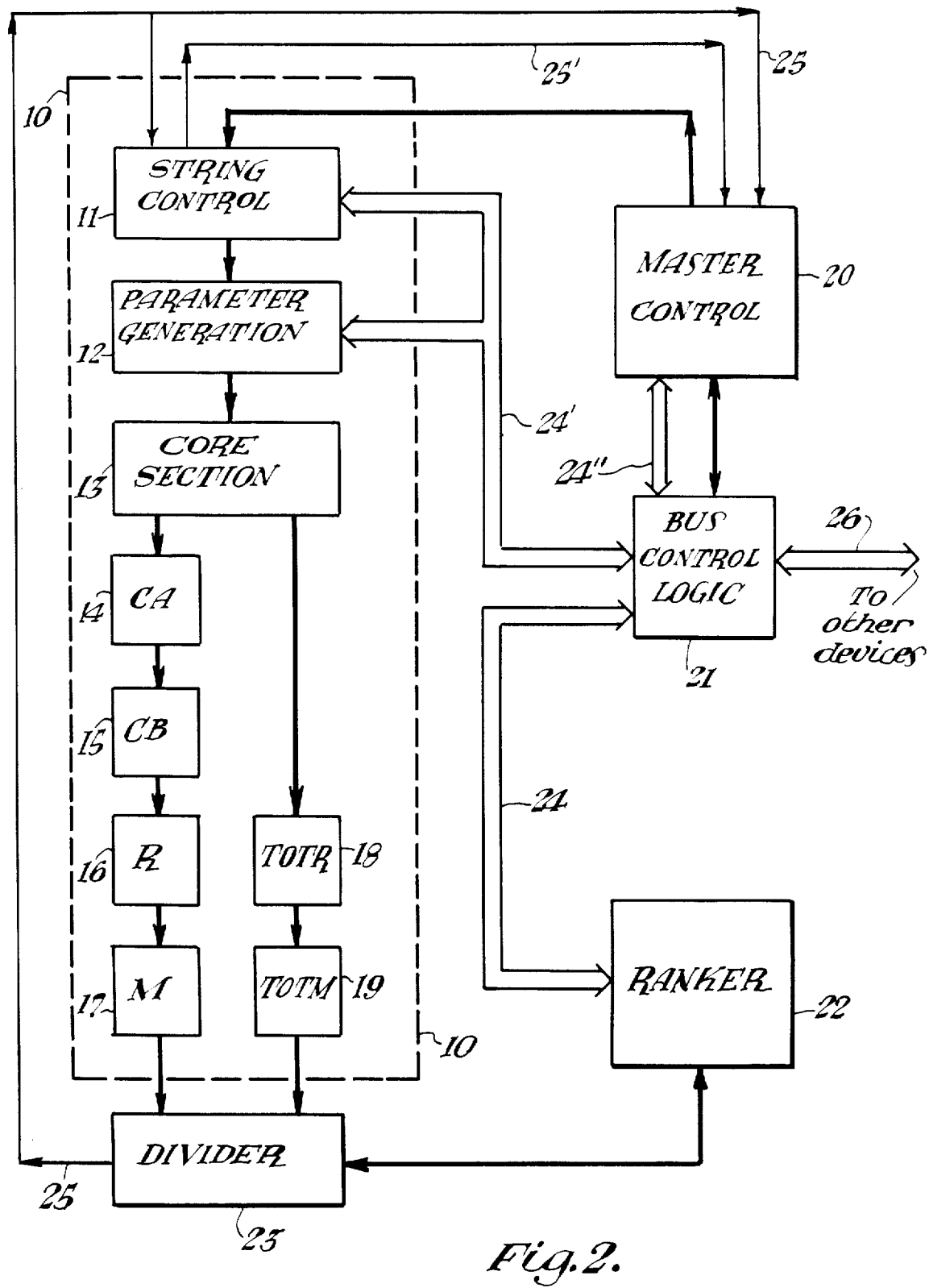
FIG. 2 is the improved block diagram of the system circuit including the string comparator means.

The preferred embodiment of the String Comparator means 103 of FIG. 1 is shown in FIG. 2. It consists of Bus Control means 21, Master Control means 20, Ranker means 22, Divider means 23, and a String Similarity Computer 10.

The string comparator means is used like a random access memory as described in Appendix 3. The Bus Control means 21 uses well-known techniques to control internal bus lines 24, 24' and 24" and the external signals 26.

Bus Control 21 controls all external accesses to the system circuit, and monitors the activities of the other internal components of the system circuit.

Master Control 20 implements DMA (Direct Memory Access) operation and DMA editing in the manner documented in Appendix 3. Master Control controls automatic loading of data from an external memory.

The Ranker means 22 maintains a ranked list of the best comparison results. The ranked lists contain up to 16 entries; each entry consists of the string similarity value and a record pointer. Appendix 3 describes the effect of the Ranker means.

Figure 11:
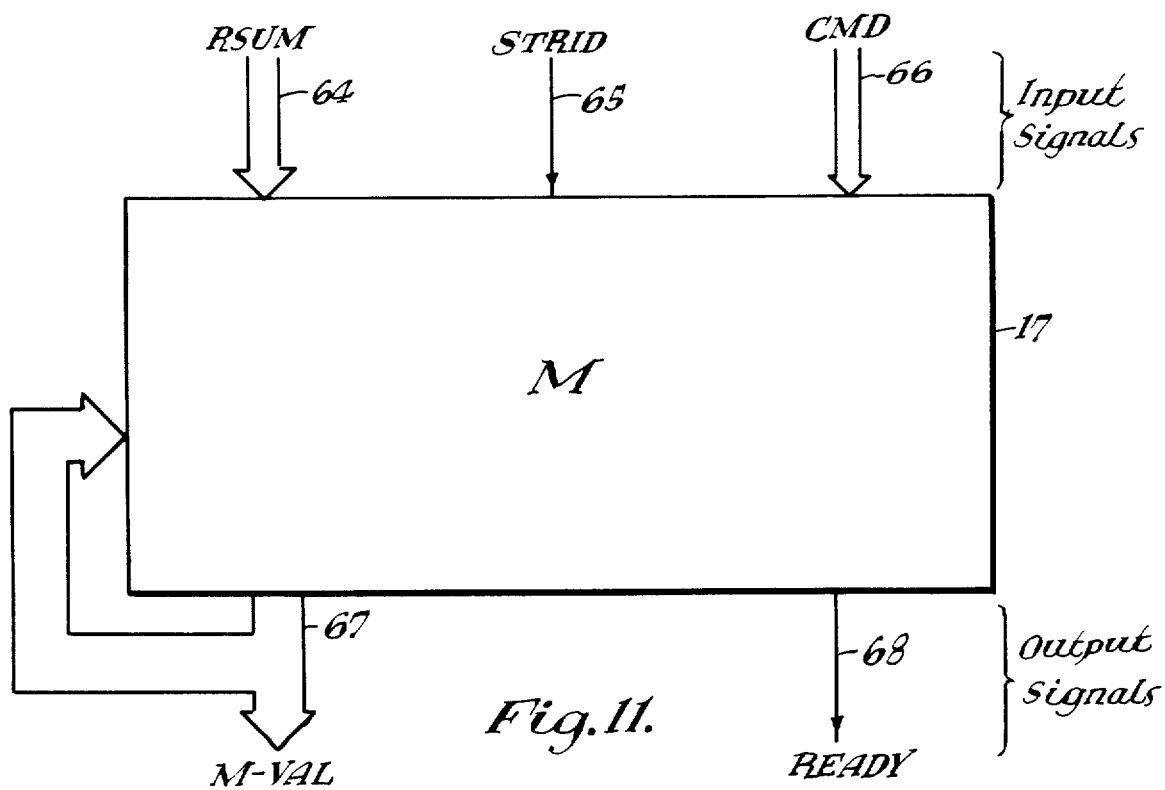
FIG. 11 is a block diagram of the M section shown in FIG. 2.
Figure 13:
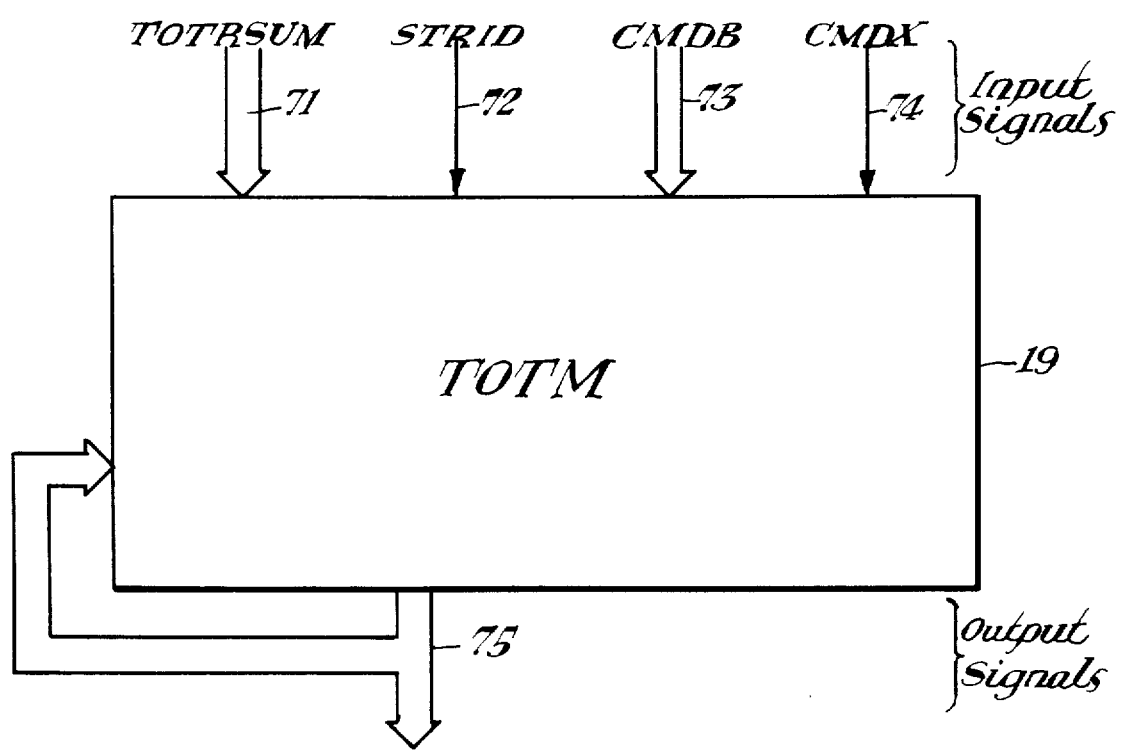
FIG. 13 is a block diagram of the TOTM section shown in FIG. 2.

The Divider means 23 computes the ratio of two binary numbers from M 17 shown in FIG. 11 and TOTM 19 shown in FIG. 13; this ratio is expressed as a fractional binary number.

The String Similarity Computer 10 computes the full string similarity function $\theta$ defined in detail in Appendix 1.

Figure 67A:
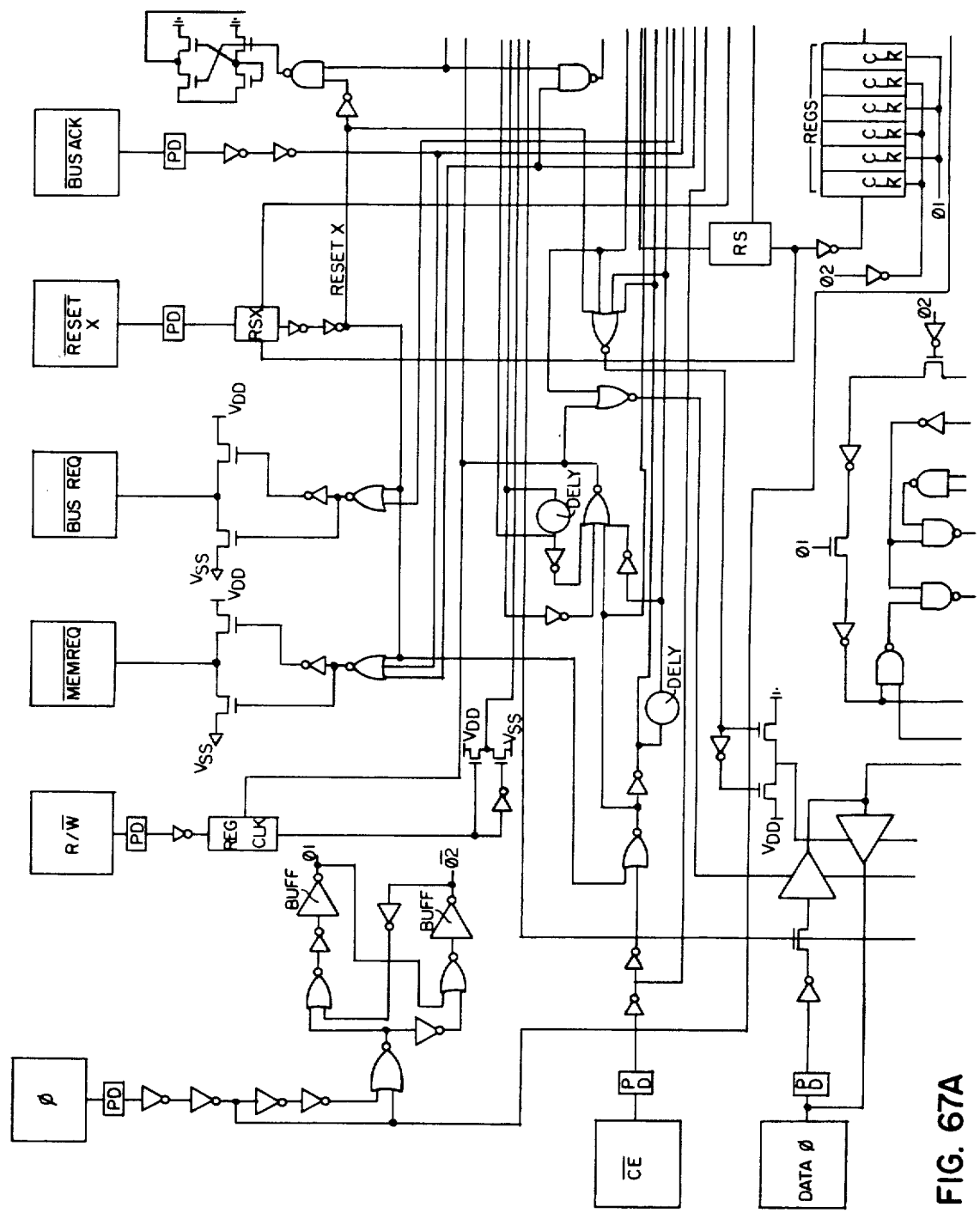
Figure 67B:
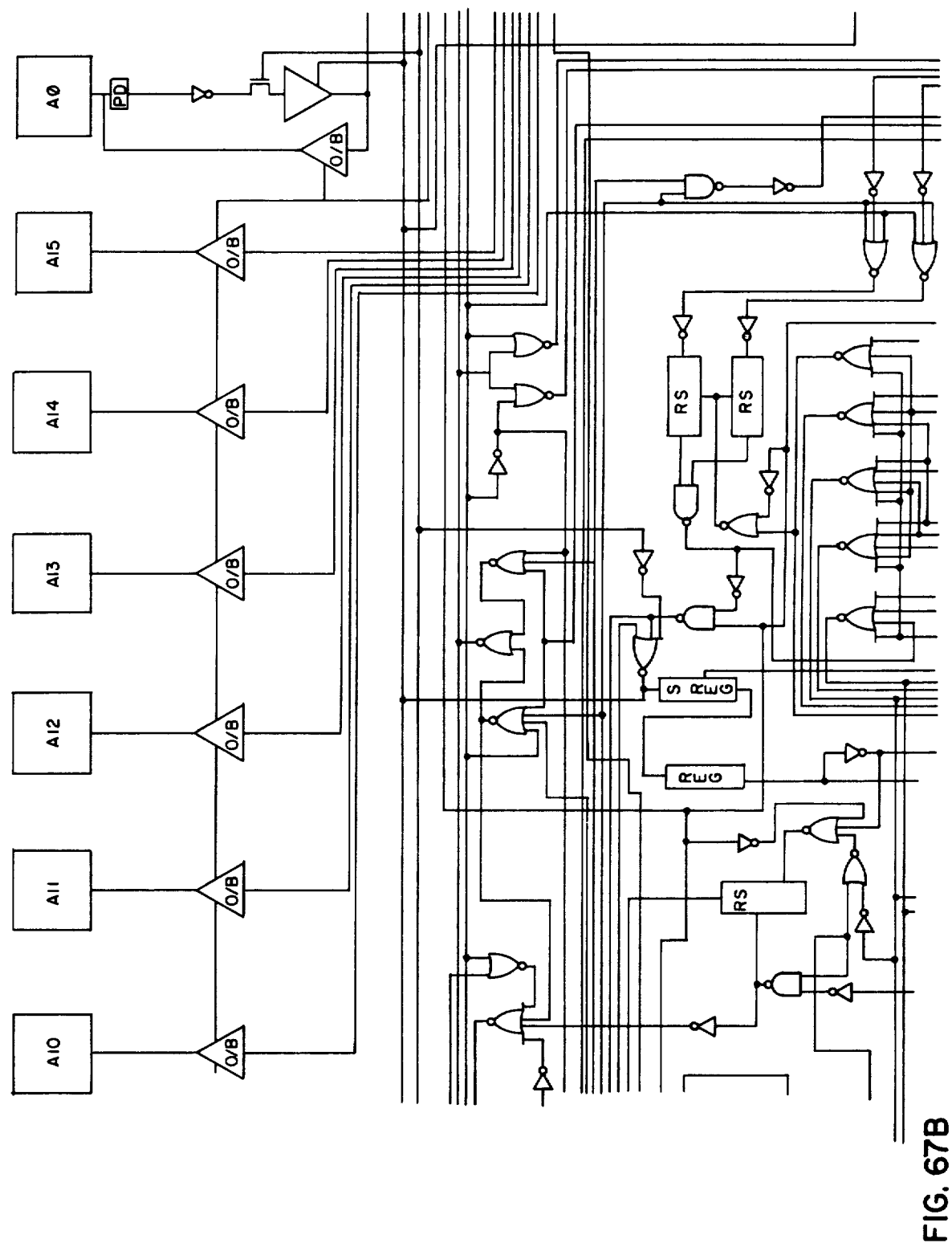
Figure 67C:
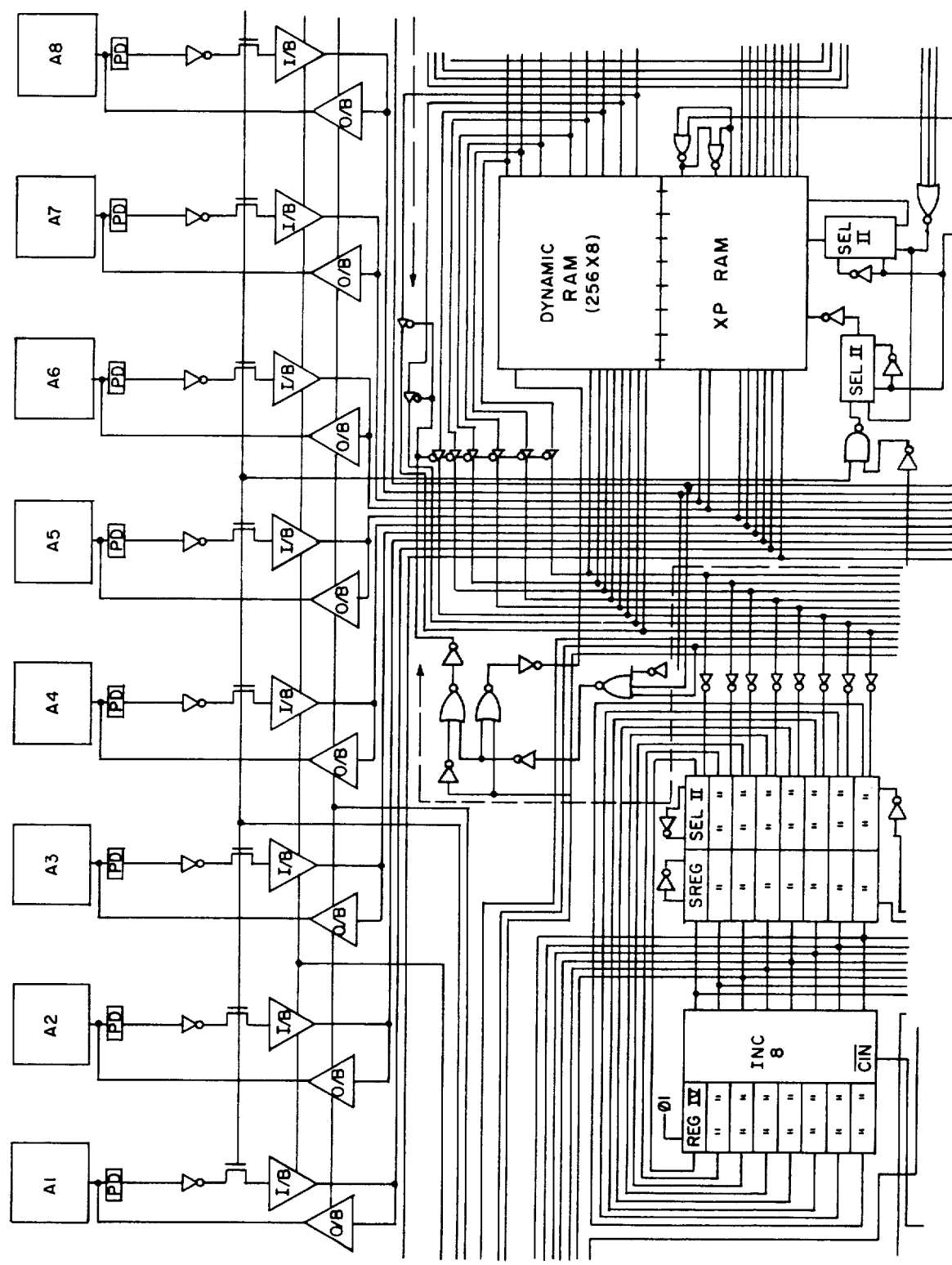
Figure 67D:
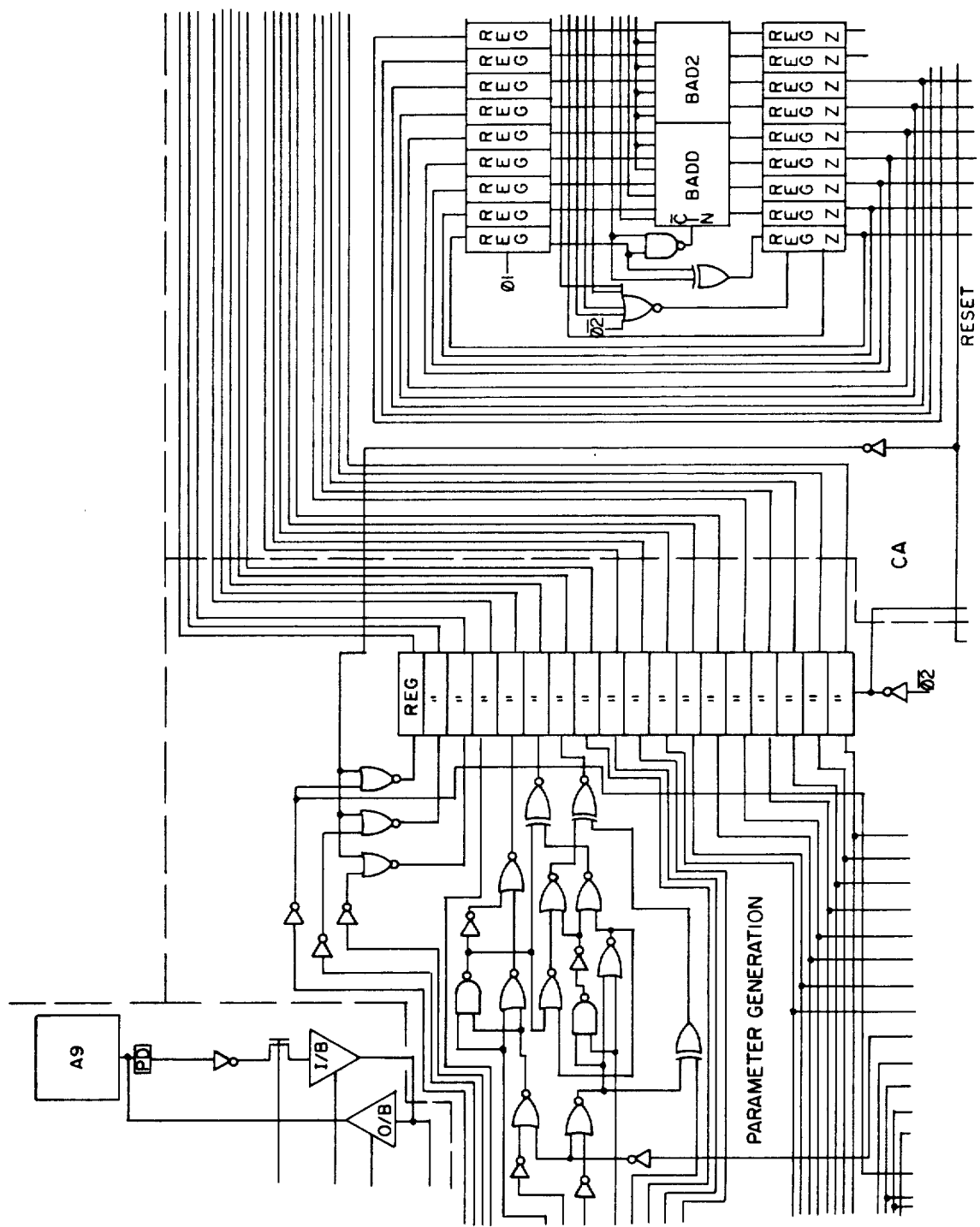
Figure 67E:
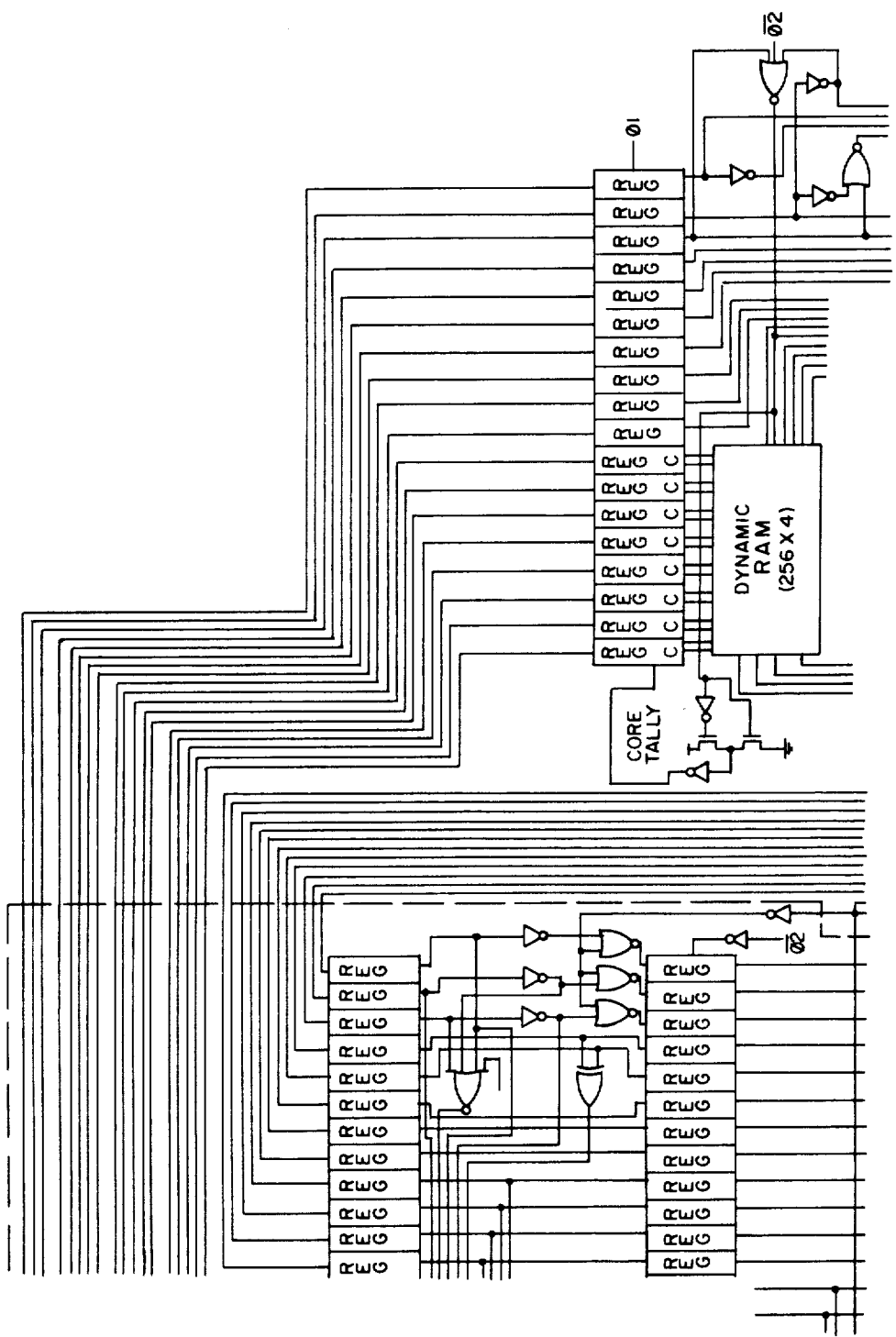
Figure 67F:
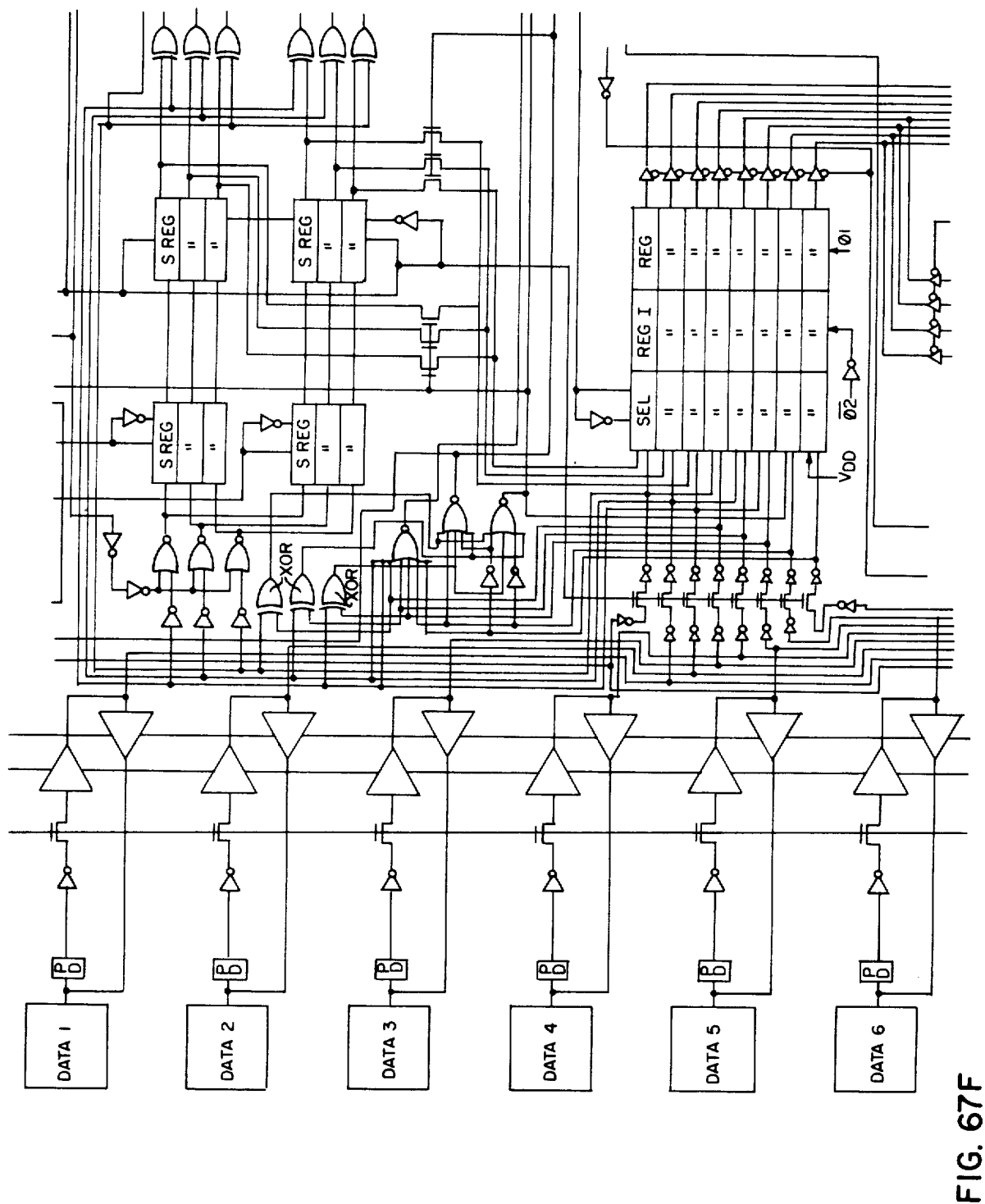
Figure 67G:
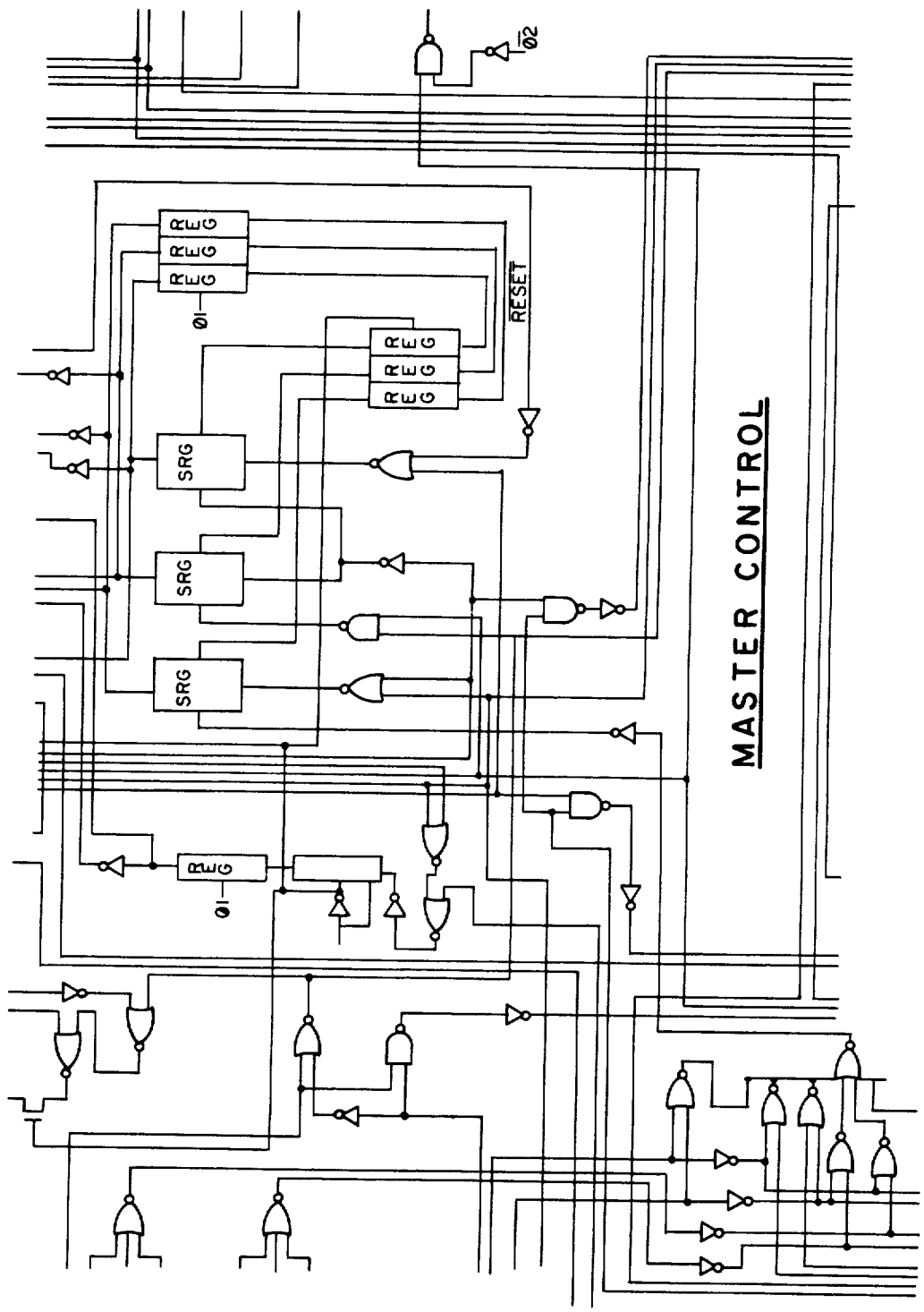
Figure 67H:
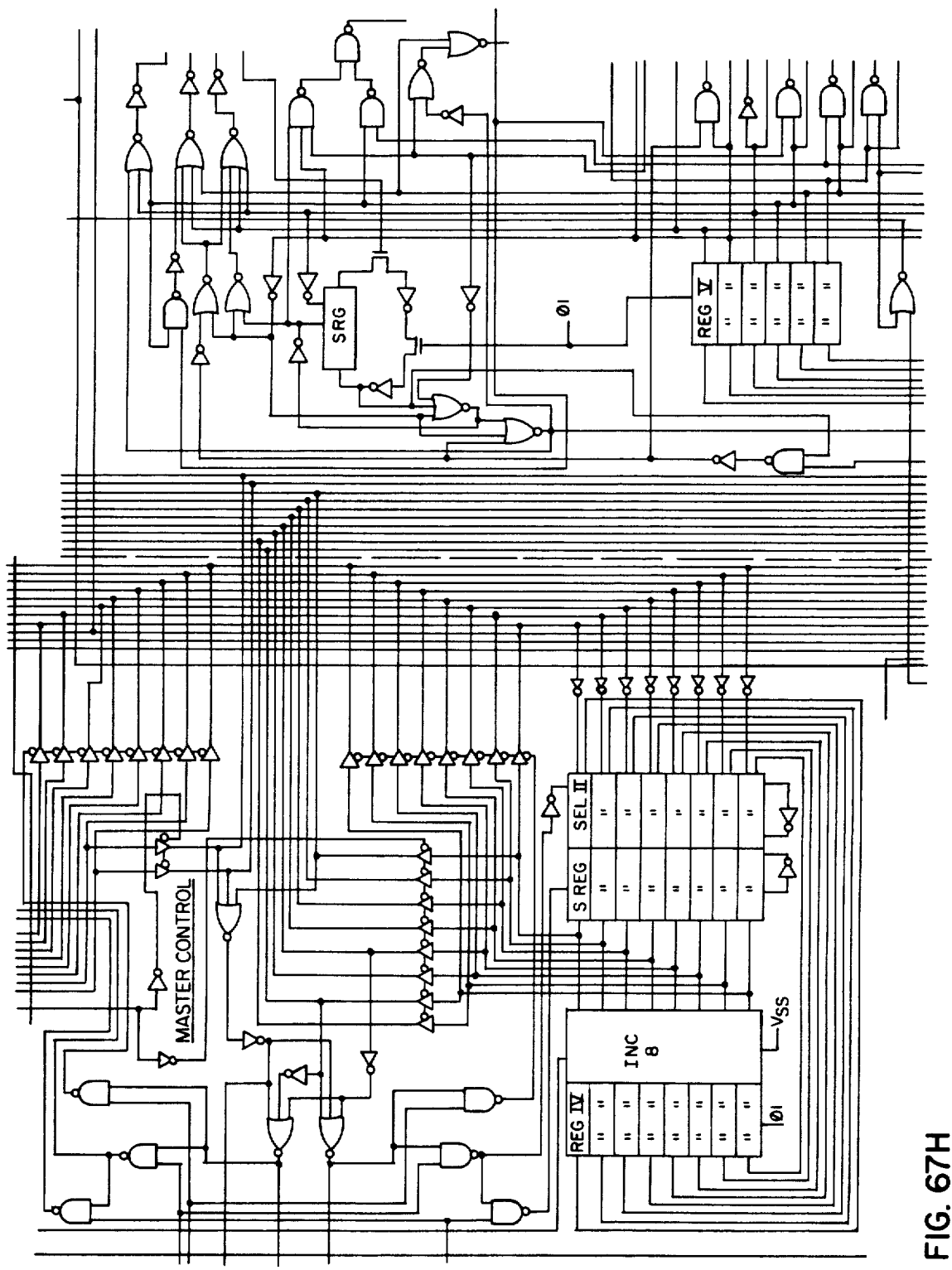
Figure 67I:
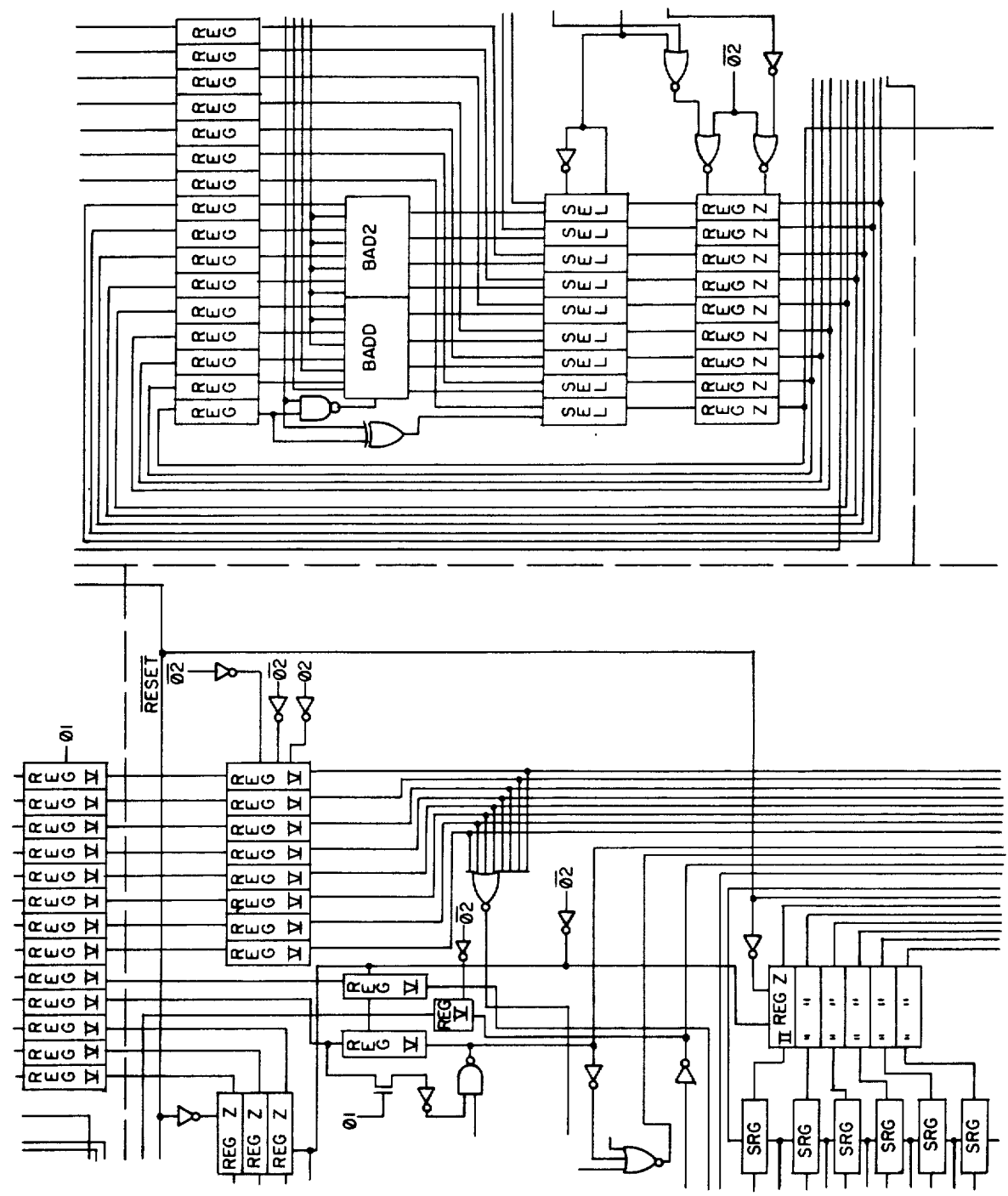
Figure 67J:
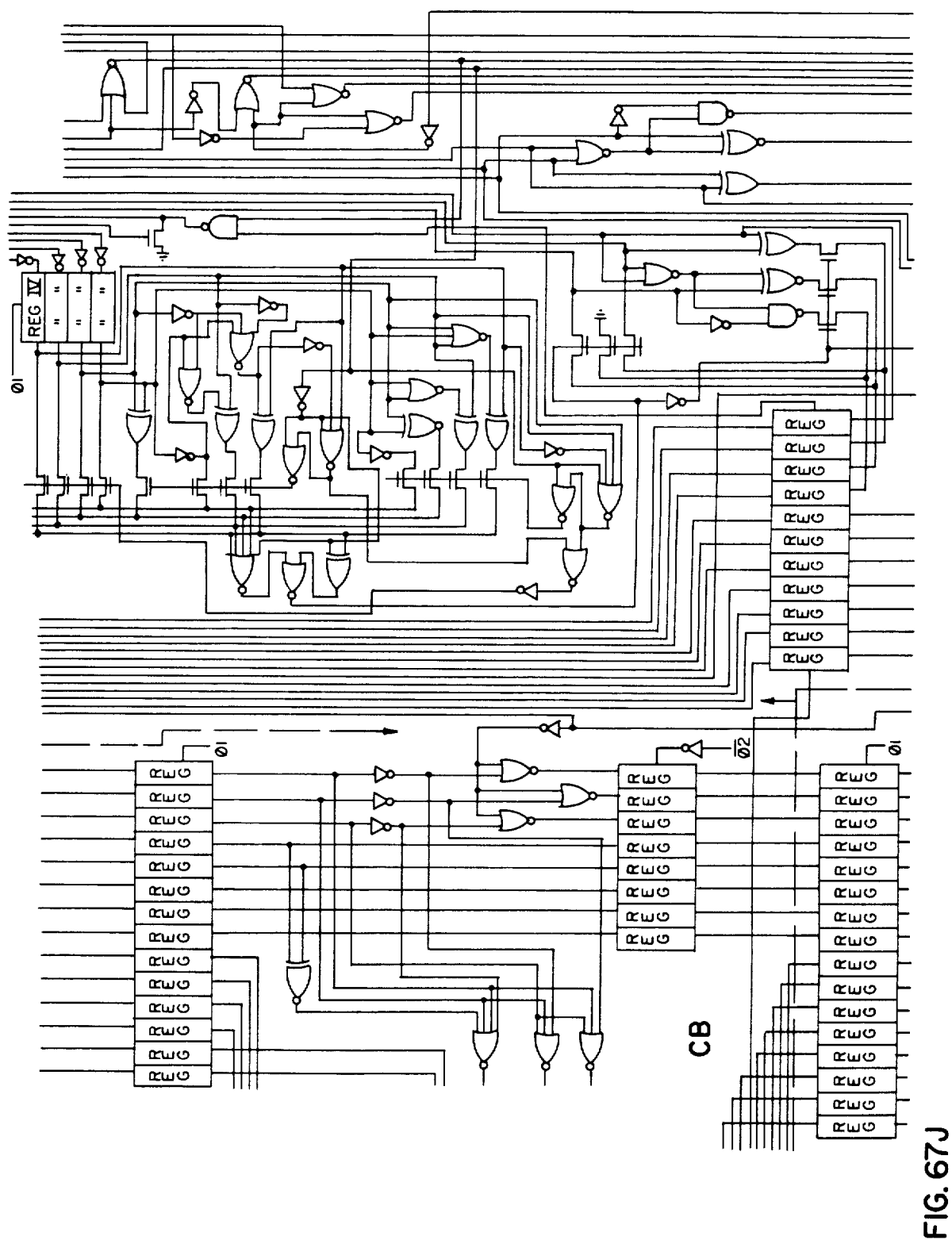
Figure 67K:
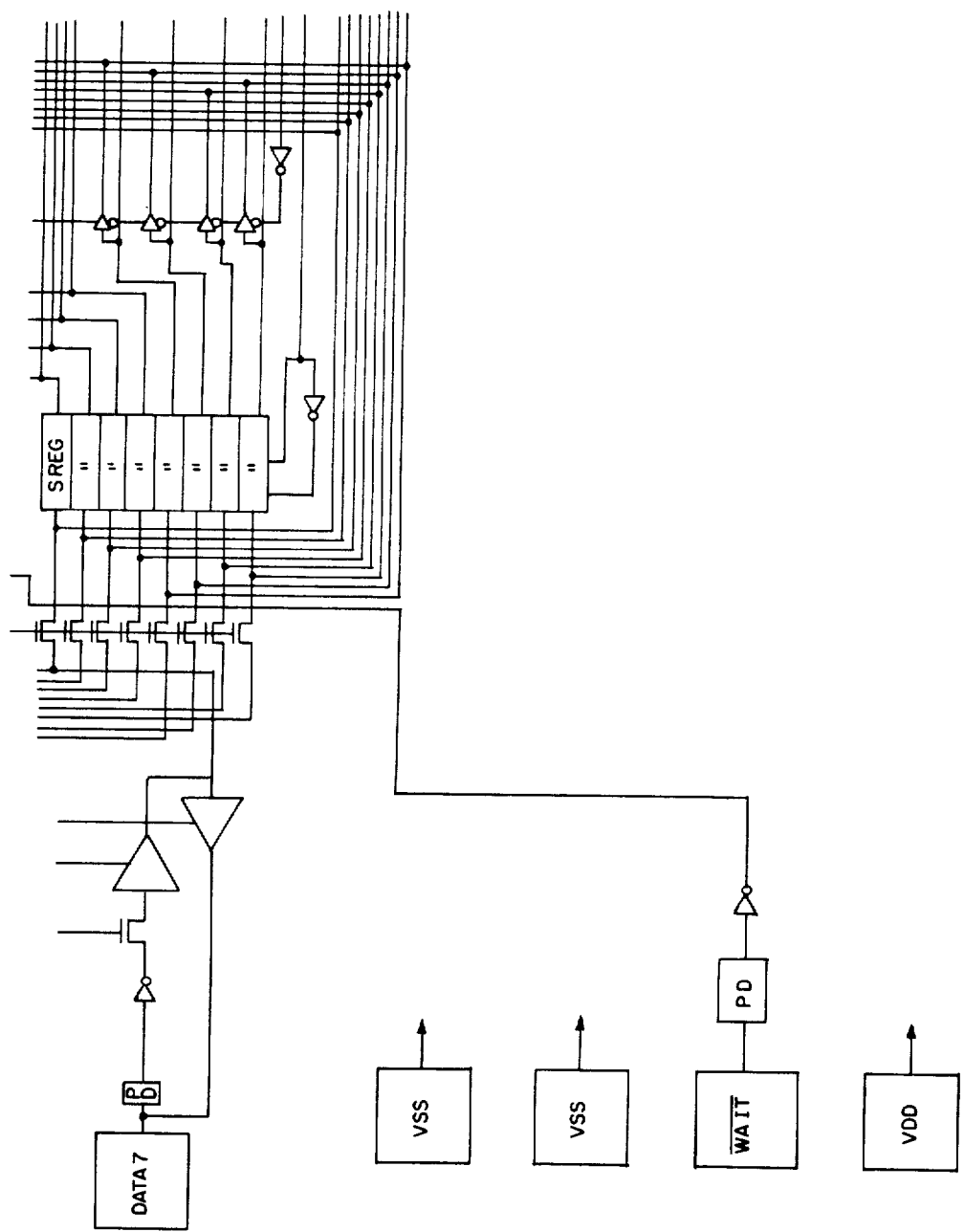
Figure 67L:
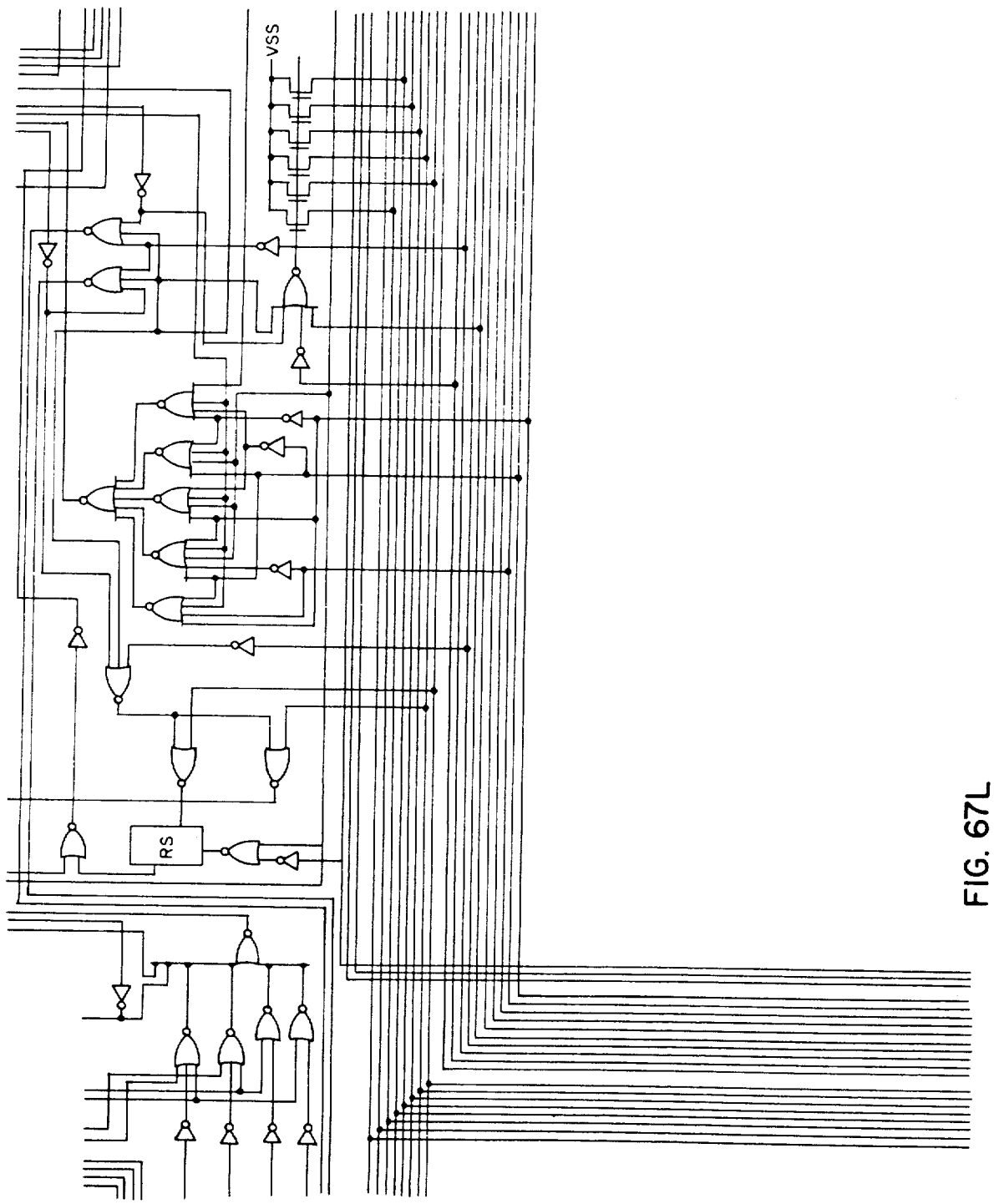
Figure 67M:
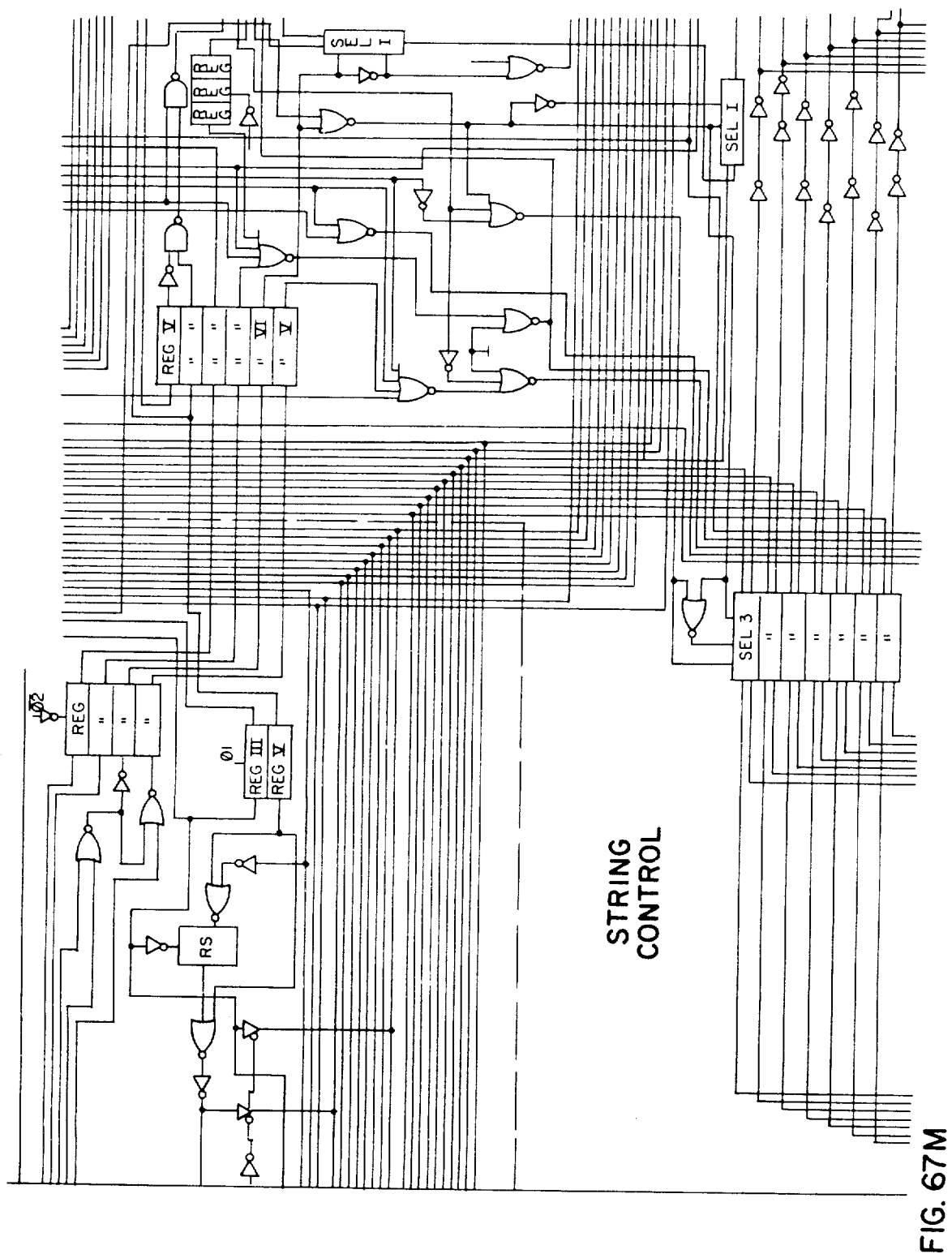
Figure 67:
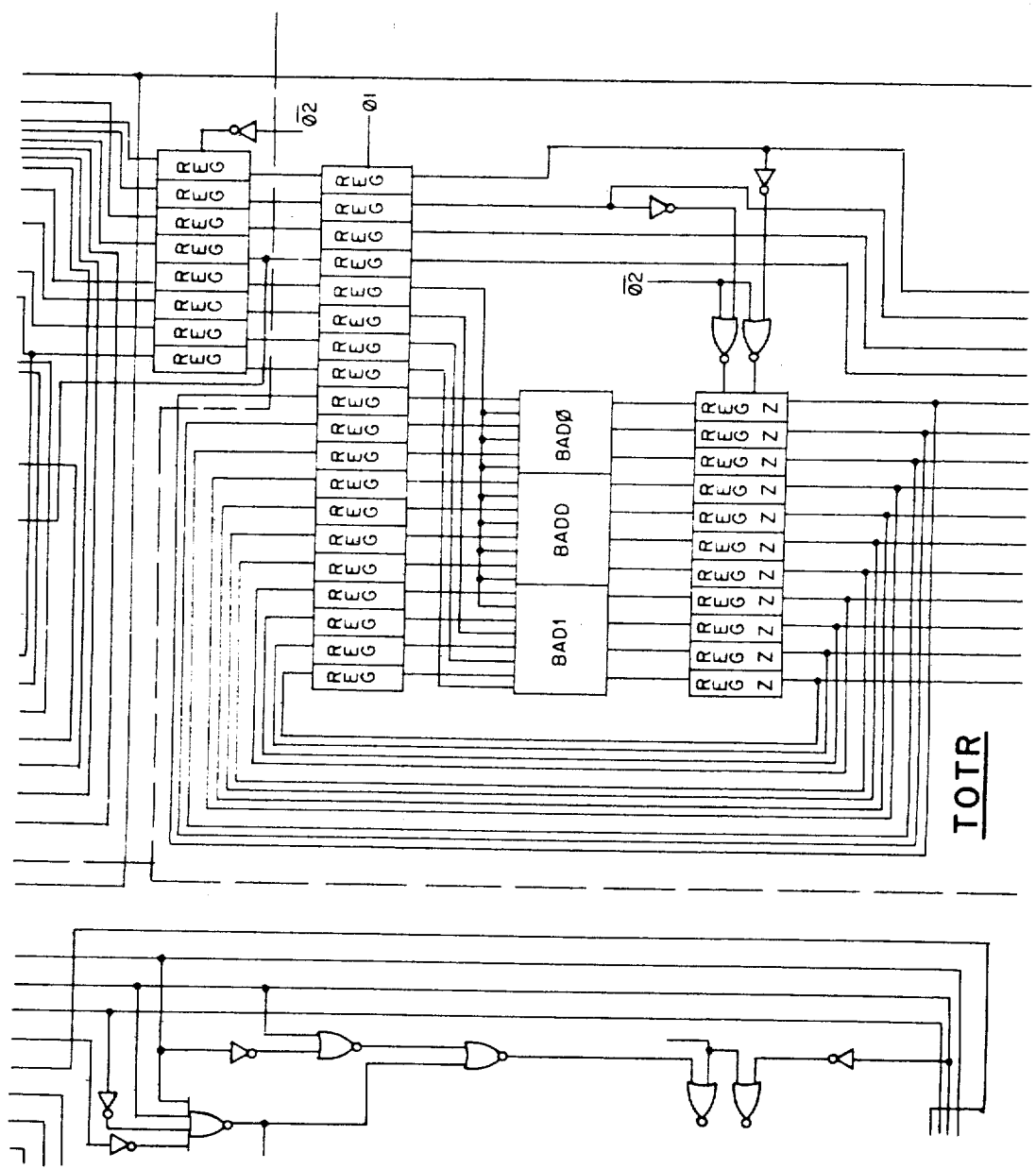
Figure 67Q:
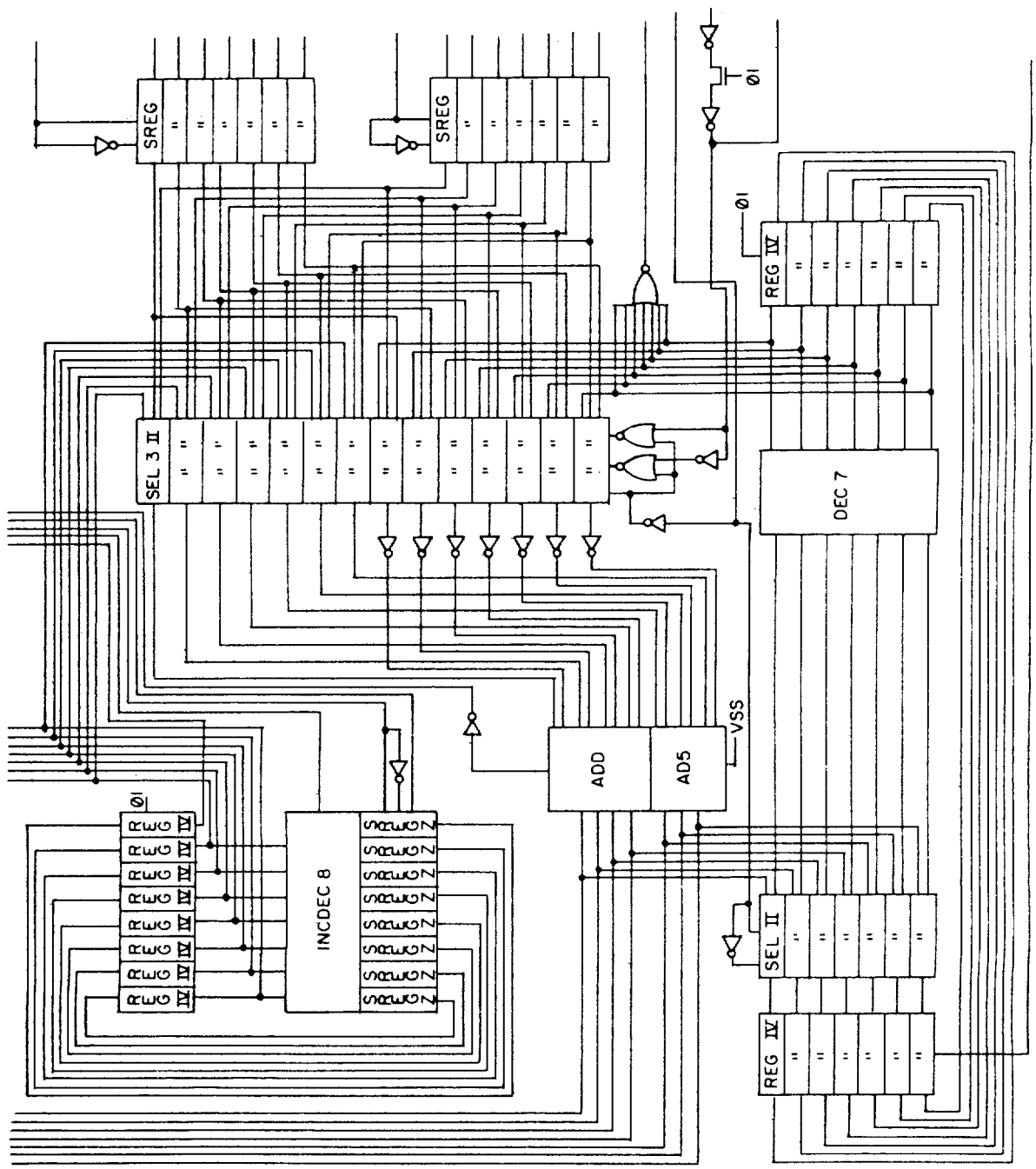
Figure 67R:
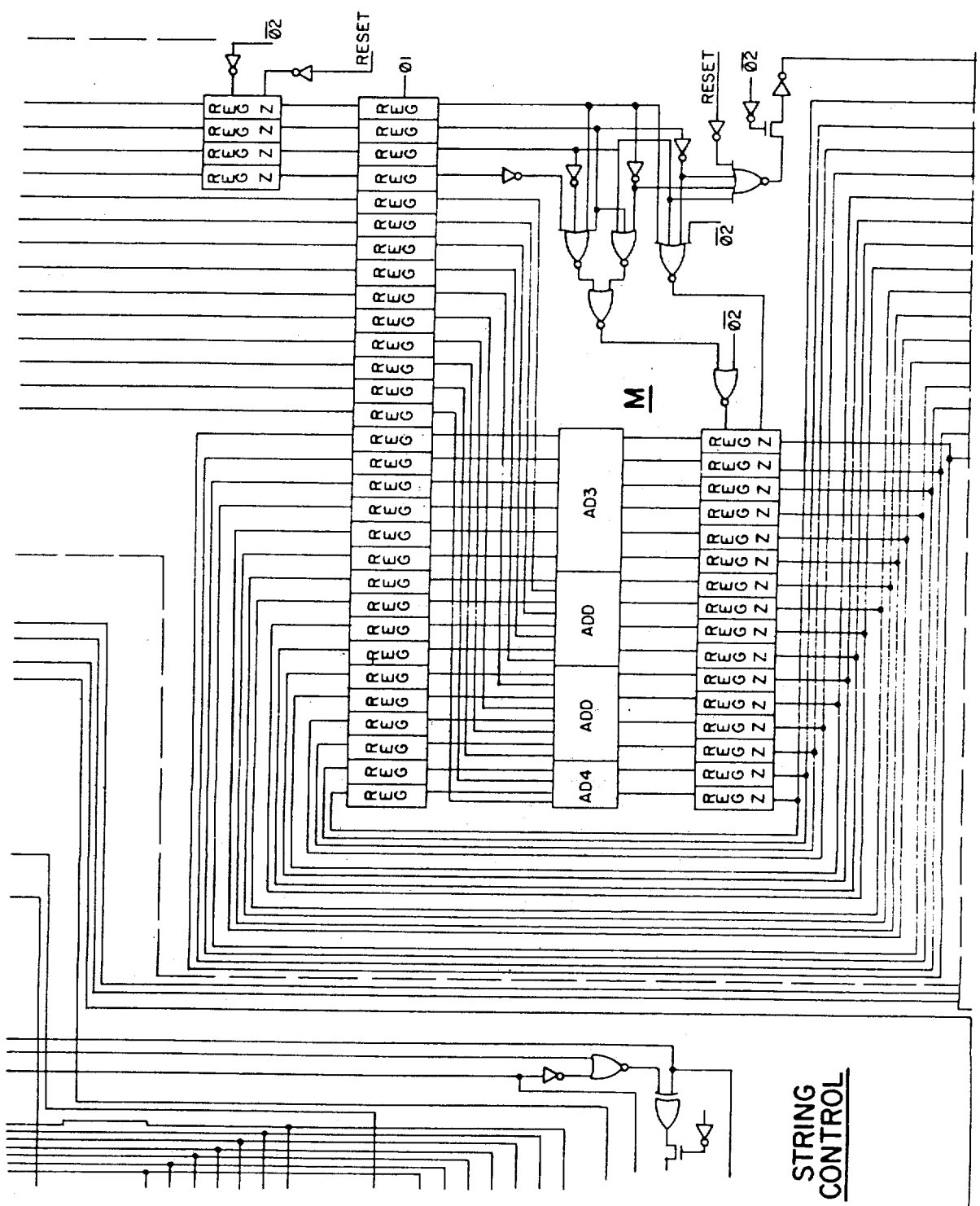
Figure 67S:
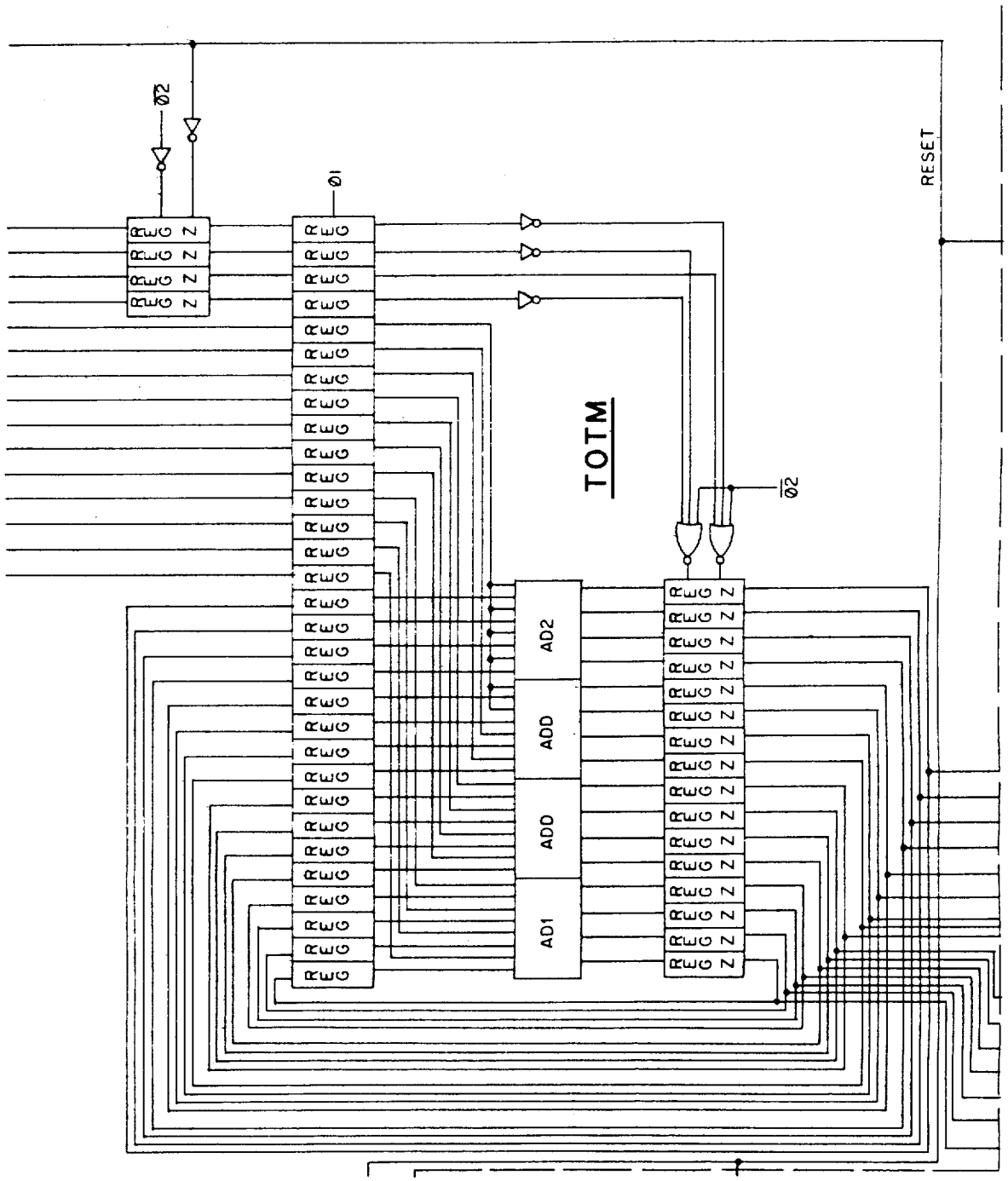
Figure 67T:
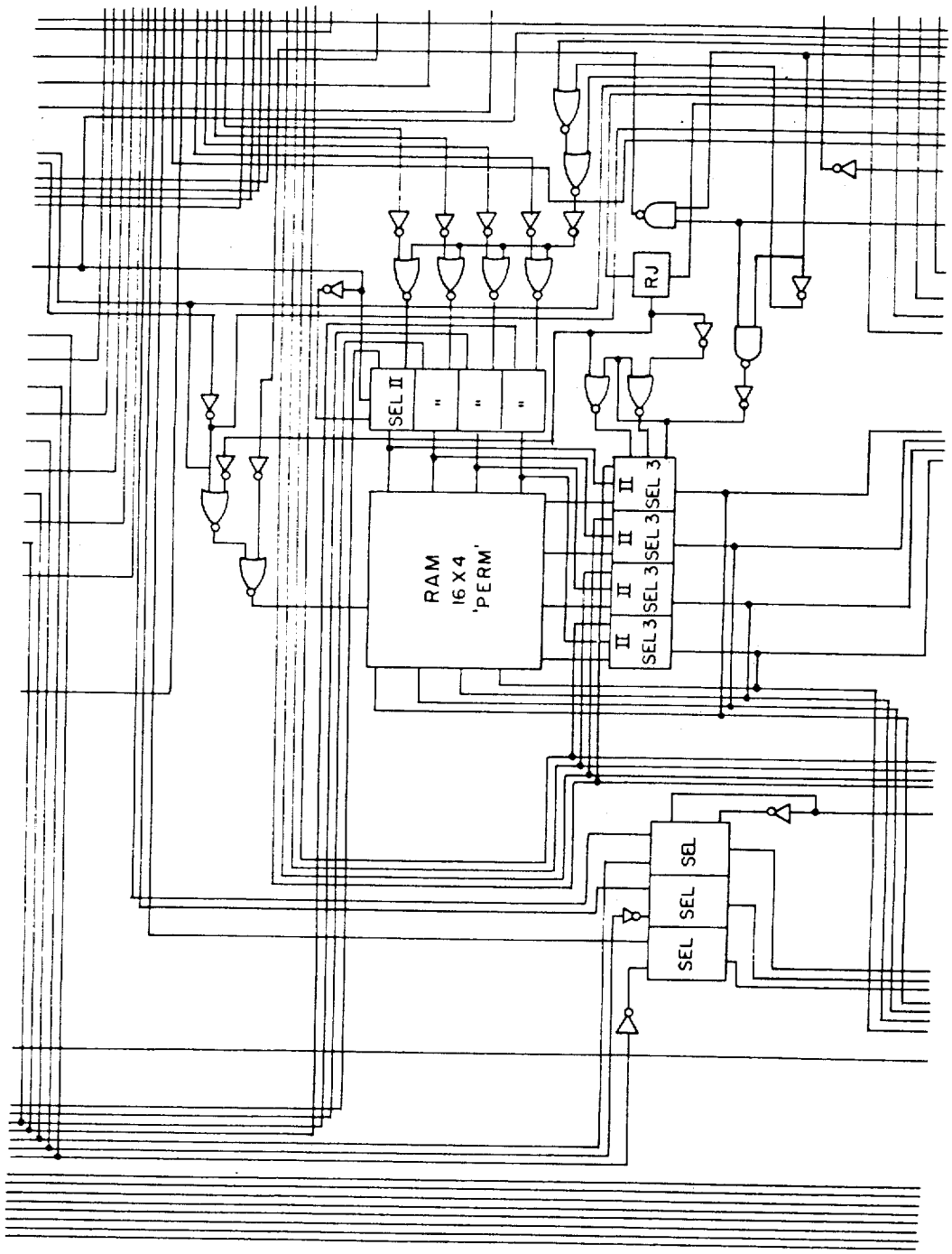
Figure 67U:
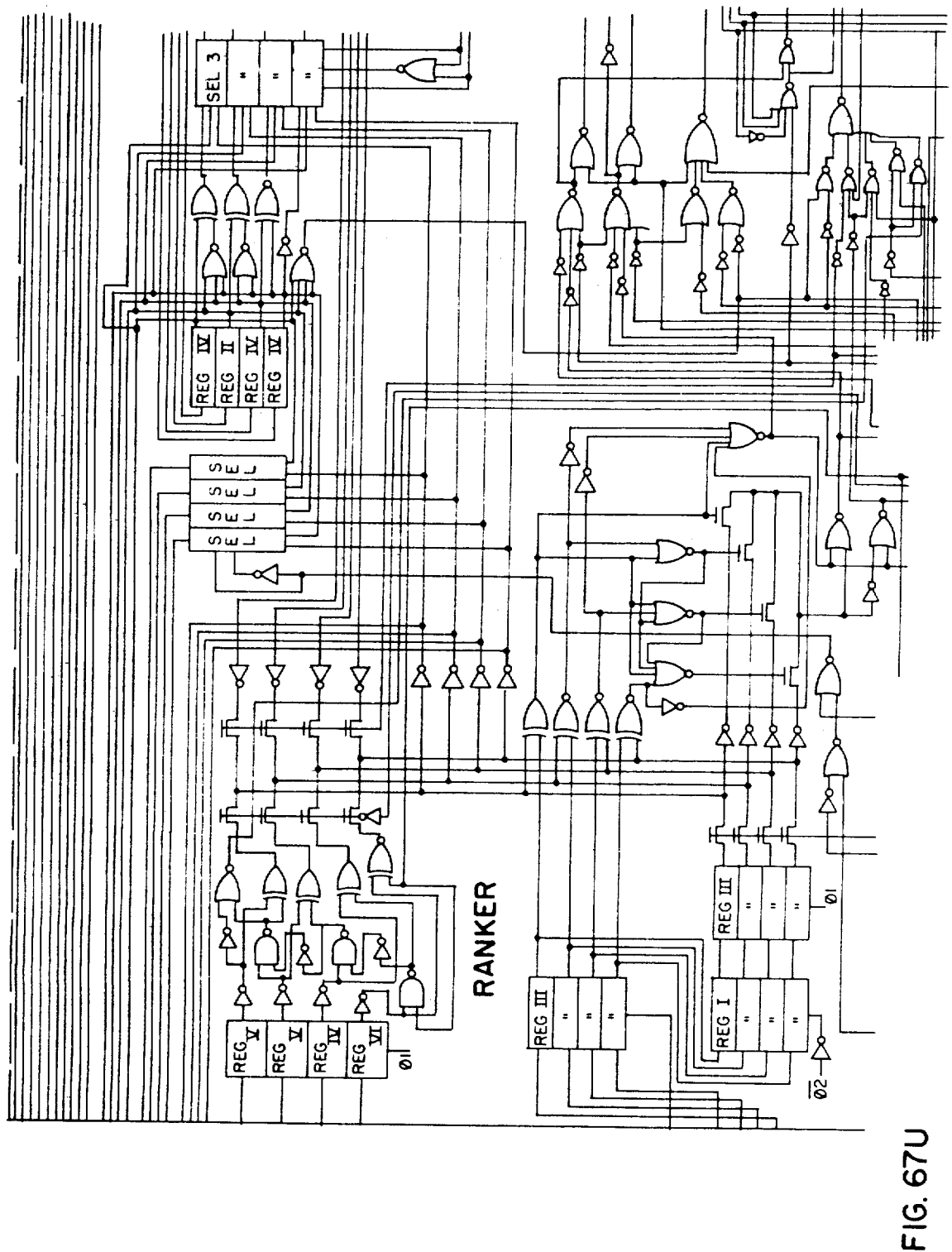
Figure 67V:
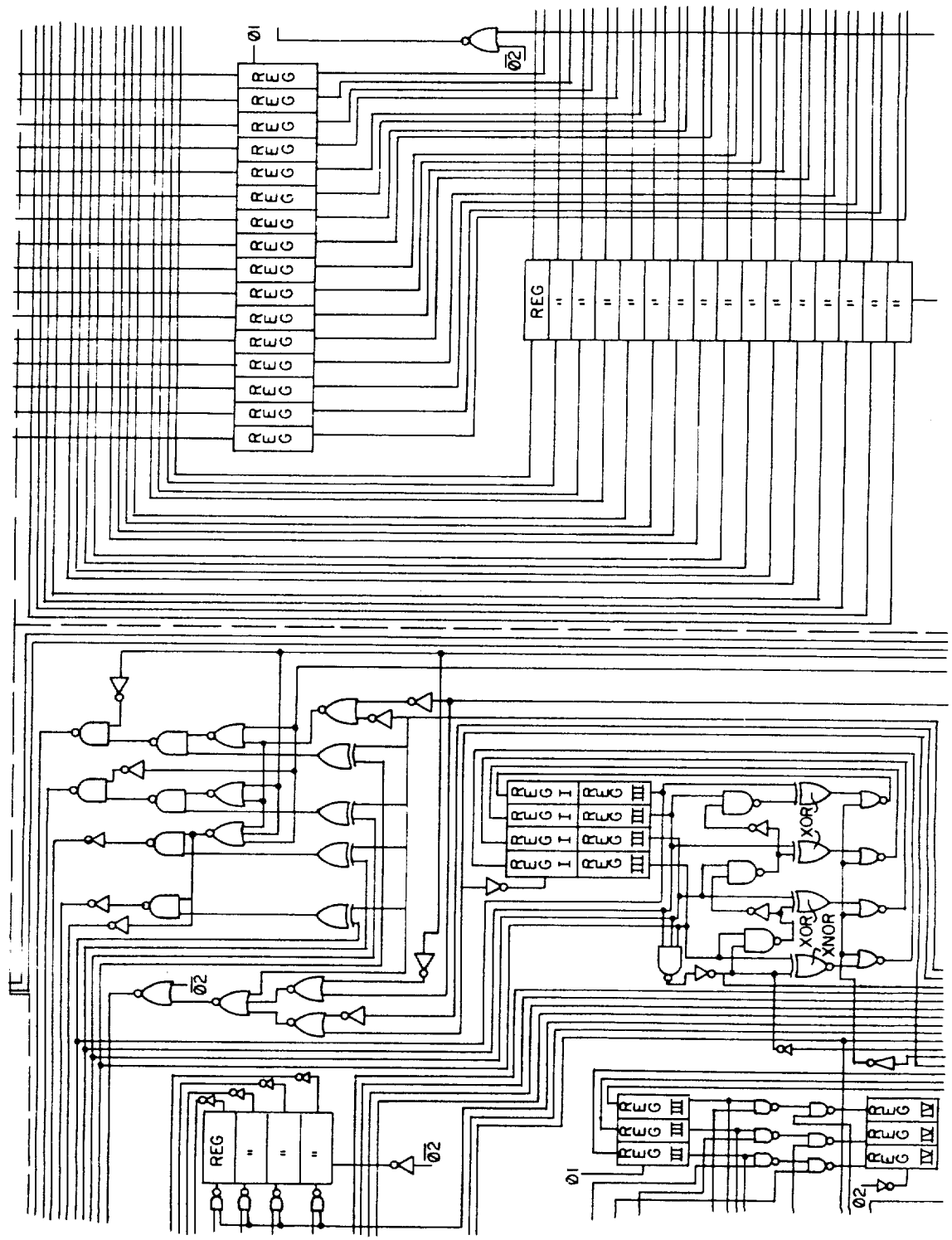
Figure 67W:
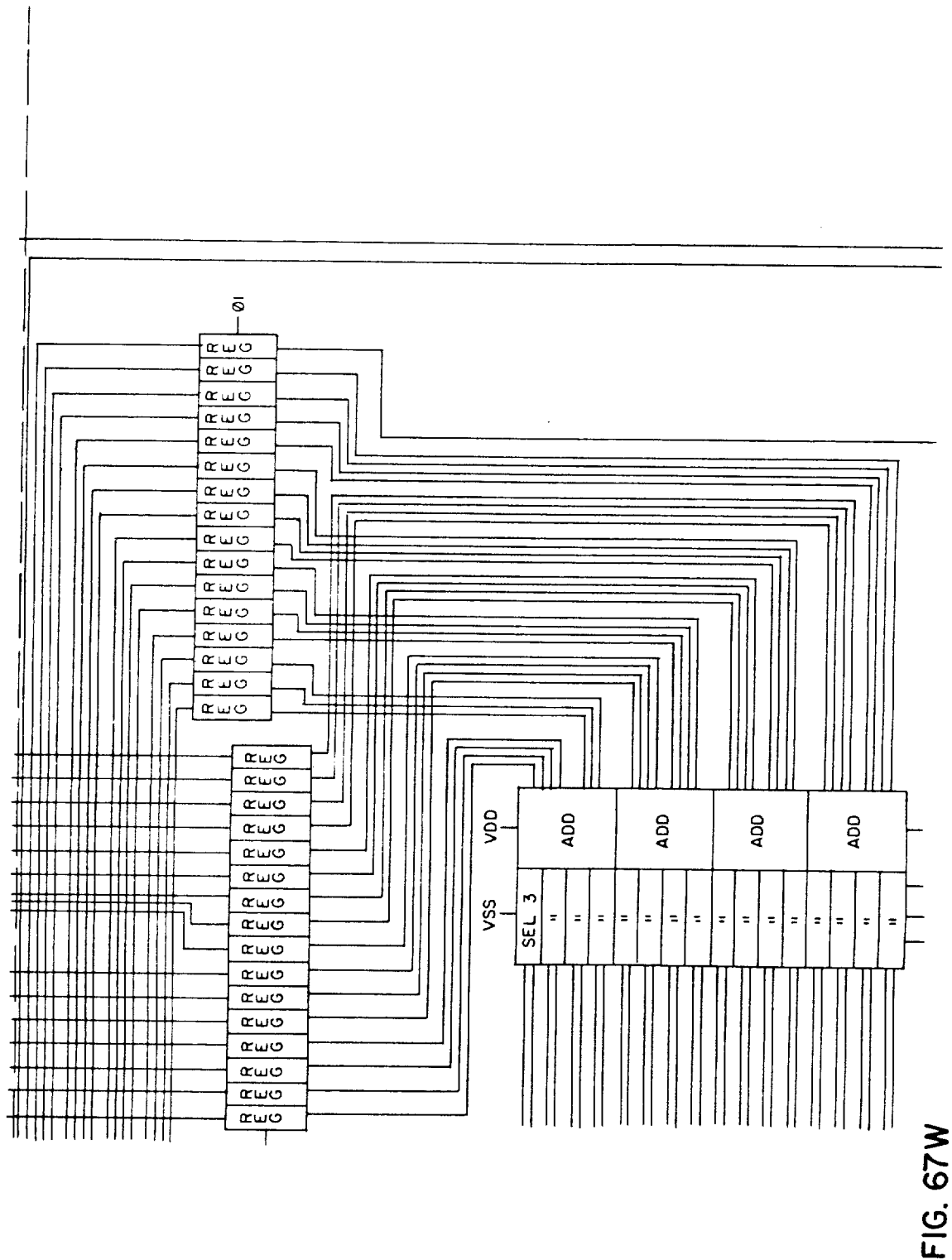
Figure 67X:
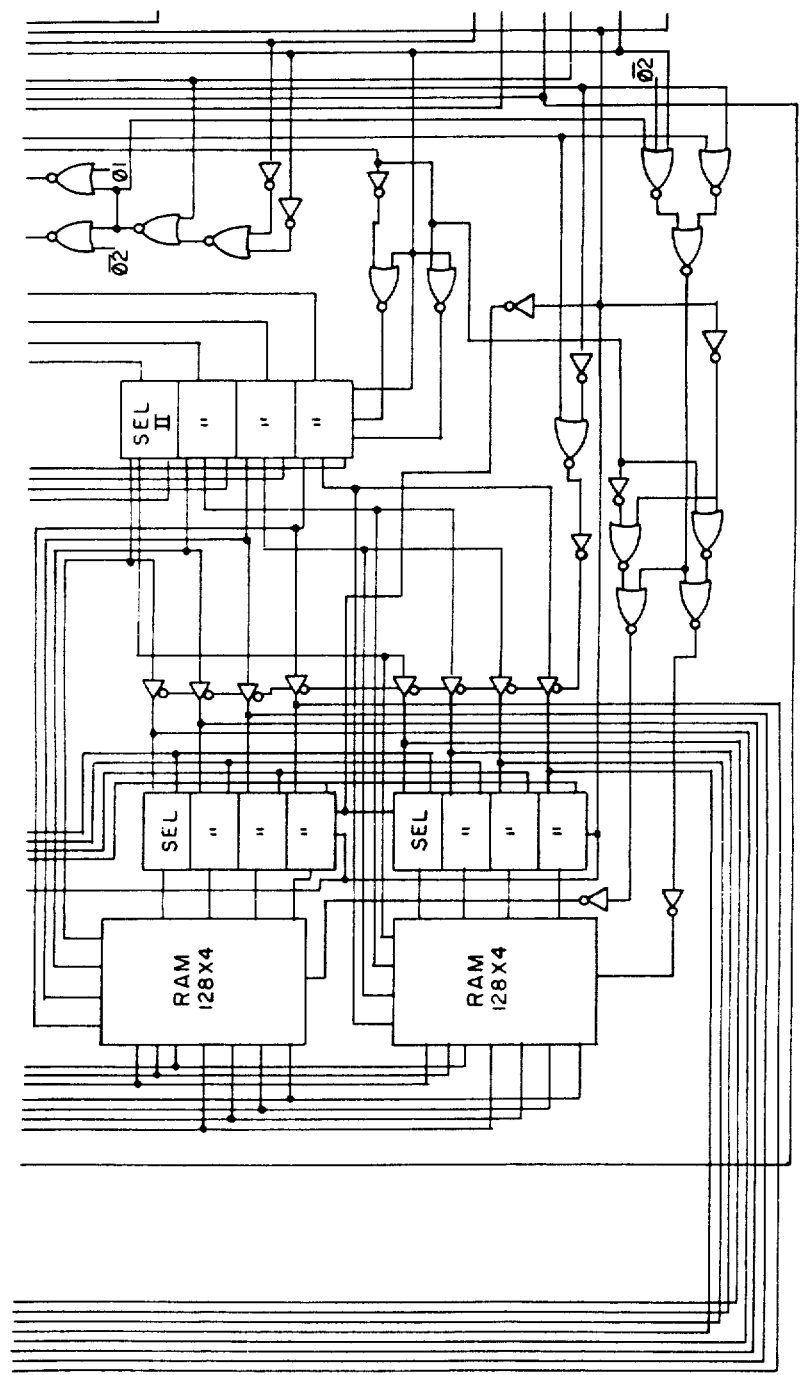
Figure 67Y:
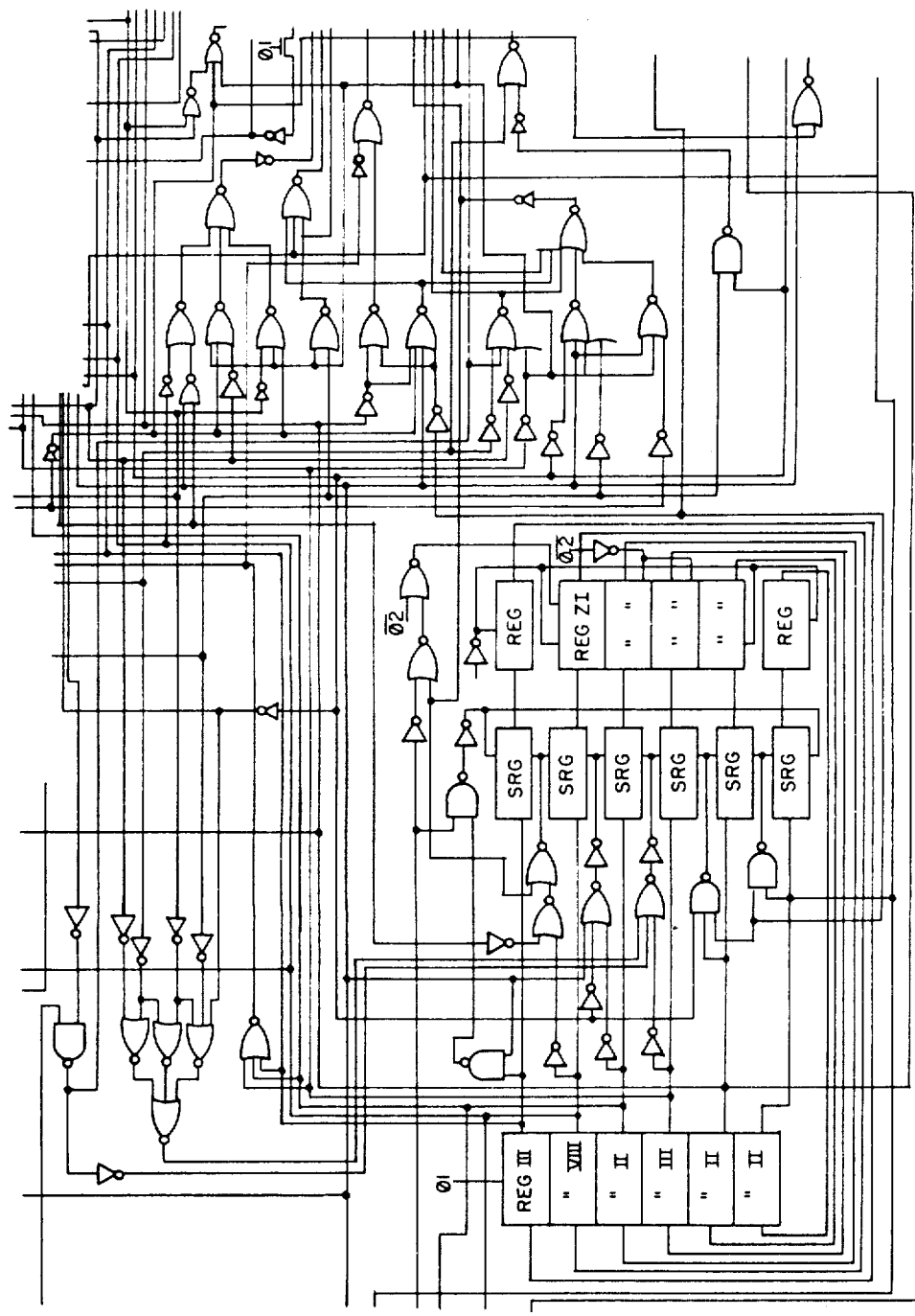
Figure 67Z:
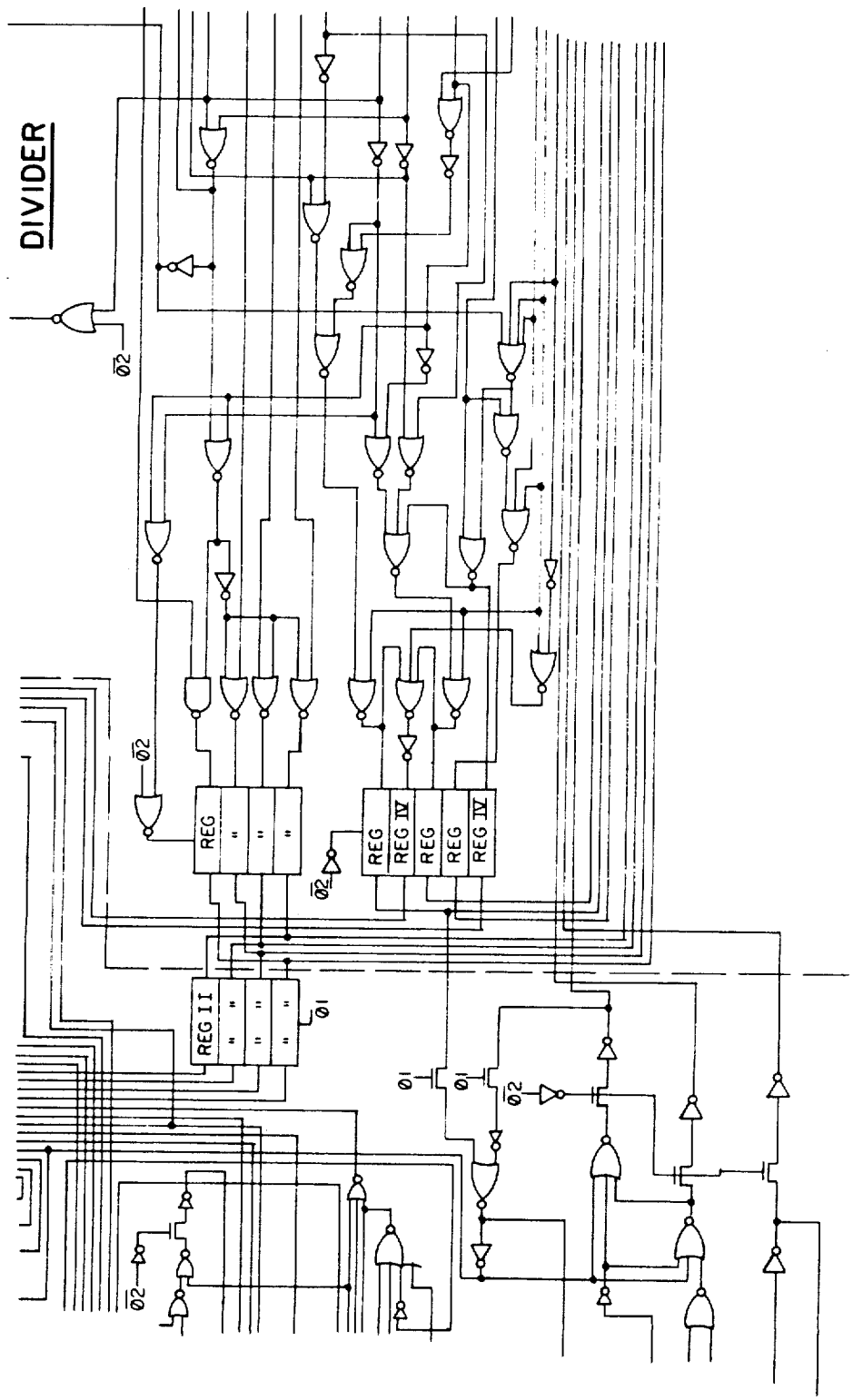
Figure 67A:
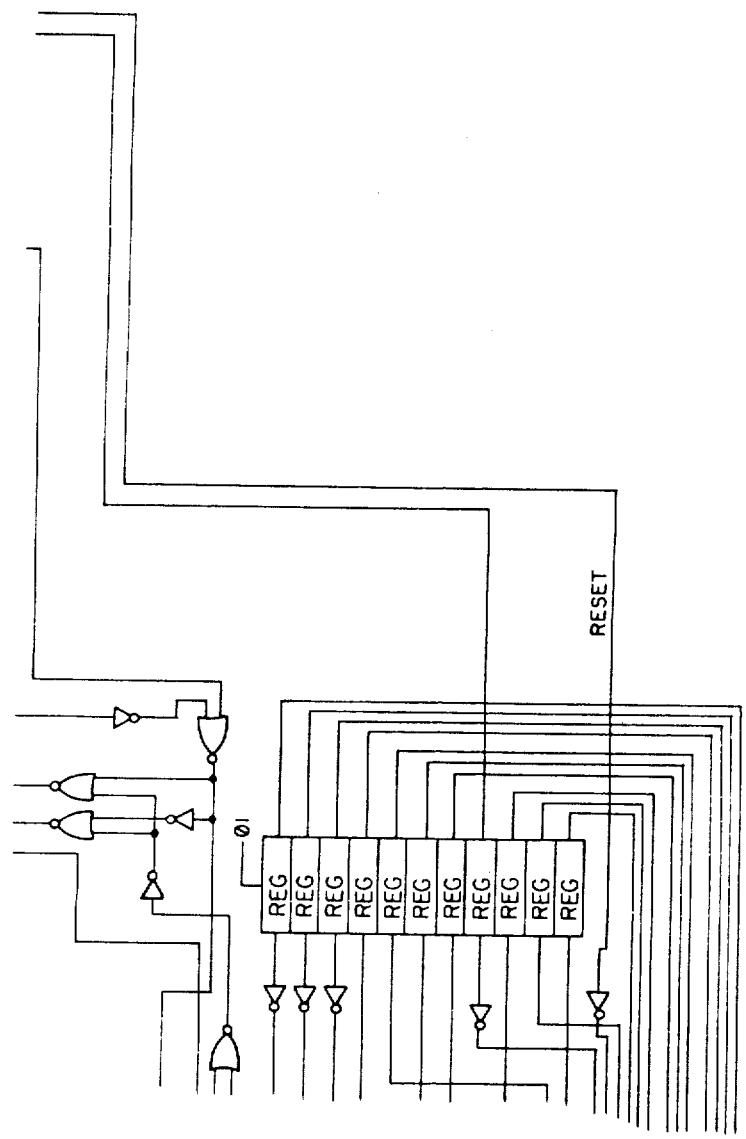

The Master Control means 20, the Bus Control means 21, the Ranker means 22, and the Divider means 23 are shown in complete detail in FIGS. 67A-67Z and 67AA as logic circuits. The string similarity computer means 10 is also shown in FIGS. 67A-67Z and 67AA. Furthermore, the string similarity computer is described on a functional level in the next section.

It should be noted that FIG. 1A may include any one of the following circuit configurations. First, string control 11, Parameter Generator 12, Core section 13, R section 16, and M section 17; second, string control 11, Parameter Generator 12, Core section 13, CA section 14, CB section 15, R section 16 and M section 17; third, string control 11, Parameter Generator 12, Core section 13, CA section 14, CB section 15, R section 16 and M section 17, TOTR section 18 and TOTM section 19;

fourth, string control 11, Parameter Generator 12, Core section 13, CA section 14, CB section 15, R section 16, M section 17, TOTR section 17, TOTM section 19 and Divider 23.

Figure 3:
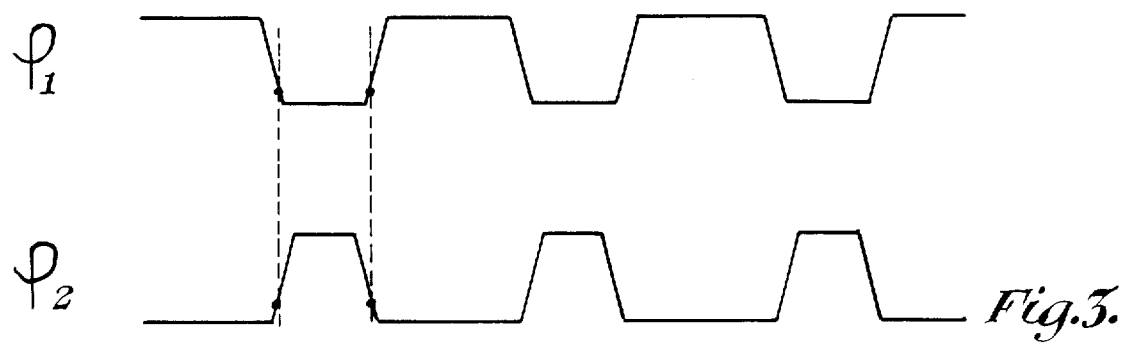
FIG. 3 is an illustration of the improved timing.

The design of the PF474 is based upon a structured design methodology which uses two-clock logic. FIG. 3 shows the two clocks $\theta 1$ and $\theta 2$. The clocks are designed so that only one is high (active) at a time. When $\theta 1$ is high, inputs are accepted into a logic block; when $\theta 1$ falls, the inputs are latched into the input registers. When $\theta 2$ is high the output of a logic block may change; when $\theta 2$ falls, the output signals are latched. These two clocks provide an orderly method for passing signals from one logic block to another. It is not possible or appropriate to discuss all the features of this structured design methodology in this patent. For a thorough discussion of this design philosophy, refer to the excellent text "Introduction to VLSI Systems" by Carver Mead and Lynn Conway (Addison-Wesley, 1980).

The string similarity computer 10 is also described in further detail in FIGS. 67A–67Z and 67AA. The string similarity computer 10 is now described on a functional level.

Figure 4:
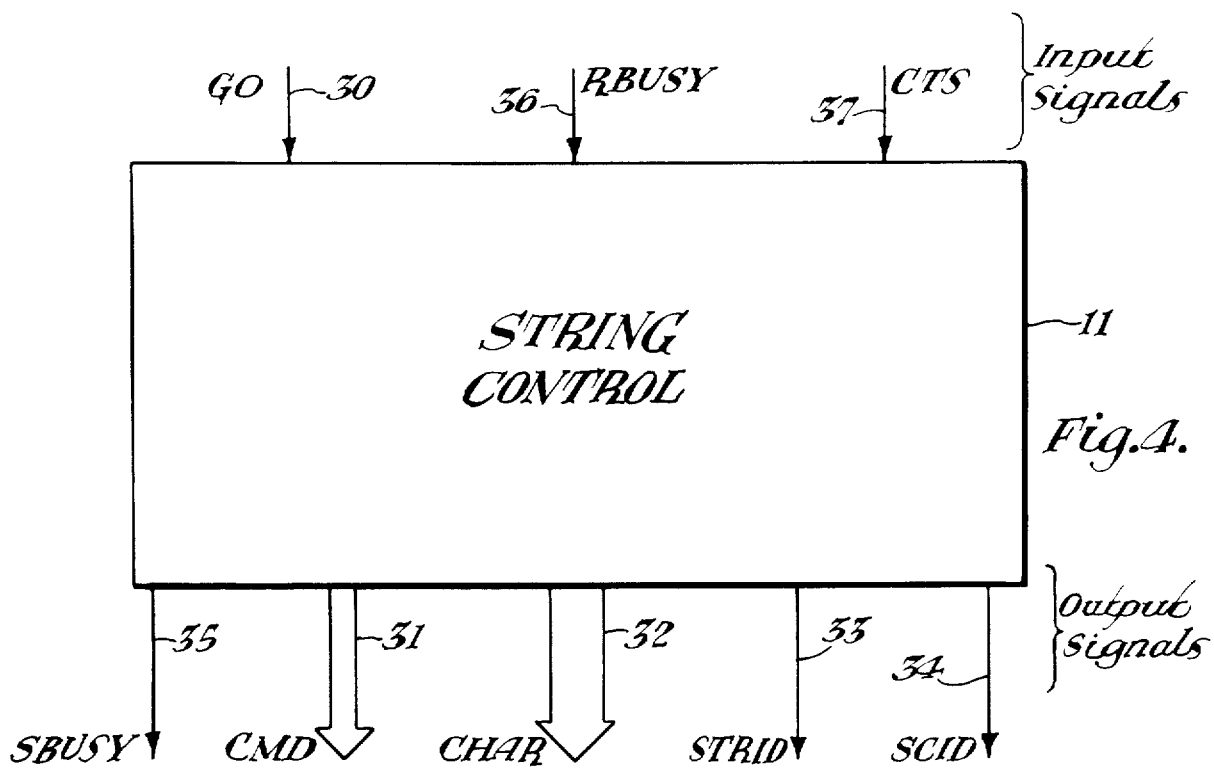
FIG. 4 is a block diagram of the String Control shown in FIG. 2.
Figure 5:
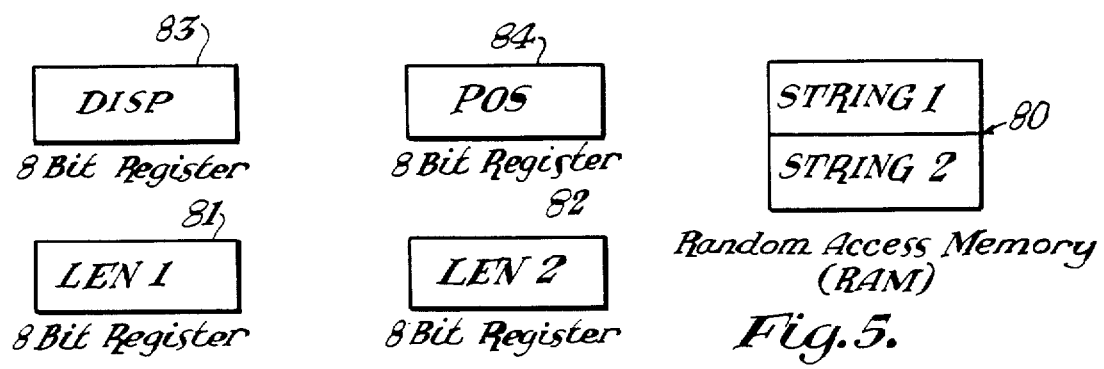
FIG. 5 is an illustration of components of the String Control of FIG. 4.

The purpose of the String Control means 11 is to control and coordinate the activities of the rest of the string similarity computer 10. The String Control means 11 is shown in FIG. 4 and FIG. 5. FIG. 4 shows the input and output signals which are important for the logical functionality. FIG. 5 shows the internal storage registers and memory.

The GO input 30 is a 1-bit signal. When GO is high (active), String Control will initiate a string comparison operation. The RBUSY signal 36 and the CTS signal 37 are status indicators. A string comparison operation can be started only when the RBUSY signal 36 is low (inactive) or the CTS signal 37 is high (active).

The SBUSY output signal 35 is high (active) while a string comparison operation is in progress. This signal is used by Master Control 20.

As shown in FIG. 5, the String Control means contains Random Access Memory 80 which contains areas for two strings of 8-bit characters. The two strings are designated String-1 and String-2. The strings are loaded into the Random Access Memory 80 by the Bus Control means 21. String-1 and String-2 are terminated with the character NULL. Additionally, two 8-bit registers LEN1 81 and LEN2 82 contains the lengths of String-1 and String-2, respectively.

The DISP register 83 and the POS register 84 are internal 8-bit registers used to perform the Forward and Reverse scans.

When a string comparison operation is initated, the lengths LEN1 and LEN2 are compared. The shorter of the two strings is designated String-A, the other is designated StringB. If the lengths are equal, the designation is made arbitrarily.

The CMD output signal 31 is a 3-bit signal which is used to sequence the activities of other parts of the string similarity computer 10. Table 1 shows the valid values for the CMD signal 31. The entries in Table 1 are listed in the order in which the values are output.

TABLE 1

| VALUE | CMD SIGNALS COMMAND |
|---|---|
| 000 | NOP (Idle State) |
| 010 | Pre-Forward Clear |
| 001 | Process Character (repeated during Forward Scan) |
| 011 | Pre-Reverse Clear |
| 101 | Load CB into R |
| 001 | Process Character (repeated during Reverse Scan stage 1) |
| 100 | Load CA into R |
| 001 | Process Character (repeated during Reverse Scan stage 2) |
| 110 | Transmit Results |
| 000 | NOP (Idle State) |

During the Forward Scan and the Reverse Scan, the CHAR output 32 is an 8-bit signal containing a character from either String-A or String-B. Each character from String-A or String-B is transmitted once during the Forward Scan and the Reverse Scan. The SCID output signal 34 is low (inactive) during the Forward Scan and high (active) during the Reverse Scan. The STRID output signal 33 is high (active) when a character from String-B is being output on CHAR lines 32. The STRID output signal is low (inactive) when a character from String-A is being output. The STRID output signal 33, the SCID output signal 34, and the CHAR output 32 are meaningful only when the CMD output 31 is equal to '001' indicating that a character should be processed.

The Forward Scan phase of the String Control means' operation causes the computation of the function $M_f$ as described in the previous section defining the string similarity function $\theta$. In effect, the String Control right-justifies String-1 and String-2 and then transmits every character beginning with the leftmost and ending with the rightmost. More precisely, String Control implements the following Forward Scan Program:

```
char strA[128], strB[128];              /*Two Strings*/
int lenA, lenB;                          /*Strings' lengths.
                                          LenB ≧ LenA*/ fscan(){
int disp;                                /*DISP register*/
int pos;                                 /*POS register*/
pos = 0;                                 /*Initialization*/
disp = LenB-LenA;
for (; pos LenB; ++p){
int i;                                   /*Temporary Variable*/
i = pos-disp;
if (i = = 0){
printf("CMD'001',OUTPUT CHAR'%c'
from STRING A. ", strA[i]);
}
printf("CMD'001', OUTPUT CHAR'%c' from
STRING B.0", strB[pos]);
}
```

}

The variable POS and DISP in the above program correspond exactly in function and purpose to the 8-bit registers POS 42 and DISP 41 shown in FIG. 5.

The Reverse Scan phase of the string control means' operation causes the computation of the function M, as described in the previous section defining the string similarity function $\theta$. The Reverse Scan is divided into two stages to facilitate the computation of the compensation functions. In effect, String Control left-justifies the String-1 and String-2 and transmits every character beginning with the rightmost and ending with the leftmost. More precisely, String Control implements the following Reverse Scan Program:

```
char strA[128]; strB[128];          /*Two Strings*/
int lenA, lenB;                     /*Strings' lengths.
                                     /*LenB≧LenA*/
rscan(){
int disp;                           /*DISP register*/
int pos;                            /*POS register*/
pos = lenB ;                        /*Initialization*/
      disp = LenB-LenA;
      /*Reverse Scan - Stage 1*/
      for (; disp = 0; disp--, pos--){
  printf("CMD'001', OUTPUT CHAR'%c' from
            STRING B. "0", strB[pos]);
      }
      /*LOAD CA INTO R*/
      printf(CMD'100', LOAD CA INTO R.0);
      /*Reverse Scan - Stage 2*/
      for (; pos 0; pos--){
  printf("CMD'001', OUTPUT CHAR'%c' from
            STRING A."0", strA[pos]);
  printf("CMD'001', OUTPUT CHAR'%c' from
            STRING B.0", strB[pos]);
      }
}
```

The variables POS and DISP in the above program correspond exactly in function and purpose to the 8-bit registers POS 42 and DISP 41 shown in FIG. 5. Also, POS and DISP are initialized in the program RSCAN to the values which they held at the end of the program FSCAN. Thus RSCAN can conveniently be run directly after FSCAN with no extra initialization.

Figure 6:
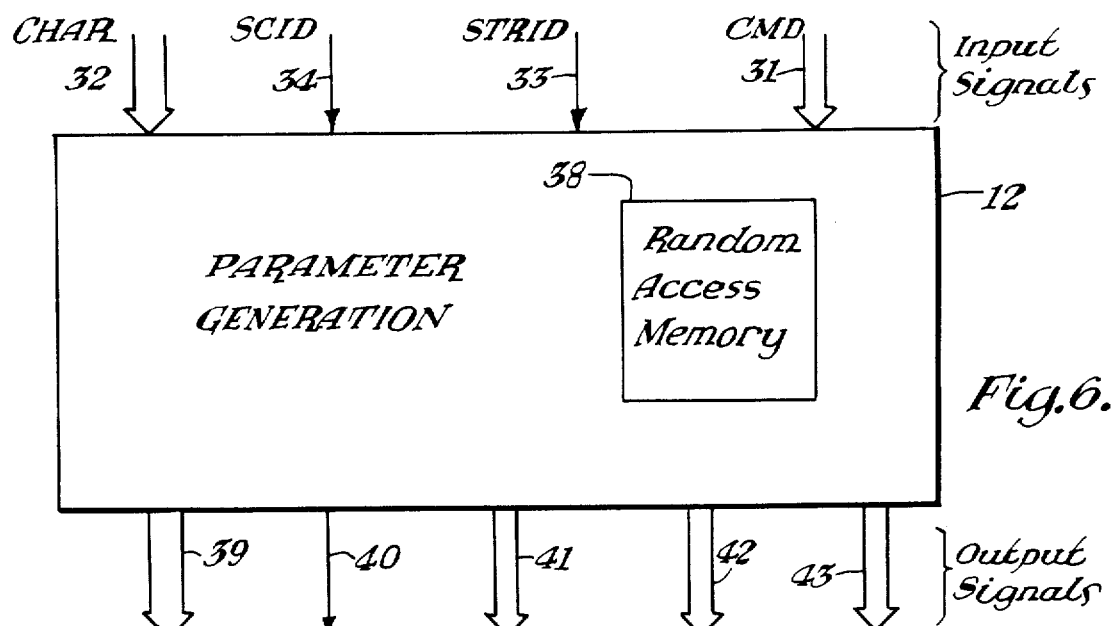
FIG. 6 is a block diagram of the Parameter Generation shown in FIG. 2.

The purpose of the Paramater Generation means 12 is to obtain the character weight and compensation values. The character itself is received from the String Control circuit 11. The character weight and compensation values are used by the rest of the string similarity computer 10. The Parameter Generation means 12 is shown in FIG. 6. FIG. 6 shows the input signals 31-34, the output signals 39-43 and the internal Random Access Memory 38.

The input signals are the CHAR input 32, the SCID input 34; the STRID input 33, and the CMD input 31. All of these signals are outputs of the String Control means 11.

The Random Access Memory 38 contains, for each of the 255 characters, a compensation value between 0 and 7, a weight value between 0 and 7, and a bias value between −2 and +1. These values correspond to the compensation function C, the forward weight function $W_f$, and the bias function B which were described in the appendix defining the string similarity function $\theta$. The Random Access Memory 38 is loaded via the Bus Control means 21.

The CHAR output signal 39 is always the same as the previous CHAR input signal 32. The CHAR signals 32, 39 are 8-bit data items.

The STRID output signal 40 is always the same as the previous STRID input signal 33. The STRID signals 33, 40 are 1-bit signals.

The CMD output signal 43 is always the same as the previous CMD input signal 31. The CMD signals 31, 43 are 3-bit signals.

The C output signal 42 is a 3-bit positivie binary signal equal to the compensation value for the character denoted by the CHAR signal 39. This compensation value is read from the Random Access Memory 38.

The WGHT output signal 41 is a 3-bit signal equal to either the forward or the reverse weight of the character denoted by the CHAR signal 39. When the SCID input signal 34 is low (inactive) denoting the Forward Scan phase, the WGHT output signal 41 is equal to the value W-f read from the Random Access Memory 38. When the SCID signal is high (active) denoting the Reverse Scan phase, the WGHT output signal 41 is equal to the sum of the values of $W_f$ and B read from the Random Access Memory 38.

The Core Section 13 is the decision-making part of the string similarity computer 10. It receives data from the Parameter Generation means 12, maintains character counts and determines what the rest of the string similarity computer must do. The Core Section 13 is pictured in FIG. 7 with its input signals 39-43, internal TALLY memory 44, and output signals 45-52.

The input signals are CHAR 39, STRID 40, WGHT 42, C 42 and CMD 43. These input signals are all outputs of the Parameter Generation means 12.

The TALLY memory 44 is a fast clear memory means of size 256×4. The TALLY memory contains a 4-bit signed (two's complement) number in the range −7 to 7, inclusive, for each character specified by the CHAR input signal 39. The clear control of the TALLY memory zeros the entire memory. Furthermore, individual entries in the TALLY memory may be incremented or decremented. Attempting to increment the value 7 or to decrement the value −7 results in an unchanged state. This is referred to as latching at ±7. The TALLY memory 44 corresponds directly to the array T used in the C programs in the earlier sections defining the string similarity function $\theta$.

The WX output signal 46 is equal to the arithmetic (two's complement) inverse of the WGHT input signal 41. WX 46 is a 4-bit non-positive integer.

The WGHT output signal 49 is equal to the previous WGHT input signal 41. The WGHT signals 41, 49 are 3-bit unsigned integers.

The CMD output signal 50 is a 3-bit signal that is always equal to the previous CMD input signal 43.

The CMDX output signal 48 is a 1-bit signal equal to the low-order bit of the CMD input signal 43.

The CMDB output signal 47 is a 2-bit signal. The low-order bit of CMDB 47 is high (active) only if the CMD input 43 is equal to '001' denoting a Process Character command. The high-order bit of CMDB 47 is high only if the CMD input 43 is equal to '010' or '011', denoting a Clear command.

When the CMD input 43 is equal to '010' or '011', a Clear command is specified. The entire contents of the TALLY memory 44 are cleared in this case.

When the CMD input 43 is equal to '001', a Process Character command is specified. The CHAR input 39 specifies a character to be processed. Each character designates a 4-bit entry in the TALLY memory 44. Character processing consists of incrementing or decrementing the entry in the TALLY memory 44 which corresponds to the character denoted by the CHAR input 39.

When the CMD input 43 is equal to '001' and the STRID input 40 is high (active), the appropriate TALLY memory entry is incremented and latched at 7. If the result is not positive then the T output signal 52 is high (active) otherwise the T output 52 is low (inactive).

When the CMD input 43 is equal to '001' and the STRID input 40 is low (inactive), the appropriate TALLY memory entry is decremented and latched at −7. If the result is non-negative then the T output signal 52 is high (active) otherwise the T output 52 is low (inactive).

If the T output signal 52 as computed above is high (active), then the C output signal 51 is the arithmetic (two's complement) inverse of the C input 42. Otherwise the C output 51 is equal to the C input 42. The C input 42 is an unsigned 3-bit integer. The C output 52 is a signed 4-bit integer.

Figure 7:
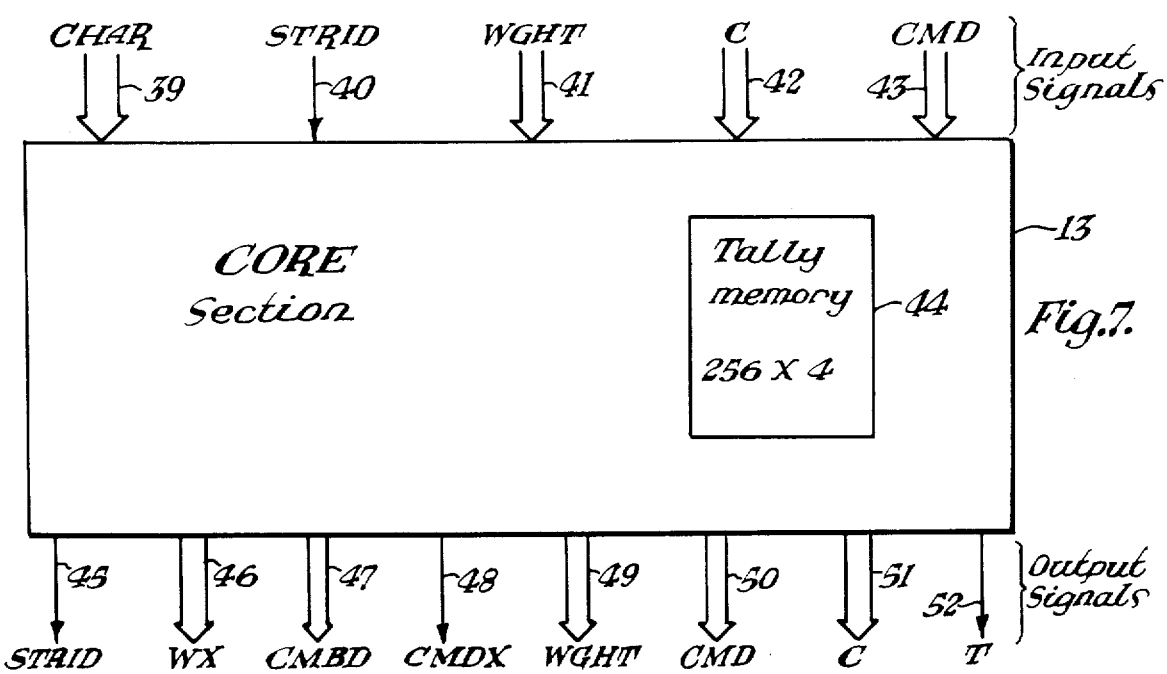
FIG. 7 is a block diagram of the Core Section shown in FIG. 2.

The CA section 14 is used to compute the total compensation value for the characters in the STRING-A. The CA section 14 is shown in FIG. 7 with its inputs 45, 49–52 and outputs 53–58. The signal COMPA 53 is an output signal which is also fed-back as an input to CA.

The input signals are STRID 45, WGHT 49, CMD 50, C 51, and T 52. These signals are outputs of the CORE section 13. The output signals STRID 54, WGHT 55, CMD 56, C 57 and T 58 are always the same value as the corresponding inputs; i.e. these signals are passed through unchanged.

The COMPA output signal 53 is a 9-bit unsigned non-negative integer. When the CMD input signal 50 is equal to '010', denoting a Pre-forward Clear command, the COMPA output value 53 is zero. When the CMD input signal 50 is equal to '001', denoting a Process Character command, and the value of the STRID input signal 45 is equal to the value of the T input signal 52; then the 4-bit signed input C 51 is added to the previous value of COMPA 53; the resulting sum is output as the COMPA signal 53. If an overflow occurs on this addition, the carry bit is lost; an overflow will not occur if the programming restraints documented in Appendix 3 are obeyed. When neither of the above condition is met, the COMPA output signal 51 is the same as the previous COMPA input signal 51.

The CB section 15 is used to compute the total compensation value for the characters in the STRING-B. The CB section 15 is shown in FIG. B with its inputs 53–58 and outputs 59–63. The signal COMPB 59 is an output signal which is also fed-back as an input to CB.

The input signals are COMPA 53, STRID 54, WGHT 55, CMD 56, C 57, and T 58. These signals are outputs of the CA section 14. The output signals STRID 60, WGHT 61, CMD 62, and T 63 are always the same value as the corresponding inputs; i.e. these signals are passed through unchanged.

The COMPB output signal 59 is a 9-bit unsigned non-negative integer. When the CMD input signal 56 is equal to '010', denoting a Pre-forward Clear command, the COMPB output value 59 is zero. When the CMD input signal 56 is equal to '100', denoting a Load CA into R command, the COMPB output value 59 is equal to the COMPA input value 53. When the CMD input signal 56 is equal to '001', denoting a Process Character command, and the value of the STRID input signal 54 is not equal to the value of the T input signal 58; then the 4-bit signed input C 57 is added to the previous value of COMPB 59; the resulting sum is output as the COMPB signal 59. If an overflow occurs on this addition, the carry bit is lost; an overflow will not occur if the programming restraints documented in Appendix 3 are obeyed. When none of the above conditions are met, the COMPB output signal 59 is equal to the previous COMPB input signal 59.

The R section 16 computes an intermediate subtotal value. The values computed by the R section correspond precisely to the R function described in the appendix 1 defining the string similarity function $\theta$.

Figure 10:
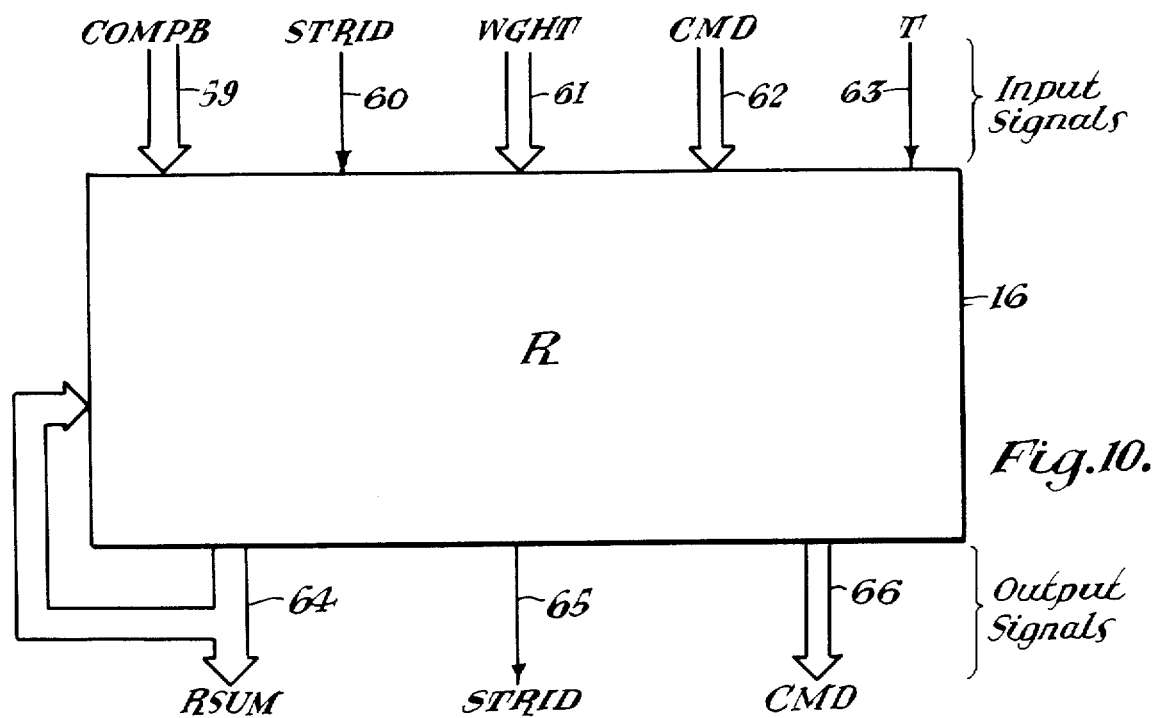
FIG. 10 is a block diagram of the R section shown in FIG. 2.

The R section 16 is pictured in FIG. 10 with its inputs 59–63 and its outputs 64–66. The RSUM signal fedback is an input to the R section 16.

The values of the output signals STRID 65 and CMD 66 are always the same as the values of the inputs STRID 60 and CMD 62.

The RSUM output signal 64 is a 10-bit non-negative (unsigned) integer. When the CMD input 62 is equal to '010' or '011', denoting a Clear command, then the RSUM output 64 is zero. When the CMD input 62 is equal to '101', denoting the Load CA into R command, then the value of the COMPB signal 59 is added to the previous value of the RSUM input signal 64; this sum is the next RSUM output 64. When the CMD input 62 is equal to '001', denoting a Process Character command, and the T input signal 63 is high (active); then twice the value of the WGHT input signal 61 is added to the value of the previous RSUM input 64; the result is the next RSUM output 64. When none of the above conditions is met, the RSUM output signal 64 is equal to the previous RSUM input signal 64.

If the result of the above additions causes an overflow, the carry bit is lost. An overflow will not occur if the programming restrictions documented in Appendix 3 are obeyed.

The M section 17 computes the numerator of the ratio defining the $\theta$ string similarity function. The M function is described in appendix 1.

The M section 17 is shown in FIG. 7. The inputs to the M section 17 are the signals RSUM 64 (a 10-bit unsigned integer), STRID 65 and CMD 66. The outputs are the READY output signals 68 and the MVAL output signal 67. MVAL 67 is a 16-bit non-negative integer which is fedback as an input to the M section 17.

The output READY 68 is high (active) only when the CMD input 66 is equal to '110', denoting a Transmit Result command. While the READY signal 68 is active, the output of the M section 17 and the TOTM section 19 are valid and ready for the DIVIDER section 23 to use them.

When the CMD input 66 is equal to '010', denoting a Pre-Forward Clear command, the MVAL output 67 is zero. When either of the following two conditions hold (1) the CMD input 66 is equal to '100', denoting a Load CA into R command, or (2) the STRID input 65 is high (active) and the CMD input 66 is equal to '001', denoting a Process Character command; then, the MVAL input 67 is added to the RSUM input 64 and the result of the addition is the next MVAL output 67. When none of the above conditions are met, then the MVAL output 67 is unchanged from the previous MVAL input 67.

If the result of the above additions causes an overflow, the carry bit is lost. An overflow will not occur if the programming restrictions documented in Appendix 3 are obeyed.

The TOTR section 18 computes an intermediate sub-total value. The values computed by the TOTR section correspond precisely to the values of the variable TOTR used in the C programs in the appendix 1 defining the $\theta$ string similarity function.

Figure 12:
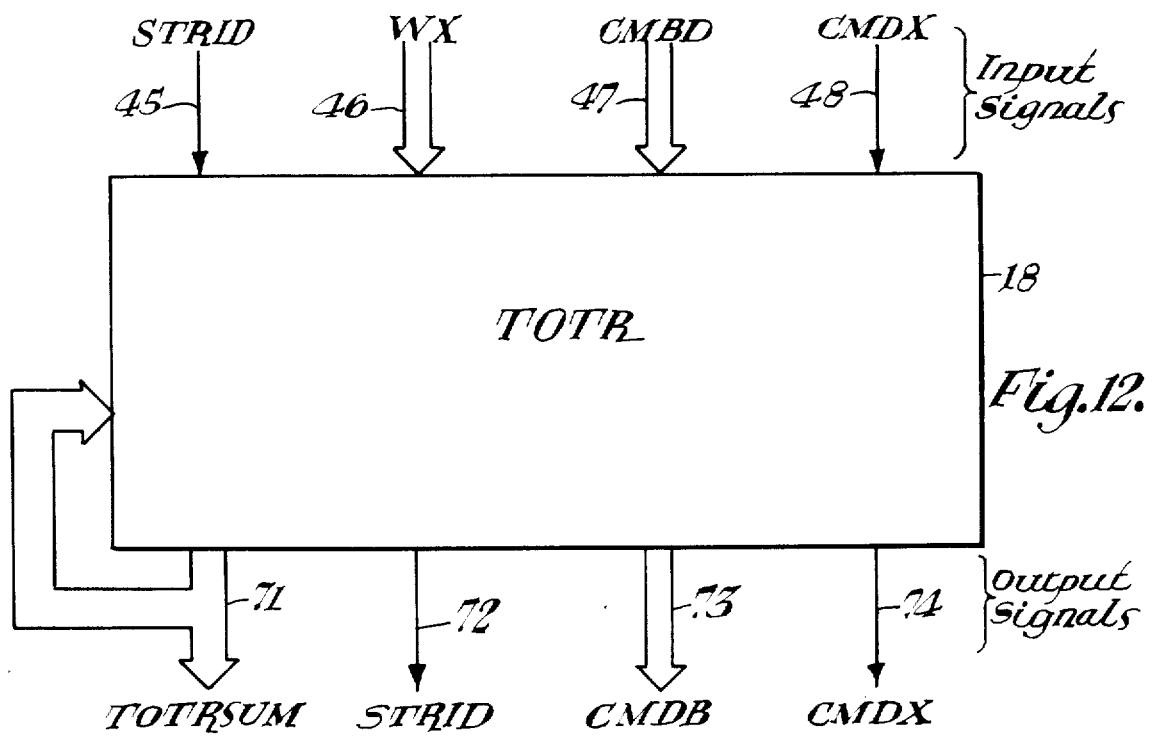
FIG. 12 is a block diagram of the TOTR section shown in FIG. 2.

The TOTR section 18 is shown in FIG. 12 with its input signals 45–48 and its output signals 71–74. The TOTRSUM output 71 is an 11-bit signed (two's complement) integer which is fedback as an input to the TOTR section 18.

The WX input 46 is a 4-bit signed (two's complement) integer. Both WX 46 and TOTRSUM 71 have only non-positive values.

The CMDX output 74 and the STRID output 72 are always equal to the previous CMDX input 48 and STRID input 45, respectively.

When the high-order bit of the CMDB input 47 is high (active), denoting a Clear command, then the TOTRSUM output 71 is zero. When the low-order bit of the CMDB input 47 is high (active), denoting a Process Character command, then the WX input 46 is added to the TOTRSUM input 71 and the result of the addition is the next TOTRSUM output value 71. When neither of the above conditions is met, then the TOTRSUM output 71 is unchanged from the previous TOTRSUM input 71.

If the result of the above additions causes an underflow, the carry bit is lost. An underflow will not occur if the programming restrictions documented in Appendix 3 are obeyed.

The TOTM section 19 computes the denominator of the ratio defining the $\theta$, string similarity function. The TOTM function was described in appendix 1.

Figure 19:
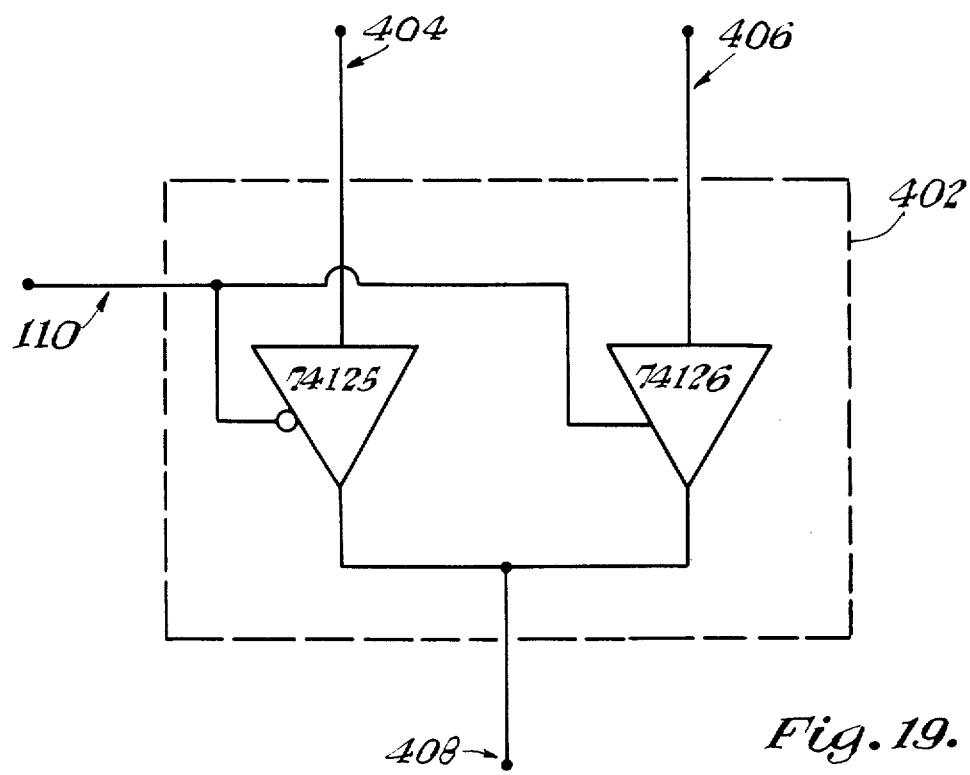
FIG. 19 is a schematic diagram of the selector circuit shown in FIG. 17.

The TOTM section 19 is shown in FIG. 19 with its inputs 71–74 and its output TOTMVAL 75. The TOTMVAL signal 75 is a 16-bit non-positive integer which is fedback to the M section 19 as an input. A non-positive integer is either zero or is a negative number in two's complement format with an implicit negative sign bit. The reason TOTMVAL 75 is a non-positive integer is to simplify the circuit design of the DIVIDER section 23. The TOTRSUM input 71 is an 11-bit signed (two's complement) number.

When the high order bit of the CMDB input signal 73 is high (active) and the CMDX input signal 74 is low (inactive) denoting a Pre-Forward Clear command, then the TOTMVAL output 75 is zero. When the low-order bit of the CMDB input 73 is high (active), denoting a Process Character command, and the STRID input 72 is high (active); then the TOTRSUM input 71 is added to the TOTMVAL input 75 and the result is the next TOTMVAL output 75. When neither of the above conditions is met, then the TOTMVAL output 75 is unchanged from the previous TOTMVAL input 75.

If the result of the above additions causes an overflow, the carry bit is lost. An underflow will not occur if the programming restrictions documented in Appendix 3 are obeyed.

Complete logic drawings for the chip including the string comparator means shown in FIGS. 1 and 2 are shown in FIGS. 27–67, 66A–66D, 67A–67Z, and 67AA. These drawings are being used by and made by American Microsystems Inc. under contract to Proximity Devices Corporation to manufacture the chip to be known by the trademark "PF474" as a Large Scale Integrated (LSI) circuit using a 5-micron NMOS process. Below, we give the correspondence of node numbers on the complete logic drawings to the numbers shown in FIGS. 1 through 13. This will show how the logic functions described in the body of the patent have been implemented in the logic drawings. FIG. 2 shows a block diagram of the PF474. The Master Control means 20 and the Bus Control means 21 are implemented with nodes 2700-3299. The Ranker means 22 is implemented with nodes 3300-3900. The Divider means 23 is node numbers 1-299. The String Similarity Computer 10 is implemented with nodes 700-2000. The String Similarity Computer 10 consists of several different logic blocks. The String Control is implemented as nodes 300-600. The Core section 13 is implemented as nodes 700-1023. The CA section 14 is implemented as nodes 1024-1122, 1182-1207. The CB section 15 is implemented as nodes 1123-1170, 1214-1303. The R section 16 is implemented as nodes 1326-1462. The M section 17 is implemented as nodes 1463-1622. The TOTR section 18 is implemented as nodes 1630-1738, 1768-1788. The TOTM section 19 is implemented as nodes 1740-1767, 1789-1978. We present in tabular form the node numbers corresponding to the signals, registers and memories shown in FIGS. 4-13.

Figure 8:
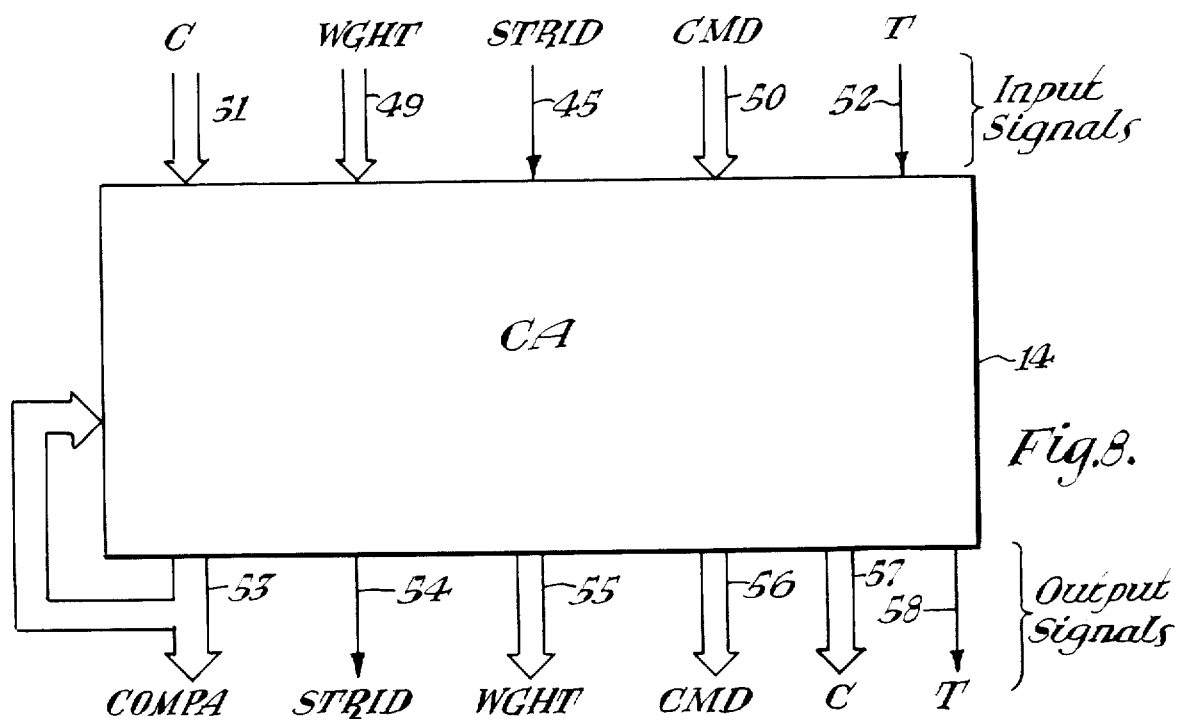
FIG. 8 is a block diagram of the CA section shown in FIG. 2.
Figure 9:
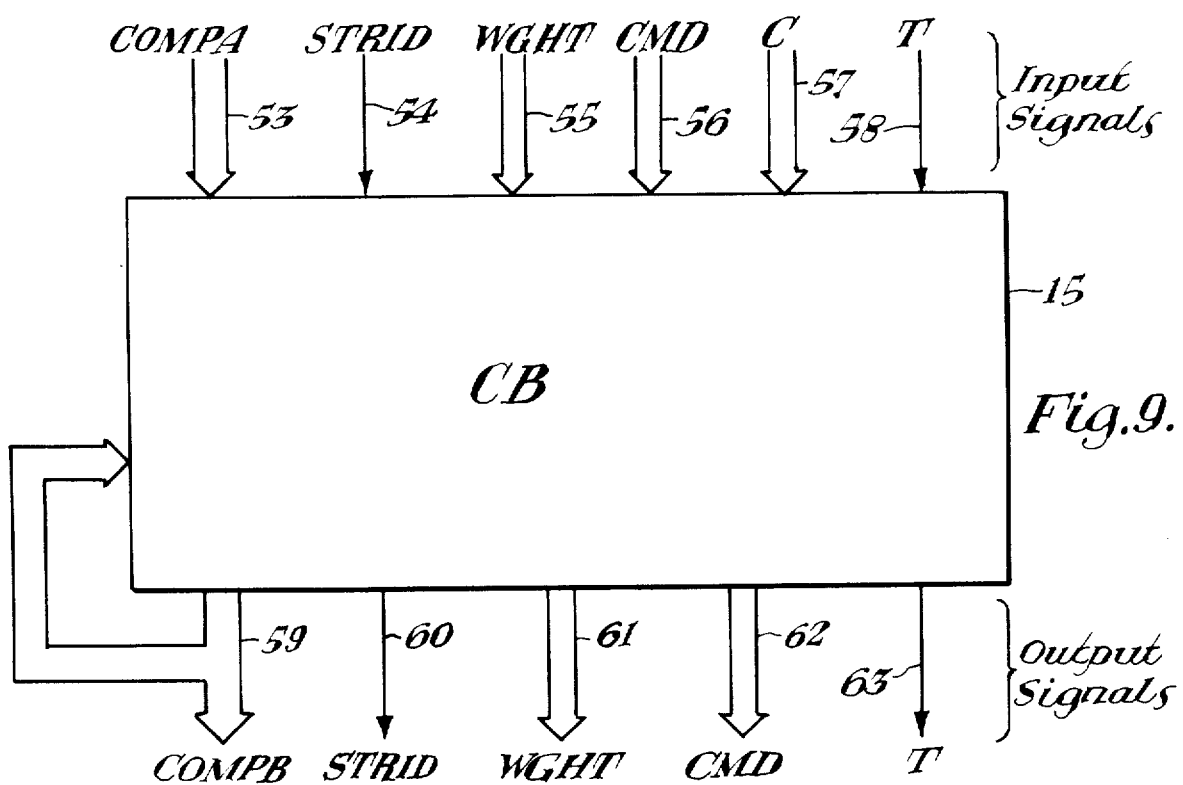
FIG. 9 is a block diagram of the CB section shown in FIG. 2.

| NODE NUMBER CORRESPONDENCE | | |
|---|---|---|
| Signal Name | Reference Figure | Node Numbers in FIG. 67 |
| GO 30 | FIG. 4 | 3044 |
| RBUSY 36 | FIG. 4 | 111 |
| CTS 37 | FIG. 4 | 108 |
| SBUSY 35 | FIGS. 4, 6 | 2509 |
| CMD 31 | FIGS. 4, 6 | 2511-2513 |
| CHAR 32 | FIGS. 4, 6 | 2500-2507 |
| STRID 33 | FIGS. 4, 6 | 2510 |
| SCID 34 | FIGS. 4, 6 | 2508 |
| String Control | FIG. 5 | 2530-2699 |
| RAM 80 | | |
| LEN1 register 81 | FIG. 5 | 2486-2492 |
| LEN2 register 82 | FIG. 5 | 2493-2499 |
| DISP register 83 | FIG. 5 | 2333-2399 |
| POS register 84 | FIG. 5 | 2153-2160, 2215-2266 |
| Parameter Generation RAM 38 | FIG. 6 | 380-563 |
| CHAR 39 | FIGS. 6, 7 | 357-364 |
| STRID 40 | FIGS. 6, 7 | 371 |
| WGHT 41 | FIGS. 6, 7 | 368-370 |
| C 42 | FIGS. 6, 7 | 365-367 |
| CMD 43 | FIGS. 6, 7 | 372-374 |
| Tally Memory 44 | FIG. 7 | 823-926 |
| STRID 45 | FIGS. 7, 8 | 811 |
| WX 46 | FIGS. 7, 8 | 807-810 |
| CMDB 47 | FIGS. 7, 8 | 1700-1701 |
| CMDX 48 | FIGS. 7, 8 | 1702 |
| WCHT 49 | FIGS. 7, 8 | 701-703 |
| CMD 50 | FIGS. 7, 8 | 815-817 |
| C 51 | FIGS. 7, 8 | 818-821 |
| T 52 | FIGS. 7, 8 | 822 |
| COMPA 53 | FIGS. 8, 9 | 1114-1122 |
| STRID 54 | FIGS. 8, 9 | 1106 |
| WCHT 55 | FIGS. 8, 9 | 1107-1109 |
| CMD 56 | FIGS. 8, 9 | 1102-1104 |
| C 57 | FIGS. 8, 9 | 1110-1113 |
| T 58 | FIGS. 8, 9 | 1105 |
| COMPB 59 | FIGS. 9, 10 | 1227-1235 |
| STRID 60 | FIGS. 9, 10 | 1240 |
| WGHT 61 | FIGS. 9, 10 | 1241-1243 |
| CMD 62 | FIGS. 9, 10 | 1236-1238 |

-continued

NODE NUMBER CORRESPONDENCE

| Signal Name | Reference Figure | Node Numbers in FIG. 67 |
|---|---|---|
| T 63 | FIGS. 9, 10 | 1239 |
| RSUM 64 | FIGS. 10, 11 | 1453–1462 |
| STRID 65 | FIGS. 10, 11 | 1450 |
| CMD 66 | FIGS. 10, 11 | 1447–1449 |
| MVAL 67 | FIG. 11 | 1607–1622 |
| READY 68 | FIG. 11 | 1605 |
| TOTRSUM 71 | FIGS. 12, 13 | 1774–1784 |
| STRID 72 | FIGS. 12, 13 | 1788 |
| CMDB 73 | FIGS. 12, 13 | 1785–1786 |
| CMDX 74 | FIGS. 12, 13 | 1787 |
| TOTMVAL 75 | FIG. 13 | 1931–1946 |

The chip manual entitled Advanced Product Description is included as Appendix 3 and made a part hereof to provide disclosure of use of the chip.

Appendix 4 is included herein and made a part hereof as an example of an electrical interface of the chip with the S-100 Bus, a widely used system for computer interconnection. The circuit described in Appendix 4 supports appropriate communication between the chip, a 4K-word by 8-bit RAM, and any of the widely used computer system which are compatible with the S-100. Appendix 4 included drawings A4-1 through A4-8.

Figure 14:
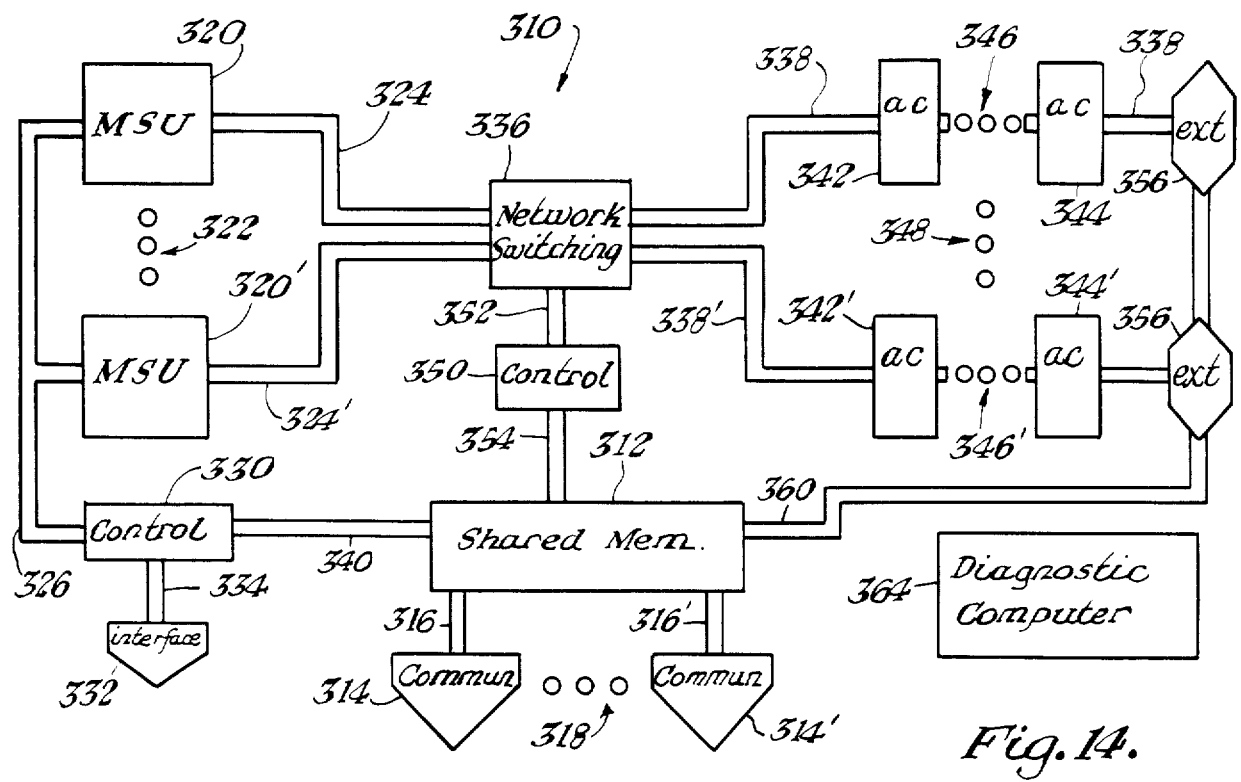
FIG. 14 is a block diagram of an associative retrieval system.

The improved string comparator is based on the associative memory circuit originally disclosed and filed on Mar. 14, 1979 as Ser. No. 20,618 includes a word associator circuit shown in detail as an electrical digital circuit in FIGS. 14 through 26. The system or associative memory circuit is shown in FIG. 14. This associative memory circuit is an improved associatve retrieval device that includes the use of the word associator or comparator circuit connected in a storage loop to locate and extract records that are most similar to the supplied query. Inexact queries will rapidly locate records similar with respect to word, numeric and mask related measurements of similarity. The new and improved method that is set forth below in detail provides a method of word comparison and a method of processing in the improved associative memory circuit or associative retrieval device. The processing is preferably in a parallel configuration that provides rapid response to queries, while processing a large number of simultaneous requests.

Referring now to FIG. 14, most internal data traffic within the associative memory circuit 10 passes through shared memory 312, such as a time multiplexed multiport random access read-write memory of any well known design such as TI's 74200. Each of the many ports of the shared memory 312 is allotted a brief time slice on the order of one millisecond. A port may disconnect prior to this time elapsing.

The associative memory circuit 10 communicates with the outside world through its communications modules 314 and 314' of any well known design. A plurality of communications modules may be connected as illustrated by numeral 318 and the small circles or dots. The communications modules 314 and 314' are microcomputer based flexible interfaces responsible for decoding requests and then supervising the operations of the associative memory circuits 310 to satisfy the request. The communications modules or circuits may communicate with the other associative memory circuits 10 using shared memory through buses 316 and 316' in any well known manner and by use of any well known design. These communication modules might also perform considerable preprocessing before passing a query onto the other system components.

The main storage units (MSU) 320 and 320' of any well known design are devices that contain the actual records to be searched in memory units of any well known design. The main storage units contain any of a variety of well known control circuits to transmit these records in a fixed format over a bus. A plurality of main storage units may be used as illustrated by number 322 and the dots. The transmission format requires the simultaneous transmission of record characters taken sequentially from the record moving from right to left and from left to right, see FIG. 25 and the in-use description set forth hereinbelow. Numeric portions of a record are transmitted separately. The bus or lines 324 and 324' also contain control and timing signals, error correction codes and a data path of well known design for use in the communications between associator circuits 342, 344, 342' and 344' and extractor circuits 356 and 356'. Within an MSU 320 and 320', data might be compressed to conserve resources by any well known means. The main storage units (MSU) 320 and 320' might be formed using virtually any of today's data storage devices. Following the transmission of each record along lines 324 and 324', a short blanking period is required to permit the associator circuits to initialize themselves for another record. Prior to the transmission of each records data, the MSU 320 and 320' must transmit an internal record number for the record that follows. These numbers should be assigned sequentially by the MSU 320 and 320'.

The control circuit 330 is connected to the MSU devices 320 and 320' by bus 326. The control circuit 330 is responsible for all update and control of the MSU's. The control circuit may consist of one or more simple microcomputers of well known design. Control circuit 330 communicates through shared memory 312 over bus 340. Optionally, a direct interface 332 of well known design might be attached by bus 334. This would permit a direct data path from an MSU 320 and 320' to an external high speed device. This would facilitate the rapid loading of an entire MSU 320 and 320' as might occur at bootstrap time.

All data storage loops generated by the MSU devices 320 and 320' feed into network switching 336 by bus 324 and 324'. The network switching circuit 36 is responsible for routing through bus 338 or 338' data from an MSU 320 and 320' to a vacant associator circuit 342 or 344 as well as 342' or 344' to satisfy a query. Additional associator circuits may be connected between 342 and 344 and 342' and 344' as illustrated by numerals 346 and 346' and the dots. Additional parallel circuits may also be interconnected as illustrated by numeral 348 and the dots. Network switching circuit 336 is connected to a control device 350 of well known design by bus 352 which processes requests communicated through shared memory 312 by connection bus or line 354. Control device 350 decodes these requests and decides which requests are to be processed and in what order. Then control device 350 communicates to network switching 336 over line 352, a specific order to reconfigure the network.

The associator circuits (ac) 342, 344, 342' and 344', are an important part of this invention. The associator circuits 342, 344, 342' and 344' are connected in strings terminated at one end by a single or multiple extractor circuits 356 and 356' respectively by continuations of bus 338 or 338' respectively and at the other end by the network switching module 336. Data from a selected MSU passes through network switching 336 and then through an associator circuit 342, 344, 342' and 344'. This circuit scrutinizes the data as it passes, looking for records that are very similar to the query provided. Of significance here is the fact that the word associator circuits, a part of 342, 344, 342', and 344' (within each associator circuit) can look for similar records at very high data rates. It is expected that data rates on the bus in excess of 20,000,000 characters per second are quite possibly using today's standard technology. The associator circuits 342, 344, 342', and 344' flag the most similar records and they are then extracted from the data stream by the extractor circuits 356 and 356' and eventually passes back through shared memory 312 over bus 360 to the communications circuits 314 and 314'.

The diagnostic computer 364, also of any well known design, is connected in a well known manner to the associative memory 310 to provide system performance statistics and maintenance information in a well known manner.

Figure 15:
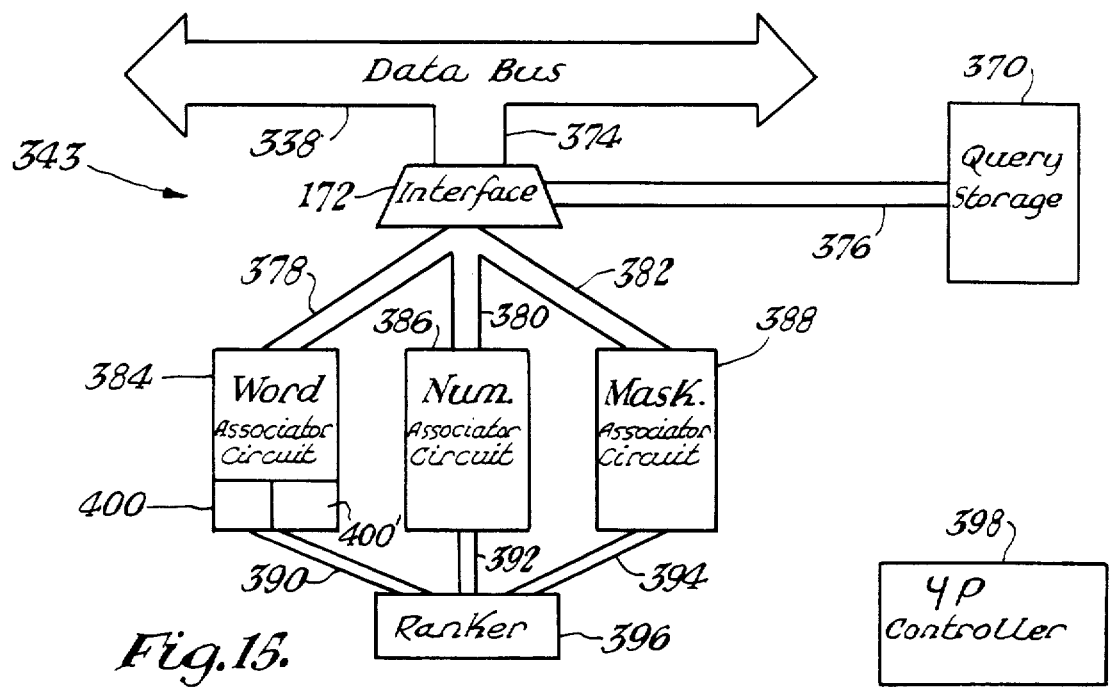
FIG. 15 is a block diagram of the associator circuit illustrated in FIG. 14.
Figure 17:
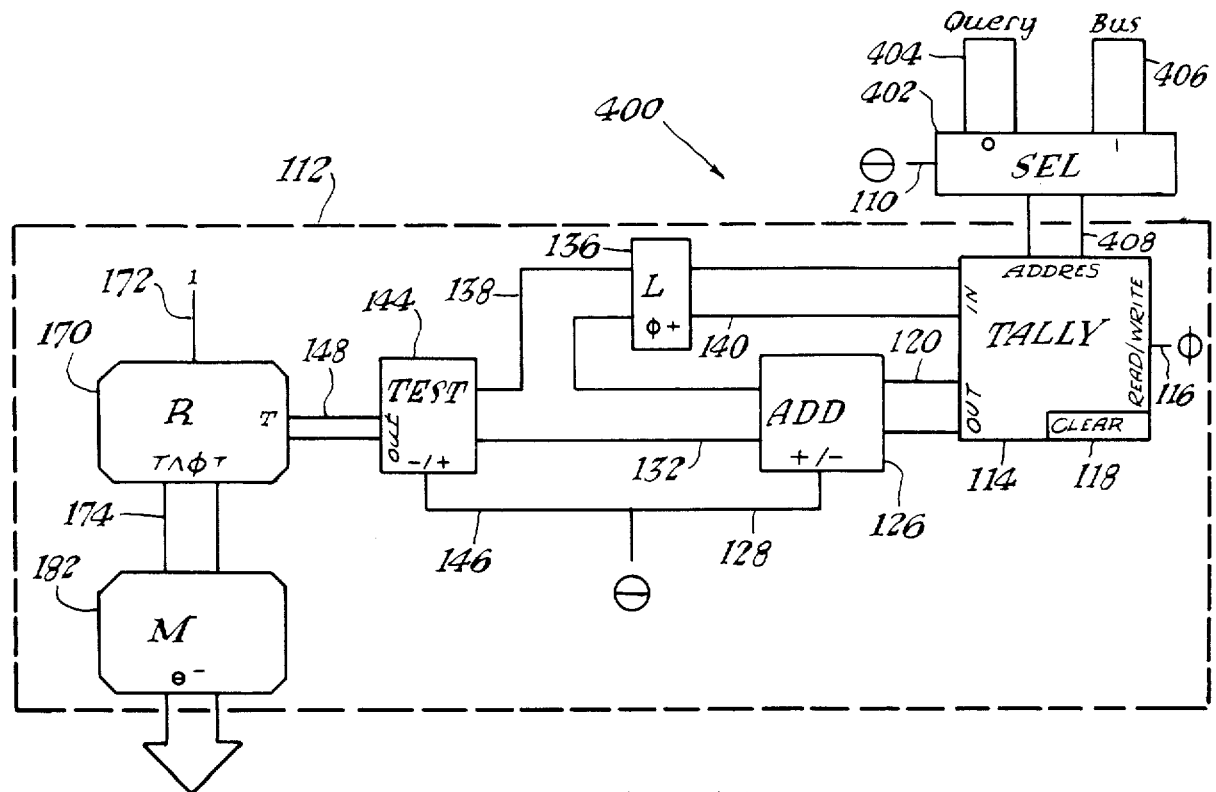
FIG. 17 is a block diagram of the basic word associator or comparator circuit.
Figure 18:
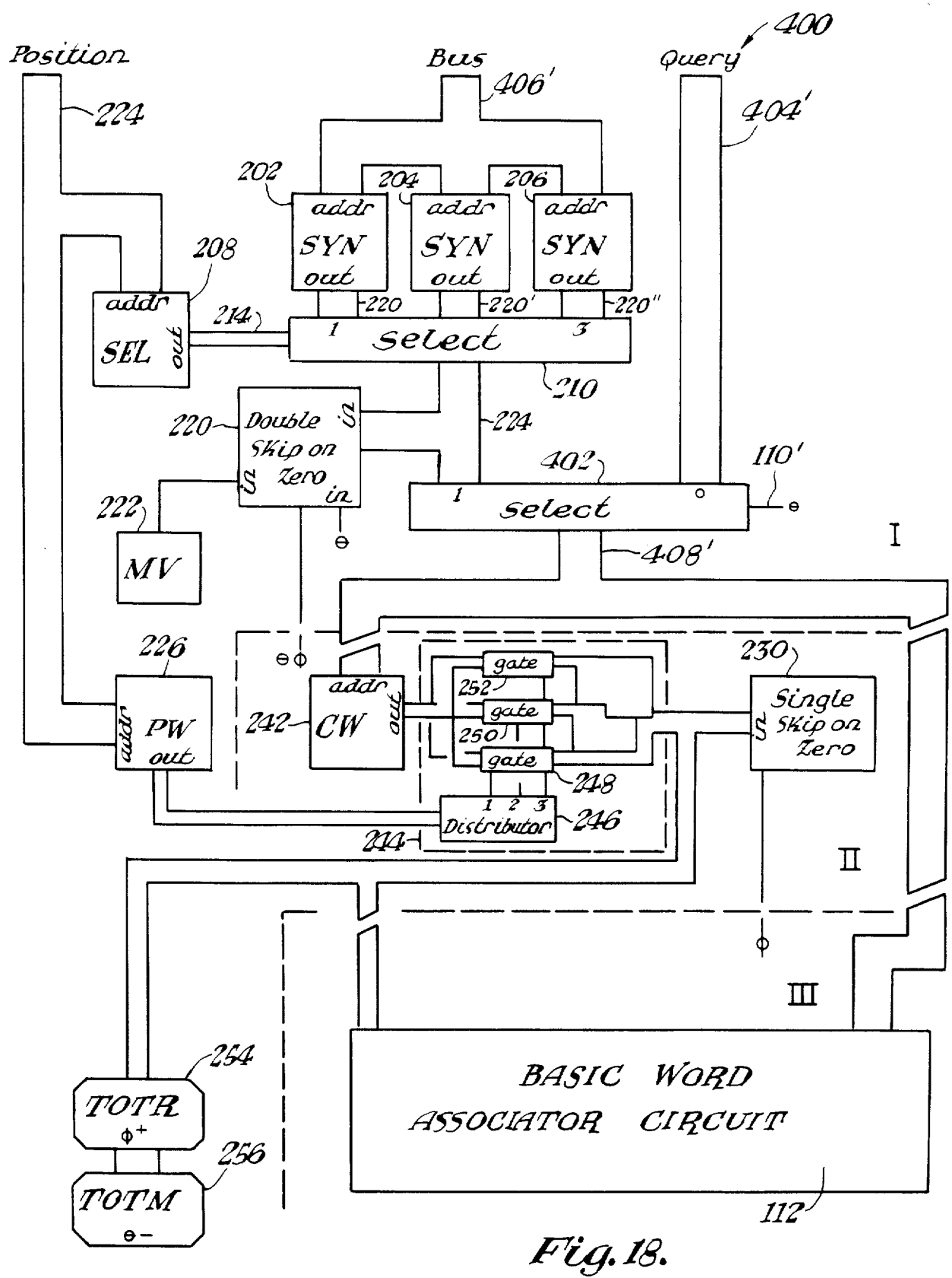
FIG. 18 is a block diagram of the basic word associator circuit in another system.

Referring now to FIG. 15, the basic module is referred to by numeral 343 which is a more detailed block diagram of associator circuits 342 and 342' of FIG. 14. Each pair of associator circuits in FIG. 14 is similar to the FIG. 15 illustration. FIG. 15 shows the associator circuit 343 along with the basic interconnections. The query is stored in query storage 370. As records pass by on the data bus 338, the records are received by the associator circuit on interface 372 over bus 374 where the records are merged with query characters transmitted over bus 376 in an appropriate manner and then forwarded through buses 378, 380, and 382 to the three types of associator circuitry. The three types of associator circuitry are: (1) a word associator circuit 384, (2) a number associator circuit 386, and (3) a mask associator circuit 388. Within the word associator circuits 384 exists two circuits designated by numerals 400 and 400', one of which is shown in greater detail in block diagram in FIG. 17 which is illustrated in schematic form in FIGS. 19 through 25. The word associator circuit 384 combines the output of circuits 400 and 400' at the end of each record to arrive at the degree of word similarity. If the basic circuit of FIG. 17 is used then at the end of each record, the M output from each copy of the circuit are added together by any well known means to arrive at the numerator of the fraction that equals the degree of word similarity. The denominator is computed by any well known means including table lookup by circuit 384 and is equal to L(L+1) where L is the length of the compared words. If the more complex circuit of FIG. 18 is used, then the numerator is computed by any well known means and is equal to twice the sum of the M quantities output from the two copies of the circuit. The denominator is computed by any well known means and is equal to the sum of the TOTM quantities output from each copy of the circuit. The word associator circuit 384 may or may not actually perform a division to arrive at the degree of word similarity. Instead, the ranker 396 and the other associator circuits 380 and 388 might work entirely with fractional representations of similarity. Using the basic circuit of FIG. 17 as 400 and 400' in FIG. 15, computes the basic form of word similarity given by the mathematical formula disclosed herein. It should also be noted that FIG. 18 is an enhanced version of the circuit in FIG. 17.

The word associator circuit 384 is mainly made up of circuits 400 and 400' and interconnecting circuitry of well known design.

Again, referring to FIG. 15, at the end of each record, the three associators forward their "opinion" of how similar the record and the query were over bus 390, 392, and 394 respectively to a ranker 396 of well known design. If the record was a perfect match, then it is marked by the ranker 396 for immediate extraction. Otherwise it is ranked relative to the prior records processed. Only the N highest ranking records are maintained in the ranker 396 by their internal record numbers. Here, N is an integer design parameter in any well known manner. Loading of the many parameters involved in the association process is controlled by an onboard microprocessor or controller 398 of well known design. The microprocessor is connected to the basic module in a well known manner. When all records have been observed, the ranker waits for the highest ranking records to appear again in the storage loop. As they appear, the ranker 396 marks them for extraction in any well known manner.

Figure 26:
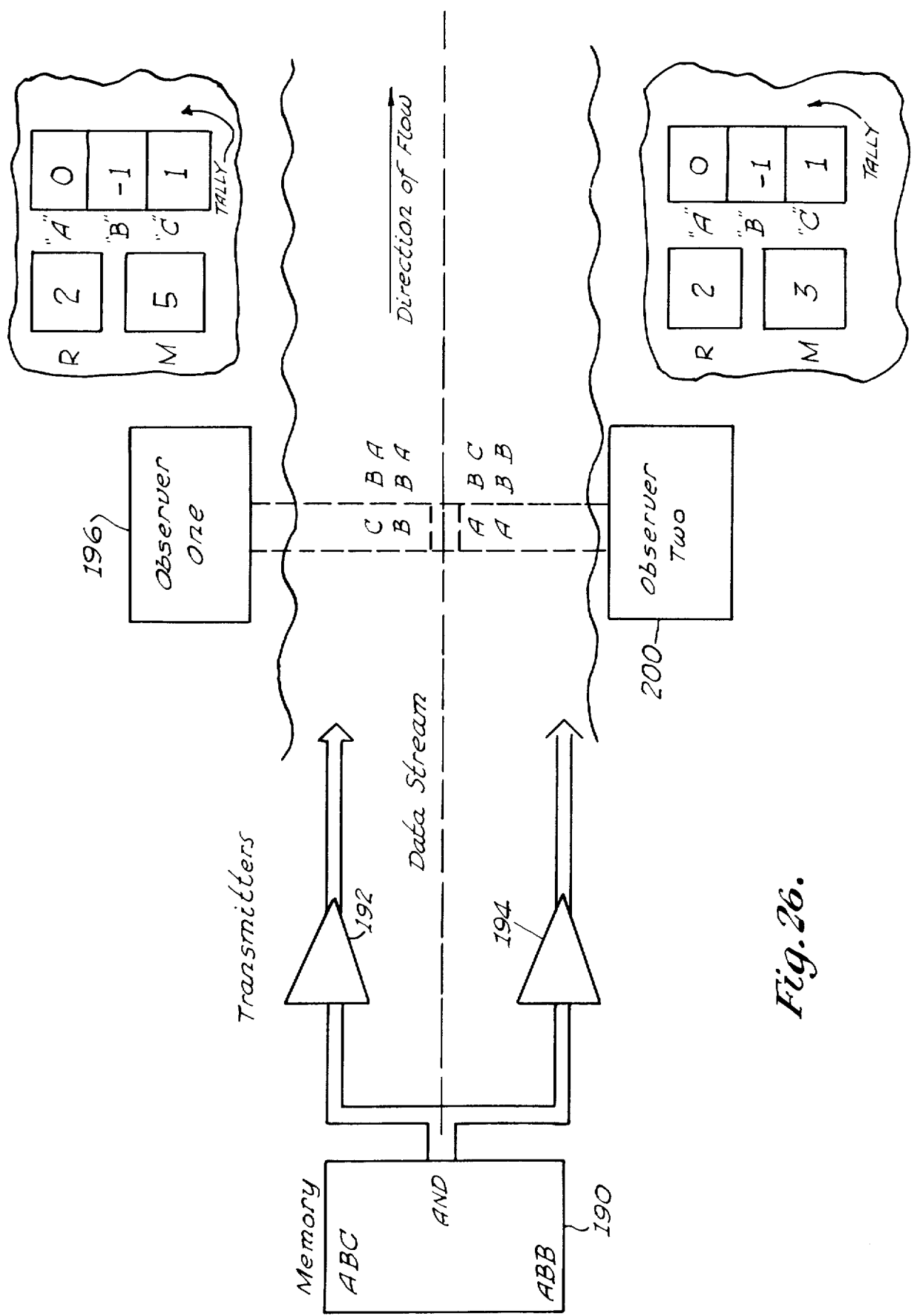
FIG. 26 is an illustration of the operation of the word comparator.
Figure 40:
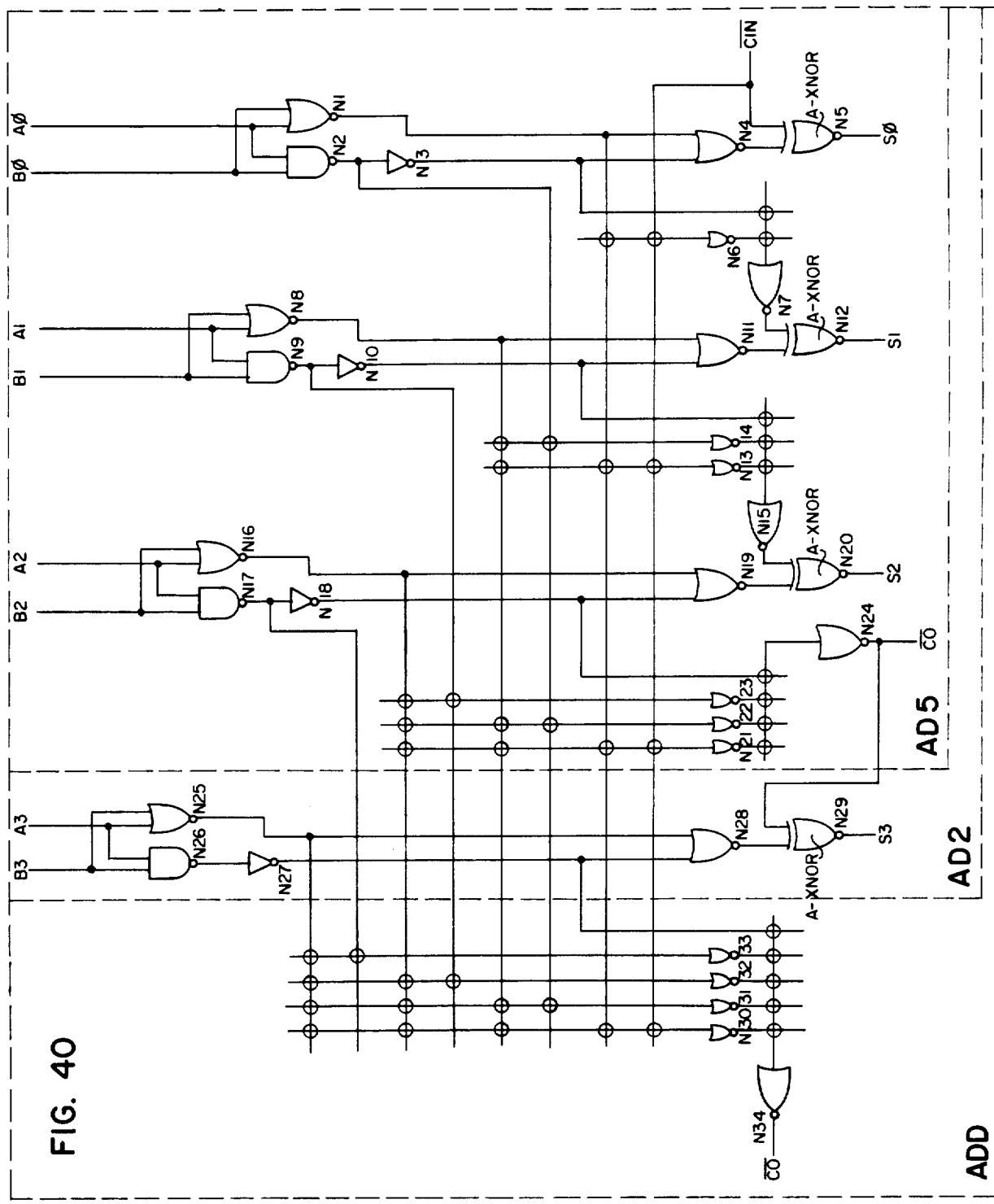
Figure 41:
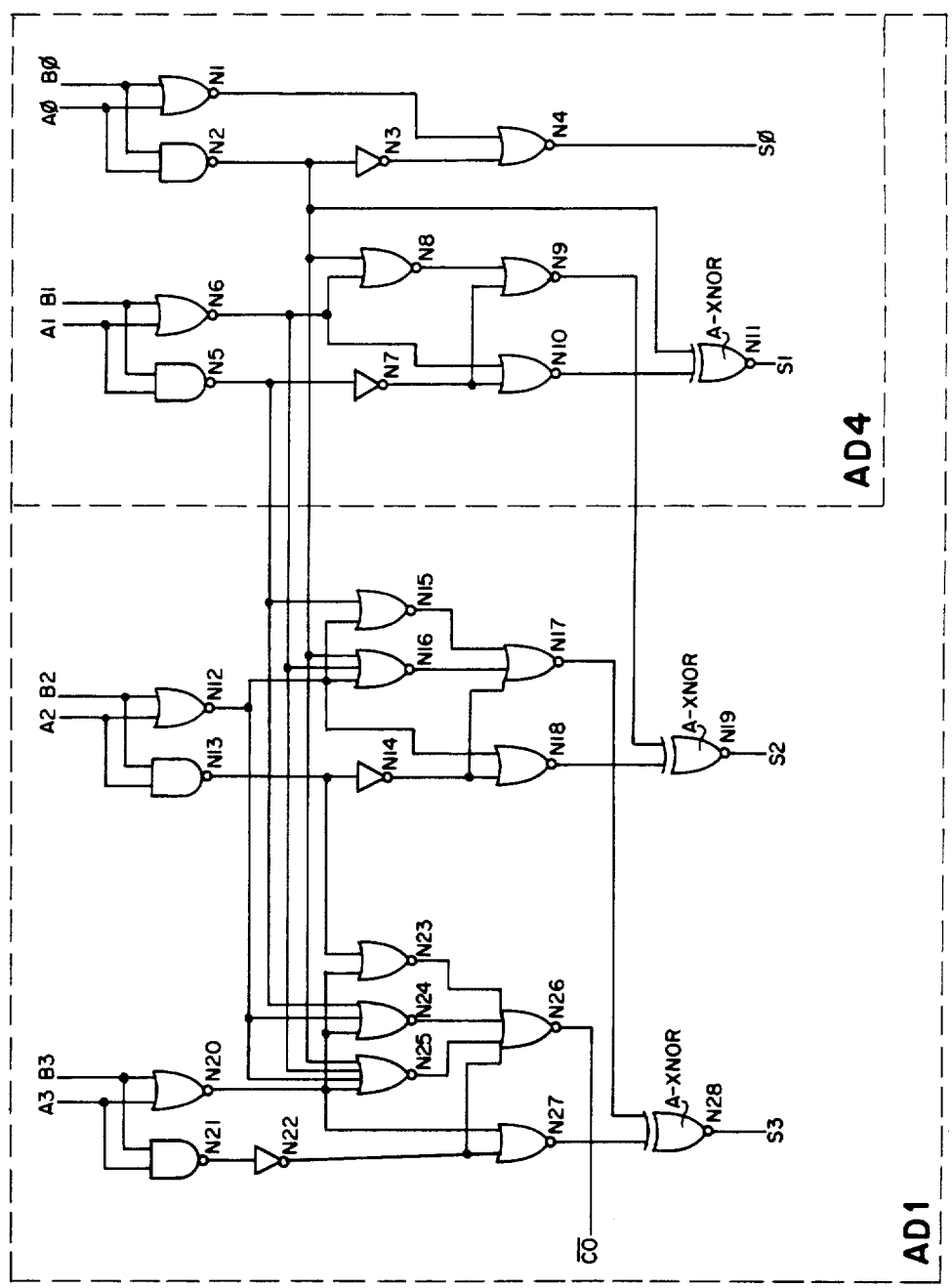
Figure 42:
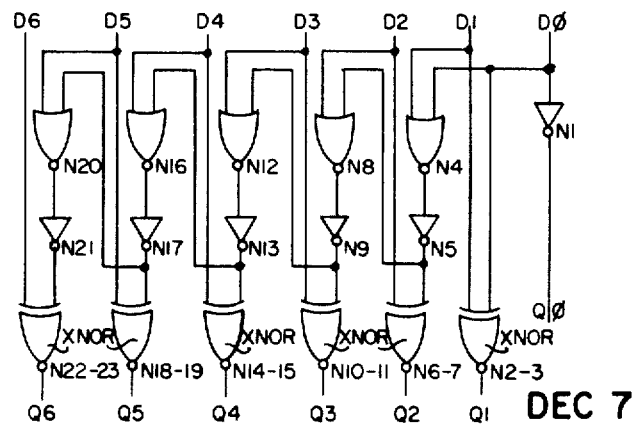
Figure 43:
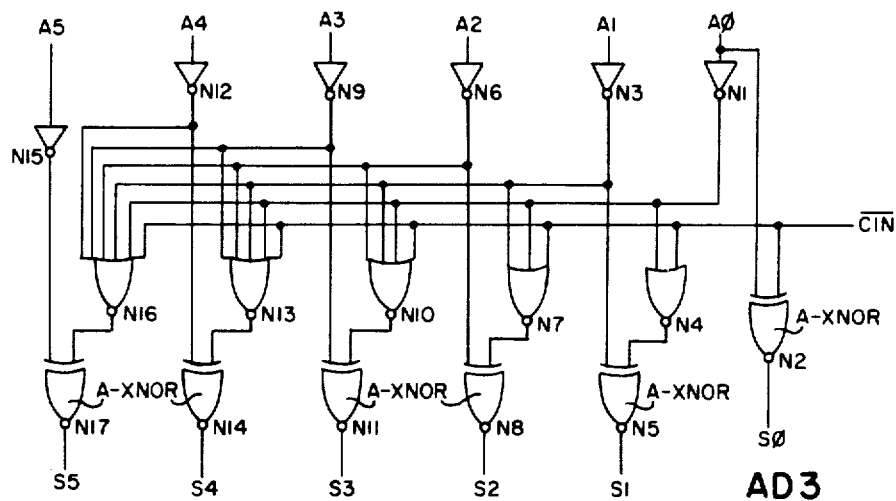
Figure 52:
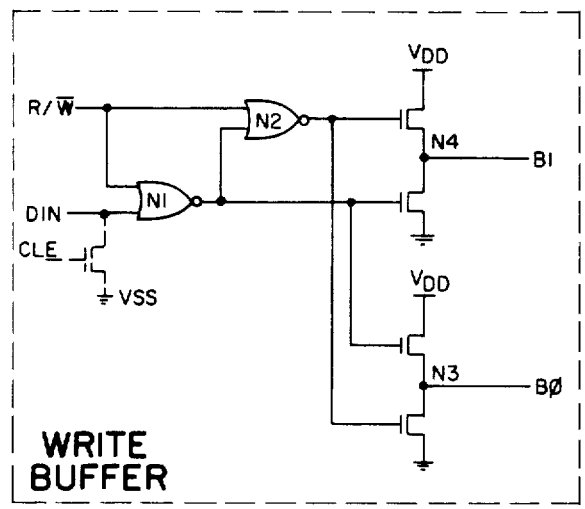
Figure 53:
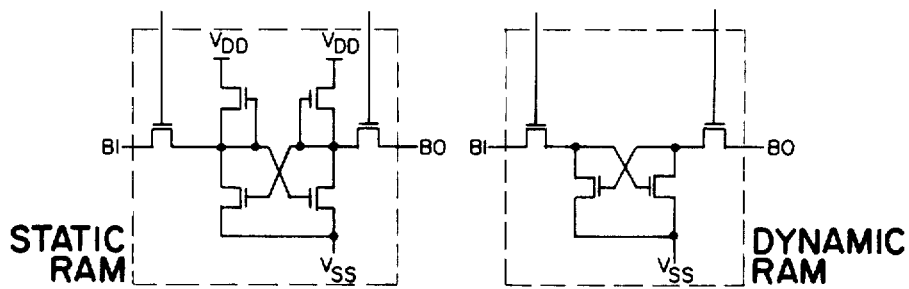
Figure 54:
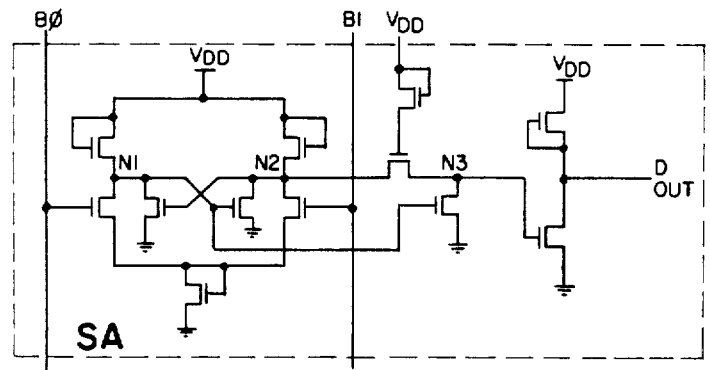
Figure 55:
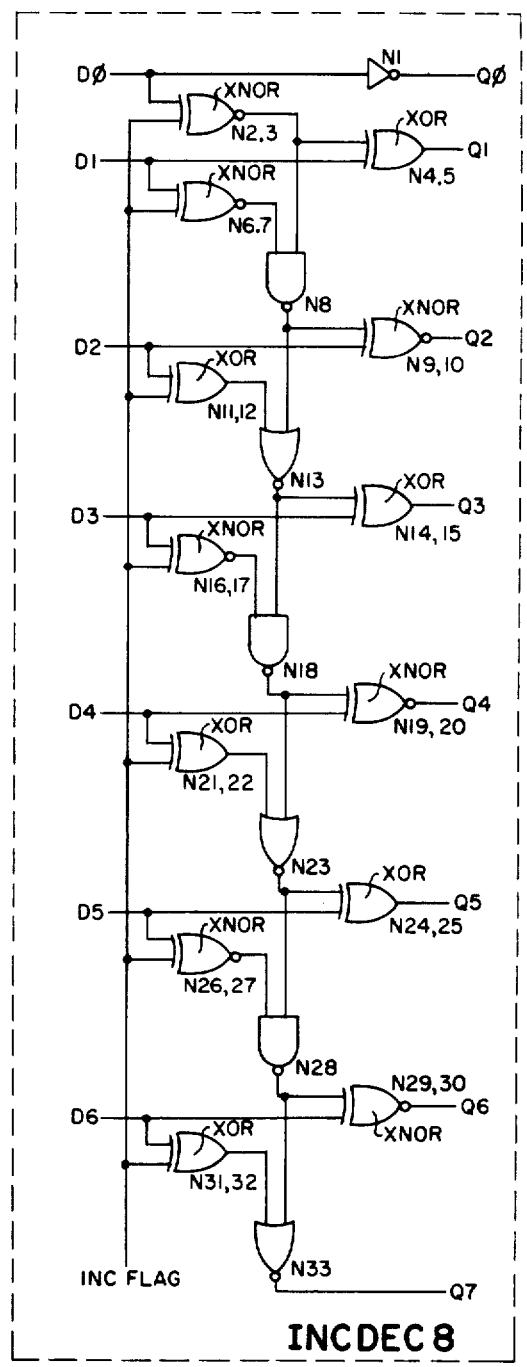
Figure 56:
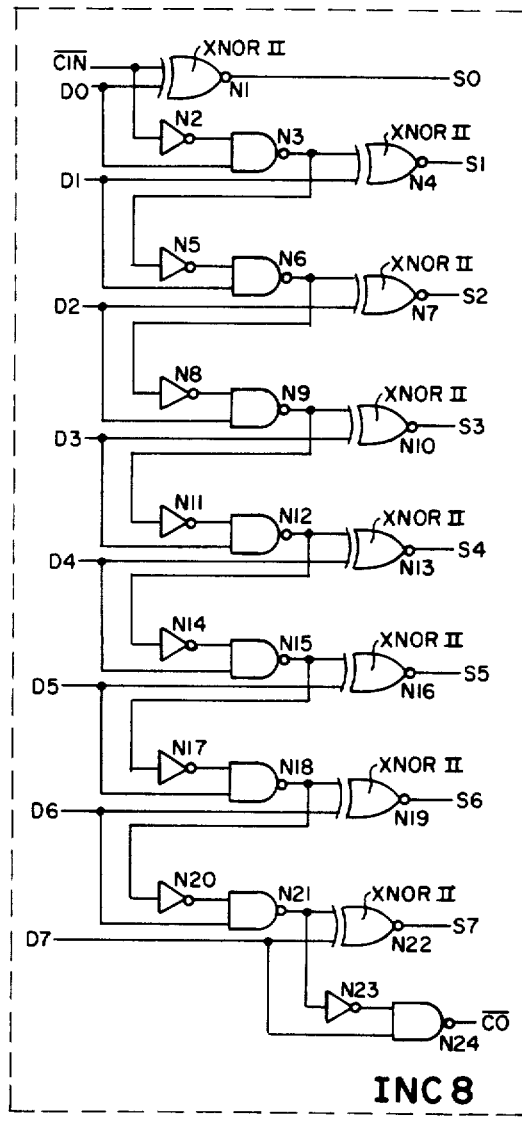
Figure 63:
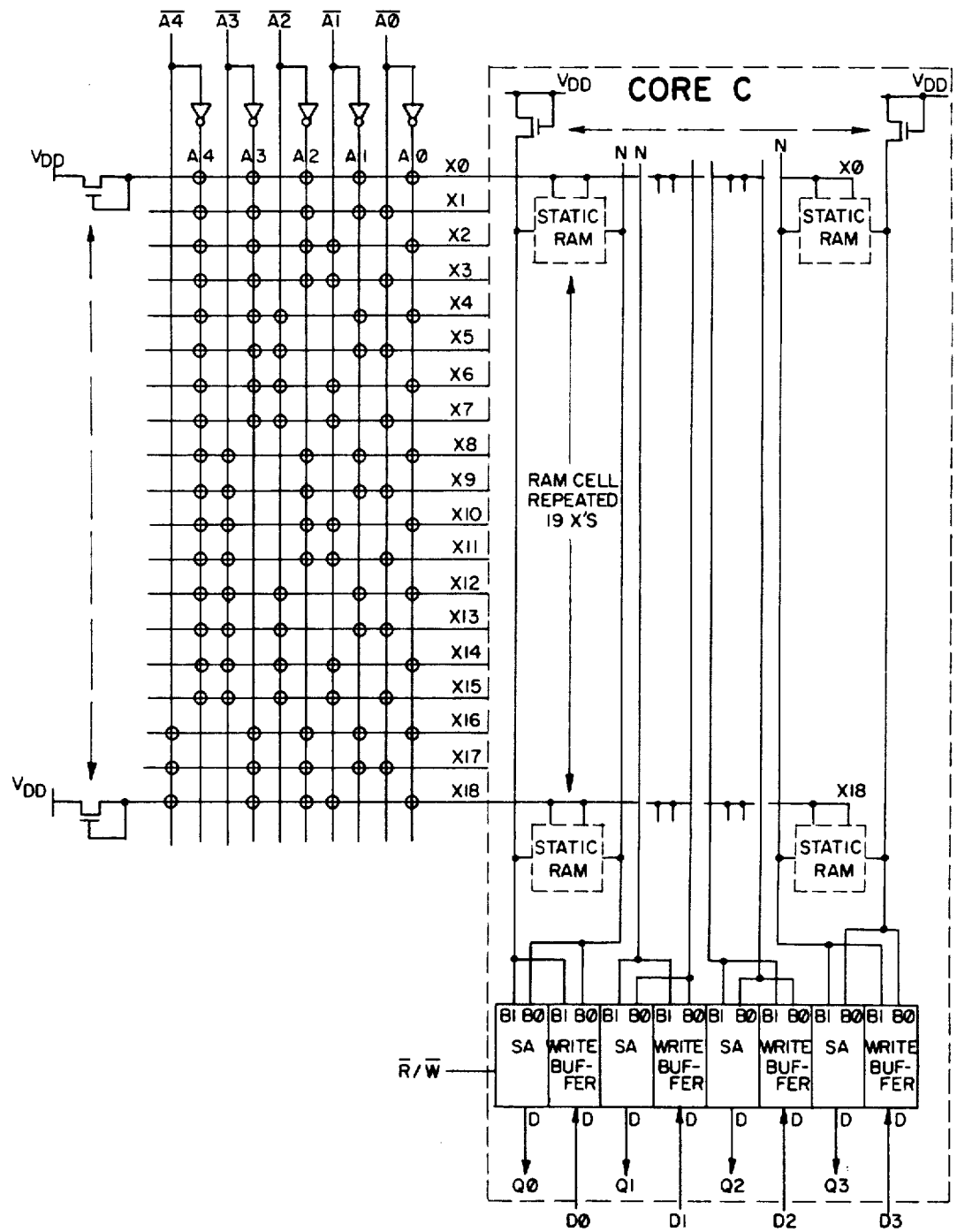
Figure 64:
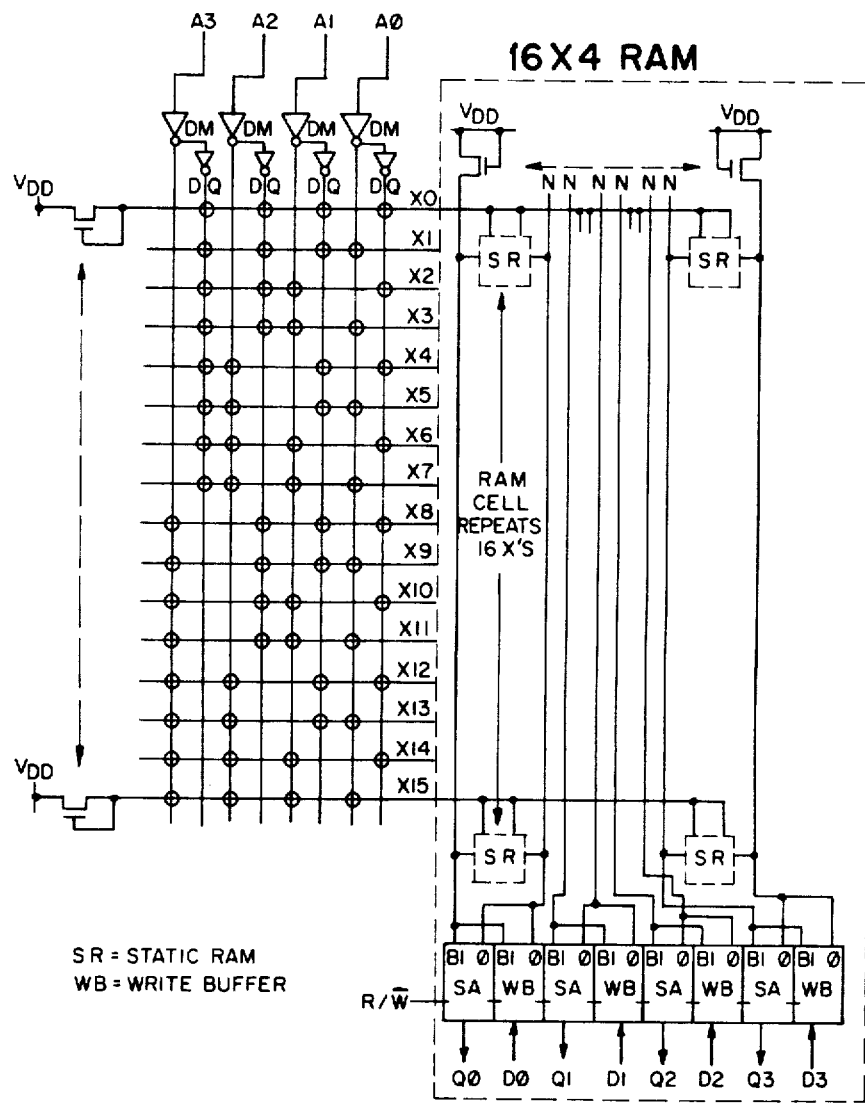
Figure 65:
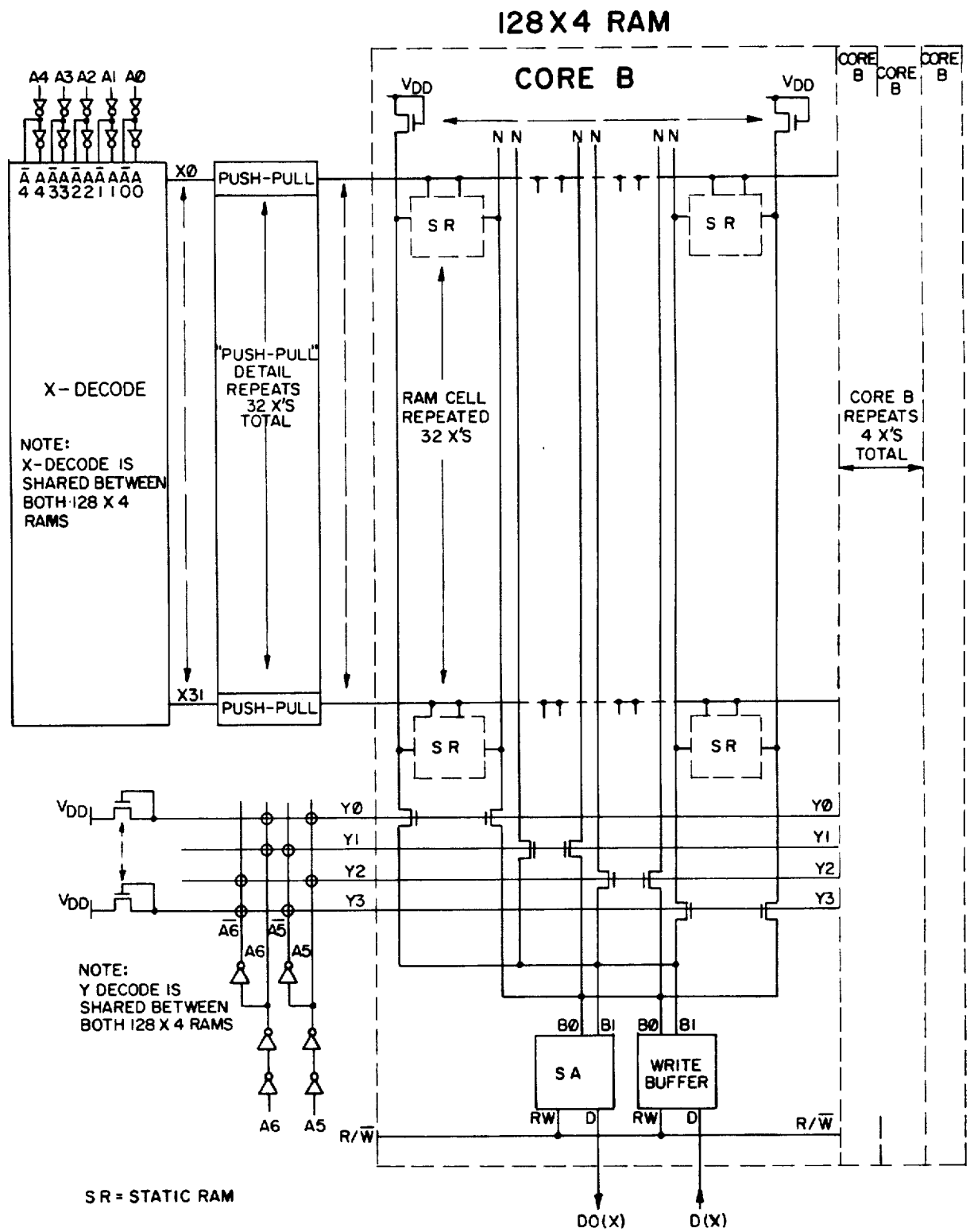
Figure 66B:
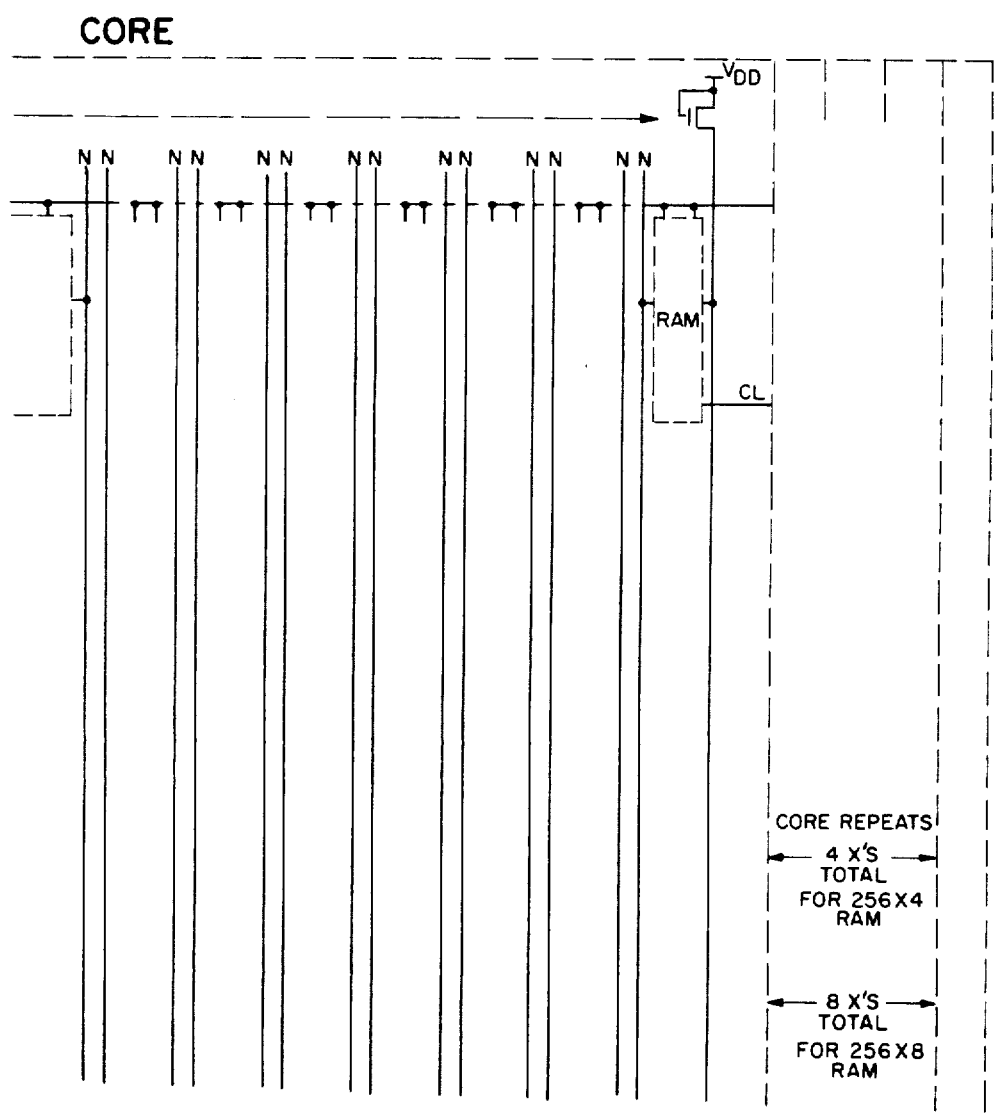
Figure 66C:
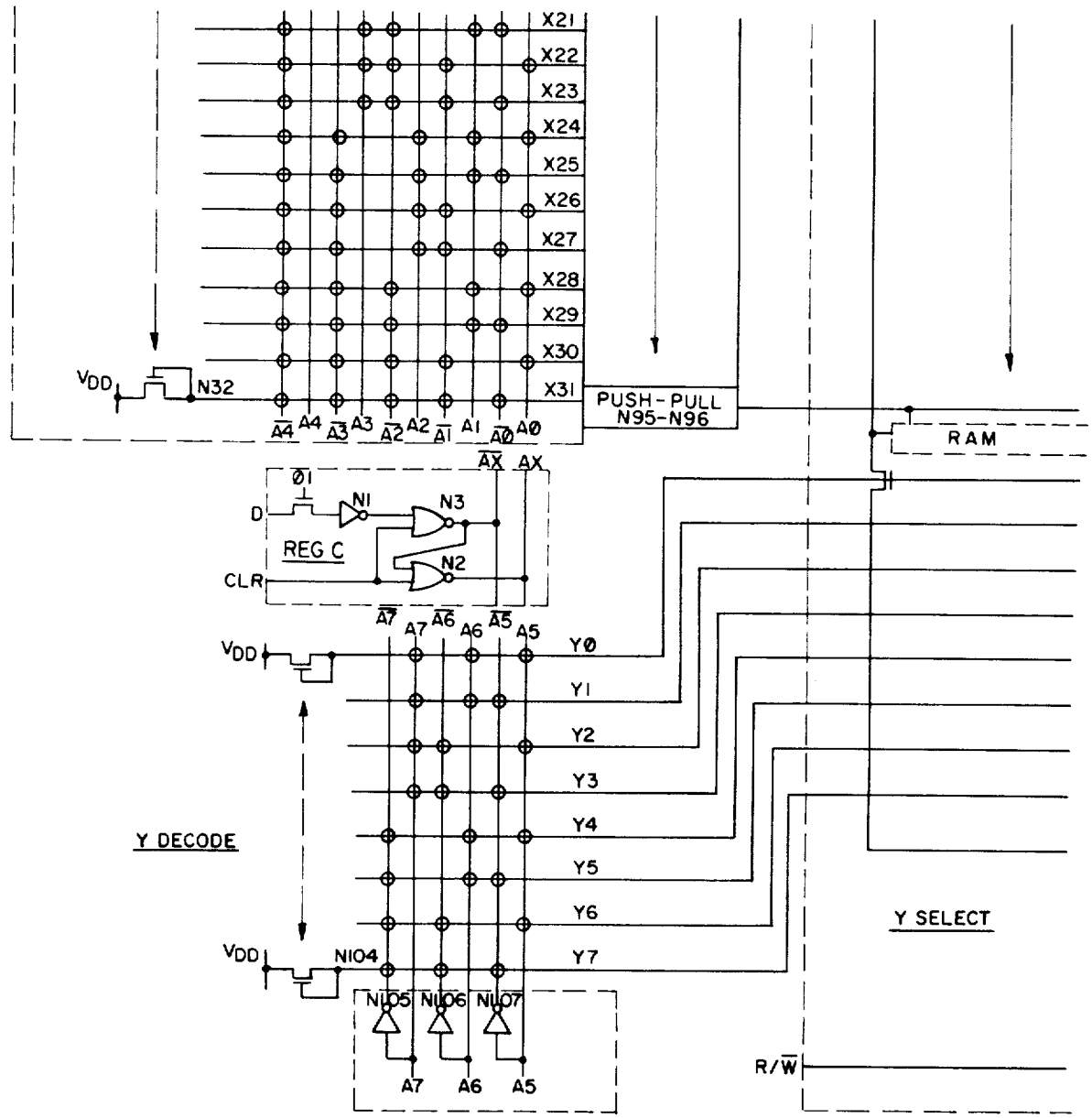
Figure 66D:
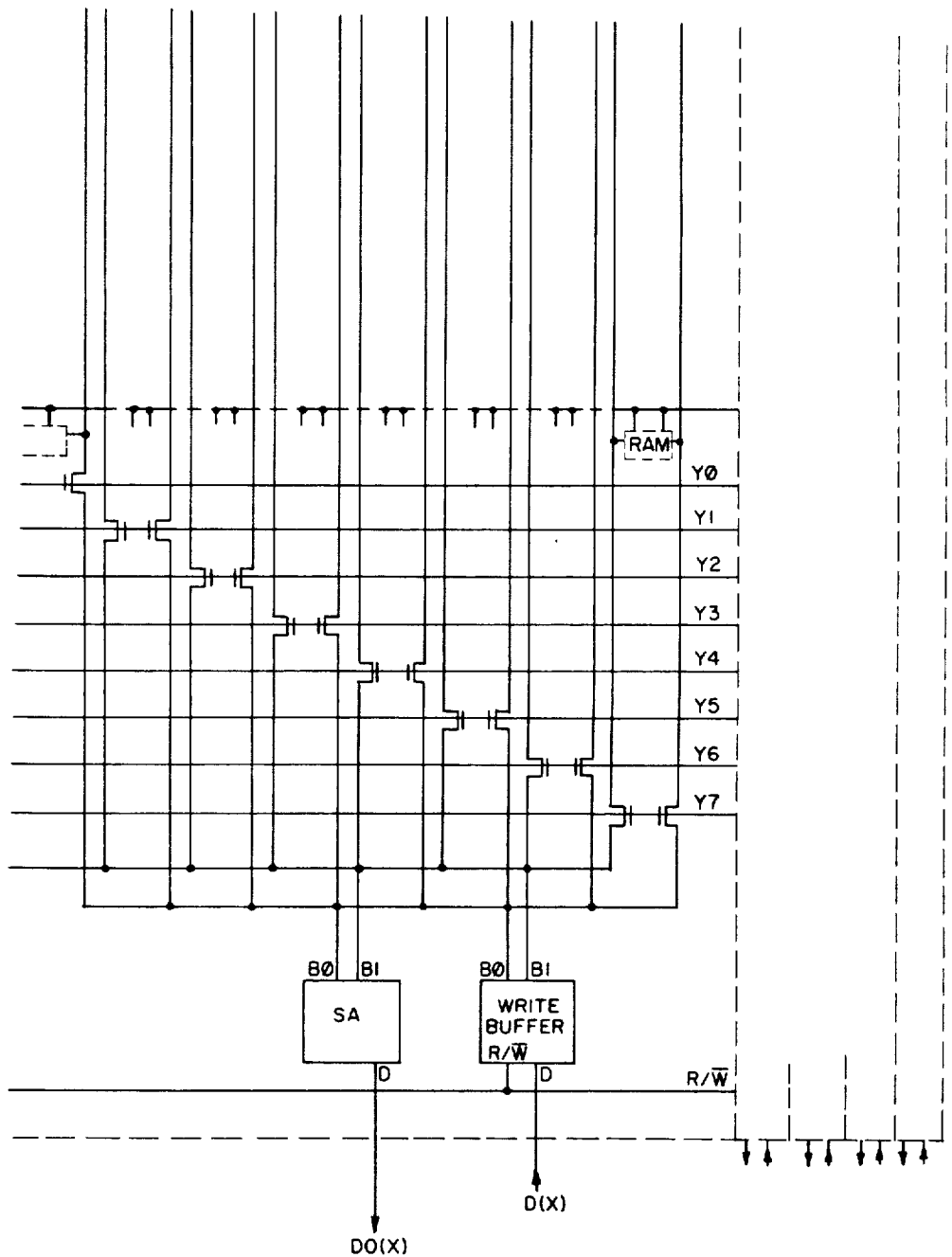

The basic method for computing the degree of word similarity in a non-complex and expeditious manner involves processing sybmols as they occur in a bidirectional serial data stream. By bidirectional serial, we mean that successive positions from each of the two words under comparison and from their flips are simultaneously transmitted. For example, imagine two observers of the data stream performing the procedure or method as illustrated in FIG. 26. Of significance is the fact that each observer needs knowledge only of the data instantaneously before him in the data stream. We describe the procedure from the standpoint of these observers. We describe the information they must remember, computations they must perform and decisions they must make. Each observer performs an identical method, the first observes the transmission of the words, the second observes the transmission of the flips of the words. Before starting, each observer must perform certain initial tasks. After all data has passed, they combined their knowledge to arrive at the degree of word similarity between the transmitted words. Hereafter, the block diagram shown in FIG. 17 will be described, second the method performed by each observer will be described and then the method in which their knowledge is eventually combined will be described.

Referring now to FIG. 17, the one word associator circuit in block diagram form is illustrated as numeral 400. Two of these circuits 400 are included in the word associated circuit 384 in FIG. 15. The data selection 1 illustrated in FIG. 17 is shown in detail in FIG. 19 and may utilize two quadruple bus gates such as Texas Instruments, Incorporated's circuit 74125 and 74126, Exhibit A in the original application and made a part of this application. It has two input buses 404 and 406 entering from above. One of these two in one time frame is routed to a single output 408 exiting below. FIG. 19 discloses the schematic for a single bus line. Clock input potential $\theta$ 110 is connected to the selector 402.

Two clocks are utilized in circuit 400, FIG. 17. They are referred to as $\phi$ and $\theta$ and graphically illustrated in FIG. 16 to disclose their interrelationship. Their interrelationship and purpose is described and disclosed in the diagram illustrated in FIG. 16. The purpose of $\phi$ is to select either the read or write mode of operation in the tally memory 114 in FIG. 17 and to provide certain triggers in latches 170 and 136 of FIG. 17. When $\phi$ is low, the read mode of operation in 114 is selected. When $\phi$ is high, the write mode of operation in 114 is selected. The event consisting of a low to high transition of $\phi$ may serve as a trigger to latch components 170 and 136 of FIG. 17.

Figure 16:
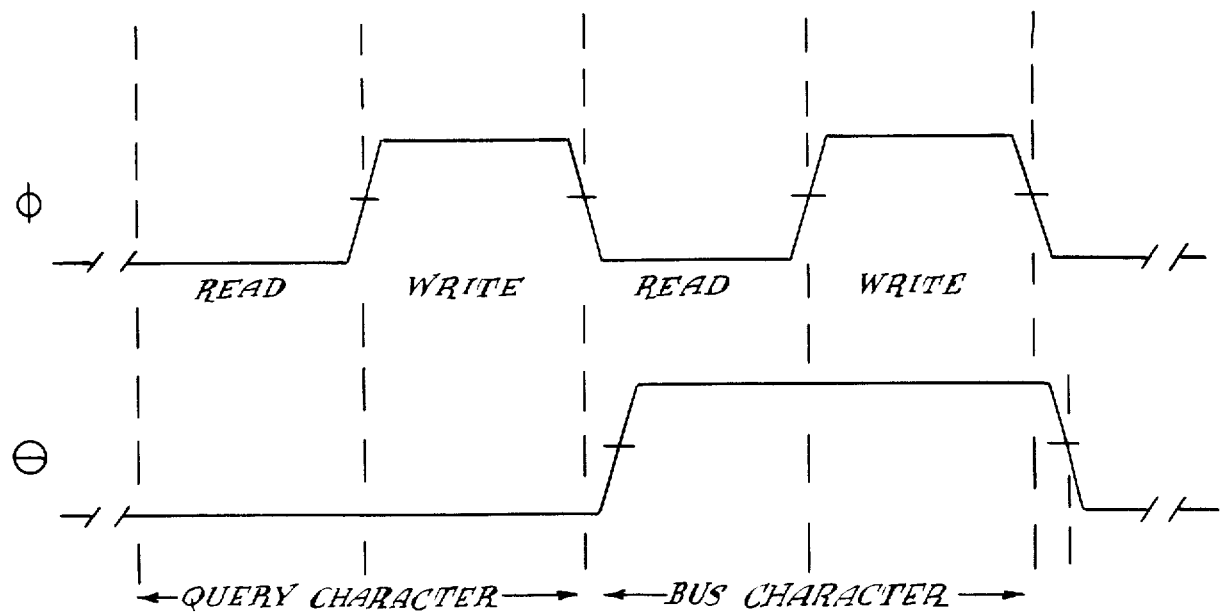
FIG. 16 is an illustration of the timing of $\phi$ and $\theta$.

The purpose of $\theta$ is to define whether a query or a bus character is currently being processed. A complete cycle of $\phi$ corresponding to a read/write cycle in 114 occurs during each half cycle of $\theta$ as shown in FIG. 16. Another purpose of $\theta$ is to provide a trigger to latch 182 of FIG. 17. The event consisting of a high to low transition of $\theta$ and may serve as a trigger to latch 182. The clock $\theta$ is used as a control input in blocks 144, 126 and 402 of FIG. 17.

The main portion of the FIG. 17 circuit is designated by numeral 112 and includes a random access read/write memory 114 referred to as tally or a tally memory. The memory address enters from above through bus 408. The read/write mode of operation is selected by the read/write potential $\phi$ entering from the right through line 116 from a clock means of well known design not shown. When read/write potential is low, the read mode is selected. When read/write potential is high, the write mode is selected. Data exists from the lower left on bus 120 and $\phi$ enters from the upper right.

Figure 20:
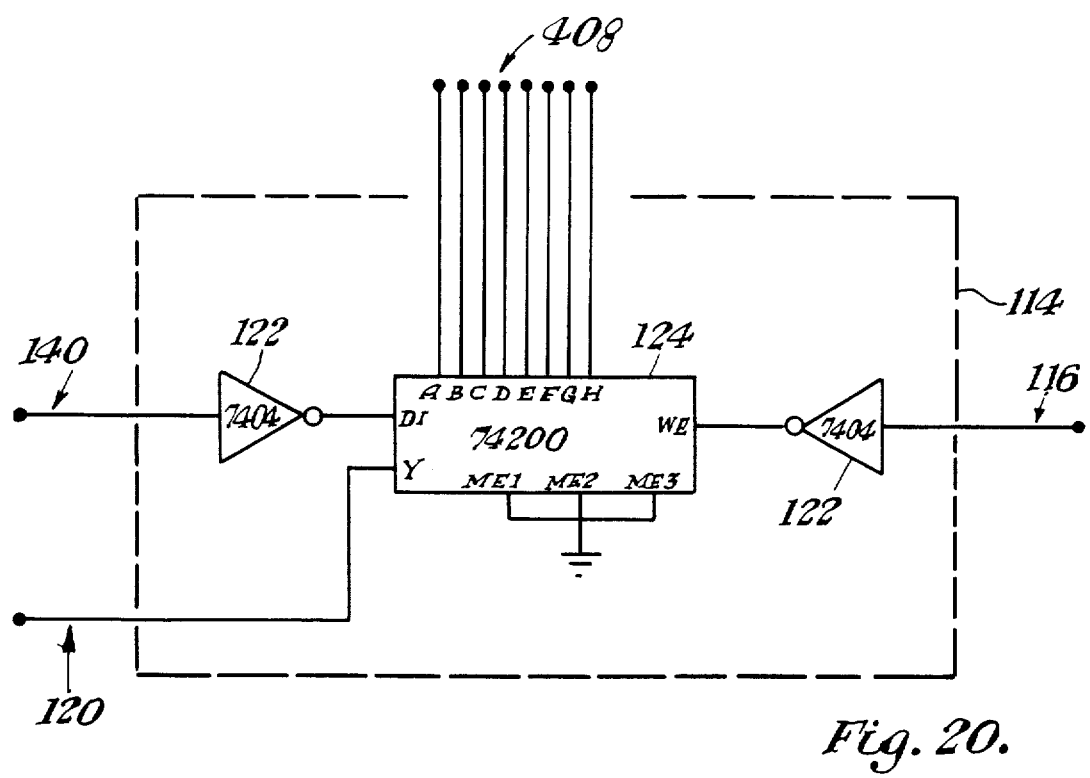
FIG. 20 is a schematic diagram of the tally memory circuit shown in FIG. 17.

In the preferred embodiment, tally is organized as 256 8 bit words. Thus, addresses and data are 8-bit quantities. FIG. 20 shows the schematic for each bit of a tally word. The tally may include one or more Texas Instrument Incorporated Hex inverter 122 No. 7404, Exhibit AA in the original application, and 256-bit read/write memory 124, No. 74200, Exhibit B in the original application and made a part hereof disclosing the circuits. It should be designed so that its contents may rapidly be set to zero by clear means 118. Simply setting all cells simultaneously to zero, may however not be practically feasible due to power surge and overheating considerations. Therefore, several cycles may be necessary to clear the memory. Each cycle would then clear a fixed portion of the memory. Also, it is not necessary to actually set all of the cells to zero. An extra bit associated with each word could be maintained. To clear the memory, only those extra bits would be cleared. Then when a memory word is read, this extra bit is tested. If it is zero, then zero is read out instead of the actual memory contents. This extra bit is set only when its associated location is written into. Now, if one is read out, then the actual memory contents are presented as usual to the outside word. In this way, the extra bits affect a logical clearing of the memory while avoiding a physical clearing of all of the cells. Techniques such as these serve to significantly expedite the clearing operation, but such procedures are not necessary because there are well known standard procedures available.

The add block FIG. 17 is an incrementer/decrementer 126. Data enters from the right. Depending on the state of input potential, the input potential value of the entering data is either incremented or decremented before exiting the two four bit binary full adders circuit 130 on bus 132, as shown in FIG. 21. The adders 130 may include a Texas Instrument Incorporated 4-bit binary full adder No. 7483, Exhibit C in the original application and made a part hereof. Hex inverters 134 No. 7404, Exhibit AA in the original application is connected between the input potential over bus 128. The incrementer/decrementer 126 in FIG. 17 is actually an adder in which one of the summands is restricted to either plus or minus one. If input potential of 128 is zero, then plus one is added. If input potential of 128 is one, then minus one is added.

A positive edge triggered data latch 136 in FIG. 17 is connected to bus 132 by bus 138. Data enters through bus extension 138 from the left and exits from the right on bus 140 to tally 114. On the positive going edge of read/write potential actuated by input $\phi$, the contents entering latch 136 are latched and become the output from the latch over bus 140. In the preferred embodiment shown in FIG. 22, the latch is a two-bit D-type register 5 with 3-state output 142 shown in FIG. 22, Texas Instrument Incorporated Number 74173 attached to the original application as Exhibit D and made a part hereof.

Figure 23:
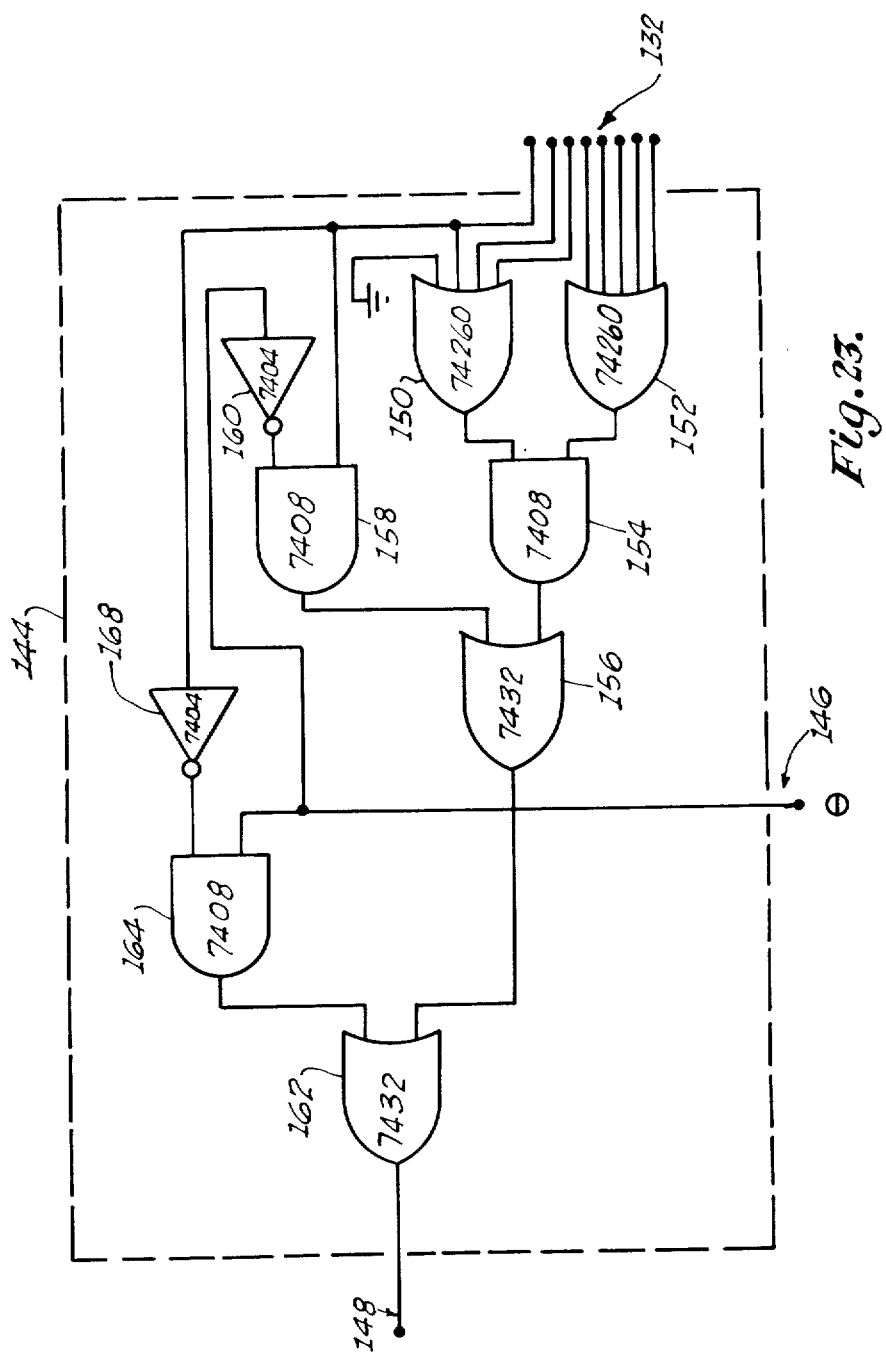
FIG. 23 is a schematic diagram of the test circuit shown in FIG. 17.

A convertible sign tester 144 in FIG. 17 has an input through bus 132 for data entering from the right and the tester 144 determines if this data is non-positive or non-negative, depending on the state of the input potential on bus 146 entering from below. The test is performed relative to two's complement arithemetic. If the input potential is low, then test will output high on output bus 148 to the left, provided that its input is greater than or equal to zero. In the preferred embodiment, tester 144 is shown in FIG. 23 as an 8-bit device. The input 132 is connected to two dual 5-input positive no gate 150 and 152 Texas Instrument No. 74260 attached in the original application as Exhibit E and made a part hereof connected to one gate of a quadruple 2-input positive and gate 154. Texas Instrument No. 7408 attached in the original application as Exhibit EE and made a part hereof. Gate 154 is connected to one gate of a quadruple 2-input positive or gates 156 Texas Instrument Incorporated No. 7432 attached in the original application as Exhibit EEE and made a part hereof. Gate 156 Texas Instrument No. 7432 is also connected to and gate 158. And gate 158 Texas Instrument No. 7408 is connected to one of the input lines 132 and line 146 through inverter 160, a Texas Instrument No. 7404. The output of 156 is connected to the input of 162 that is the same as 156 having another input from and gate 164 with input from bus 146 and the output of inverter 168, a Texas Instrument Incorporated 7404. The exhibits are incorporated herein and made a part hereof.

Figure 24:
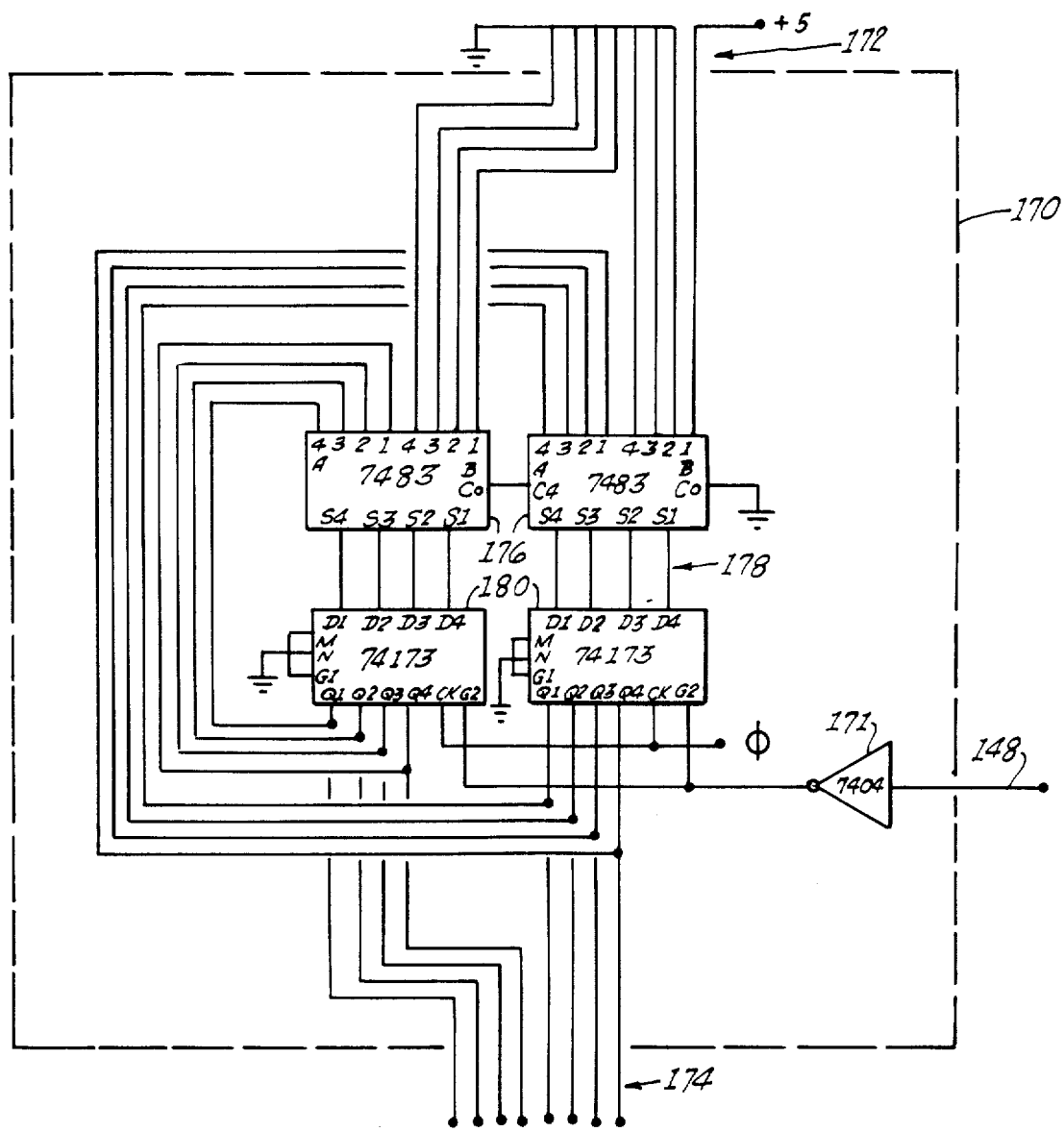
FIG. 24 is a schematic diagram of the add-latch circuit or R section shown in FIG. 17.

A clearable edge triggered latch 170 is shown in FIG. 17 and shown in detail in FIG. 24 with an adder attached as described below. Input 172 inserts a one (1) into latch 170. The output is transmitted on bus 174 to add latch 182. The adder 170 has two inputs on busses 148 and 172 and a single output on bus 174 which is the sum of the inputs. The output 178 of the adders 176, such as a 4-bit binary full adder of Texas Instrument, Incorporation No. 7483 attached as Exhibit C on the original application become the input to the latches 180, such a 4-bit D-type registers with 3-state outputs, Exhibit D. One of the inputs to the adder is the output of the latch. The other input enters from above in FIG. 24 and is wired permanently to be equal to 1. The latches 180 are similar to item 142 and are triggered from bus 148 when it is high at the positive going edge of the read/write potential. The current latch contents exit from below over bus 174, to an add-latch 182. In the preferred embodiment, latch 170 is an 8-bit latch coupled to an adder with an 8-bit output and two 7-bit inputs as shown in FIG. 24. The clearing connections are not shown in FIG. 24, but may be accomplished by any well known manner.

Figure 25:
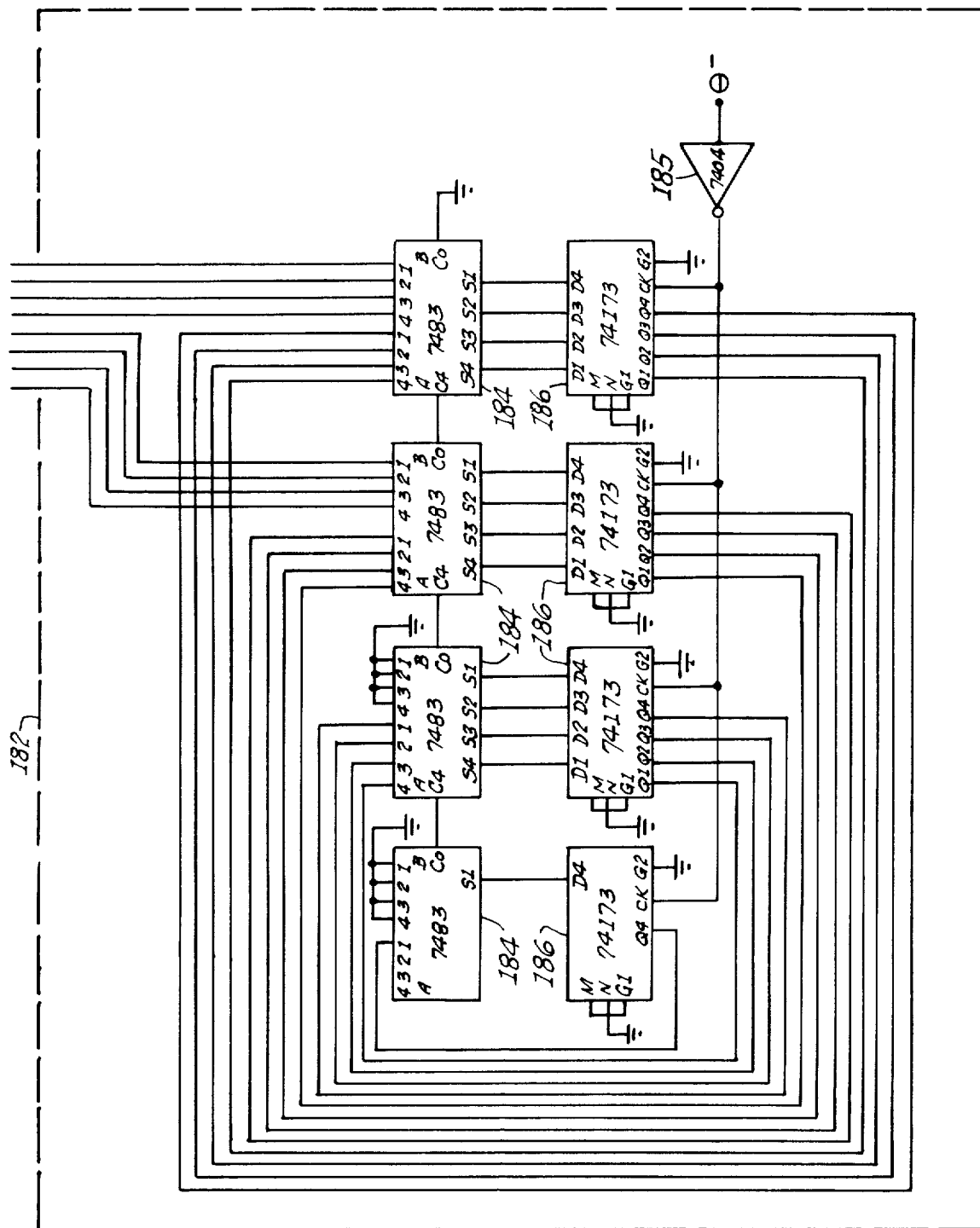
FIG. 25 is a schematic diagram of another add-latch circuit or M section shown in FIG. 17.

Add-latch 182, shown in FIGS. 17 and 25, is like item 170. Its input enters from bus 174 from above. Add-latch 182 is triggered on the negative going edge of the read/write potential θ. In the preferred embodiment, add-latch 182 includes 4-bit binary full adders 184 such as Texas Instruments Corporation No. 7483, is a 13-bit latch coupled, that is connected to a 4-bit D-type register with 3-stage outputs 186 such as Texas Instrument Corporation No. 74173. Indicator/readout devices of well known design may be connected thereto. The output of item 182 is an electrical output signal that may be translated to readable or other indications by any well known device. Clearing connections are not shown in FIG. 25, but any well known devices or procedures may be used.

Referring now to illustration FIG. 26, the memory 190 contains the words ABC and ABB which are to be compared. They are transmitted via two transmitters 192 and 194 over a data stream four characters wide, as illustrated. The top half of the stream contains the transmission of the unaltered words and the bottom half contains the transmission of the flips of the words. On each side of the stream sits an observer 196 and 200. Each observer is watching a single column at a time as columns flow from left to right. The memory 190 and transmitters 192 and 194 correspond to the MSU 320 of FIG. 14 and the data stream roughly for illustration purposes corresponds to the data bus 338 of FIG. 15 (although query characters do not occur on the data bus or in the MSU). The two observers correspond for illustration purposes to the two copies of the circuit 100 shown in FIG. 17 contained within the word associator 384 of FIG. 15. To perform his appointed task, each observer must "remember" a numeric quantity associated with each alphabet member. In this example there are but three; A, B, and C. This collection of quantities corresponds for illustration purposes to tally 114 of FIG. 17. Each observer must also "remember" a numeric quantity R that is 170 and another M that is 182. These correspond for illustration purposes directly with FIG. 17. At each instant in time, each observer notices two characters before him. He processes one at a time in some fixed order, say top to bottom. First, he increments the quantity corresponding to the top character. Then if it is less than or equal to zero, he increments R. Next, he decrements the quantity corresponding to the bottom character. Then if it is greater than or equal to zero, he increments R. Finally, now that both characters are processed, he updates M by adding R to it. This continues for each column as they flow past.

The relationship between FIGS. 17 and 26 are now more particularly described.

To illustrate this relationship a description of what occurs in the circuit of FIG. 17, step by step, as the example of FIG. 26 is processed by the circuit is presented.

First, OBSERVER ONE shown as 196 in FIG. 26 corresponds to one copy of the circuit 400 of FIG. 17. We will also call the word "ABC" the query word and "ABB" the bus word.

The circuit of FIG. 17 is controlled by two clock cycles shown in FIG. 16. The bottom signal (THETA) is the major timing signal. Within each THETA cycle, another clock PHI makes a complete cycle. PHI is called the minor clock. These clocks are an essential part of the invention only insofar as they specify the order of processing which occurs within the circuit. Three major clock cycles are required to process the examples with three characters. Within each of these, two characters are processed, first a character from the query word is processed and then a character from the bus word.

Since OBSERVER ONE is considered at this point, the circuit first processes the character "A" from the query and "A" from the bus word. Then it processes the character "B" from the query word and "B" from the bus word. Then it processes the character "C" from the query word and "B" from the bus word.

It is useful to imagine that these characters flow downward into selections 404 and 406 as follows:

|  | Minor clock cycle | |
|---|---|---|
|  | 1 | 2 |
| (Major clock cycle 3) | C | B |
| (Major clock cycle 2) | B | B |
| (Major clock cycle 1) | A | A |

In other words external means are used to access the two words being compared and "feed" these words into the core circuit. Then external means may be used to interpret the result of the circuit which at the completion of the computation is available at output 182. This interpretation normally involves a division but the essential point is that the degree of similarity is directly indicated by the magnitude of the number present at output 182 at the end of the computation, i.e. larger numbers mean more similarity. In other words this quantity may be "normalized" by a process involving a division as discussed elsewhere if one desires a similarity measure that ranges from zero to one.

Before operation begins, R, M. and TALLY are reset to zero.

During Major clock cycle 1 Minor clock cycle 1:

During the start of this period while PHI is low, the character "A" is routed from 404 to become the address of the memory 114 and since PHI is low that memory responds by reading out this location and presenting it to the ADD block 126. Since THETA is low this block adds one to the value producing 1. This is then routed both into LATCH 136 and TEST 144. Since THETA is low TEST outputs a 0. At the positive going edge of PHI, the LATCH contents are frozen as TALLY switches into write mode. This in effect writes the updated quantity just computed by ADD back into location "A". Also at this transition the R register is incremented if signal 148 is 1. In this case it is not. During the second half of this period while PHI is high, TALLY is writing its updated information.

The character "A" is present at the selection input 404.

The character "A" is present at the selector input 406.

The R register shown as 170 in FIG. 4 contains zero.

The M register shown as 182 in FIG. 4 contains zero.

|  | Original Value | Updated Value |
|---|---|---|
| Tally location "A" = | 0 | 1 |
| Tally location "B" = | 0 |  |
| Tally location "C" = | 0 |  |

During Major clock cycle 1 Minor clock cycle 2:

During the start of this period while PHI is low, the character "A" is routed from 406 to become the address of the memory 114 and since PHI is low the memory responds by reading out this location and presenting it to the ADD block 126. Since THETA is high this block subtracts one to the value producing 0. This is then routed both into LATCH 136 and TEST 144. Since THETA is high TEST outputs a 1. At the positive going edge of PHI, the LATCH contents are frozen as TALLY switches into write mode. This in effect writes the updated quantity just computed by ADD back into location "A". Also at this transition the R register is incremented if signal 148 is 1. In this case it is. During the second half of this period while PHI is high, Tally is writing its updated information.

The character "A" is present at the selector input 404.

The character "A" is present at the selector input 406.

The R register shown as 170 in FIG. 17 contains zero at the start of this period and 1 at the completion.

The M register shown as 182 in FIG. 17 contains zero at the start of this period and 1 at the completion.

|  | Original Value | Updated Value |
|---|---|---|
| Tally location "A" = | 1 | 0 |
| Tally location "B" = | 0 |  |
| Tally location "C" = | 0 |  |

The end of this cycle is marked by the negative going edge of THETA. At this time M is updated and becomes 1.

During Major clock cycle 2 Minor clock cycle 1:

During the start of this period while PHI is low, the character "B" is routed from 404 to become the address of the memory 114 and since PHI is low the memory responds by reading out this location and presenting it to the ADD block 126. Since THETA is low this block adds one to the value producing 1. This is then routed both into LATCH 136 and TEST 144. Since THETA is low TEST outputs a 0. At the positive going edge of PHI, the LATCH contents are frozen as TALLY switches into write mode. This in effect writes the updated quantity just computed by Add back into location "B". Also at this transition the R register is incremented if signal 148 is 1. In this case it is not.

During the second half of this period while PHI is high, TALLY is writing its updated information.

The character "B" is present at the selector input 404.
The character "B" is present at the selector input 406.

The R register shown as 170 in FIG. 17 contains 1 throughout.

The M register shown as 182 in FIG. 17 contains zero.

|  | Original Value | Updated Value |
|---|---|---|
| Tally location "A" = | 0 | 1 |
| Tally location "B" = | 0 |  |
| Tally location "C" = | 0 |  |

During Major clock cycle 2 Minor clock cycle 2:

During the start of this period while PHI is low, the character "B" is routed from 406 to become the address of the memory 114 and since PHI is low the memory responds by reading out this location and presenting it to the ADD block 126. Since THETA is high this block subtracts one to the value producing 0. This is then routed both into LATCH 136 and TEST 144. Since THETA is high TEST outputs a 1. At the positive going edge of PHI, the LATCH contents are frozen as TALLY switches into write mode. This in effect writes the updated quantity just computed by ADD back into location "B". Also at this transition the R register is incremented if signal 148 is 1. In this case it is. During the second half of this period while PHI is high, TALLY is writing its updated information.

The character "B" is present at the selector input 404.

The character "B" is present at the selector input 406.

The R register shwon as 170 in FIG. 17 contains 1 at the start of this period and 2 at the completion.

The M register shown as 182 in FIG. 17 contains 1 at the start of this period and 3 at the completion.

|  | Original Value | Updated Value |
|---|---|---|
| Tally location "A" = | 0 | 0 |
| Tally location "B" = | 1 |  |
| Tally location "C" = | 0 |  |

The end of this cycle is marked by the negative going edge of THETA. At this time M is updated and becomes 3.

During Major clock cycle 3 Minor clock cycle 1:

During the start of this period while PHI is low, the character "C" is routed from 404 to become the address of the memory 114 and since PHI is low the memory responds by reading out this location and presenting it to the ADD block 126. Since THETA is low this block adds one to the value producing 1. This is then routed both into LATCH 136 and TEST 144. Since THETA is low TEST outputs a 0. At the positive going edge of PHI, the LATCH contents are frozen as TALLY switches into write mode. This in effect writes the updated quantity just computed by ADD back into location "C". Also at this transition the R register is incremented if signal 148 is 1. In this case it is not. During the second half of this period while PHI is high, TALLY is writing its updated information.

The character "C" is present at the selector input 404.

The character "B" is present at the selector input 406.

The R register shown as 170 in FIG. 17 contains 2 throughout.

The M register shown as 182 in FIG. 17 contains 3 throughout.

|  | Original Value | Updated Value |
|---|---|---|
| Tally location "A" = | 0 |  |
| Tally location "B" = | 0 |  |
| Tally location "C" = | 0 | 1 |

During Major clock cycle 2 Minor clock cycle 2:

During the start of this period while PHI is low, the character "B" is routed from 406 to become the address of the memory 114 and since PHI is low the memory responds by reading out this location and presenting it to the ADD block 126. Since THETA is high this block subtracts one to the value producing 0. This is then routed both into LATCH 136 and TEST 144. Since THETA is high TEST outputs a 0. At the positive going edge of PHI, the LATCH contents are frozen as TALLY switches into write mode. This in effect writes the updated quantity just computed by ADD back into location "B". Also at this transition the R register is incremented if signal 148 is 1. In this case it is not. During the second half of this period while PHI is high, TALLY is writing its updated information.

The character "C" is present at the selector input 404.
The character "B" is present at the selector input 406.
The R register shown as 170 in FIG. 17 contains 2 at the start of this period and 2 at the completion.
The M register shown as 182 in FIG. 17 contains 3 at the start of this period and 5 at the completion.

|  | Original Value | Updated Value |
|---|---|---|
| Tally location "A" = | 0 |  |
| Tally location "B" = | 0 | −1 |
| Tally location "C" = | 1 |  |

The end of this cycle is marked by the negative going edge of THETA. At this time M is updated and becomes 5.

| FINAL TALLY CONTENTS: | |
|---|---|
| Tally location "A" = | 0 |
| Tally location "B" = | −1 |
| Tally location "C" = | 1 |
| FINAL R CONTENTS: | 2 |
| FINAL M CONTENTS: | 5 |

The circuit copy representing OBSERVER TWO would work in the same manner except that the order of characters for both words is reversed.

In the above, we have assumed that the observer started with all quantities equal to zero. Once the record has passed, the two observers add together the values for M that they have arrived at. This result is then divided by L(L+1) which in this case is 3(3+1)=12. L is defined as te length of the compared words. Thus, we have $8/12 = \frac{2}{3}$ as the final similarity between the two words. FIG. 26 displays the final state of all numeric quantitites involved.

A basic mathematical formula has been created. If A is an alphabet, then words in A are finite concatenations of members from A. If w is a word in A, then w denotes the flip of w. For example, the flip of the word "abcd" is "dcba". If x and y are numbers then (x,y) denotes the greater of the two quantities x-y and 0. If w is a word in A, then n(a,w,i) denotes the number of occurances of alphabet member "a" in word w found in position i or beyond where position is measured canonically from left to right. If w and v are words in A, both of length L, then the degree of word similarity between them is denoted S(w,v) and is given by the formula below:

$$S(w,v) = \frac{L(L+1) - (n(a,w,i),n(a,v,i)) + (n(a,w,i),n(a,v,i))}{L(L+1)}$$

This formula, as set forth above and well understood by those skilled in the art, produces a number between 0 and 1 inclusive. It produces 1 if and only if w and v are identical. It produces 0 if and only if w and v share no common alphabet members. Intermediate values are interpreted as degrees of similarity between these two extremes. Formula exist and are discussed in "The Definition, Computation and Application of Symbol String Similarity Functions" referred hereinabove, which do not presume equality of the lengths of w and v. The above formula is, however, the most fundamental. It equally weighs all alphabet members and word positions. It corresponds to the circuit of FIG. 17.

In the equation above, the fundamental computation is that involving the double summation. Various forms of the equation might still perhaps produce a useful measurement of word similarity. For example, the whole equation might be raised to some positive integral power. Falk in the article referred to hereinabove, discussed a function which also associated with each pair of words, a number between zero and one. But his function is considerably more complex and in practice is much more difficult to compute. This is discussed in the thesis referred to hereinabove. The disclosed formula rests on a simpler and more rigorous mathematical foundation, as pointed out in the thesis. Faulk also makes little attempt towards justifying his formula.

It should be noted that the circuit invention evolved from the formula to the algorithm to the circuit. The following criteria are met:
1. Mathematical simplicity
2. Ease of computation
3. Agreement with human intuition
4. Flexibility to permit varied applications. The formula derived in the thesis and disclosed herein and made a part hereof is mathematically simple and produces results that appear to agree well with human intuition as referred to in the IEEE articles referred to hereinabove. Computation of the formula in a straight forward fashion requires quite a bit of work, primarily due to the double summation.

The next evolutionary step is the invention of an algorithm which quickly computes the formula. This algorithm is presented herein in the form of a Fortran function subprogram. It is called with three input parameters: IQ, IR and N. IQ and IR each of which is a dimension N integer vector. Upon return, the variable Theta is the degree of similarity between the input words IQ and IR. Alphabet members are integers between 1 and 256 inclusive.

To process a character from each of the two words under comparison, the algorithm implemented in machine language on a modern general purpose CPU such as the IBM 370, requires the execution of dozens of instructions each comprised of many micro instructions.

To perform this same task, our circuit requires only two internal clock cycles. Each represents approximately a read/write cycle pertaining to a high speed random access memory. Actually, the clock must be slightly slower than the memory's maximum speed to permit other circuit components to operate. In use, however, the multiple should be less than 2. Therefore, we see that our circuit is capable of computing our definition of word similarity much faster than any existant general purpose processor.

A complete similarity memory system may contain many such circuits. Therefore, the system would than be performing a search function beyond the capabilities of existant general CPU's. The basic algorithm as programmed in Fortran is:

```
                FUNCTION THETA (IQ, IR, N)
C
C    IQ and IR ARE EACH WORDS OF LENGTH N IN THE ALPHABET CONSISTING
C    OF THE NUMBERS 1 THROUGH 256. THEY ARE PASSED AS INTEGER VECTORS
```

```
                             -continued
                     FUNCTION THETA (IQ, IR, N)
C   EACH OF DIMENSION N. UPON RETURN, THETA ASSUMES THE VALUE OF
C   THE BASIC WORD SIMILARITY BETWEEN IQ AND IR.
C
      INTEGER R
      DIMENSION ITALLY (256), IQ(N), IR(N)
      DO 1 I=1,256
    1 ITALLY(I)=0
      M=0
      R=0
C
      DO 2 I=1,N
      ITALLY (IQ(I))=ITALLY(IQ(I))+1
      IF (ITALLY(IQ(I)).LE.0) R=R+1
      ITALLY (IR(I))=ITALLY(IR(I))−1
      IF (ITALLY(IR(I)).GE.0) R=R+1
    2 M=M+R
C
      R=0
      DO 4 I=1,256
    4 ITALLY(I)=0
C
      DO 3 J=1,N
      I=N+1−J
      ITALLY (IQ(I))=ITALLY(IQ(I))+1
      IF (ITALLY(IQ(I)).LE.0)R=R+1
      ITALLY(IR(I))=ITALLY(IR(I))−1
      IF (ITALLY(IR(I)).GE.0) R=R+1
    3 M=M+R
C
      THETA=FLOAT(M)/(N*(N+1))
C
      RETURN
      END
```

Referring now to FIG. 18, the SEL is a random access read/write memory 208. Its address enters on bus 224 from above and data output is to the right on bus 214. In FIG. 18, it is assumed that the read mode is selected as the device is only written to during master initialization. In the preferred embodiment the read/write memory 208 is organized as 127 2-bit words.

SYN consists of three random access read/write memories, 202, 204, and 206. In each, the address enters on bus 406' from above the data output transmitted on bus 220, 220', and 220" from below. In the Figure, we assume that the read mode is selected as the device is only written to during master initialization. In the preferred embodiment, it is organized as three memories, each consisting of 256 8-bit words. Select is a data selector 210. It has three input busses 220, 220', and 220" entering from above. One of these three is routed to a single output 224 existing below, depending upon the numeric value of the 2-bit value entering from the left. If this value is 0, then Select ignores its input and outputs zero. If this value is 1, 2 or 3, then the first, second or third input data bus respectively is routed to the output. In the preferred embodiment, it has 8-bit inputs and outputs.

MV is a one bit latch 222. It is set/reset during master initialization. The current state of MV exists above.

Select 402 is a data selector. It has two input busses 224 and 404' entering from above. One of these is routed to a single output exiting below, depending upon the state of $\theta$ entering from the right. If $\theta$ is low, then the right input bus is selected. Otherwise, the left bus is selected. In the preferred embodiment, Select has 8-bit inputs and outputs.

Double skip on zero is a circuit to block the propagation of $\phi$ and $\theta$, for the duration of two $\phi$ cycles, provided that $\theta=0$, MV=1 and the output from Select is zero, at the time of a positive transition of $\phi$. This effectively causes the later circuit stages to ignore completely the current column. These altered versions of $\phi$ and $\theta$ are then used by the central stage of the circuit.

PW is a random access read/write memory. Its address enters from the left and data output is to the right. In the figure, we assume that the read mode is selected, as the device is only written to during master initialization. In the preferred embodiment, it is organized as 127 2-bit words.

CW is a random access read/write memory. Its address enters from above and data output is to the right. In the figure, we assume that the read mode is selected, as the device is only written to during master initialization. In the preferred embodiment, it is organized as 256 2-bit words.

Distributor is a data distributor. It has three outputs above and a 2-bit control input to the left. When this input is zero, all three outputs are zero. When it is 1, 2, or 3, the first, second or third output goes high respectively, leaving the others zero.

Single skip on zero is a circuit to block the propagation of $\phi$, for the duration of one $\phi$ cycle, provided that the cumulative output from the gate circuits is zero at the time of a positive transition of $\phi$. This altered version of $\phi$ is then used by the lowest circuit stage.

Each gate is a pair of logical and gates used to control the propagation of the data output from CW. Both bits leaving CW center each gate to the left. Inside gate there are two 2-input and gates. One input from each becomes a common control input shown entering from below. The remaining two inputs connect to the two entering data lines. The outputs from the gates are shown to the right. When the control input is low, the gate outputs zero. When it is high, gate simply propagates its two bit input.

The combination of the three gate circuits and the distributor circuit forms a variable shift register which shifts the output of CW, depending upon the output of PW. This affects the computation of the final weight.

TOTM is an add-latch device. Its input enters above. It is triggered on a negative $\theta$ transition. In the preferred embodiment, TOTM is a 17-bit latch together with an adder having one 17-bit input and one 11-bit input.

R is an add-latch device. Its input enters above and its output exists below. It is triggered on a positive $\phi$ transition provided that T entering from the right is equal to one. In the preferred embodiment, R is an 11-bit latch coupled to an adder having one 11-bit input and one four bit input.

TOTR is an add-latch device. Its input enters above and its output exists below. It is triggered on a positive transition of $\phi$ provided that $\theta = 1$. In the preferred embodiment, it is an 11-bit latch together with an adder having one 11-bit input and one four-bit input.

M is an add-latch device. Its input enters above. It is triggered on a negative $\theta$ transition. In the preferred embodiment, it is a 17-bit latch together with an adder having one 17-bit input and one 11-bit input.

Sign test is defined as test of FIG. 17. L is defined as L of FIG. 17. Tally is defined as tally of FIG. 17. Adder is defined as add of FIG. 17.

Referring to FIG. 18, this diagram illustrates how the basic circuit of FIG. 17 may be considerably enhanced without sacrificing speed of processing. In FIG. 18, before data reaches the core or data selector, circuit 402 and the basic word associator circuit 112 that is identical to that shown in FIG. 17, several tasks are performed. First, a memory word is fetched corresponding to the current column position being processed. If this word is zero, then the current column is ignored. This is accomplished by using the double skip on zero circuit 220 of well known design. This circuit merely blocks propagation of all timing signals during the current character pair. Therefore, the circuit ignores the current column. Whereas the circuit of FIG. 17 processed every column unconditionally, this facility permits column selection in the circuit of FIG. 18. If the fetched word is non zero, then it is used to select one of three tables to be used in translating the data character from the record before it reaches the select circuit 402. This is called synonym processing and permits additional flexibility. The facilities above are implemented via the random access memory's SEL 208 and the three random access memory's labels SYN 202, 204, and 206, and by the SEL 208 component which simply selects one of the three outputs from the SYN memories 202, 204, and 206. The SEL 208 is of any well known design. The SYN 202, 204 and 206 is a set of three random access memories of a well known design. If the translated value of a record character is zero and the MV flag is set, then the entire current column is ignored as above. MV 222 is a one bit latch of a well known design. This permits the definition of missing value fields so as not to detract from the measure of the similarity between the record and the query. Position bus 224 is connected to SEL 208 and PW 226 that is a random access memory of well known design. The enhancements we have discussed so far constitute simple preprocessing and are not crutial to the basic invention. We now discuss some more crucial enhancements.

In the circuit of FIG. 17 you will note that the quantity "1" is always added to R 107. This has the effect of weighing all alphabet members and column positions equally. FIG. 18 implements a weighing scheme wherein the column number currently under consideration and the current character are used to determine a weight which is to be added to R instead of "1". In this way, one can weight characters heavier than others. Generally speaking, many circuits might compute a weight to be used to update R. FIG. 18 contains one such circuit. In this circuit, each alphabet character is assigned a two bit weight. This weights 0, 1, 2, 3 are possible. Each column position is also assigned a weight also two bits. But this weight is used to control a shift register so that here the possible weights are 0, 1, 2, 4. The character weight is effectively multiplied by the column weight to arrive at the final weight. A complete word associator circuit must of course contain two copies of the circuit of FIG. 18. We observe that the positional weight tables defined for each copy might differ. This might allow certain columns to be processed with more emphasis on initial or on final characters. When the two tables agree, there is no such directional bias. It should be noted that when the final weight of a column/character pair is zero, the character is not processed. This is accomplished by the "single skip on zero" circuit 230 which blocks propagation of timing signals for the duration of a single character.

The weight scheme is implemented by the random access memories PW 226 and CW 242 of well known design and by the selectable shift register 244 formed by the distributor 246 and gate components 248, 250, and 252 and by the single skip on zero circuit 230, all of which are of well known designs.

In the circuit of FIG. 17, the final result M needed to divide by N(N+L) where N is the length of the words under comparison, to arrive at the measure of similarity. In the circuit of FIG. 18, this denominator must be computed since it will depend upon the weights encountered during processing. In FIG. 18, TOTR 254 and TOTM 256 that are add-latches, compute a denominator term. A corresponding term is computed by the other copy of the circuit. The sum of these two terms is the final denominator. The final numerator is twice the sum of the two M values read out of the two circuit copies. The similarity between the query and bus words is the quotient of the numerator and the denominator quantities. The above is just one way in which the information read out of the circuit may be interpreted to arrive at a measurement of similarity. Other schemes might weight various terms unequally. The circuit 112' in the lower right of FIG. 18 is recognizable as very similar to the circuit of FIG. 17. The only difference is that the selection component is now external and R may now be updated by quantities other than "1".

The circuit of FIG. 18 is divided by dashed lines into three stages designated by I, II and III. Note that busses passing from stage to stage are broken. These indicate that buffers might be inserted to achieve a pipeline with three stages. In this way the circuit can process data as fast as the circuit of FIG. 17. Without pipeline buffers, the circuit is two to three times slower. The timing signals are labeled identically in each stage but may vary from stage to stage both because of the optional pipeline and because of the skip on zero circuits.

The circuit of FIG. 18 must be initialized before use. A master initialization must be performed once per search to establish weights, etc. This initialization must load the SEL 208, SYN 202, 204 and 206, PW 226, and CW 242 memories. Also, the MV 222 flag must be set or reset. Before each record is processed, additional initialization is required. The tally memory in 112' not illustrated must be set to zero as must the R and M, not shown, the TOTR 254 and TOTM 256 add-latches. After each record is processed, the contents of M, not shown in 112', and TOTM 256 are read out of the circuit.

Connections describing initialization and readout are trivial and of well known design and are therefore not shown in the drawings.

Finally, note that in the circuit of FIG. 18, the bus data character must be stable on the bus even during the processing of the query character. This permits the bus character to be translated while the query character, which does not pass through synonym translation, is processed. The query translation is better left to software since the query is fixed during a search.

The instant invention has been shown and described herein in what is considered to be the most practical and preferred embodiment. It is recognized, however, that departures may be made therefrom within the scope of the invention and that obvious modifications will occur to a person skilled in the art.

CONFIDENTIAL

SIMPLEST STRING COMPARISON FUNCTION

The following describes the simplest formulation of the *string comparison function*. In later sections, more complex and powerful string comparison techniques will be described.

The reader should fully understand the contents of the following section before reading about the more sophisticated versions of the string comparison function.

MATHEMATICAL DESCRIPTION

Let A denote an alphabet and A\* denote strings formed by finite concatenation of elements of A. We shall refer to the members of A\* as *words* or *strings*. We shall refer to the members of A as *characters*. The string of length zero, the *null word*, is a member of A\*.

We will define a *string comparison function* $\theta$ with range $\mathbf{A}^* \times \mathbf{A}^*$ and domain [0,1]. Intuitively, $\theta$ is a function which, for any two words $s_1$ and $s_2$ of A\*, computes a number between 0 and 1. If $\theta(s_1,s_2)=1$ then the strings are identical; if $\theta(s_1,s_2)=0$, then the strings are totally dissimilar. Intermediate values for $\theta$ indicate intermediate similarity. In general, the more similar the strings $s_1$ and $s_2$, the greater the value of $\theta(s_1,s_2)$.

If s is a word in A\*, we define *Suf(s,n)* to be the substring of s obtained by dropping the first n characters. Thus, *Suf(s,0)*=s. If n is greater than or equal to the length of s we define *Suf(s,n)* to be the null word. For example, if 'a', 'b', and 'c' are characters in A and s is the string 'aabc', then *Suf(s,3)* is the string 'c'.

We use *Len(s)* to denote the number of characters in s. Thus *Len('abcd')*=4.

If s∈A\*, we define *Flip(s)* to be the string obtained by reversing the order of the characters in s. Hence, *Flip('aabc')*='cbaa'.

If a∈A, s∈A\*; then we define *Count(a,s)* to be equal to the number of times the character a occurs in the string s. Hence *Count(a,Suf(s,n))* is equal to the number of a's which occur after the first n characters of the string s.

In accordance with common usage, we will use *Min(m,n)* to denote the smaller of the integers m and n.

If s∈A\*, we use the notation s[n] to denote the n-th character of s. The first character of s is s[1].

We are now ready to define the *string comparison function* $\theta$.

Definition: Let A be an alphabet. Let $s_1$, $s_2$ be strings from $A^*$. The functions $M_r$, $M_l$, $M$, $TOTM$ and $\theta$ are defined as follows:

$$TOTM(s_1) = Len(s_1) \cdot [Len(s_1) + 1]$$

$$M_r(s_1,s_2) = \sum_{n=0}^{\infty} \sum_{a \in A} 2 \cdot Min[Count(a,Suf(s_1,n)), Count(a,Suf(s_2,n))]$$

$$M_l(s_1,s_2) = M_r(Flip(s_1), Flip(s_2))$$

$$M(s_1,s_2) = M_l(s_1,s_2) + M_r(s_1,s_2)$$

$$\theta(s_1,s_2) = \frac{M(s_1,s_2)}{TOTM(s_1) + TOTM(s_2)}$$

If the denominator of the last fraction is equal to zero then we define $\theta(s_1,s_2)$ equal to 1. This happens only if both strings $s_1$ and $s_2$ are the null string.

(The functions $M_r$, $M_l$, $TOTM$, and $\theta$ will be redefined in later sections. In this section we will use the above definitions exclusively.)

Thus $\theta(s_1,s_2)$ is defined as the ratio of two numbers. The denominator, $TOTM(s_1) + TOTM(s_2)$, can be thought of as the *maximum possible match*. The numerator, $M(s_1,s_2)$, is a measure of the *co-incidence* of the strings $s_1$ and $s_2$. Their ratio is a number between 0 and 1 which is the strings' similarity value.

This function has several important properties:

(1) By the definition, $\theta(s_1,s_2) = \theta(s_2,s_1)$. Hence, $\theta$ is a symmetric function. Also, $\theta(s_1,s_2) = \theta(Flip(s_1), Flip(s_2))$.

(2) Note that the definition of $M_r(s_1,s_2)$ is written as an infinite sum. Actually, for $n \geq Min(Len(s_1), Len(s_2))$, the summand is zero. Thus $M_r(s_1,s_2)$ can be written as $$M_r(s_1,s_2) = \sum_{n=0}^{m} \sum_{a \in A} 2 \cdot Min(Count(a,Suf(s_1,n)), Count(a,Suf(s_2,n)))$$

where $m = Min(Len(s_1), Len(s_2))$.

(3) Consider the sum $$\sum_{a \in A} 2 \cdot Min(Count(a,Suf(s_1,n)), Count(a,Suf(s_2,n)))$$

(for a fixed n).

Intuitively, the number can be computed as follows: Drop the first n characters from each word $s_1$ and $s_2$. Then count how many characters the remaining suffixes of $s_1$ and $s_2$ have in common. Example: if $s_1 = $'abcd' and $s_2 = $'dabce' and $n = 2$, then the above sum is equal to 1.

(4) Let $$R(s_1,s_2,n) = \sum_{a \in A} Min(Count(a,Suf(s_1,n)), Count(a,Suf(s_2,n)))$$

Then, $$M_r(s_1,s_2) = 2 \sum_{n=0}^{\infty} R(s_1,s_2,n) = 2 \sum_{n=0}^{m} R(s_1,s_2,n)$$

where $m = Min(Len(s_1), Len(s_2))$.

Define $T_1(s_1, s_2)$ equal to 1 if $$Count(s_1[n], Suf(s_1, n+1)) < Count(s_1[n], Suf(s_2, n+1))$$

and equal to zero otherwise.

Define $T_2(s_1, s_2)$ equal to 1 if $$Count(s_1[n], Suf(s_2, n+1)) < Count(s_1[n], Suf(s_1, n))$$

and equal to zero otherwise. (It is important to note that $T_1(s_1, s_2, n) \neq T_2(s_2, s_1, n)$.)

Then, it is readily seen that $$R(s_1, s_2, n) - R(s_1, s_2, n+1) = T_1(s_1, s_2, n) + T_2(s_1, s_2, n)$$

Thus, $$R(s_1, s_2, n) = \sum_{i=n}^{m} (T_1(s_1, s_2, i) + T_2(s_1, s_2, i))$$

Hence, $$M_r(s_1, s_2) = 2 \sum_{n=0}^{m} \sum_{i=n}^{m} (T_1(s_1, s_2, i) + T_2(s_1, s_2, i))$$

This formula for $M_r(s_1, s_2)$ provides the basis for an efficient means to calculate $\theta(s_1, s_2)$. To see this, note the double summation is of the form $$\sum_{n=0}^{m} \sum_{i=n}^{m} X(i)$$

Since the argument of the double summation is a function only of $i$ and not of $n$, we can compute the double summation with two accumulating registers. We show below a sample C routine to illustrate the computation of the double summation (for a description of C, see "The C Programming Language" by B. Kernighan and D. Ritchie, Prentice-Hall, 1978).

```
doubsum (m) {
    int n, i;
    int X();
    int M, R;

M = R = 0;
    for ( n = 0; n < m; n++ ) {
        for ( i = m; i >= n; i-- ) {
            R += X(i);
            M += R;
        }
    }
    return (M);
}
```

(5) An alternative formula for $TOTM(s_1)$ is often easier to compute. Recall that $$TOTM(s_1) = Len(s_1) \cdot (Len(s_1) + 1)$$

It is easily shown that $$TOTM(s_1) = 2 \sum_{n=1}^{Len(s_1)} n$$

The latter formula is an easily computed value. In fact, it can be put in the same double summation format as discussed above:

$$TOTM(s_1) = \sum_{n=1}^{Len(s_1)} \sum_{1}^{n} 2$$

Also, it is readily seen from the double summation formulas that $$TOTM(s_1) + TOTM(s_2) < M_r(s_1,s_2) + M_f(s_1,s_2)$$

thus proving $$0 \leq \theta(s_1,s_2) \leq 1.$$

ALGORITHM FOR COMPUTATION OF SIMPLE STRING SIMILARITY FUNCTION

Below is shown a software implementation of an efficient algorithm for the computation of the simple string comparison function $\theta$.

The algorithm is expressed as a subroutine in the language C. This subroutine accepts as parameters two strings named 's1' and 's2' and the numbers 'len1' and 'len2' which are the lengths of the strings. It returns a fractional number between 0 and 1 equal to $\theta(s1,s2)$.

It should be noted this is not the most efficient program to compute $\theta(s_1,s_2)$, but is instead written to illustrate a good *algorithm*.

Note that this algorithm has execution time proportional to the length of the longer comparand string. The hardware implementation discussed in a later section computes the string similarity even faster: execution time is proportional to the *average* length of the two comparand strings. This linear execution time (with a fixed alphabet size) is much better than commonly known algorithms — many other algorithms have execution speed proportional to the square of the length of the comparand strings.

The program closely follows the formulation of $\theta$ given in note (4) above. It is assumed that the variables R, M and TOTM will not overflow.

```
float theta ( s1, s2, len1, len2 )

char s1[], s2[];
int len1, len2;
{
    int i;
    int ls;

int T[128];      /* Tally Vector for 128 character alphabet */
    int R;           /* Intermediate R Accumulator */
    int M;           /* Accumulator for Match (Numerator) */
    int TOTM;        /* Total Possible Match (Denominator) */
    double theta;    /* String Similarity Value */ ls = len1 < len2 ? len2 : len1;    /* max (len1, len2) */

/* Clear Tally Vector */ for (i=0; i<128; i++) {
        T[i] = 0;
    }

/* Compute $M_r$ */
```

```
M = R = 0;
for (i=ls-1; i>=0; i--) {
    if ( i<len1 ) {
        if ( T[s1[i]]++ < 0 ) {    /* T_1 */
            R++;
        }
    }
    if ( i<len2 ) {
        if ( T[s2[i]]-- > 0 ) {    /* T_2 */
            R++;
        }
    }
    M += 2*R;
}

/* Clear Tally Vector */ for ( i=0; i<128; i++) {
    T[i] = 0;
}

/* Compute M_f */

R = 0;
for (i=0; i<ls; i++) {
    if ( i >= ls-len1 ) {
        if ( T[s1[i-ls+len1]]++ < 0 ) {   /* T_1 */
            R++;
        }
    }
    if ( i >= ls-len2 ) {
        if ( T[s2[i-ls+len2]]-- > 0 ) {   /* T_2 */
            R++;
        }
    }
    M += 2*R;
}

TOTM = len1*(len1+1) + len2*(len2+1);

if (TOTM == 0) {
    theta = 1.0;
}
else { theta = (M+0.0)/(TOTM+0.0);
} return ( theta );
}
```

A HARDWARE IMPLEMENTATION OF THE SIMPLE STRING COMPARISON MEANS

A hardware implementation of the above-described string comparison method was described in the original patent application, Serial Number 020,618, filed March 14, 1979 and shown in Figures 3, 4 and 6 through 13. The original application is incorporated in the present application of which this is Appendix A of said present application. The circuit computes the functions $M_r$ or $M_f$. The strings are fed in forward to compute $M_f$ and fed in backwards to compute $M_r$. Other hardware is needed to feed in the strings and to display the results in human comprehensible form.

The chip drawings show hardware which handles the entire task of performing string comparisons.

STRING COMPARISON FUNCTION WITH VARIABLE CHARACTER WEIGHTS

The *string comparison function* described in the last section can be made far more powerful and flexible by allowing characters to be *weighted* individually. The characters are weighted as to their relative importance. In essence, same characters are marked as being more important, or more *meaningful* than others.

The *String Comparison function with Variable Character Weights* is described below. The notation is same as in the previous section. Proofs have been omitted where they closely follow the proofs of the last section.

MATHEMATICAL DESCRIPTION

Assume we are given an alphabet A and a *weight function* W, where W is a function defined an A such that, if a∈A, then W(a) is a non-negative integer called the *weight* of a.

We define a string comparison function $\theta$ with domain $A^* \times A^*$ and range [0,1] below.

Definition: Let A be an alphabet with weight function W. Let $s_1$ and $s_2$ be strings from $A^*$. The functions M, TOTM, and $\theta$ are defined as follows:

$$TOTM(s_1) = [Len(s_1)+1] \sum_{i=1}^{Len(s_1)} W(s_1[i])$$

$$M_r(s_1,s_2) = \sum_{n=0}^{\infty} \sum_{a \in A} 2 \cdot W(a) \cdot Min(Count(a,Suf(s_1,n)), Count(a,Suf(s_2,n)))$$

$$M_f(s_1,s_2) = M_r(Flip(s_1), Flip(s_2))$$

$$M(s_1,s_2) = M_r(s_1,s_2) + M_f(s_1,s_2)$$

$$\theta(s_1,s_2) = \frac{M(s_1,s_2)}{TOTM(s_1) + TOTM(s_2)}$$

If the denominator of the last fraction is equal to zero then we define $\theta(s_1,s_2)$ equal to 1. This degenerate case occurs only if the strings $s_1$ and $s_2$ are empty or consist entirely of characters with weight equal to zero.

(In this section the functions $M_r$, $M_l$, $TOTM$, $M$, and $\theta$ are defined as above. In other sections, these functions are defined differently.)

Next we derive an alternative formulation of $\theta(s_1,s_2)$ which provides the basis for an efficient means for the computation of this string similarity function.

Let $$R(s_1,s_2,n) = \sum_{a_i \in A} 2 \cdot W(a_i) \cdot Min(Count(a_i, Suf(s_1,n)), Count(a_i, Suf(s_2,n)))$$

Then, $$M_r(s_1,s_2) = \sum_{n=0}^{m} R(s_1,s_2,n)$$

where $m = Min(Len(s_1), Len(s_2))$.

Define $T_1(s_1,s_2,n)$ to be equal to 1 if $$Count(s_1[n], Suf(s_1,n+1)) < Count(s_1[n], Suf(s_1,n+1))$$

and to be equal to zero otherwise.

Define $T_2(s_1,s_2,n)$ to be equal to 1 if $$Count(s_2[n], Suf(s_2,n+1)) < Count(s_2[n], Suf(s_1,n))$$

and to be equal to be zero otherwise.

Then, $$R(s_1,s_2,n) - R(s_1,s_2,n+1) = W(s_1[n]) \cdot T_1(s_1,s_2,n) + W(s_2[n]) \cdot T_2(s_1,s_2,n)$$

Thus, $$R(s_1,s_2,n) = \sum_{i=n}^{m} [W(s_1[i]) \cdot T_1(s_1,s_2,i) + W(s_2[i]) \cdot T_2(s_1,s_2,i)]$$

Hence, $$M_r(s_1,s_2) = \sum_{n=0}^{m} \sum_{i=n}^{m} [W(s_1[i]) \cdot T_1(s_1,s_2,i) + W(s_2[i]) \cdot T_2(s_1,s_2,i)]$$

Also, it is easily seen that $$TOTM(s_1) = \sum_{i=1}^{Len(s_1)} \sum_{j=i}^{Len(s_1)} W(s_1[j]) + \sum_{i=1}^{Len(s_1)} \sum_{j=i}^{Len(s_1)} W(s_1[j])$$

$$= \sum_{i=1}^{Len(s_1)} \sum_{j=i}^{Len(s_1)} W(s_1[j]) + \sum_{i=1}^{Len(s_1)} \sum_{j=i}^{Len(s_1)} W((Flip(s_1))[j])$$

It follows from the above equations that $$M(s_1,s_2) \leq TOTM(s_1) + TOTM(s_2)$$

so we have $$0 \leq \theta(s_1,s_2) \leq 1$$

Note that the above equations for $M$ and $TOTM$ are double summations of the form which can be easily computed with two accumulating registers. Thus, these equations form the basis for an efficient means to compute $\theta(s_1,s_2)$.

ALGORITHM FOR THE COMPUTATION OF THE STRING SIMILARITY FUNCTION WITH VARIABLE CHARACTER WEIGHTS

Below is shown a software implementation of an efficient algorithm for the computation of the string comparison function with variable character weighting.

The algorithm is expressed as a subroutine in the language C. The parameters to the subroutine are two strings named 's1' and 's2', two numbers 'len1' and 'len2' which are the lengths of the strings, and an integer array 'W' which contains the character weighting values. It returns a fractional number equal to $\theta(s_1,s_2)$.

The size of the alphabet is set to 128 bytes. It is assumed that the members of the array T and the variables R, M, and TOTM will not overflow.

This program is not intended to be the most efficient C subroutine for calculation of $\theta(s_1,s_2)$, but is rather written to illustrate the preferred *algorithm*. Note that this algorithm runs in a time proportional to the length of the longer of the comparand strings.

```
float theta ( s1, s2, len1, len2, W )

char s1[], s2[];
int len1, len2;
int W[128];
{
        int i;
        int ls;

int T[128];        /* Tally Vector for 128 character alphabet */
        int R;             /* Intermediate R Accumulator */
        int M;             /* Accumulator for Match (Numerator) */
        int TOTR;          /* Intermediate TOTR Accumulator */
        int TOTM;          /* Total Possible Match (Denominator) */
        float theta;       /* String Similarity value */ ls = len1 < len2 ? len2 : len1;    /* max (len1, len2) */

/* Clear Tally Vector */ for (i=0; i<128; i++) {
            T[i] = 0;
        }

/* Compute M, and TOTM, */

TOTM = TOTR = 0;
        M = R = 0;
```

```
for (i=ls-1; i>=0; i--) {
    if ( i<len1 ) {
        if ( T[s1[i]]++ < 0 ) {      /* T_1 */
            R += W[s1[i]];
        }
        TOTR += W[s1[i]];
    }
    if ( i<len2 ) {
        if ( T[s2[i]]-- > 0 ) {      /* T_2 */
            R += W[s2[i]];
        }
        TOTR += W[s2[i]];
    }
    M += 2*R;
    TOTM += TOTR;
}

/* Clear Tally Vector */ for ( i=0; i<128; i++ ) {
    T[i] = 0;
}

/* Compute M_i and TOTM_i */

TOTR = 0;
R = 0;
for (i=0; i<ls; i++) {
    if ( i >= ls-len1 ) {
        if ( T[s1[i-ls+len1]]++ < 0 ) {      /* T_1 */
            R += W[s1[i-ls+len1]];
        }
        TOTR += W[s1[i-ls+len1]];
    }
    if ( i >= ls-len2 ) {
        if ( T[s2[i-ls+len2]]-- > 0 ) {      /* T_2 */
            R += W[s2[i-ls+len2]];
        }
        TOTR += W[s2[i-ls+len2]];
    }
    M += 2*R;
    TOTM += TOTR;
} if (TOTM==0) {
    theta = 1.0;
}
else {
    theta = (M+0.0)/(TOTM+0.0);
} return ( theta );
}
```

STRING COMPARISON FUNCTION WITH UNMATCHED CHARACTER COMPENSATION AND VARIABLE CHARACTER WEIGHTS

Next we describe an extension to the *string comparison function* discussed in the previous sections. This extension includes variable character weighting and also provides *unmatched character compensation*. *Unmatched character compensation* provides a means for partially ignoring characters which occur in only one the strings being compared. This increases the flexibility and usefulness of the string comparison function.

MATHEMATICAL DESCRIPTION

Assume we are given an alphabet $A$, a weight function $W$ and a *compensation function* $C$. By definition, $W$ and $C$ are functions defined on $A$ such that, if $a \in A$, then $W(a)$ and $C(a)$ are non-negative integers called the *weight* of a and the *compensation value* of a, respectively.

Furthermore, we must have $W(a) \geq C(a)$.

We define a *string comparison function* $\theta$ with domain $A^* \times A^*$ and range $[0,1]$ as follows:

Definition: Let $A$ be an alphabet with weight function $W$ and compensation function $C$. Let $s_1$, $s_2$ be strings from $A^*$. The functions $M$, $TOTM$, and $\theta$ are defined as follows:

$$TOTM(s_1) = [Len(s_1) + 1] \cdot \sum_{i=1}^{Len(s_1)} W(s_1[i])$$

$$M_r(s_1, s_2) = \sum_{n=0}^{\infty} \sum_{a_i \in A} 2 \cdot W(a_i) \cdot Min(Count(a_i, Suf(s_1, n)), Count(a_i, Suf(s_2, n)))$$

$$M_l(s_1, s_2) = M_r(Flip(s_1), Flip(s_2))$$

$$COMP(s_1, s_2) = [Len(s_1) + 1] \cdot \sum_{a_i \in A} [C(a_i) \cdot Max(0, Count(a_i, s_1) - Count(a_i, s_2))]$$

$$M(s_1, s_2) = M_r(s_1, s_2) + M_l(s_1, s_2) + COMP(s_1, s_2) + COMP(s_2, s_1)$$

$$\theta(s_1, s_2) = \frac{M(s_1, s_2)}{TOTM(s_1) + TOTM(s_2)}$$

If the denominator of the last fraction is equal to zero then we define $\theta(s_1, s_2)$ equal to 1. This degenerate case occurs only if the strings $s_1$ and $s_2$ are empty or consist entirely of characters with weight equal to zero.

(In this section the functions $M_r$, $M_l$, $TOTM$, $M$, and $\theta$ are defined as above. In other sections, these functions are defined differently.)

The above definition should be compared to the definition in the previous section of the *string similarity function with variable character weights* (without unmatched character compensation). It should be noted that the definitions of $TOTM$, $M_r$, and $M_l$ are unchanged. The functions $R$, $I_1$, and $I_2$ from the previous section can still be defined in the same way and all of the relationships derived in the last section are still valid.

The new factor in the definition of $\theta$ is the $COMP$ function. The value of $COMP(s_1, s_2)$ is the *total weight* of the characters in string $s_1$ which are unmatched in the string $s_2$. The compensation values are added to M as partial compensation for non-matching characters in the comparand strings. This allows θ to measure two kinds of *dissimilarity* of words: first, strings can differ by having the same character in different positions; second, strings can differ by having missing or extra characters.

By properly setting the character weight and compensation functions, $\theta(s_1,s_2)$ can be defined so as to distinguish between these kinds of 'dissimilarity'. Since the weight and compensation values can be independently set for each character in the alphabet A, the string similarity function can treat the two kinds of dissimilarity differently for each character. This gives the θ function a high degree of flexibility.

AN ALGORITHM FOR THE COMPUTATION OF THE STRING SIMILARITY FUNCTION WITH UNMATCHED CHARACTER COMPENSATION

Below is shown a software implementation of an efficient algorithm for the computation of the string comparison function with variable character weighting and unmatched character compensation. The algorithm closely follows that of the previous section. However, code has been added to compute the compensation functions.

The algorithm is expressed as a subroutine in the language C. The parameters to the subroutine are two strings named 's1' and 's2', two numbers 'len1' and 'len2' which are the lengths of the strings, and two integer arrays 'W' and 'C' which contain the character weights and character compensations. It returns a fractional number equal to $\theta(s_1,s_2)$.

The size of the alphabet is set to 128 bytes. It is assumed that the members of the array T and the variables C1, C2, R, M, and TOTM will not overflow.

The variables C1 and C2 are used as intermediate accumulators to aid in the computation of $COMP(s_1,s_2)$ and $COMP(s_2,s_1)$, respectively.

This program is not intended to be the most efficient C subroutine for calculation of $\theta(s_1,s_2)$, but is rather written to illustrate the preferred *algorithm*. Note that this algorithm runs in a time proportional to the length of the longer of the comparand strings.

```
float theta ( s1, s2, len1, len2, W, C )

char s1[], s2[];
int len1, len2;
int W[128];
int C[128];
{ int i;
    int ls;

int T[128];      /* Tally Vector for 128 character alphabet */
    int R;           /* Intermediate R Accumulator */
    int M;           /* Accumulator for Match (Numerator) */
    int TOTR;        /* Intermediate TOTR Accumulator */
    int TOTM;        /* Total Possible Match (Denominator) */
    int C1;          /* For computation of COMP(s1,s2) */
    int C2;          /* For computation of COMP(s2,s1) */
    float theta;     /* String Similarity value */ ls = len1 < len2 ? len2 : len1;    /* max (len1, len2) */

/* Clear Tally Vector */ for (i=0; i<128; i++) {
        T[i] = 0;
    }

/* Compute M_r and TOTM_r */
```

```
C1 = C2 = 0;
TOTM = TOTR = 0;
M = R = 0;
for (i=ls-1; i>=0; i--) {
    if ( i<len1 ) {
        if ( T[s1[i]]++ < 0 ) {      /* T_1 */
            R += 2*W[s1[i]];
            C2 -= C[s1[i]];
        }
        else {
            C1 += C[s1[i]];
        }
        TOTR += W[s1[i]];
    }
    if ( i<len2 ) {
        if ( T[s2[i]]-- > 0 ) {      /* T_2 */
            R += 2*W[s2[i]];
            C1 -= C[s2[i]];
        }
        else {
            C2 += C[s2[i]];
        }
        TOTR += W[s2[i]];
    }
    M += R;
    TOTM += TOTR;
}

/* Clear Tally Vector */ for ( i=0; i<128; i++) {
    T[i] = 0;
}

/* Compute M_i and TOTM_i */

TOTR = 0;
R = 0;
for (i = -1; i<ls; i++) {
    if ( i == ls-len1-1 ) {
        R += C1;
    }
    if ( i == ls-len2-1 ) {
        R += C2;
    }
    if ( i >= ls-len1 ) {
        if ( T[s1[i-ls+len1]]++ < 0 ) {    /* T_1 */
            R += 2*W[s1[i-ls+len1]];
        }
        TOTR += W[s1[i-ls+len1]];
    }
    if ( i >= ls-len2 ) {
        if ( T[s2[i-ls+len2]]-- > 0 ) {    /* T_2 */
            R += 2*W[s2[i-ls+len2]];
        }
        TOTR += W[s2[i-ls+len2]];
    }
    M += R;
    TOTM += TOTR;
} if (TOTM==0) {
    theta = 1.0;
```

```
            }
    else {
            theta = (M+0.0)/(TOTM+0.0);
            } return ( theta );
}
```

STRING COMPARISON FUNCTION WITH DIRECTIONAL BIASING AND VARIABLE CHARACTER WEIGHTS

In this section we describe how the previously described string comparison function can be augmented by providing the capability to attach importance to the relative position of the letters in a word. Specifically, the beginning or end of a string can be more strongly emphasized. We will first define mathematically the extension to the string comparison function and then will discuss further the uses of directional biasing.

MATHEMATICAL DESCRIPTION

Let A be an alphabet with two weight functions $W_f$ and $W_r$. $W_f$ is called the *forward weight function* and $W_r$ is called the *reverse weight function*. Recall that a weight function is a non-negative function with domain A; so $W_r(a) \geq 0$ and $W_f(a) \geq 0$ for all $a \in A$. We will also use the *bias function* B which is defined by $$B(a) = W_f(a) - W_r(a)$$

for $a \in A$.

Recall that without directional biasing, the importance of a particular character is proportional to its weight. With directional biasing, the importance of a character at the beginning of a word is proportional to its forward weight value and at the end of a word is proportional to its reverse weight value.

The string comparison function with variable character weights and directional biasing is the function $\theta$ with domain $A^* \times A^*$ and range $[0,1]$ defined below.

Definition: Let A be an alphabet, $W_f$ and $W_r$ be the forward and reverse weight functions. Let $s_1$, $s_2$ be strings from $A^*$. The functions $TOTM$, $M_r$, $M_f$, $M$, and $\theta$ are defined as follows.

$$TOTM(s_1) = \sum_{n=0}^{m} \sum_{i=n}^{m} W_r(s_1[i]) + \sum_{n=0}^{m} \sum_{i=1}^{n} W_f(s_1[i])$$

$$M_r(s_1,s_2) = \sum_{n=0}^{\infty} \sum_{a_i \in A} 2W_r(a_i) Min(Count(a_i, Suf(s_1,n)), Count(a_i, Suf(s_2,n)))$$

$$M_f(s_1,s_2) = \sum_{n=0}^{\infty} \sum_{a_i \in A} 2W_f(a_i) Min(Count(a_i, Suf(Flip(s_1),n)), Count(a_i, Suf(Flip(s_2),n)))$$

$$M(s_1,s_2) = M_r(s_1,s_2) + M_f(s_1,s_2)$$

$$\theta(s_1,s_2) = \frac{M(s_1,s_2)}{TOTM(s_1) + TOTM(s_2)}$$

If the denominator of the last fraction is equal to zero then we define $\theta(s_1,s_2)$ equal to 1. This degenerate case occurs only if the strings $s_1$ and $s_2$ are empty or consist entirely of characters with weight equal to zero.

In this section, we will always use $TOTM$, $M_r$, $M_f$, $M$, and $\theta$ as defined above. In other sections, these functions are defined differently.

The reader should compare the above definition to the definition of the string comparison function with variable weights but no directional biasing in a preceding section. The only difference in the definitions is that $M_r$ and $M_f$ are now defined in terms of the reverse and forward weight functions $W_r$ and $W_f$ and $TOTM$ has been redefined to use both weight functions. When the forward and weight functions are identical (i.e. the bias function $B$ is zero), then the above definition is identical to the previous definition.

By examination of the above formula, it is easily seen that the forward weight, $W_f$, is more important for characters near the beginning of the strings $s_1$ and $s_2$ and that the reverse weight, $W_r$, is more important for characters near the end of the strings. We now show a simple example which will illustrate the effectiveness of the directional biasing function.

Let $s_1$ be the string 'xAxx' and $s_2$ be the string 'Axxx'. Let $W_r(x) = W_f(x) = 0$, so we may ignore the character 'x' for our calculations. Also, let $$W_f(A) = 2$$

$$W_r(A) = 1$$

so that the forward weight of 'A' is twice the reverse weight. Thus, $$B(A) = W_f(A) - W_r(A) = 1.$$

Then, $$TOTM(s_1) + TOTM(s_2) = 17$$

and $$M(s_1, s_2) = 14.$$

So, $$\theta(s_1, s_2) = \frac{14}{17}.$$

But now, if we compare the strings $s_3$ and $s_4$ defined by $$s_3 = \text{'xxAx'}$$
$$s_4 = \text{'xxxA'}$$

then, $$TOTM(s_3) + TOTM(s_4) = 13$$

and $$M(s_3, s_4) = 10.$$

So, $$\theta(s_3, s_4) = \frac{10}{13} < \frac{14}{17} = \theta(s_1, s_2)$$

as expected.

It should be noticed that the difference between the numerator and the denominator is equal to 3 in both of the above two examples. It is generally true that as characters are uniformly shifted left or right,

ALGORITHM FOR THE COMPUTATION OF THE STRING SIMILARITY FUNCTION WITH VARIABLE CHARACHTER WEIGHTS AND DIRECTIONAL BIASING

Below is shown a software implementation of an efficient algorithm for the computation of the string comparison function with variable character weighting and directional biasing.

The algorithm is expressed as a subroutine in the language C. The parameters to the subroutine are two strings named 's1' and 's2', two numbers 'len1' and 'len2' which are the lengths of the strings, and two integer arrays 'Wf' and 'Wr' which contains the character forward and reverse weight values. It returns a fractional number equal to $\theta(s_1, s_2)$.

The size of the alphabet is set to 128 bytes. It is assumed that the members of the array T and the variables R, M, and TOTM will not overflow.

This program is not intended to be the most efficient C subroutine for calculation of $\theta(s_1, s_2)$, but is rather written to illustrate the preferred *algorithm*. Note that this algorithm runs in a time proportional to the length of the longer of the comparand strings.

```
float theta ( s1, s2, len1, len2, Wf, Wr )

char s1[], s2[];
int len1, len2;
int Wf[128];
int Wr[128];
{
        int i;
        int ls;

int T[128];       /* Tally Vector for 128 character alphabet */
        int R;            /* Intermediate R Accumulator */
        int M;            /* Accumulator for Match (Numerator) */
        int TOTR;         /* Intermediate TOTR Accumulator */
        int TOTM;         /* Total Possible Match (Denominator) */
        float theta;      /* String Similarity value */ ls = len1 < len2 ? len2 : len1;     /* max (len1, len2) */

/* Clear Tally Vector */ for (i=0; i<128; i++) {
            T[i] = 0;
        }

/* Compute M, and TOTM, */

TOTM = TOTR = 0;
        M = R = 0;
        for (i=ls-1; i>=0; i--) {
            if ( i<len1 ) {
                if ( T[s1[i]]++ < 0 ) {      /* T_1 */
                    R += Wr[s1[i]];
                }
                TOTR += Wr[s1[i]];
            }
            if ( i<len2 ) {
                if ( T[s2[i]]-- > 0 ) {      /* T_2 */
                    R += Wr[s2[i]];
```

```
            |
            TOTR + = Wr[s2[i]];
            |
        M + = 2*R;
        TOTM + = TOTR;
    |

/* Clear Tally Vector */ for ( i=0; i<128; i++ ) |
        T[i] = 0;
    |

/* Compute M_f and TOTM_f */

TOTR = 0;
    R = 0;
    for (i=0; i<ls; i++) |
        if ( i >= ls-len1 ) |
            if ( T[s1[i-ls+len1]]++ < 0 ) |    /* T_1 */
                R + = Wf[s1[i-ls+len1]];
            |
            TOTR + = Wf[s1[i-ls+len1]];
        |
        if ( i >= ls-len2 ) |
            if ( T[s2[i-ls+len2]]-- > 0 ) |    /* T_2 */
                R + = Wf[s2[i-ls+len2]];
            |
            TOTR + = Wf[s2[i-ls+len2]];
        |
        M + = 2*R;
        TOTM + = TOTR;
    | if (TOTM==0) |
        theta = 1.0;
    |
    else |
        theta = (M+0.0)/(TOTM+0.0);
    | return ( theta );
|
```

THE FULL STRING COMPARISON FUNCTION WITH VARIABLE CHARACTER WEIGHTS, UNMATCHED CHARACTER COMPENSATION AND DIRECTIONAL BIASING

Now we define the complete and most complex version of the string comparison function. This incorporates both unmatched character compensation and directional biasing, which were introduced separately in the last two sections. The complete string comparison function is an very flexible, function which can be tailored for many different applications and set up to compute very different types of string similarity. This tailoring is done by setting the character forward and reverse weights and compensations to achieve the desired characteristics.

In the section below, we first define the full string comparison function mathematically and give a software example of a preferred algorithm for the computation of the string comparison function. This section will conclude the theoretical discussion of the string comparison function and means for the computation of the string comparison function. In another section we will discuss preferred logic designs and preferred hardware implementations for the computing of the string comparison function.

MATHEMATICAL DESCRIPTION

Let A be an alphabet with compensation function C, forward weight function $W_f$, and reverse weight function $W_r$. Each of these functions is a non-negative function with domain A. Furthermore the compensation of a character must be less than its weights, that is, $$C(a) \leq Min(W_r(a), W_f(a))$$

for all $a \in A$.

We now define the *full string comparison function* $\theta$ with domain $A^* \times A^*$ and range $[0,1]$. This definition is the most complex and sophisticated definition for the $\theta$ function.

Definition: Let A be an alphabet. Let $s_1$ and $s_2$ be strings from $A^*$. Then the functions $M_f$, $M_r$, COMP, M, TOTM and $\theta$ are defined as follows:

$$TOTM(s_1) = \sum_{n=0}^{m} \sum_{i=n}^{m} W_r(s_1[i]) + \sum_{n=0}^{m} \sum_{i=1}^{n} W_f(s_1[i])$$

$$M_r(s_1,s_2) = \sum_{n=0}^{\infty} \sum_{a_i \in A} 2W_r(a_i) Min(Count(a_i, Suf(s_1,n)), Count(a_i, Suf(s_2,n)))$$

$$M_f(s_1,s_2) = \sum_{n=0}^{\infty} \sum_{a_i \in A} 2W_f(a_i) Min(Count(a_i, Suf(Flip(s_1),n)), Count(a_i, Suf(Flip(s_2),n)))$$

$$COMP(s_1,s_2) = [Len(s_1)+1] \sum_{a_i \in A} [C(a_i) \cdot Max(0, Count(a_i,s_1) - Count(a_i,s_2))]$$

$$M(s_1,s_2) = M_r(s_1,s_2) + M_f(s_1,s_2) + COMP(s_1,s_2) + COMP(s_2,s_1)$$

$$\theta(s_1,s_2) = \frac{M(s_1,s_2)}{TOTM(s_1) + TOTM(s_2)}$$

If the denominator of the last fraction is equal to zero then we define $\theta(s_1,s_2)$ equal to 1. This degenerate case occurs only if the strings $s_1$ and $s_2$ are empty or consist entirely of characters with weight equal to zero.

The reader should compare the above definitions to those of the last two sections. This definition of $\theta$ combines the compensation and directional biasing capabilities into a single function.

ALGORITHM FOR THE COMPUTATION OF THE FULL STRING SIMILARITY FUNCTION WITH VARIABLE CHARACTER WEIGHTS, DIRECTIONAL BIASING AND UNMATCHED CHARACTER COMPENSATION

Below is shown a software implementation of an efficient algorithm for the computation of the full string comparison function with variable character weighting, unmatched character compensation and directional biasing.

The algorithm is expressed as a subroutine in the language C. The parameters to the subroutine are two strings named 's1' and 's2', two numbers 'len1' and 'len2' which are the lengths of the strings, two integer arrays 'Wf' and 'Wr' which contains the character forward and reverse weight values, and an integer array 'C' which contains the character compensation values. It returns a fractional number equal to $\theta(s_1,s_2)$.

The size of the alphabet is set to 128 bytes. It is assumed that the members of the array T and the variables R, M, and TOTM will not overflow.

This program is not intended to be the most efficient C subroutine for calculation of $\theta(s_1,s_2)$, but is rather written to illustrate the preferred *algorithm*. Note that this algorithm runs in a time proportional to the length of the longer of the comparand strings.

```
float theta ( s1, s2, len1, len2, Wf, Wr, C )

char s1[], s2[];
int  len1, len2;
int  Wf[128];
int  Wr[128];
int  C[128];
{
        int i;
        int ls;

int T[128];     /* Tally Vector for 128 character alphabet */
        int R;          /* Intermediate R Accumulator */
        int M;          /* Accumulator for Match (Numerator) */
        int TOTR;       /* Intermediate TOTR Accumulator */
        int TOTM;       /* Total Possible Match (Denominator) */
        int C1;         /* For computation of COMP(s1,s2) */
        int C2;         /* For computation of COMP(s2,s1) */
        float theta;    /* String Similarity value */ ls = len1 < len2 ? len2 : len1;    /* max (len1, len2) */
        /* Clear Tally Vector */ for (i=0; i<128; i++) {
                T[i] = 0;
        }

/* Compute M, and TOTM, */

C1 = C2 = 0;
        TOTM = TOTR = 0;
        M = R = 0;
        for (i=ls-1; i>=0; i--) {
                if ( i<len1 ) {
                        if ( T[s1[i]]++ < 0 ) {    /* T1 */
                                R += 2*Wr[s1[i]];
                                C2 -= C[s1[i]];
                        }
                        else {
                                C1 += C[s1[i]];
                        }
                        TOTR += Wr[s1[i]];
                }
                if ( i<len2 ) {
                        if ( T[s2[i]]-- > 0 ) {    /* T2 */
                                R += 2*Wr[s2[i]];
                                C1 -= C[s2[i]];
                        }
                        else {
                                C2 += C[s2[i]];
                        }
                        TOTR += Wr[s2[i]];
                }
                M += R;
                TOTM += TOTR;
        }
```

```
/* Clear Tally Vector */ for ( i=0; i<128; i++) {
    T[i] = 0;
}

/* Compute M, and TOTM, */

TOTR = 0;
R = 0;
for (i = -1; i<ls; i++) {
    if ( i == ls-len1-1 ) {
        R += C1;
    }
    if ( i == ls-len2-1 ) {
        R += C2;
    }
    if ( i >= ls-len1 ) {
        if ( T[s1[i-ls+len1]]++ < 0 ) {   /* T_1 */
            R += 2*Wf[s1[i-ls+len1]];
        }
        TOTR += Wf[s1[i-ls+len1]];
    }
    if ( i >= ls-len2 ) {
        if ( T[s2[i-ls+len2]]-- > 0 ) {   /* T_2 */
            R += 2*Wf[s2[i-ls+len2]];
        }
        TOTR += Wf[s2[i-ls+len2]];
    }
    M += R;
    TOTM += TOTR;
} if (TOTM==0) {
    theta = 1.0;
}
else {
    theta = (M+0.0)/(TOTM+0.0);
} return ( theta );
}
```

APPENDIX 3

PROXIMITY DEVICES CORPORATION
5353 N. Federal Highway - Suite 200
Fort Lauderdale, Florida 33308
Phone: 305-491-8383

ADVANCED PRODUCT DESCRIPTION

The PF474 LSI microcircuit is a totally new device which implements a high speed $\theta$-proximity computer and ranker on a single silicon chip using high speed NMOS technology. A '$\theta$-proximity computer' (United States and foreign patents pending) is a device that compares two symbol strings to arrive at a number which is indicative of their similarity. With the PF474, this number is a 32-bit binary fraction ranging from zero to one. The notion of similarity computed is highly sophisticated and flexible and can be adjusted to address a wide spectrum of applications. It is useful to think of the PF474 as a scoring device that produces high scores for very similar strings and low scores for highly dissimilar strings. Typically, the PF474 is used to search a list of entries that are similar to a query which is fixed for the duration of the operation. When the search is complete, the ranker portion of the device can be accessed by the outside world to identify which members of the list received the highest scores. This document is preliminary and is intended to provide the information needed to facilitate limited advanced applications engineering.

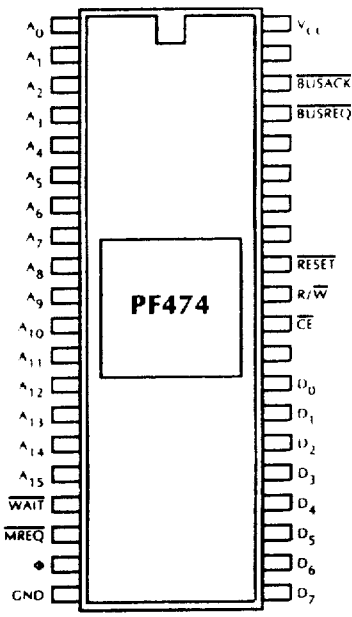

FEATURES

- Computes 32-bit $\theta$-proximity value
- String lengths up to 127 8-bit symbols
- High-reliability 40-pin ceramic DIP package
- $\theta$-proximity is tailored by internal parameter tables stored in externally accessible RAM
- Maintains internal 16-element ranked list of best matches
- Permits location of 15 additional *next best* matches
- Modern programming architecture whereby the device is controlled by addressing it as memory and accessing assigned locations

- All pins LS TTL compatible
- Designed for compatibility, the PF474 fits naturally and simply into $\mu$P based systems
- 4MHz operation
- Single +5 volt supply
- Nominal throughput is 25,000 comparisons and rankings per second
- High-speed DMA facility permits rapid loading from external memory
- Smart DMA permits optional editing of the input data to offload certain useful preprocessing tasks from the host $\mu$P

PRELIMINARY

Pin Functions

| LABEL | PIN | DESCRIPTION |
|---|---|---|
| V$_{CC}$ | 40 | +5 Volt Power Supply |
| GND | 20 | Ground |
| D0-D7 | 21-28 | Data bus *(input/output - active high)*<br>D0-D7 constitute an 8-bit bidirectional data bus. The bus is configured as an *output* during read accesses to the PF474. At all other times it is configured as an *input*. |
| A0-A9 | 1-10 | Address bus (main) *(input/output - active high)*<br>A0-A9 constitute a 10-bit bidirectional address bus. The bus is configured as an *output* during PF474 DMA operation. At all other times it is configured as an *input*. |
| A10-A15 | 11-16 | Address bus (extension) *(3-state output - active high)*<br>A10-A15 constitute a 6-bit output-only address bus. The bus is configured as an *output* during PF474 DMA operation. At all other times it is in the 3-state *off* condition. These six outputs together with the ten outputs A0-A9 enable the PF474 to generate a 16-bit address during DMA operation which facilitates simple interface to most μP systems. |
| $\overline{CE}$ | 30 | Chip enable *(input - active low)*<br>$\overline{CE}$ must be active to select the PF474 in order to read from or write to its internal memory. It must be held high during DMA. Selection indicates that the address bus is valid at the falling edge, and in the case of a write that the data bus is valid at the rising edge. |
| R/$\overline{W}$ | 31 | Read/Write mode select *(input - read-high/write-low)*<br>This signal is an input and selects read or write mode for accesses to the PF474 internal memory during non-DMA operation. |
| $\overline{MREQ}$ | 18 | Memory Request *(output - active low)*<br>When active, $\overline{MREQ}$ indicates that the PF474 is performing a direct memory access, and that A0-A15 contain valid data. $\overline{MREQ}$ is only active during DMA operation. |
| $\overline{BUSREQ}$ | 37 | Bus Request *(output - active low)*<br>The $\overline{BUSREQ}$ signal is used to request control of the data and address buses in preparation for a PF474 DMA operation. |
| $\overline{BUSACK}$ | 38 | Bus Acknowledge *(input - active low)*<br>This signal must appear in response to $\overline{BUSREQ}$ and informs the PF474 that it has control of the signals necessary for its DMA operation. |
| Φ | 19 | Clock *(input)*<br>A single phase TTL square wave clock meets all PF474 clock requirements. |
| $\overline{RESET}$ | 32 | Master Reset *(input - active low)*<br>$\overline{RESET}$ effects a master clear of the PF474. While $\overline{RESET}$ is active, D0-D7 and A0-A9 are configured as input, A10-A15 are held in their high impedance state, and $\overline{MREQ}$ and $\overline{BUSREQ}$ are held high. The reset function terminates any PF474 operation in progress including DMA transfers. $\overline{RESET}$ must be active for a minimum of 2 clock periods. |
| $\overline{WAIT}$ | 17 | Wait *(input - active low)*<br>$\overline{WAIT}$ is used to lengthen DMA cycles, permitting the use of arbitrarily slow external memories. Its state is sampled and latched at each rising edge of the clock. |

GENERAL INTERFACE CHARACTERISTICS

The PF474 is interfaced much like a 1024x8 static RAM. It has a data and an address bus, a chip enable input and a read/write control input line. In addition, it requires a single phase clock. A reset pin may be connected directly to the reset line in most systems to effect a master clear. A DMA facility exists which permits high speed reads from the system's memory. The use of this facility is entirely optional. Three pins control the DMA operation using a simple and widely used protocol. A single +5 volt power supply is required.

When accessed as memory, the PF474 requires a 10-bit address which is provided at pins A0-A9 (described above). During DMA the PF474 generates a 16 bit address. The low order 10-bits are output on pins A0-A9 and the high order 6-bits are output on pins A10-A15 (described above). Thus, the PF474 uses its address bus in two ways. In standard mode, the low order 10-bits A0-A9 are used as inputs to address a particular location within the device. The high order 6-bits A10-A15 are held in the 3-state *off* condition. This mode exists whenever DMA is not active. In DMA mode, the entire 16-bits A0-A15 are used as outputs to address a location of the external system's memory.

ELECTRICAL SPECIFICATIONS

The electrical specifications on the following page are preliminary and subject to change since the PF474 has not yet been characterized. They should serve as guidelines to aid in preliminary applications analysis.

INTRODUCTION TO θ-PROXIMITY

The simplest mechanical comparison of two strings does nothing but determine whether or not they are identical. Slightly more sophisticated techniques check for alphabetical order, treat capital letters the same as small letters, identify one string as a prefix of the other, etc. The lack of a generally accepted function to compute the similarity between strings that are only *slightly different* has been a major handicap in the development of many applications. In particular, computers are now increasingly being called upon to deal with real-world data. When processing such data it is absolutely essential that a computer cope with the task of recognizing slightly different patterns.

Developed over the last four years by Proximity's staff, the θ-Proximity function is a mathematically elegant definition of similarity that can be computed at high speeds. Identical strings are said to have a θ of 1. Totally dissimilar strings (no characters in common) have a θ of 0. Slightly differing strings have θ values slightly below 1.

The θ function's notion of similarity agrees very well with human intuition; the function 'sees' the same similarities that people do. This property alone makes θ a very exciting programming tool.

PROGRAMMING THE PF474

The figure below is a basic memory map of the 1K byte region occupied by the PF474. There are four main sections of 256 bytes. The Control section contains command, option, status and DMA control registers. The Parameter section is a table containing a one byte entry for each of the possible 256 symbols. The two strings to be compared are stored in the String section; the Ranker section contains the results of the proximity comparisons in an internal ranked list. A program can directly store strings into the String region or use a software invoked DMA process to accomplish this at greater speeds.

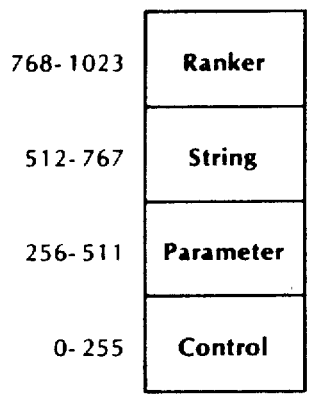

| | |
|---|---|
| 768-1023 | Ranker |
| 512-767 | String |
| 256-511 | Parameter |
| 0-255 | Control |

Absolute Maximum Ratings

| Symbol | Parameter | Limits Min | Limits Max | Units |
|---|---|---|---|---|
| $V_{CC}$ | Supply Voltage | -0.3 | 7.0 | V |
| $V_{IN}$ | Input Voltage | -0.3 | 7.0 | V |
| $T_A$ | Operating Temperature | 0 | 70 | Degrees °C |
| $T_{STG}$ | Storage Temperature | -55 | 125 | Degrees °C |

A.C. Characteristics

| Cycle | Symbol | Parameter | Limits Min | Limits Max | Units |
|---|---|---|---|---|---|
| Clock | f | Frequency of Operation | 2 | 4 | MHz |
| | $T_{CYC}$ | Clock Period (cycle time) | 250 | 500 | nsec |
| | $T_{\Phi r}$ | Clock Rise or Fall | | 25 | nsec |
| | $T_{\Phi p}$ | Clock pulse width | 125 | 250 | nsec |
| Reset | $T_{RSh}$ | RESET hold from rising Φ edge | 2 | | $T_{CYC}$ |
| | $T_{RSs}$ | RESET setup to rising Φ edge | | 90 | nsec |
| | $T_{RSf}$ | Delay to 3-state configuration | | 100 | nsec |
| Read/Write | $T_{CE}$ | Chip enable (active) | 250 | 1500 | nsec |
| | $T_{rdCEi}$ | Chip enable (inactive), read cycle | 100 | | nsec |
| | $T_{wrCEi}$ | Chip enable (inactive), write cycle | 150 | | nsec |
| | $T_{rdwCYC}$ | Read/write cycle time | 450 | | nsec |
| | $T_{aS}$ | Address setup time | 0 | | nsec |
| | $T_{aH}$ | Address hold time | 60 | | nsec |
| | $T_{dS}$ | Data setup time | 60 | | nsec |
| | $T_{dH}$ | Data hold time | 10 | | nsec |
| | $T_{acc}$ | Access from CE | | 250 | nsec |
| | $T_{dH}$ | Data hold | 40 | | nsec |
| | $T_{dF}$ | Data float | | 80 | nsec |
| DMA | $T_{dnMRw}$ | MREQ pulse width | 3 | | $T_{\Phi p}$ |
| | $T_{dmaCYC}$ | Read cycle time | 4. | | $T_{\Phi p}$ |
| | $T_{dnAh}$ | Address hold | 3 | | $T_{\Phi p}$ |
| | $T_{dnMRt}$ | MREQ transition | | 30 | nsec |
| | $T_{dnAs}$ | Address setup | 20 | | nsec |

The CONTROL Section

The control section consists of five registers. It occupies addresses 0-255 although only a few addresses are actually assigned at this time. Any unused location should be considered reserved for possible future use. The STATUS, OPTIONS, COMMAND and DMA registers are accessible during all phases of a proximity computation and ranking. The ACPOS resister is accessible when SBUSY is reset, as is explained below.

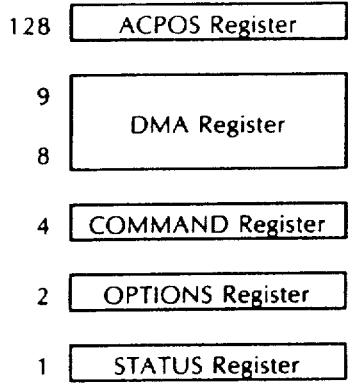

STATUS is a read-only register located at address 1. By examining this register a program can determine if there is a proximity computation or ranking in progress.

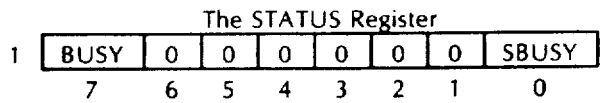

The low order bit SBUSY when set indicates that a Proximity computation is in progress. The String and Parameter sections of the PF474 cannot be accessed while SBUSY is set. The high order bit BUSY when set indicates that either a proximity computation or a ranking is in progress. The Ranker section of the PF474 cannot be accessed during a ranking operation. Unused bits are returned as zero. The table below summarizes the 3 possible values of this register.

| Register Contents (Binary) | PF474 Status | Accessibility | | |
|---|---|---|---|---|
| | | String | Parameter | Ranker |
| 00000000 | Idle | Yes | Yes | Yes |
| 10000001 | Proximity Computer busy | No | No | No |
| 10000000 | Ranker busy | Yes | Yes | No |

The significance of the 10000000 value is that the program may initiate a new proximity computation even though the PF474 is still ranking the last one.

We now turn to the OPTIONS register. To understand this register and the DMA process we must first examine the alphabet of the PF474.

The PF474 deals with one byte symbols of which there are of course 256. The table below summarizes the special meanings attached to some of these symbols:

| Binary Symbol Value | Name | Description |
|---|---|---|
| 00000000 | NULL | Used to terminate PF474 strings. This symbol is therefore not available for other uses. |
| 00000001 | FILL | During DMA this symbol is always deleted, i.e. read from external RAM but ignored. It has no other special attributes. |
| 10xxxyyy | $GA^{xxx}_{yyy}$ | These are the 64 GA (which stands for *group A*) symbols. They are treated specially only during DMA and then only if the OPTIONS register so indicates. When $xxx=yyy$ we call the resulting symbol $SA_{xxx}$. For example, when $xxx=yyy=101$ we have $SA_5$. SA stands for *state symbol/A-group*. When $xxx \neq yyy$ we call the resulting symbol $TA^{xxx}_{yyy}$. TA stands for *transition symbol/A-group*. |
| 11xxxyyy | $GB^{xxx}_{yyy}$ | These are the 64 GB (which stands for *group B*) symbols. They are treated specially only during DMA and then only if the OPTIONS register so indicates. When $xxx=yyy$ we call the resulting symbol $SB_{xxx}$. For example, when $xxx=yyy=101$ we have $SB_5$. SB stands for *state symbol/B-group*. When $xxx \neq yyy$ we call the resulting symbol $TB^{xxx}_{yyy}$. TB stands for *transition symbol/B-group*. |

The purpose of the options register is the specification of several parameters for the DMA process. It is a read/write register with the following layout:

The OPTIONS Register

2 | CMDA | SEL | ENGB | ENGA | DELB | DELA | DELDUPB | DELDUPA |
|---|---|---|---|---|---|---|---|
| 7 | 6 | 5 | 4 | 3 | 2 | 1 | 0 |

The upper bit CMDA is used to select an automatic sequence designed to allow a very tight software loop to control the PF474. When a DMA operation is initiated (See the DMA registers) while CMDA is set, the following sequence of events occurs:

- If SBUSY is set, the PF474 waits until it is reset

- The string position register is cleared (Same as writing to the ACPOS register)

- A DMA operation is performed

- A proximity computation/ranking is initiated (Same as the GO signal to the COMMAND register)

By using CMDA, a program can ignore the status of the PF474 and just initiate operations as quickly as it can. It is only after the final operation that the program needs to check the STATUS register.

The SEL bit of the OPTIONS register is used to determine whether String #1 or String #2 will receive the DMA data. Zero selects the first string and one selects the second.

The remaining bits: ENGA/B, DELA/B, DELDUPA/B are used to specify what editing of the GA and GB symbols is to be performed during DMA. We will describe only the behavior of ENGA, DELA and DELDUPA in detail, since their *B* counterparts behave analogously.

If DELA is set then all SA symbols are filtered out (stripped/ deleted) during the DMA operation. In the example below there are three SA symbols which are deleted. There is also a FILL symbol which is deleted.

For example, if the OPTIONS register contains xx000100:

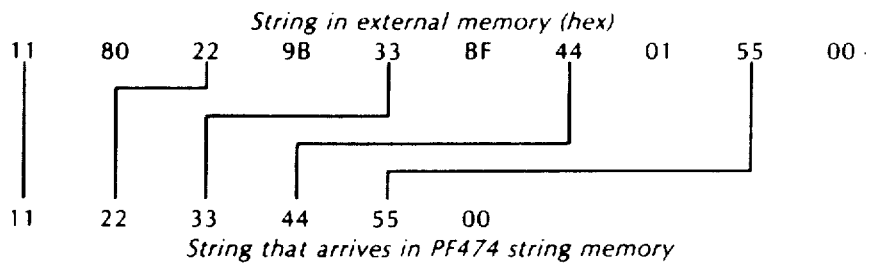
*String that arrives in PF474 string memory*

If DELDUPA is set then all repeated (duplicated) SA symbols are filtered out (stripped/ deleted) during the DMA operation.

For example, if the OPTIONS register contains xx000001:

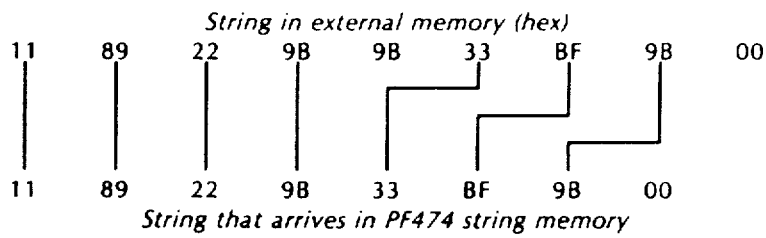
*String that arrives in PF474 string memory*

If ENGA is set then the PF474 will generate TA symbols during DMA as SA symbols are encountered. For example, suppose the options register contains 00010000:

Input: $SA_1\ SA_2\ SA_3\ SA_3\ SA_4$ NULL

Result: $SA_1\ TA_0^1\ SA_2\ TA_1^2\ SA_3\ TA_2^3\ SA_3\ SA_4\ TA_3^4$ NULL

The example above in hex is:

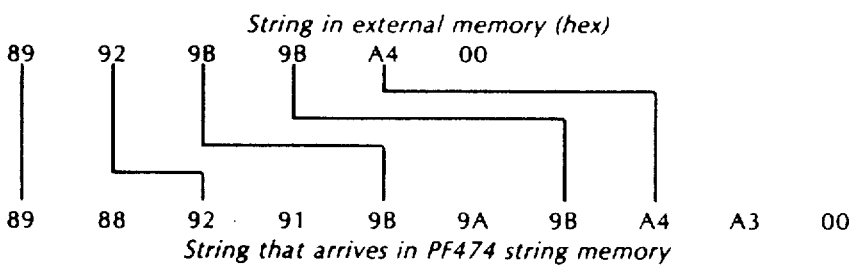
*String that arrives in PF474 string memory*

ENGA functions independently of DELA and DELDUPA. Also DELA overrides DELDUPA. It is worthwhile to note that the use of ENGA/B may lengthen a string as it is transferred from external memory to the PF474. It is the user's responsibility to see that this never results in a string of length greater than 127 (excluding the NULL terminator).

The COMMAND Register

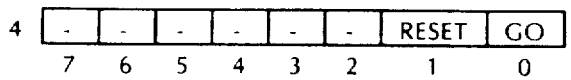

The COMMAND register is used to start a proximity computation/ranking or to cause a software reset. It is a write-only register. The GO bit is used to start the PF474 in cases where CMDA is not used (see the OPTIONS register). The RESET bit is used to perform a software reset (same function as hardware reset pin). Specifying GO and RESET is a programming error. RESET aborts any computation in progress and returns the PF474 to an idle state within three clock cycles. In many applications the COMMAND register may be totally unused since the PF474 may be reset at power-on time and the CMDA bit may be set in the OPTIONS register.

The DMA Register

| | 7 | 6 | 5 | 4 | 3 | 2 | 1 | 0 |
|---|---|---|---|---|---|---|---|---|
| 9 | A15 | A14 | A13 | A12 | A11 | A10 | A9 | A8 |
| 8 | A7 | A6 | A5 | A4 | A3 | A2 | A1 | A0 |

The DMA register occupies locations 8-9 and holds a 16 bit address. The PF474 maintains an internal modified flag for each of its two bytes. When both are set indicating that the program has written a full 16 bits DMA is automatically invoked. After DMA the flags are reset. After a DMA operation reading this register will provide the address immediately following the NULL that terminated DMA. Under normal circumstances at most 128 characters are read from external memory. Starting DMA on a string of longer length is considered a programming error. On some systems this increased DMA length (in time) might even interfere with the refresh of main memory.

The ACPOS Register

| | 7 | 6 | 5 | 4 | 3 | 2 | 1 | 0 |
|---|---|---|---|---|---|---|---|---|
| 128 | - | - | - | - | - | - | - | CLEAR |

The PF474 contains an internal register called POS which is used during DMA as a position index. Zero corresponds to the first string position and so on. Writing a one (actually anything) to ACPOS zeros the POS register. The ACPOS register is not of any use if the CMDA option of the OPTIONS register is used. To illustrate its use, suppose that the string *pic* is stored in external memory at address 100 and the string *tur* is stored at 200, and the string *es* is stored at 300. Then the following register operations would be needed to load the string *pictures* into PF474 string memory:

- Wait until SBUSY in the STATUS register is zero
- Write 1 to ACPOS
- Write 100 to the DMA register
- Write 200 to the DMA register
- Write 300 to the DMA register Note that the ACPOS register must not be written to if SBUSY is set. ACPOS is a write-only register.

The PARAMETER Section

This section occupies addresses 256-511 and consists of 256 *Symbol Parameter Control Bytes* (SPCB's). Each SPCB controls the manner in which the PF474 processes a particular symbol. For example, the thirtieth SPCB has address 256+30=286 and affects processing of the symbol having decimal value 30. Thus it is possible to individually specify processing parameters for each symbol used in a given application. It is worth noting that according to the scheme above, the first SPCB would control processing of the NULL symbol. But NULL is used to mark the end of strings and is therefore not a usable data symbol. Therefore the first SPCB is essentially unused and writing values into it will have no affect whatever on the PF474's processing. This byte may be used for other purposes. The contents of this section are not predictable at power up time and therefore should be initialized before the PF474 is used. However there is no need to load SPCBs corresponding to symbols that are not used in a given application. Resetting the PF474 has no effect on this section. There are restrictions on setting an SPCB that we summarize later. Violation of these is considered to be a programming error. In the event of such an error, the proximity computation may produce an erroneous value but this is the only effect of such errors. Each SPCB is divided into three separate bit-fields as shown below:

SPCB Layout

| COMPENSATION | | | BIAS | | WEIGHT | | |
|---|---|---|---|---|---|---|---|
| 7 | 6 | 5 | 4 | 3 | 2 | 1 | 0 |

WEIGHT is a three bit unsigned binary field used to adjust the weight (intuitively, importance) of a symbol.

| Bit-2 | Bit-1 | Bit-0 | WEIGHT |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

Smaller values correspond to less weight. Therefore seven is the maximum weight. A weight of zero causes the PF474 to virtually ignore the symbol. However even weight zero symbols occupy space in a string and therefore affect to some extent the proximity computation. To avoid an internal arithmetic overflow condition within the PF474 a rule must be obeyed when setting the weight field. This is covered in more detail later. This rule only restricts the weight field when string length exceeds 67 characters (not including the NULL terminator). In other words, if an application will never involve strings of length greater than 67, then weights may be used freely.

BIAS is a two bit signed two's complement binary field that may be used to adjust the positional sensitivity of the proximity computation to non-corresponding (missing or extra) symbols. Negative bias values increase sensitivity towards the beginning of the string, reducing linearly with position. Positive bias values increase sensitivity towards the end of the string, reducing linearly with position. A bias of zero is the neutral setting. There is a simple restriction on the setting of bias; that the sum of bias and weight must fall in the range 0-7. For example, if bias is set to -1, the range of legal weights is 1-7.

| Bit-4 | Bit-3 | BIAS |
|---|---|---|
| 1 | 0 | -2 |
| 1 | 1 | -1 |
| 0 | 0 | 0 |
| 0 | 1 | 1 |

COMPENSATION is a three bit unsigned binary field that is used to adjust overall sensitivity of the PF474 to non-corresponding symbols. When set to zero the PF474 is least tolerant of non-corresponding symbols. In this case the result of comparing a with b would be zero. Raising compensation increases tolerance. The extreme case occurs when compensation is equal to weight. For example, if this extreme case occurs for symbols 'a' as well as 'b' then the result of comparing a with b would be unity! Compensation is restricted in that it should never be greater than weight or greater than the sum of weight and bias. It is useful to state generally that low compensation values place a high weight on occurence and less weight on position while high compensation values place a high weight on position and a less weight on occurence.

| Bit-7 | Bit-6 | Bit-5 | COMPENSATION |
|-------|-------|-------|--------------|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

Setting all SPCBs to 1 is perhaps the most basic setting (and a good one to try when getting started). Adjusting the SPCBs is a powerful method for adjusting the proximity computation. In some cases this adjustment will occur during a product's design cycle and then be frozen (or static) for a given application during product operation. More sophisticated applications may require dynamic adjustment of the SPCBs in real-time. Having covered the basics of the SPCB we now return to the issue of weight and bias selection vis-a-vis the PF474's arithmetic overflow design restriction. We begin by defining the *total weight* (TW) of a string:

$$TW = \sum_{i=1}^{L} iB_i + W_i(L+1)$$

In the equation above $B_i$ refers to the bias of the $i$th symbol in the string, $W_i$ refers to the weight of the $i$th symbol and $L$ refers to the length of the string. The overflow condition is just:

$$TW < 32,768$$

But by making some assumptions we can reduce this to a more usable table of design guidelines.

If we denote by $W_{max}$ the maximum weight we intend to use in an application and if we assume that it would be possible for the entire string to consist of symbols of this weight, then we have:

$$TW = W_{max} L(L+1) + \sum_{i=1}^{L} iB_i$$

If we denote by $B_{max}$ the maximum bias we intend to use in an application and if we assume that it would be possible for the entire string to consist of symbols with this bias, then we have:

$$TW = L(L+1)(W_{max} + B_{max}/2)$$

We now use this relation to provide a quick reference table:

|  |  | \multicolumn{8}{c}{$W_{max}$} |
|--|--|-----|-----|-----|-----|-----|-----|-----|-----|
|  |  | 0 | 1 | 2 | 3 | 4 | 5 | 6 | 7 |
| $B_{max}$ | 1 | 127 | 127 | 113 | 96 | 84 | 76 | 70 | - |
|  | 0 | 127 | 127 | 127 | 104 | 90 | 80 | 73 | 67 |
|  | -1 | - | 127 | 127 | 113 | 96 | 84 | 76 | 70 |
|  | -2 | - | - | 127 | 127 | 104 | 90 | 80 | 73 |

For example, if the maximum bias value used in a given application is zero and the maximum weight is 6, then the under all circumstances strings of length 73 or less are legal.

This is a brief summary of the PF474 SPCB value restrictions:

- BIAS + WEIGHT should always be in the range 0-7

- COMPENSATION must be no greater than WEIGHT or WEIGHT + BIAS

- The *total weight* (defined above) must be less than 32,768

The STRINGS Section

This section holds the two strings to be compared. It is basically 256 bytes of RAM divided into two 128 byte sections. The strings are NULL terminated. They may be written here under program control, treating the PF474 as just another memory region, or they may be loaded via DMA. The first byte of each string is at the lowest address in the region. Because of the NULL terminator, the effective usable string length is 127 instead of 128.

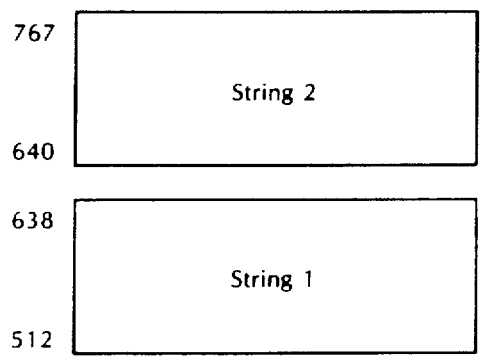

WARNING: If there is no NULL terminator, the PF474 will not behave properly.

Also, the PF474 recognizes *only* the most recent NULL written as the end of string. Thus, the following sequence of program writes is improper:

1. Write 'c' to location 512
2. Write 'a' to location 513
3. Write 't' to location 514
4. Write '0' to location 515
5. Write '0' to location 516

But the following sequence does not constitute a programming error:

1. Write 'c' to location 512
2. Write 'a' to location 513
3. Write 't' to location 514
4. Write '0' to location 516
5. Write '0' to location 515

This sequence is O.K. because the PF474 remembers location 515 as the last location to which a NULL was written, which is the where we wanted the string terminated.

The RANKER Section

The primary purpose of the ranker is to maintain up to 16 slots corresponding to the *best matches* that the PF474 has encountered. It occupies addresses 768-1023 and consists of two major subsections of 128 bytes each as shown below:

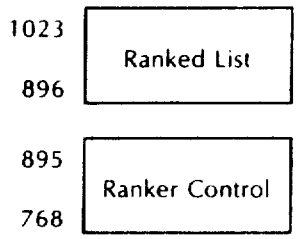

```
1023 ┌──────────────┐
     │ Ranked List  │
 896 └──────────────┘

895 ┌──────────────┐
     │Ranker Control│
 768 └──────────────┘
```

The Ranked List contains the slots referred to above and the Ranker Control consists of control and status registers. Two pieces of information are maintained in a slot; a proximity value and an IRN (Internal Record Number). You will note that the strings which were compared to produce the proximity value are NOT stored in the ranker slot. This is due to both speed and space constraints. Instead an IRN is stored in their place. Thus IRNs should in most cases be assigned so as to uniquely identify a particular computation. For example, the IRN might be nothing more than a record number in a database.

We begin by examining the Ranker Control portion. The map below details its layout:

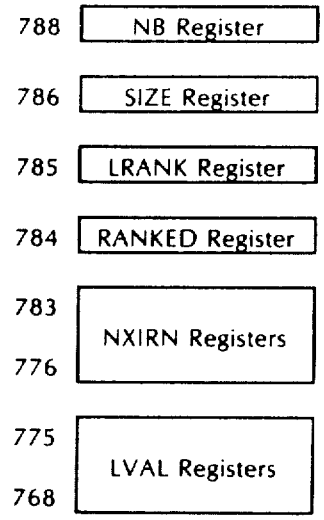

Note that all locations are not used in the map above. Any unused location should be considered reserved for possible future use.

The LVAL registers together contain the last 32-bit proximity value computed by the PF474. There are eight LVAL registers occupying locations 768 through 775. Each is read only and should not be written to. LVAL stands for *Last Value*. The purpose of these registers is to permit a program to determine the value resulting from the last proximity computation performed (only if the last word examined ranked). This register is is not used in most applications since the proximity values of most interest are those which rank and therefore are stored in the ranked list. Building a 32-bit proximity value from the contents of these registers is less than straightforward since only one nibble (4-bits) is obtained from reading a single register. Calling the 32-bit proximity value $P$ with bits 0-31 (0 is low order) we have the following layout:

LVAL Layout

|  | 7 | 6 | 5 | 4 | 3 | 2 | 1 | 0 |
|---|---|---|---|---|---|---|---|---|
| 775 | 0 | 0 | 0 | 0 | $P_3$ | $P_2$ | $P_1$ | $P_0$ |
| 774 | 0 | 0 | 0 | 0 | $P_7$ | $P_6$ | $P_5$ | $P_4$ |
| 773 | 0 | 0 | 0 | 0 | $P_{11}$ | $P_{10}$ | $P_9$ | $P_8$ |
| 772 | 0 | 0 | 0 | 0 | $P_{15}$ | $P_{14}$ | $P_{13}$ | $P_{12}$ |
| 771 | 0 | 0 | 0 | 0 | $P_{19}$ | $P_{18}$ | $P_{17}$ | $P_{16}$ |
| 770 | 0 | 0 | 0 | 0 | $P_{23}$ | $P_{22}$ | $P_{21}$ | $P_{20}$ |
| 769 | 0 | 0 | 0 | 0 | $P_{27}$ | $P_{26}$ | $P_{25}$ | $P_{24}$ |
| 768 | 0 | 0 | 0 | 0 | $P_{31}$ | $P_{30}$ | $P_{29}$ | $P_{28}$ |

The NXIRN registers together contain the next 32-bit IRN to be used by the PF474. There are eight NXIRN registers occupying locations 776 through 783. Each is a read/write register. NXIRN stands for *Next Internal Record Number*. Just before a search or perhaps a phase of a search begins, the program writes a 32-bit value into these registers, one nibble at a time as indicated by the table below. After each proximity computation is performed the ranker circuits of the PF474 attempt to place it in the ranked list. If the record is ranked, then the value of the NXIRN register is copied into the proper ranker slot along with the proximity value. Whether or not the computation ranks, but after the attempt has been made, the NXIRN value is incremented as a 32-bit unsigned binary quantity. Thus NXIRN is a counter which may be used to uniquely identify items in the ranked list. Calling the 32-bit IRN $N$ with bits 0-31 (0 is low order) we have the following layout:

NXIRN Layout

| | 7 | 6 | 5 | 4 | 3 | 2 | 1 | 0 |
|---|---|---|---|---|---|---|---|---|
| 783 | 0 | 0 | 0 | 0 | $N_3$ | $N_2$ | $N_1$ | $N_0$ |
| 782 | 0 | 0 | 0 | 0 | $N_7$ | $N_6$ | $N_5$ | $N_4$ |
| 781 | 0 | 0 | 0 | 0 | $N_{11}$ | $N_{10}$ | $N_9$ | $N_8$ |
| 780 | 0 | 0 | 0 | 0 | $N_{15}$ | $N_{14}$ | $N_{13}$ | $N_{12}$ |
| 779 | 0 | 0 | 0 | 0 | $N_{19}$ | $N_{18}$ | $N_{17}$ | $N_{16}$ |
| 778 | 0 | 0 | 0 | 0 | $N_{23}$ | $N_{22}$ | $N_{21}$ | $N_{20}$ |
| 777 | 0 | 0 | 0 | 0 | $N_{27}$ | $N_{26}$ | $N_{25}$ | $N_{24}$ |
| 776 | 0 | 0 | 0 | 0 | $N_{31}$ | $N_{30}$ | $N_{29}$ | $N_{28}$ |

The SIZE register is used to set the size of the PF474's ranked list. It is a read/write register located at location 786. Only the lower four bits are used:

SIZE Register

| | 7 | 6 | 5 | 4 | 3 | 2 | 1 | 0 |
|---|---|---|---|---|---|---|---|---|
| 786 | 0 | 0 | 0 | 0 | $S_3$ | $S_2$ | $S_1$ | $S_0$ |

The size of the ranked list can be set to any value from 1 to 16, by writing the desired size minus one into the SIZE register. For example, to set the size to 11 (decimal) one writes 10 (decimal) which is 00001010 (binary). In actuality the upper four bits are ignored during a write but are returned as zero during a read operation. Normally the SIZE register is just set to its maximum value of 15. Lower values may slightly improve the PF474's overall throughput but in general do not do so significantly. However, if the user code examines the RANKED and LRANK registers after each computation, then a smaller ranked list might significantly improve performance by reducing the frequency with which computations rank.

When read the LRANK register provides the position number in the ranked list that received the last ranked record. If a record does not rank the LRANK register is unchanged (see the RANKED register below). It is normally used as a read-only register but can be written to. The upper four bits are returned as zero.

LRANK Register

| | 7 | 6 | 5 | 4 | 3 | 2 | 1 | 0 |
|---|---|---|---|---|---|---|---|---|
| 785 | 0 | 0 | 0 | 0 | $P_3$ | $P_2$ | $P_1$ | $P_0$ |

When read the RANKED register returns high values (00001111 binary) if the last proximity computation ranked and returns zero otherwise.

RANKED Register

If last record ranked:

| | 7 | 6 | 5 | 4 | 3 | 2 | 1 | 0 |
|---|---|---|---|---|---|---|---|---|
| 784 | 0 | 0 | 0 | 0 | 1 | 1 | 1 | 1 |

If last record did not rank:

| | 7 | 6 | 5 | 4 | 3 | 2 | 1 | 0 |
|---|---|---|---|---|---|---|---|---|
| 784 | 0 | 0 | 0 | 0 | 0 | 0 | 0 | 0 |

NB is a write-only register located at address 788 which establishes the ranker's general mode as normal or *next best*. In normal mode the ranker selects the best matches it encounters and ranks them. Next-best mode is used to effectively extend the size of the ranked list by locating up to 15 next best matches. Typically the first time the PF474 processes a list of records it is used to locate the best 16. Then if a longer list is desired, the application program copies the IRN and the Proximity value ranked lowest during the first pass into the highest ranked slot, then writes a one into the NB register, then uses the PF474 to re-processes the record list. What remains is the next-best 15 matches. This process can be repeated to get the next next-best 15 and so on. In our example we assumed the SIZE register contained 15 (selecting a ranked list size of 16) but next-best processing will work for any ranked list length above 1. It is very important to note that next-best processing will function properly only if the records are processed in order of increasing IRN's. It should also be noted that the SIZE register can be set differently during the first pass and subsequent passes. For example, the SIZE register could be set to say 5 for the first pass and to 15 for the second. The NB register is not affected by a RESET and, therefore, must be initialized before the first proximity computation is initiated.

When writing to the NB register only the lower bit is important. '1' selects next-best mode and '0' selects normal mode.

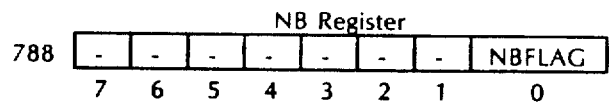

We now turn to the Ranked List section of the ranker region. It occupies locations 896 through 1023 (128 bytes) and consists of 16 slots of 8 bytes. The lowest ranked slot is the first slot, occupying addresses 896 through 903. The highest ranked slot is the one corresponding to the value of the SIZE register. Thus, if the SIZE register contained 15, the highest ranked slot would be slot 15 occupying addresses 1016 through 1023.

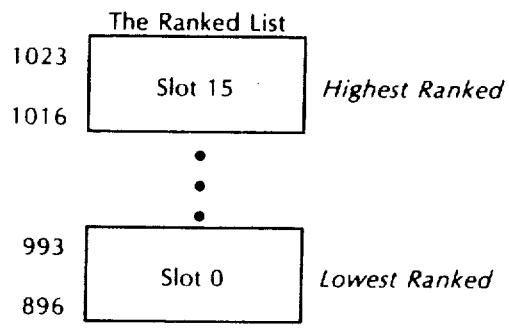

Each slot holds a 32-bit proximity value as well as a 32-bit IRN. Each of these occupies 4 bytes with the low order byte in low memory. The diagram below details this layout calling the 32-bit proximity value $P$ with bits 0-31 (0 is low order) and calling the 32-bit IRN $I$ with bits 0-31 (0 is low order):

Ranker Slot Layout

|       | 7 | 6 | 5 | 4 | 3 | 2 | 1 | 0 |
|-------|---|---|---|---|---|---|---|---|
| Byte7 | $I_{31}$ | $I_{30}$ | $I_{29}$ | $I_{28}$ | $I_{27}$ | $I_{26}$ | $I_{25}$ | $I_{24}$ |
| Byte6 | $I_{23}$ | $I_{22}$ | $I_{21}$ | $I_{20}$ | $I_{19}$ | $I_{18}$ | $I_{17}$ | $I_{16}$ |
| Byte5 | $I_{15}$ | $I_{14}$ | $I_{13}$ | $I_{12}$ | $I_{11}$ | $I_{10}$ | $I_{9}$ | $I_{8}$ |
| Byte4 | $I_{7}$ | $I_{6}$ | $I_{5}$ | $I_{4}$ | $I_{3}$ | $I_{2}$ | $I_{1}$ | $I_{0}$ |
| Byte3 | $P_{31}$ | $P_{30}$ | $P_{29}$ | $P_{28}$ | $P_{27}$ | $P_{26}$ | $P_{25}$ | $P_{24}$ |
| Byte2 | $P_{23}$ | $P_{22}$ | $P_{21}$ | $P_{20}$ | $P_{19}$ | $P_{18}$ | $P_{17}$ | $P_{16}$ |
| Byte1 | $P_{15}$ | $P_{14}$ | $P_{13}$ | $P_{12}$ | $P_{11}$ | $P_{10}$ | $P_{9}$ | $P_{8}$ |
| Byte0 | $P_{7}$ | $P_{6}$ | $P_{5}$ | $P_{4}$ | $P_{3}$ | $P_{2}$ | $P_{1}$ | $P_{0}$ |

The ranker memory MUST be initialized after power-up and before the first comparison is initiated. In addition it should be initialized after a software initiated reset except in cases where the status register was examined and revealed that the ranker was not busy. Initialization must minimally consist of writing at least one byte of data to each slot but normally consists of setting the entire list to zero.

PF474 AC Timings
This page summarizes the basic PF474 operating sequences.
Read Cycle
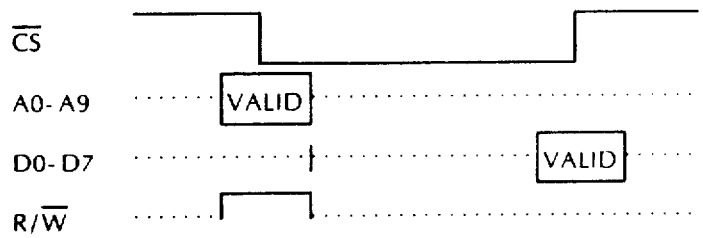
Write Cycle
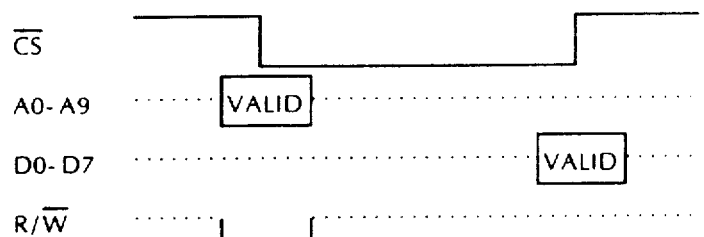
DMA Memory Read Cycle Timing *(No wait states)*
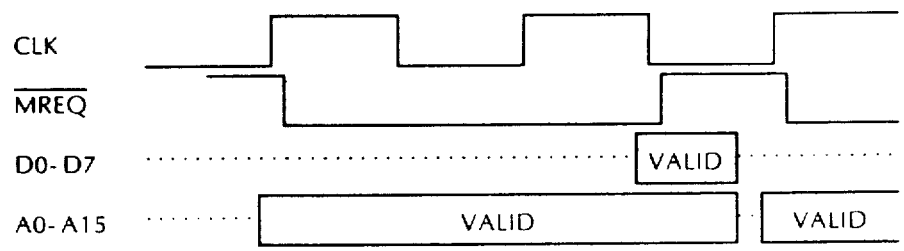
DMA Memory Read Cycle Timing *(With wait states)*
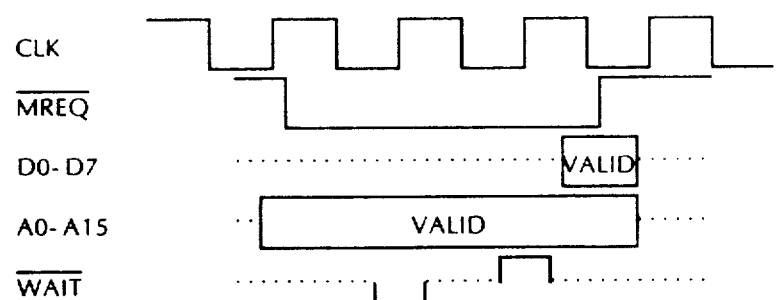
DMA Capture *(Follows write to DMA register)*
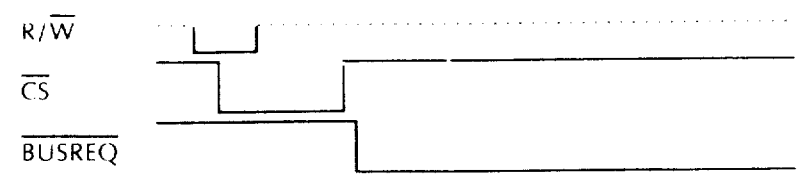

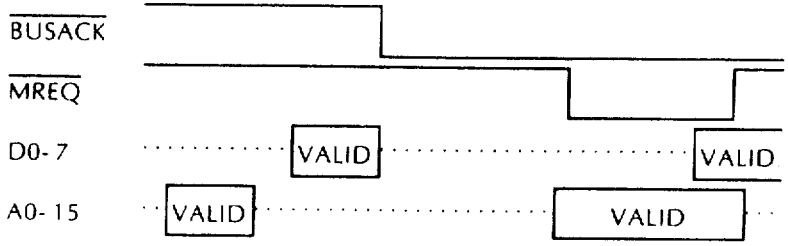

RESET

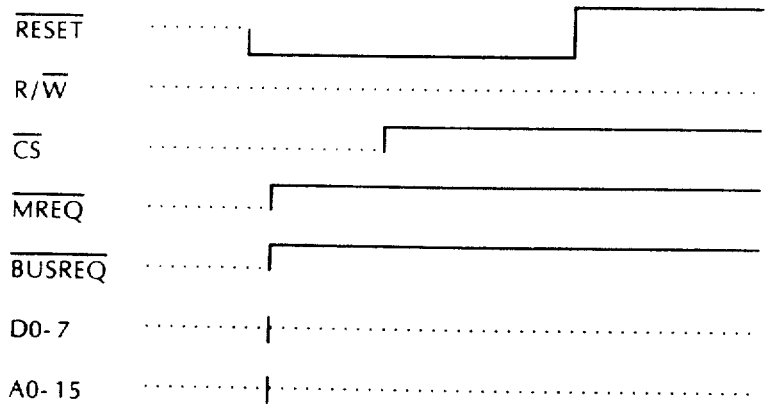

APPENDIX 4

S-100 BUS INTERFACE WITH PF474

The following is an example of an electrical interface of the PF474 with the S-100 Bus, a widely used system for computer interconnections. The circuit described below supports appropriate communication between the PF474, a 2K-word by 8-bit RAM, and any of the widely used computer systems which are compatible with the S-100 Bus.

For details on the S-100 Bus, see The S-100 Bus Handbook by Dave Bursky, Hayden Book Company, Rochelle Park, New Jersey, 1980. For details of the TTL LS parts referred to below, see Signetics Logic-TTL Data Manual 1978. For details on the RAM used, see the '80 Semiconductor Data Book Hitachi IC Memories.

FIG. A4-1 shows the overall plan of the S-100 Bus interface to the PF474. The S-100 bus itself, 237, is expanded in FIG. A4-2 to show the bus signals used in this interface. S-100 pins 79, 80, 81, 31, 30, 29, 82, 83, 84, 34, 37, 87, 33, 85, 86, 32 are Address lines 0-15 respectively (200). Signal 207 indicates Output Status (pin 45); signal 208 is the Write Strobe (pin 77); signal 209 indicates Write Cycle Status (pin 97); signal 210 indicates Memory Read Status (pin 47); signal 211 is Power-On Clear (pin 99); signal 212 is Reset (pin 75); and signal 213 is Hold Acknowledge (pin 26), indicating the relinquishing of the bus by the CPU. These signals are used by the control logic 206 as described below. Signal 214 is Hold (pin 74), an input to the S-100 bus used to request bus control for DMA. S-100 pins 36, 35, 88, 89, 38, 39, 40, 90 are Data Out lines 0-7 respectively, 232. S-100 pins 95, 94, 41, 42, 91, 92, 93, 43 are Data In lines 0-7 respectively, 233.

The address for any processor operation travels over the S-100 Address lines 200 and is stored in the address latch 201. As FIG. A4-3 shows, this latch consists of two SN74LS373s 238 and 239, controlled by lines 215 and 216 as described below. The stored address is delivered through the interface on the address bus 202. Address lines 12-15 203 are used only by the control logic to drive chip select lines. Address line 11 203A is also used by the chip select logic, and may be driven by the PF474 228 during direct memory access (DMA) operation. Address lines 0-11 204 access the PF474 228 (FIG. A4-5), and may also be driven by the PF474 during DMA. Address lines 0-10 205 access the RAM 231 (FIG. A4-6).

Three modes of data flow are supported. Data written to the board enters on the S-100 Data Out lines 232 and drives the tri-state buffers 234 (a SN74LS244, FIG. A4-4) which are enabled by line 227. When this line is asserted, data being written enters the data bus 236 and is accepted by either the PF474 228 or the RAM 231.

During read operations the other set of tri-state buffers 235 (another SN74LS244, FIG. A4-4) is enabled by line 226, and data from the data bus 236 is transferred to the S-100 Data In lines 233.

During DMA neither set of buffers is enabled and data flows from the RAM 231 to the PF474 228 on the data bus 236.

The PF474 228 is the subject of this document, with connections shown in FIG. A4-5. Bus Request line 220 and Memory Request line 221 are outputs of the PF474. These signals control DMA operation. The signals Reset 222, Bus Acknowledge 223, Chip Enable 224, and Read/Write 225 are inputs generated by the control logic as described below. The clock signal 229 is generated by a 4 megahertz crystal oscillator clock 230 by a well-known method.

The RAM 231 is a Hitachi HM6116P-3 2048-word by 8-bit Static Ram, with connections shown in FIG. A4-6. The signals Write Enable 217, Chip Select 218, and Output Enable 219 are generated by the control logic as described below.

The control logic 206 is described in FIG. A4-7 and FIG. A4-8. FIG. A4-7 shows the logic generating the Chip Select signals 218 and 224 for the PF474 228 and the RAM 231 respectively. Address signals 12-15 203 and their inversions generated by inverters 242-245 are the eight inputs to a jumper platform 246. Four jumpers are assumed connected by the user from four of these eight lines to the four output lines, selecting a 4K address space for this board. The four-input OR 247 accepts these lines as inputs and generates a signal indicating a valid address for this board.

The three inputs of NOR 255 represent the three valid conditions for asserting any chip enable signal, any one of which is sufficient, which are as follows. The first is a read operation: a valid address signal from OR 247 is combined with the S-100 Memory Read Status signal 210 (which is inverted by Schmidt Trigger 248) in the two-input NOR 253 to generate the signal indicating a valid read.

The second is a write operation: the three-input NOR 254 combines the valid address signal from OR 247 with the S-100 output status signal 207 and the S-100 write cycle status signal 209. 207 and 209 are first protected against noise by Schmidt Triggers 249 and 250 respectively, and then restored by inverters 251 and 252 respectively.

The third cause of a valid chip select signal is a DMA operation: the Bus Acknowledge signal 223, generated elsewhere, and the Memory Request signal 221 from the PF474 228 are combined in two-input NOR 259. Thus three-input NOR 255 generates a Master Chip Select signal 261 indicating that one of the two Chip Select signals 218 or 224 should be generated. Address line 11 203A determines which chip select becomes asserted. If 203A is low, OR 256 combines 203A with the active low Master Chip Select 261 to assert (low) the RAM Chip Select signal 218. If 203A is high, its inversion through inverter 258 is combined in OR 257 with Master Chip Select 261 to assert (low) the PF474 chip select signal 224.

Note that signal 225, the PF474 Read/Write control, is produced as a by-product. This signal is the same as S-100 write cycle status signal 209, protected against noise by Schmidt Trigger 250 and restored by inverter 252. 240, 241, 260, and 261 are signals used elsewhere in controlling logic, as described below.

FIG. A4-8 shows the remaining control logic. The PF474 Bus Acknowledge signal 223, also used as an input to the chip select logic above, is the inverse of the S-100 Hold Acknowledge signal 213, generated by Schmidt Trigger 262.

The S-100 Hold signal 214 is the PF474 Bus Request signal 220 slightly delayed by inverters 263 and 264. The inverted version of Bus Request 220 is used to disable the outputs of the address latch 201 by line 215.

The S-100 Reset 212 and Power-On Clear 211 are combined in AND 265 to produce the PF474 Reset signal 222.

The inverted version 241 of the S-100 write cycle status signal 209 is combined with the Ram Chip Select line 218 to produce the Ram Output Enable signal 219 (Both 241 and 218 are produced in FIG. A4-7).

The Ram Write Enable signal 217 is the same as the S-100 Write Strobe 208, protected against noise by Schmidt Trigger 268 and restored by inverter 267.

The address latch enable signal 216 is generated from 260, 240 and 241 by NAND 269 and NOR 270. 260, 240 and 241 are generated in FIG. A4-7, and represent the inverses of the S-100 signals Memory Read Status 210, Output Status 207, and Write Cycle Status 209 respectively.

The enable 226 of read buffers 235 is the logical OR 271 of Master Chip Select 261 with 241, which is the inverted S-100 Write Cycle Status signal 209. The enable 227 of the write buffers 234 is produced by the logical NAND 272 of PF474 Bus Acknowledge signal 223 (generated above as the inverse of S-100 Hold Acknowledge signal 213) with the enable 226 of the read buffers 235.

We claim:

1. An indicia string comparator circuit for providing a numeric measurement of the degree of indicia string similarity between a record indicia string and a query indicia string, comprising;
   first means including an output for presenting record string indicia and query string indicia alternately and for presenting control information at said output, said first means connected to a digital source of record string indicia and query string indicia,
   read/write memory operably connected to a second means,
   said second means having an input operably connected to said output of said first means, said second means having an output, said second means for reading from and writing to said read/write memory and for indicating at said output of said second means common portions of the indicia strings by generating control signals based on indicia counts, and
   third means includes an input and output, said input of said third means connected to said output of said second means, said third means for computing a numeric measurement of the weight of the common portions of the indicia string, and for presenting a digital signal representing said numeric measurement at said output of said third means.

2. An indicia string comparator circuit as set forth in claim 1, wherein;
   said indicia string comparator circuit including said first means, said read/write memory, said second means, and said third means for computation in a time span generally proportional to the average length of said indicia strings.

3. An indicia string comparator circuit as set forth in claims 1 or 2, wherein
   said indicia string comparator circuit provides the degree of indicia string similarity which approximates the formula;

$$S(w,v) = \frac{L(L+1) - (n(a,w,i),n(a,v,i)) + (n(a,w,i),n(a,v,i))}{L(L+1)}$$

4. An indicia string comparator circuit as set forth in claim 1, wherein
   said first means including parameter means having an input connected to said first means and an output,
   said parameter means for presenting at said output of said parameter means the indicia's weights,
   said second means for presenting at said output of said second means the indicia weights obtained from said first means.

5. An indicia string comparator circuit as set forth in claim 4, wherein
   said parameter means for presenting the indicia's weight and the indicia's compensation values,
   said second means for presenting the indicia weights and compensation values obtained from said first means at said output of said second means.

6. An indicia string comparator circuit as set forth in claim 4, wherein;
   said first means includes string control means and said parameter means is a parameter generation means,
   said string control means including an output, said string control means for presenting record string indicia and query string indicia alternately and presenting control information,
   said parameter generation means connected to said output of said string control means, and said parameter generation means for presenting an indicia weight value for the indicia input from said string control means and for presenting all the inputs from said string control means, said output of said parameter generation means is said output of said first means.

7. An indicia string comparator circuit as set forth in claim 6, wherein:
   said parameter generation means for presenting an indicia weight and an indicia compensation value;
   said second means for presenting the indicia weights and compensation values obtained from said first means at said output of said second means.

8. An indicia string comparator as set forth in claim 1, wherein:
   said third means includes R means having an input and output and M means having an input and output,
   said R means for providing a tally of common portions of the indicia strings by summing input from said second means, said R means input is said third means input,
   said M means for computing a numeric measurement of the common portions of the indicia string by summing input from said R means, said output of said R means connected to said input of said M means, said output of said M means is said third means' output.

9. An indicia string comparator as set forth in claims 4 or 6, wherein;
   said third means including R means including an input and output, and M means including an input and output;
   said R means for providing a tallying sum of the weights of the weights of the common portions by summing input from said second means, said input of said R means is said input of said third means;
   said M means for providing a numeric measurement of the weight of the common portions of the indicia strings by summing input from said R means, said input of said M means connected to said output of said R means, said output of said M means is said third means' output.

10. An indicia string comparator as set forth in claims 5 or 7;
   said third means for computing a numeric measurement including CA means including an input and output CB means including an input and output, R means including an input, and output M means including an input and output,
   said CA means for providing a numeric measurement of the sum of the compensation values of the indicia of the shorter string unmatched by indicia in the longer string, said input of said CA means is said third means input,
   said CB means for providing a numeric measurement of the sum of the compensation values of the indicia of the longer string unmatched by indicia in the shorter string, said input of said CB means connected to said output of said CA means,
   said R means for providing a tallying sum of the weights of the common portions and of the compensations by summing output from said CA means, CB means and said second means, said input of said R means connected to said output of said CB means, said M means for providing a numeric measurement of the weight of the common portions of the indicia strings by summing input from said R means, said input of said M means connected to said output of said R means, said output of said M means is said third means' output.

11. An indicia string comparator circuit as set forth in claims 1, 2, 4, 5, 6, 7, or 8, wherein
- fourth means having an input and output, said fourth means for computing a numeric measurement of the total weight of the indicia strings, said fourth means connected to said output of said second means.

12. An indicia string comparator circuit for providing a numeric measurement of the degree of indicia string similarity between a record indicia string and a query indicia string, comprising:
- a first means connected to a digital source of record string indicia and query string indicia;
- said first means includes string control means and a paramenter generation means,
- said string control means including an output, said string control means for presenting record string indicia and query string indicia alternately and presenting control information at said output of said string control means,
- said parameter generation means connected to said output of said string control means, and said parameter generation means for presenting an indicia weight and an indicia compensation value for the indicia input from said string control means, for presenting all the inputs from said string control means and for presenting an indicia weight and an indicia compensation value,
- read/write memory operably connected to a core means,
- said core means having an input operably connected to said output of said parameter generation means, said core means having an output, said core means for reading from and writing to said read/write memory and for indicating at said output of said core means common portions of the indicia strings by generating control signals based on indicia counts,
- CA means having an input and output for providing a numeric measurement of the sum of the compensation values of the indicia of the shorter string unmatched by indicia in the longer string, said input of said CA means connected to said output of said second means,
- CB means having an input and output for providing a numeric measurement of the sum of the compensation values of the indicia of the longer string unmatched by indicia in the shorter string, said input of said CB means connected to said output of said CA means,
- R means for providing a tallying sum of the weights of the common portions and of the compensations by summing output from said CA means, CB means and said second means, said input of said R means connected to said output of said CB, means,
- M means for providing and presenting a digital signal representing a numeric measurement of the weight of the common portions of the indicia strings by summing input from said R means, said input of said M means connected to said output of said R means,
- fourth means having an input and output, said input of said fourth means connected to said output of core means, said fourth means for computing and presenting a digital signal representing a numeric measurement of the total weight of the indicia strings.

13. An indicia string comparator circuit as set forth in claim 1 or 8 including,
- a fourth means including TOTR means and TOTM means,
- said TOTR means having an input and output for providing a tally of indicia by summing input from said second means, input of said TOTR means connected to said output of second means,
- said TOTM means having an input and output for providing a numeric measurement of the total weight of the indicia strings by summing input from said TOTR means, said input of said TOTM means connected to said output of said TOTR means, said output of said TOTM means is said fourth means' output.

14. An indicia string comparator circuit as set forth in claims 12, wherein:
- said fourth means including TOTR means and TOTM means,
- said TOTR means having an input and output for providing a tally of indicia by summing input from said second means, input of said TOTR means connected to said output of core means,
- said TOTM means having an input and output for providing a numeric measurement of the total weight of the indicia strings by summing input from said TOTR means, said input of said TOTM means connected to said output of said TOTR means, said output of said TOTM means is said fourth means' output.

15. An indicia string comparator circuit as set forth in claim 14, wherein
- divider means including an input and output, said divider means for computing and presenting a digital signal representing the ratio of the output of said M means over said output of said TOTM means.

16. An indicia string comparator circuit as set forth in claim 8 including,
- a fourth means including TOTR means and TOTM means,
- said TOTR means having an input and output for providing a tally of indicia by summing input from said second means, input of said TOTR means connected to said output of second means,
- said TOTM means having an input and output for providing a numeric measurement of the total weight of the indicia strings by summing input from said TOTR means, said input of said TOTM means connected to said output of said TOTR means,
- divider means including an input and output, said divider means for computing and presenting a digital signal representing the ratio of the output of said M means over said output of said TOTM means.

17. An indicia string comparator circuit as set forth in claim 12, wherein
- said indicia string comparator circuit including said first means, said read/write memory, said core means, said CA means, said CB means, said R means, said M means and said fourth means for computation in a time span generally proportional to the average length of said indicia strings.

18. An indicia string comparator circuit as set forth in claim 14 including:
  divider means including an input and output, said divider means for computing and presenting a digital signal representing the ratio of the output of said M means over said output of said TOTM means,
  a bus control means connected to said string control means and said parameter generator means for controlling all external accesses to said indicia string comparator circuit and a ranker means and for monitoring the activities of said ranker means and the indicia string comparator means;
  said ranker means for maintaining a ranked list of the best string comparison results for saving said ranked list in a memory accessible to external devices, for having said ranked list contain entries consisting of a record pointer and a string similarity coefficient, and for having said string similarity coefficient as an input from said divier means.

19. A system circuit as set forth in claim 18, including;
  a Master Control means connected to said bus control means and said string control means for automatic loading of words from an external memory into the memory of said string control means.

20. A word comparator device for use with a digital data processing device and an input/output display device, said word comparator device for providing a numeric measurement of the degree of indicia similarity between query words and record words whereby said records words can be ranked by said digital data processing device and displayed according to rank by said input/output display device in a quick and expeditious manner, comprising:
  a selecting means having at least one selecting means input and a selecting means output, said selecting means for alternately addressing and routing a query word character and a record word character to said selecting means output;
  said record word storage area electrically coupled to a selecting means input;
  said query word input/output device electrically coupled to a selecting means input;
  a read/write memory means having a memory means input, memory means output, and updating input, said memory means input is connected to said selecting means output, said read/write memory means for storage and retrieval of numeric information addressed by said selecting means;
  control timing circuit means for selecting either the read or write mode of said read/write memory means and for defining whether a query word or record word is being processed, said control timing circuit connected to a selecting means input for controlling the input of query words and record words;

said control timing circuit means connected to said read/write memory means,
  an adder means including an adder input connected to said read/write memory means output and an adder output, said adder means for incrementing or decrementing the numeric information and updating of said read/write memory means;
  said control timing circuit means for controlling the state of said adder means, connected to said adder means;
  latching means connected to said adder output, said latching means for updating said read/write memory means with said adder output;
  said control timing circuit means for controlling the state of said latching means, connected to said latching means;
  a test means including comparator means, said test means for generating a test output depending on the state of said control timing circuit means, said test output being representative of the numeric character similarity between a query word and a corresponding record indicia string;
  said control timing circuit means for controlling said test means, connected to said test means; and
  output latch means connected to said test means; said output latch means for providing an output which represents a cumulative numeric measurement of the numeric character similarities representative of the degree of word similarity between the record word and the query word.

21. A method of ordering stored data words using a general purpose electronic data processor having a central processing unit with a working storage area, at least one random access storage device and at least one input/output means, said method of ordering stored data words comprising the steps of:
  generating a query word of sequentially ordered data characters;
  generating strings of sequentially ordered stored data word characters, each said string representing a stored data word;
  comparing each ordered data character of each said stored data word with a respective ordered data character of said query word;
  calculating a forward similarity function between said query word and each said stored data word;
  reversing the ordered sequence of said query word data characters and each said stored data word;
  comparing each ordered data character of each said string with a respective ordered data character of said query word;
  calculating a reverse similarity function between said query word and each said stored data word;
  calculating a total similarity function between each said stored data word and said query word;
  ordering said stored data word relative to said total similarity function.

* * * * *